US012425341B2

(12) United States Patent
Soffer

(10) Patent No.: US 12,425,341 B2
(45) Date of Patent: Sep. 23, 2025

(54) LONGEST PREFIX MATCHING

(71) Applicant: Ethernity Networks

(72) Inventor: Guy Soffer, Lod Business Park (IL)

(73) Assignee: ETHERNITY NETWORKS, Airport City (IL)

( * ) Notice: Subject to any disclaimer, the term of this patent is extended or adjusted under 35 U.S.C. 154(b) by 417 days.

(21) Appl. No.: 17/929,756

(22) Filed: Sep. 6, 2022

(65) Prior Publication Data

US 2024/0015102 A1 Jan. 11, 2024

Related U.S. Application Data

(60) Provisional application No. 63/260,933, filed on Sep. 6, 2021.

(51) Int. Cl.
*H04L 45/748* (2022.01)
*H04L 45/48* (2022.01)

(52) U.S. Cl.
CPC ............ *H04L 45/748* (2013.01); *H04L 45/48* (2013.01)

(58) Field of Classification Search
CPC .............................. H04L 45/748; H04L 45/48
See application file for complete search history.

(56) References Cited

U.S. PATENT DOCUMENTS

2002/0143747 A1* 10/2002 Tal ...................... G06F 16/9027
2013/0268542 A1* 10/2013 Dinwoodie ........... G06F 16/322 707/769
2023/0015569 A1* 1/2023 Davies ............... G06Q 20/3827

* cited by examiner

*Primary Examiner* — Nizam U Ahmed
(74) *Attorney, Agent, or Firm* — Reches Patents

(57) ABSTRACT

A method for routing using longest prefix matching. The method may include receiving a packet associated with a packet destination address; scanning, using the packet destination address, a tree that comprises multiple nodes to find a longest matching destination address prefix. The multiple nodes may include leaf nodes and non-leaf (NL) nodes. The NL nodes are associated with node boundary values that represent boundaries of destination address ranges, the destination address ranges are spanned by destination addresses prefixes of a routing table; and applying at least one routing decision, based on the longest matching destination address prefix. Each NL node has NL children nodes. The NL node is also associated with the NL children node pointers that point to the NL children nodes; introducing one or more changes in values of one or more of the boundaries of destination address ranges, while maintaining links to the multiple nodes unchanged.

23 Claims, 152 Drawing Sheets

BinTree Construction from a Sub-trie

- Binary tree construction is performed by treating the sub-trie as list or IP ranges in the IP space.

Grid-of-Tries

- The root of each sub-trie is designated as "leader".
- The leaders are forming the backbone (BB) of the trie, or the Grid-of-Tries.
- The leaders are the entries of the TinyLPM.

Traversing the Sub-tries

- Now, that we have a sub-trie, we can traverse it in 2 ways:
  - As a trie – simple, but performance is bad in the worst case (linear in number of prefixes).
  - As a binary tree – needs SW conversion, but logarithmic in worst case.

BinTree Construction from a Sub-trie

- Binary tree construction is performed by treating the sub-trie as list or IP ranges in the IP space.

BinTree Node Format

- Value = the IP address to compare with. 64bit for both IPv4 & IPv6
- Lfinal = flag that indicates if left child is a leaf (action). 1bit
- Rfinal = flag that indicates if right child is a leaf (action). 1bit
- Lchild = left child. 16bit
  Contains action of <Lfinal>=1 or next node ID if <Lfinal>=0.
- Rchild = right child. 16bit
  Contains action of <Rfinal>=1 or next node ID if <Rfinal>=0.

Merging nodes to provide m-ary tree, m exceed 2

- Better utilization might be achieved using mode merging

- Node format:

| 64bit | 64bit | | | | 8bit | 8bit |
| --- | --- | --- | --- | --- | --- | --- |
| valueX | valueY | | | | Type | Rsrv |
| valueZ | child0 | child1 | child2 | child3 | Reserved | |
| | 16bit | 16bit | 16bit | 16bit | | |

Different trees to different address lengths

- Separation of IPv4 nodes from IPv6 nodes.
  IPv4 nodes can be represented with 9 Bytes, which can utilize URAM better.

14

16

HW Assist – AddPrefix Min Value

- SW Provides the NewLimit to be added (either New_Prefix_MIN or New_Prefix_MAX)
- SW provides the new location – where to put the new limit (Free Node Location within a URAM)
- SW maintains a list of Free Entries in each URAM (UnUsed)
- HW scans the tree (starting at VRF/FSB)
- HW identifies which nodes should be updated:
  - Two Consecutive nodes where the new Limit falls in between their X-Value:
    PrevNode.Xvalue < NewLimit < NextNode.Xvalue
- HW updates Child Pointers accordingly (assuming adding Prefix.MinValue):
  - NewLocation.Xvalue = NewLimit
  - NewLocation.NodeType = NewNodeType
  - NewLocation.RightChild = PrevNode.RightChild
  - NewLocation.LeftChild = NextNode.LeftChild
  - PrevNode.RightChild = NewLocation
  - NextNode.LeftChild = NewChildPointer (Action)
- If needed (requested by SW), HW also rolls the tree either Left or Right
- AddNewPrefix Parameters:
  - NewLocation – 17 bit (physical address in URAM)
  - NewChildPointer – 17 bit (Pointer to Next Node of New Prefix. This is the "New Range Name"
  - NewLimit - 32 bit ( this is either the minimum or maximum value which this new prefix can have)
  - NewNodeType – 4 bit ( the new node type: Normal, Final, or Skip)
  - NewPrefixMinOrMax – 1 bit (0=Min, 1= Max) - Indicates whether this New Limit is the Min of the New Prefix or the Max of the New Prefix
  - Roll – 2 bits (2'b00=NoRoll, 2'b01=RollRight, 2'b10=RollLeft)

FIG. 18

HW Assist – AddPrefix Max Value

- SW Provides the NewLimit to be added (either New_Prefix_MIN or New_Prefix_MAX)
- SW provides the new location – where to put the new limit (Free Node Location within a URAM)
- SW maintains a list of Free Entries in each URAM (UnUsed)
- HW scans the tree (starting at VRF/FSB)
- HW identifies which nodes should be updated:
  - Two Consecutive nodes where the new Limit falls in between their X-Value:
    PrevNode.Xvalue < NewLimit < NextNode.Xvalue
- HW updates Child Pointers accordingly (assuming adding Prefix.MaxValue):
  - NewLocation.Xvalue = NewLimit
  - NewLocation.NodeType = NewNodeType
  - NewLocation.RightChild = PrevNode.RightChild
  - NewLocation.LeftChild = NewChildPointer (Action)
  - PrevNode.RightChild = NewLocation
- If needed (requested by SW), HW also rolls the tree either Left or Right
- AddNewPrefix Parameters:
  - NewLocation – 17 bit (physical address in URAM)
  - NewChildPointer – 17 bit (Pointer to Next Node of New Prefix. This is the "New Range Name"
  - NewLimit - 32 bit ( this is either the minimum or maximum value which this new prefix can have)
  - NewNodeType – 4 bit ( the new node type: Normal, Final, or Skip)
  - NewPrefixMinOrMax – 1 bit (0=Min, 1= Max) - Indicates whether this New Limit is the Min of the New Prefix or the Max of the New Prefix
  - Roll – 2 bits (2'b00=NoRoll, 2'b01=RollRight, 2'b10=RollLeft)

- Add New Node:
  - Find the right place where to add the New Node (based on its X_Value) – See later
  - Create a FreeSpot below this location – See later
    - "Below" means a FreeSpot in LastStage below this location
    - FreeSpot below means: PrevNode has *ChildIsLast* in *2ndLastStage*
    - In other words: PrevNode should be in Stage N-1 (at 2nd Last Stage)
- Create a FreeSpot below PrevNode (only if needed, i.e., only if PrevNode does not have any ChildIsLast )
  - PrevNode should move to LastStage
  - New Node should be placed at Stage N-1 (where PrevNode was)
- If a certain Stage is FULL then ALL the Stages are Full
- If you have to do PUSH-UP Tree then it means the upper level (Stage N-1) is only half full (or even less)
- Each Push-UP tripples the potential capacity of a tree (immediately following Push-Up, 2*N of the Nodes are FreeSpots and N are Final Nodes and N-1 are Non-Final).
  Later, each Final-Node + 2 FreeSpots will be converted into 2 New Final-Nodes.
- FreeSpots belong to all VRFs and can serve all of them
- Push-Up practically, prepares the physical location in the pipe to handle the next level (additional pipe stage).
- It does NOT allocate the nodes for that stage for that VRF.
- Push-Down releases precious nodes of <u>early</u> pipe stages to other VRFs. Meaning, that VRF can be fully stored in cheaper nodes (later pipe stages)

FIG. 24

Push UP/Down Hysteresis

- In order to avoid Push-Tree UP and Down constantly flipping a hysteresis mechanism must be put in place
- Push-Up
  - SW should accumulate N (e.g. 10) new Prefix Adding before Push-Up in order to reduce the probably of Push-Down in the following cycle
- Push-Down
  - Push down may not be done immediately – it can/should be delayed
  - It is better to delay it till it is really required for 2 reasons:
    - The VRF tree (which requires push-down) may add a new prefix soon (which will require a Push-Up). So delaying will prevent unnecessary Push-Down followed by Push-Up cycle.
    - While no other VRF requires the “captured” precious memory space the “release” process (Push-Down) can be done in the background in low profile without performance hit to other higher priority maintenance tasks (e.g. adding new prefixes to other VRFs which have FreeSpots)
  - Once another VRF has a full tree and needs room for more nodes this is when Push-Down becomes critical and should be done promptly

FIG. 25

Push UP/Down Hysteresis

- If Push-Down is delayed, then Push-Down of more than 1 level might be required as the VRF removes more prefixes (especially in small trees)
- SW must keep track of how many Push-Down levels are pending for each VRF
- Accumulating several Push-Downs of a VRF reduces the maintenance BW and improves the UPDATE rate of other VRFs. This is at the cost of delaying the release of precious LPM node resources to the Free-Pool.

FIG. 26

Where to add a NewNode?

- Search the tree all the way down with the *NewNode* (X-Value)
- If you choose Right (PrevNode < NewNode) and:
    - PrevNode < *NewNode* & NextNode > *NewNode* & NextLeftChild is Last
    - Add between PrevNode and NextNode
    - PrevNode should have a FreeSpot below it
- If you choose Left (PrevNode > NewNode):
    - PrevNode > *NewNode* & NextNode < *NewNode* & NextRightChild is Last
    - Add between PrevNode and NextNode

- If you choose Right (<u>right most bottom</u>):

PrevNode < NewNode & NewNode < NewNode & NextRightChild is Last

Add NewNode to the NextRightChild (NextRightChild is no longer Last)
- If you choose Left (<u>left most bottom</u>):

PrevNode > NewNode & NextNode > NewNode & NextLeftChild is Last

Add NewNode to the NextLeftChild (NextLeftChild is no longer Last)

FIG. 27

SW Algorithm - MoveTreeRight

- Resolve last MAX nodes of Left-Cone
- Resolve last MIN nodes of Right-Cone
- Create a <u>New</u> MIN node in Right-Cone (at Address given by SW from FreePool):
  - X_Value = CommonTopNode.X_Value
  - LeftChild = LeftCone.MAX_Node.RightChild
  - RightChild = RightCone.MIN_Node.LeftChild
- Set RightCone.MIN_Node.LeftChild = NewMIN_Node.Address
- Set TopCommonNode.X_Value = LeftCone.MAX_Node.X_Value
- Set LeftCone.2ndLastMAX_Node.RightChild = LeftCone.MAX_Node.LeftChild
- Delete LeftCone.MAX_Node.* (Add its address to FreePool)

FIG. 40

SW Algorithm - MoveTreeLeft

- Resolve last MAX nodes of Left-Cone
- Resolve last MIN nodes of Right-Cone
- Create a New MAX node in Left-Cone (at Address given by SW from FreePool):
  - X_Value = CommonTopNode.X_Value
  - LeftChild = LeftCone.MAX_Node.RightChild
  - RightChild = RightCone.MIN_Node.LeftChild
- Set LeftCone.MAX_Node.RightChild = NewMAX_Node.Address
- Set TopCommonNode.X_Value = RightCone.MIN_Node.X_Value
- Set RightCone.2ndLastMIN_Node.LeftChild = RightCone.MIN_Node.RightChild
- Delete RightCone.MIN_Node.* (Add its address to FreePool)

FIG. 41

SW Algorithm – How To Find TopCommonNode

- If you stand on LeftCone.MAX_Node
  - Climb up the tree – search backwards
  - Search for the first Node in which you enter via its LeftChild
  - This is the TopCommonNode
  - To find RightCone.MIN_Node:
    - Select RightChild of TopCommonNode
    - Keep moving DOWN the tree while selecting always LeftChild
- If you stand on RightCone.MIN_Node
  - Climb up the tree
  - Search for the first Node in which you enter via its RightChild
  - This is the TopCommonNode
  - To find LeftCone.MAX_Node:
    - Select LeftChild of TopCommonNode
    - Keep moving DOWN the tree while selecting always RightChild

FIG. 42

SW Algorithm – How To Find TopCommonNode

- Search the X_VALUE of LeftCone.MAX_Node.X_VALUE in the tree (top to button – regular search)
- Keep track of the nodes traversed during the search
- The last node in which you chose LeftChild is the TopCommonNode

- Search the X_VALUE of RightCone.MIN_Node.X_VALUE in the tree (top to button – regular search)
- Keep track of the nodes traversed during the search
- The last node in which you chose RightChild is the TopCommonNode

- Remember:
  SW keeps track per VRF the MIN and MAX nodes per URAM per STAGE

FIG. 43

Main Concept

- Get List of all Limits (prefix thresholds) sorted in ascending order (from SW)
- No need for Node-Type (2 bits) in each node
- Add VRF (3 bits) to each Node
- For Build LEFT-2-RIGHT scan Limit-List from smallest to largest
- For Build RIGHT-2-LEFT scan Limit-List from largest to smallest
- Place each limit in a binary skeleton while scanning the skeleton in order (see later)
- Uses minimum number of Skip Nodes (maximum 2 skip nodes per stage, L/R)
- Skip nodes are only at right hand when tree is built L2R
- Skip nodes are only at left hand when tree is built R2L
- Skip nodes could be 1 in left 1 in right after update (per stage)
- Once there are no Skip nodes (tree is full) a new chain of skip nodes is open from a new(upper) Top-Cone-Node to a new Bottom Node (either to the left or to the right)

FIG. 100

LONGEST PREFIX MATCHING

CROSS REFERENCE

This application claims priority from U.S. provisional patent Ser. No. 63/260,933 filing date Sep. 6, 2022, which is incorporated by reference.

BACKGROUND OF THE INVENTION

Routers use forwarding table to determine which incoming packet should be forwarded to which next hop. The forwarding table maps destination IP prefix values to (at least) the next hop.

An IP prefix is a set of IP addresses with the same IP prefix. For example, 20.2.1.0/28 is an IP prefix of all the IP addresses with the same 28 most significant bits specified by 20.2.1.0. It covers all the addresses from 20.2.1.0 till 20.2.1.0/15. Similarly, 20.2.1.0/24 covers all the addresses from 20.2.1.0 till 20.2.1.255.

When a packet needs to be forwarded routers look at the destination IP address, searches the forwarding table for a match and forwards the packet to corresponding next hop.

An example of a forwarding table is provided below:

TABLE 1

| Destination IP prefix | Next hop information |
|---|---|
| 10.1.1.0/24 | R0 |
| 10.1.2.0/24 | R1 |
| 10.1.0.0/16 | R2 |
| 20.2.1.0/28 | R1 |

An IP prefixes might overlap and an incoming destination IP may match multiple IP prefixes entries in the table.

For example a destination IP address of 10.1.1.3 matches both 10.1.1.0/24 and 10.1.1.0/16.

In this case the router use Longest Prefix Match (LPM)—to find the entry in the routing table which has the longest prefix matching with the incoming packet's destination IP and forward the packet to the corresponding next hop. In the mentioned above example the LPM for destination IP address of 10.1.1.3 is 10.1.1.0/24.

The LPM is a complex process, it has to take into account IP addresses and subnet masks, and is also time consuming. In theory, the IP address of each packet should be verified against all the prefixes stored in the routing table. In order to better understand the complexity, let's consider a typical router with an aggregate throughput of 100 Gbps (10 ports of 10 Gbps). The packet rate in that case is 150 million packets per second (64 byte packets). A typical routing table size is in the range of thousands to millions prefixes. This yields more than 150 billion searches per second which is a challenging, or even impractical process with today's technology. Common ways to overcome this challenge involve use of TCAM (Ternary Content Addressable Memory), and/or Hash tables, and/or Trie-Bit-Map algorithms. Besides for the compare process for every packet, an even bigger challenge is to manage the routing table during the lifetime of the router operation time. The routing table management is complex in two aspects: (1) in some solutions the longer prefixes must be placed at certain address/places in the database, and, (2) the database must remain coherent and provide the correct result at any given time. For (1), adding a new longer prefix may require shifting all the shorter prefixes by one space, or alternatively, deleting an obsolete prefix may require shifting all the shorter prefixes in the other direction. In order to overcome the second challenge (2), most router use "double-buffer" which means splitting the database into 2 Trees: (a) Active Tree, and, (b) Standby Tree, so that all the updates are done in the Standby Tree while all the IP searches are done in the Active-Tree, and the management SW, at some point, switches between the Active-Tree and the Standby-Tree. Due to the complexities involved in LPM, most implementations today are managed by SW, which means bottlenecks of CPU power and execution throughput/bandwidth.

There is a growing need to provide an efficient LPM process.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 18-21 illustrate examples of pseudo codes and additional examples of adding a destination address range;

FIGS. 24-43 illustrate examples of pseudo codes and additional example for updating the tree;

FIGS. 100-150 illustrate examples of pseudo codes, a tree that is compressed and updating the tree that is compressed in an iterative manner;

DETAILED DESCRIPTION OF THE DRAWINGS

Figure 1:
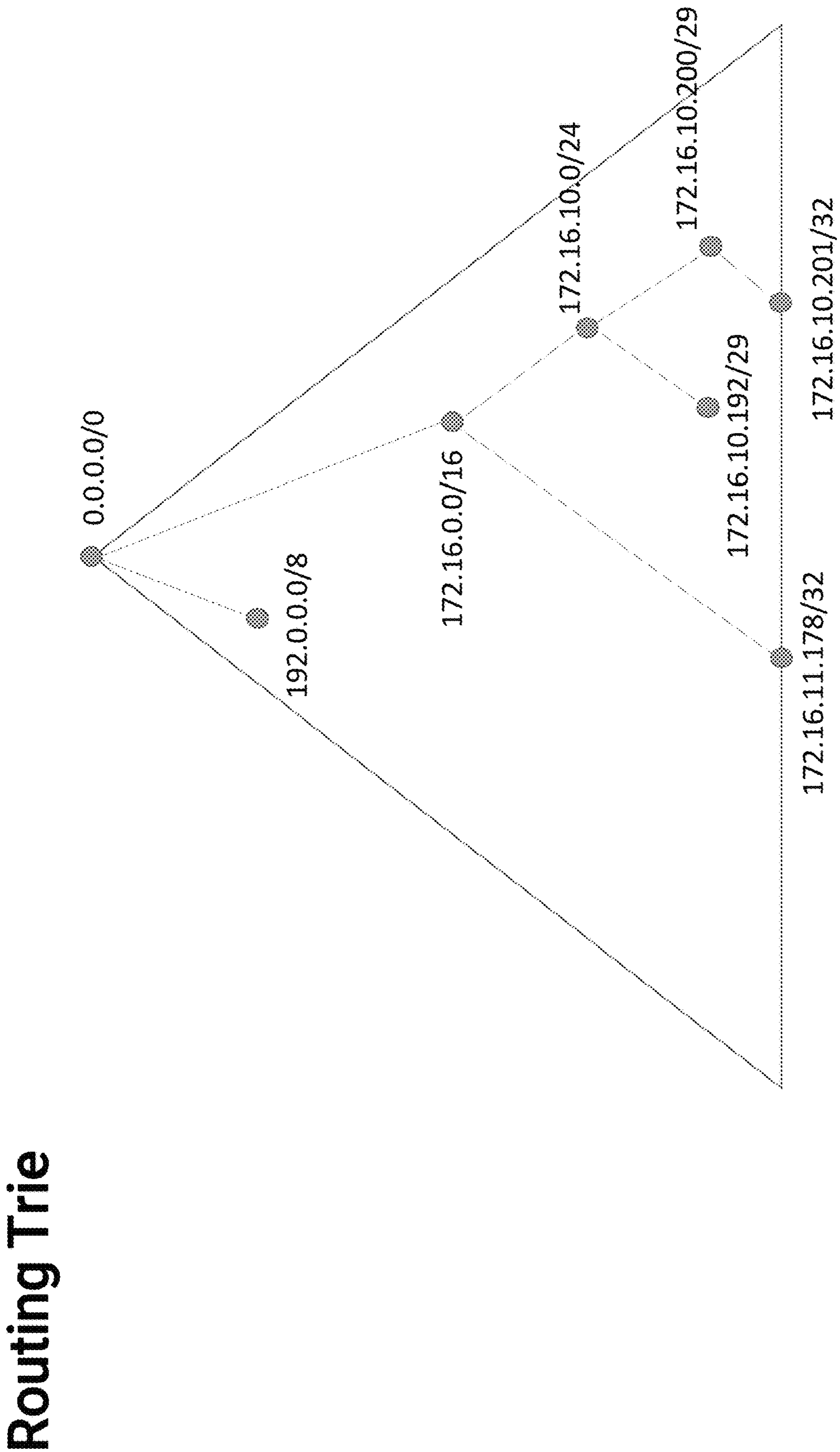
FIGS. 1-6 illustrates examples of a process for converting destination addresses prefixes of a routing table to an order set of destination address ranges.
Figure 2:
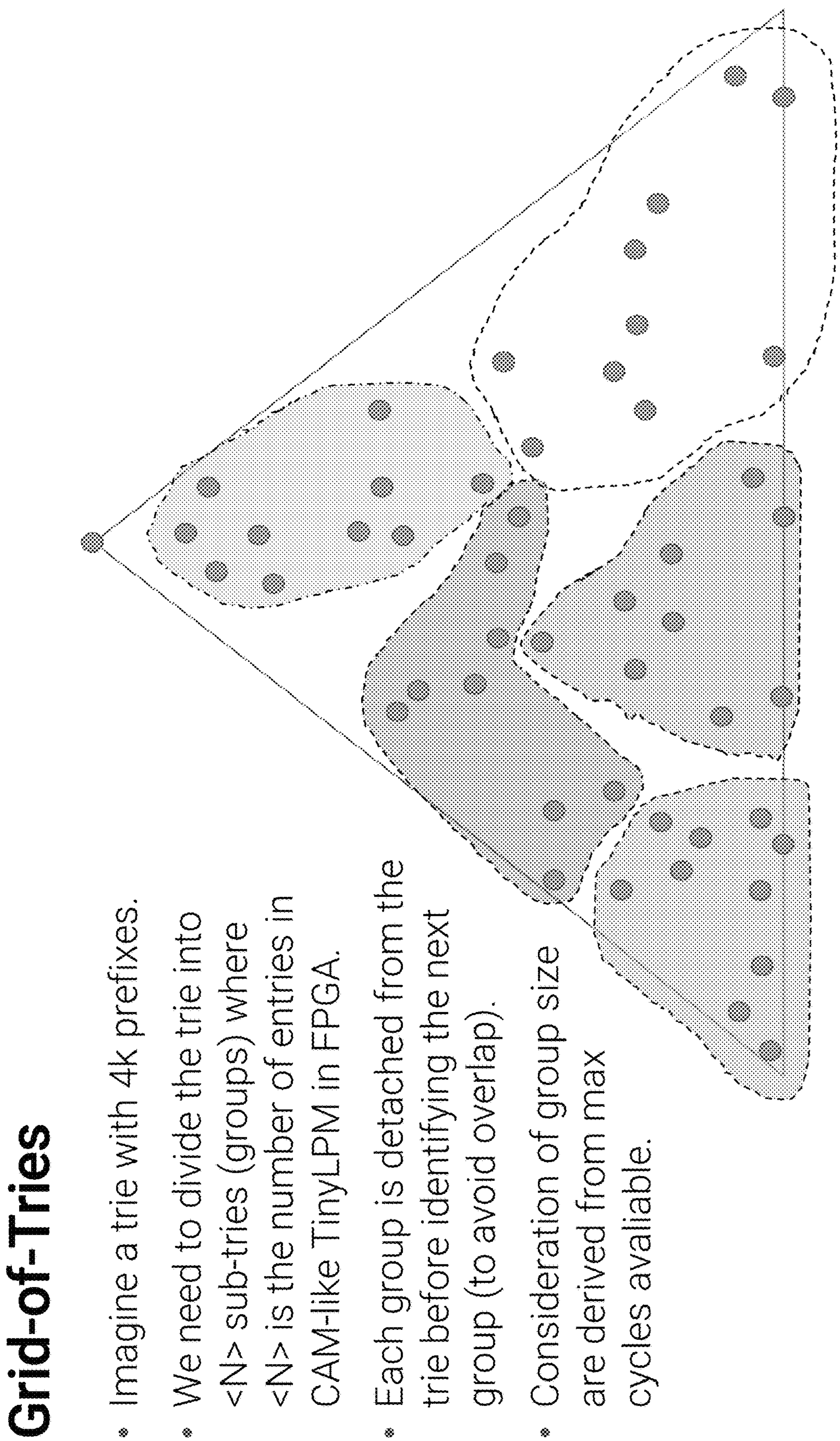
Figure 3:
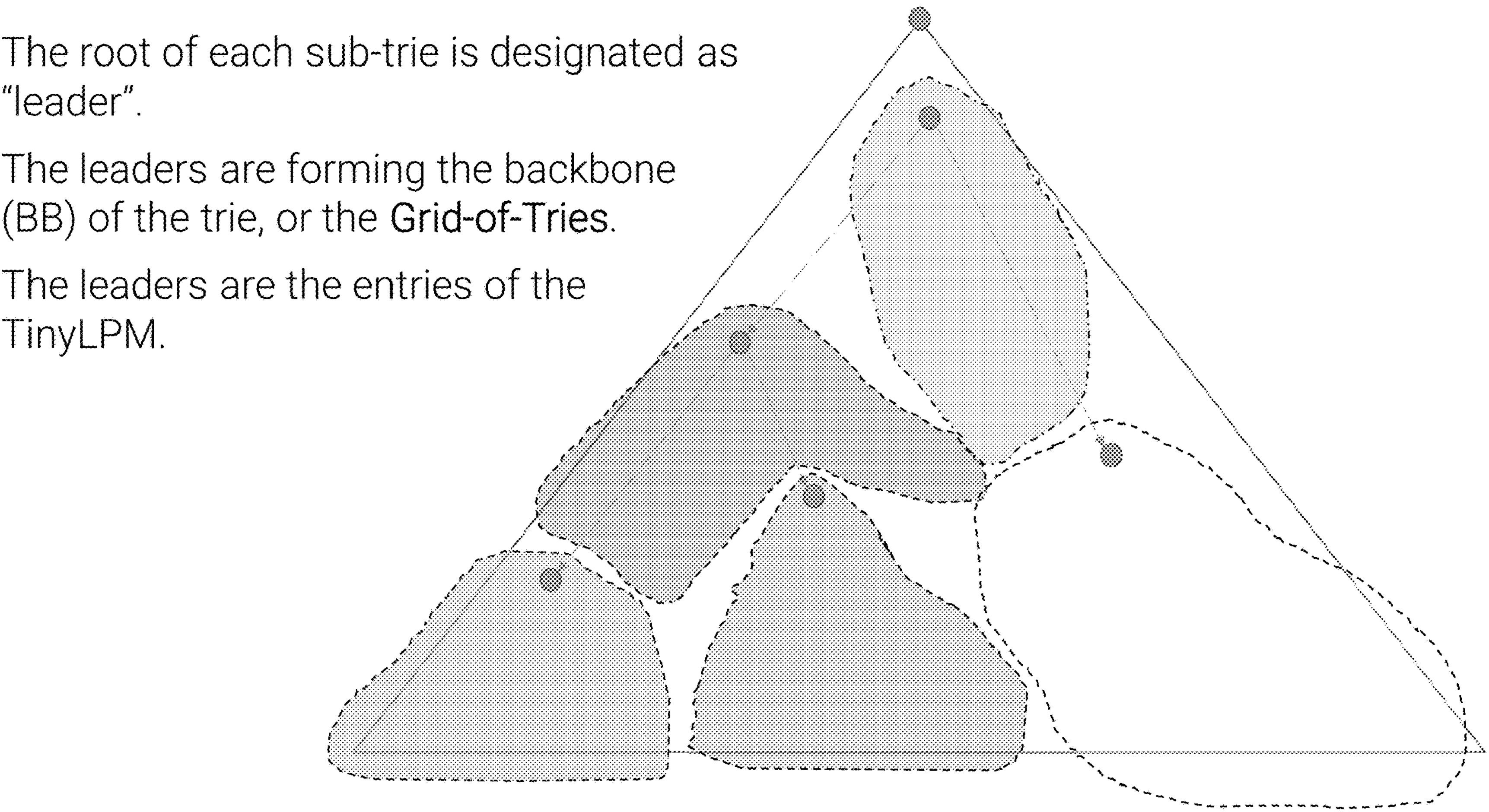
Figure 4:
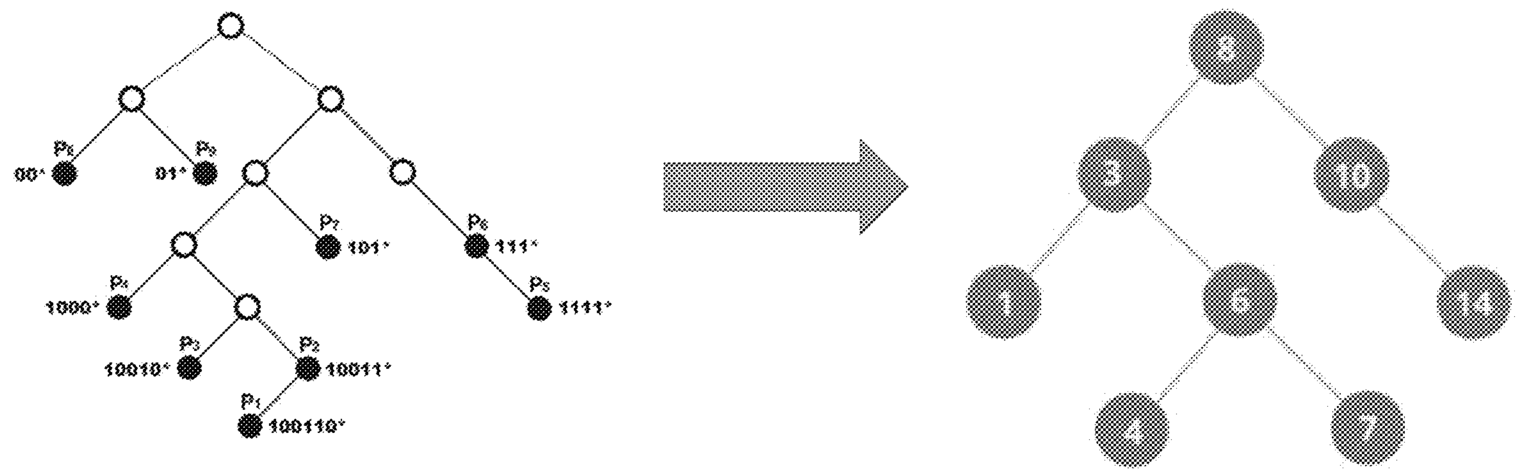
Figure 5:
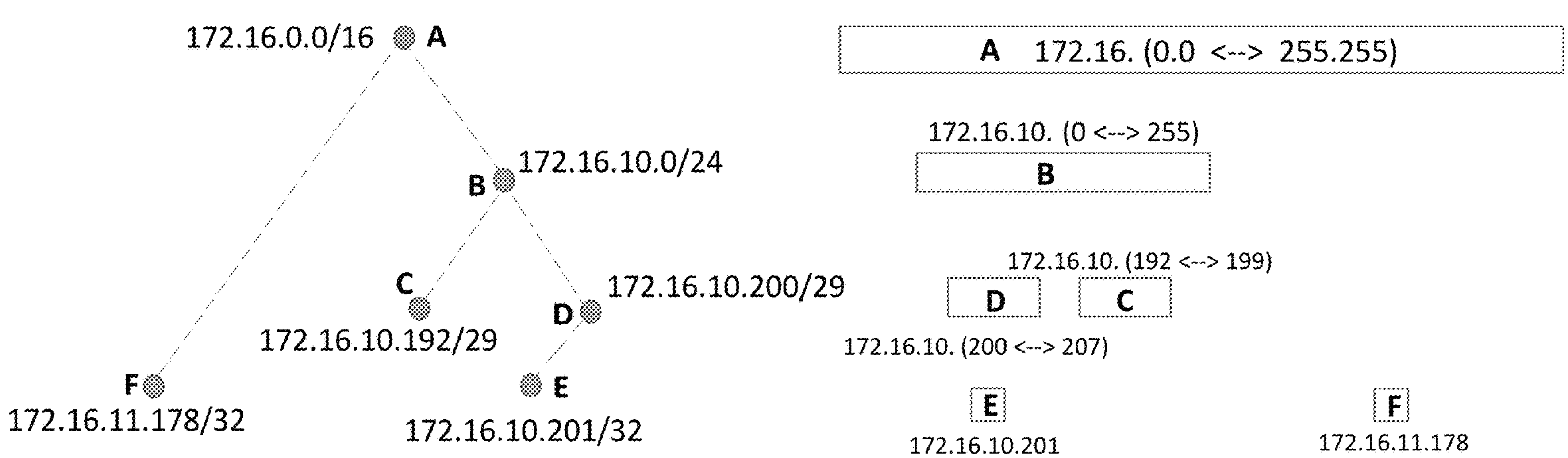
Figure 6:
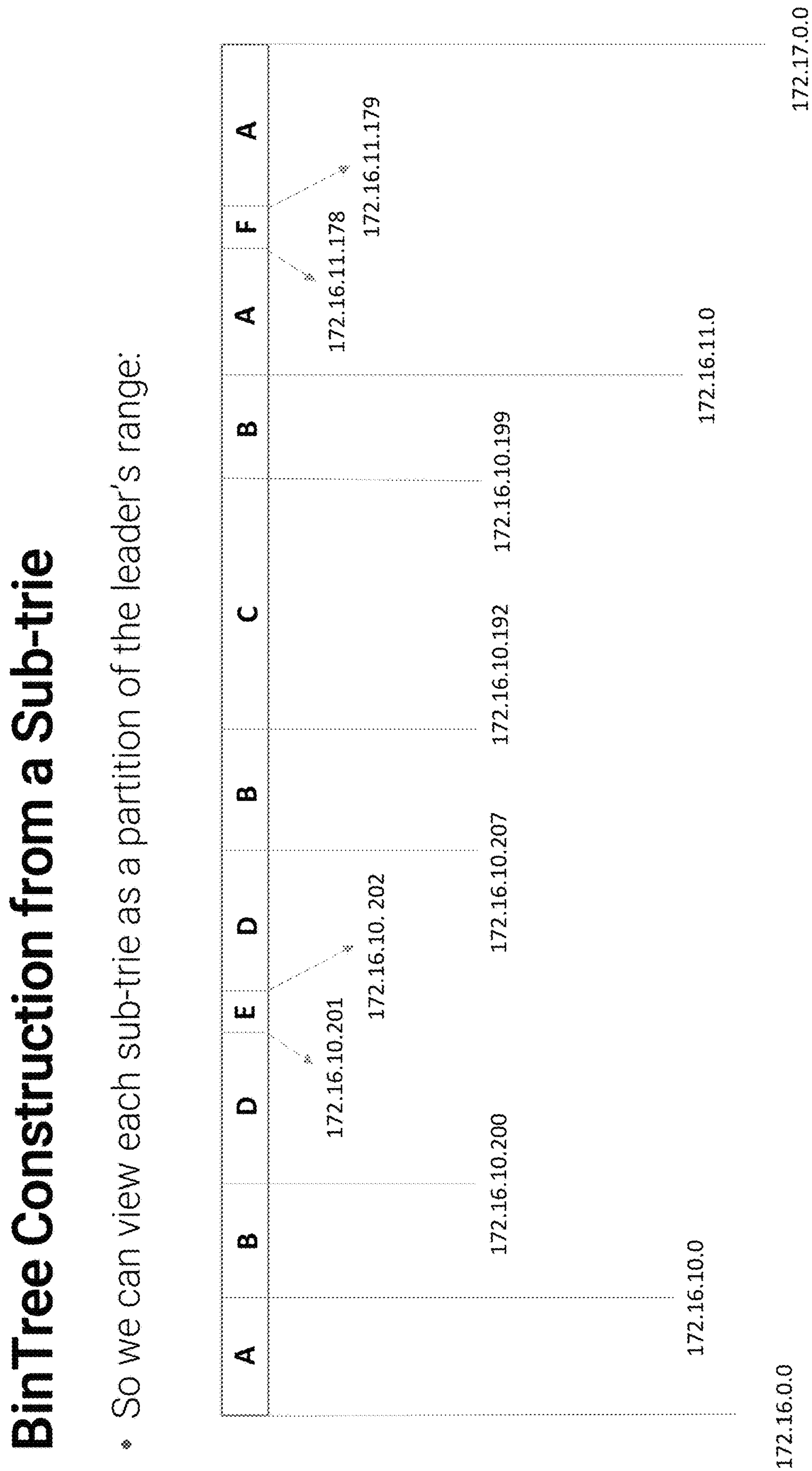
Figure 7:
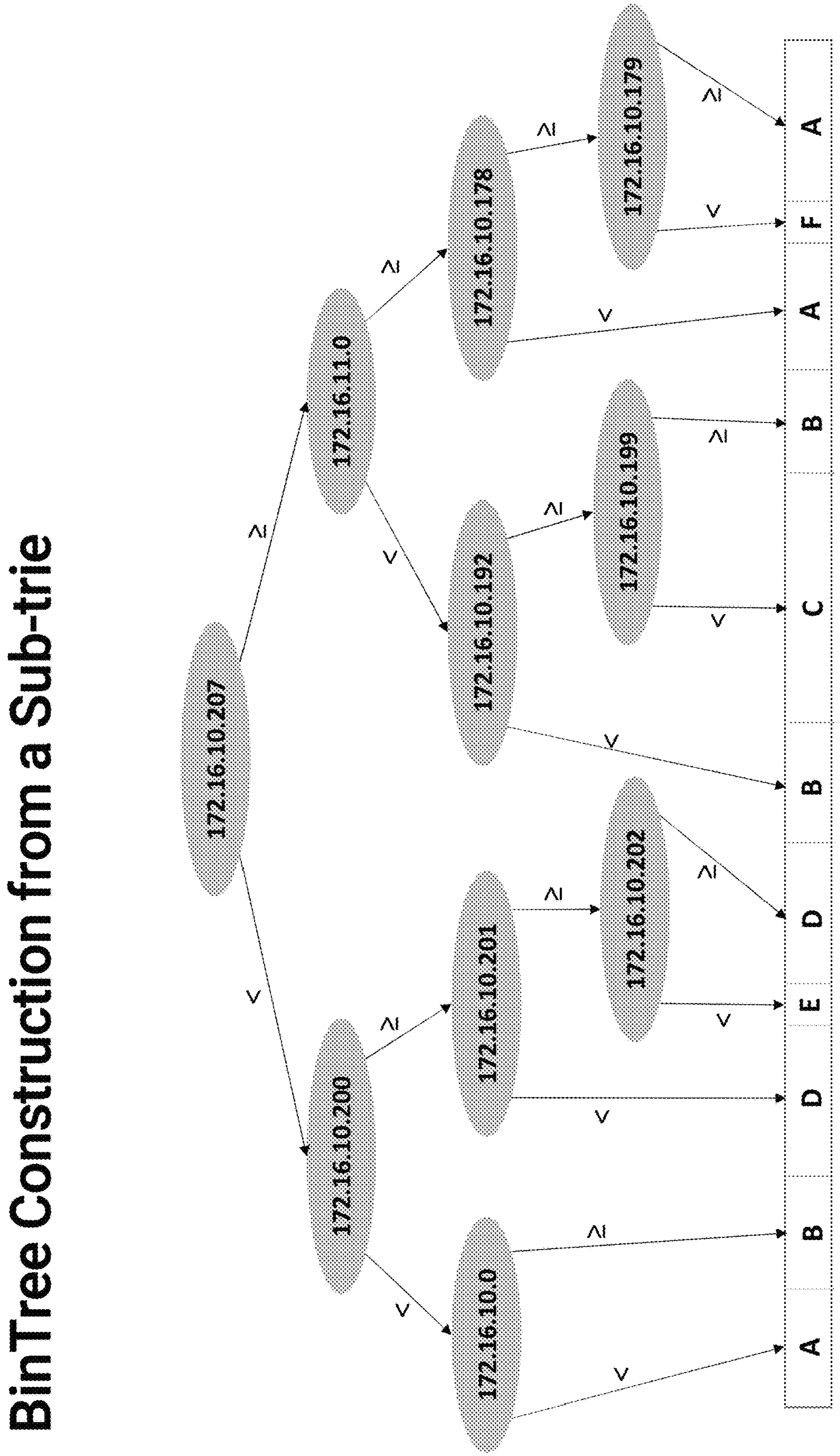
FIGS. 7-8 illustrates examples of a process for converting the order set of destination address ranges to a tree.
Figure 8:
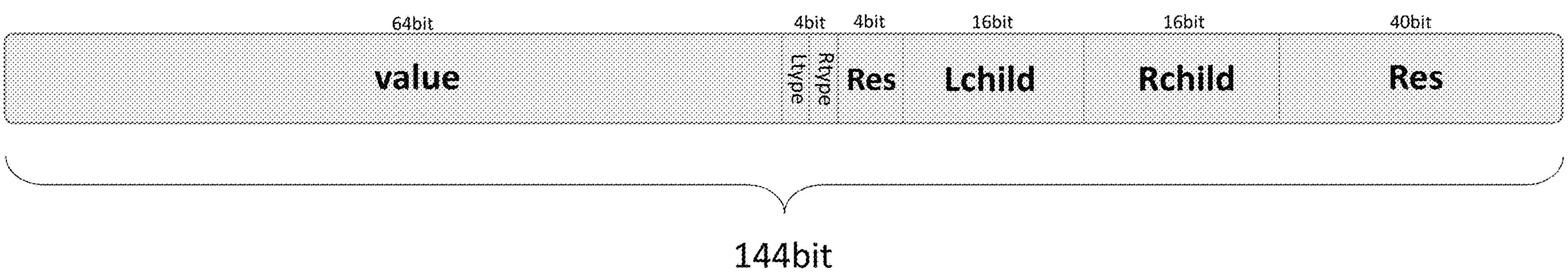

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

Any reference to the term "link" should be applied mutatis mutandis to the term "pointer". A link or a pointer from one information element to another information element is information for retrieving and/or accessing the other information element.

Figure 151:
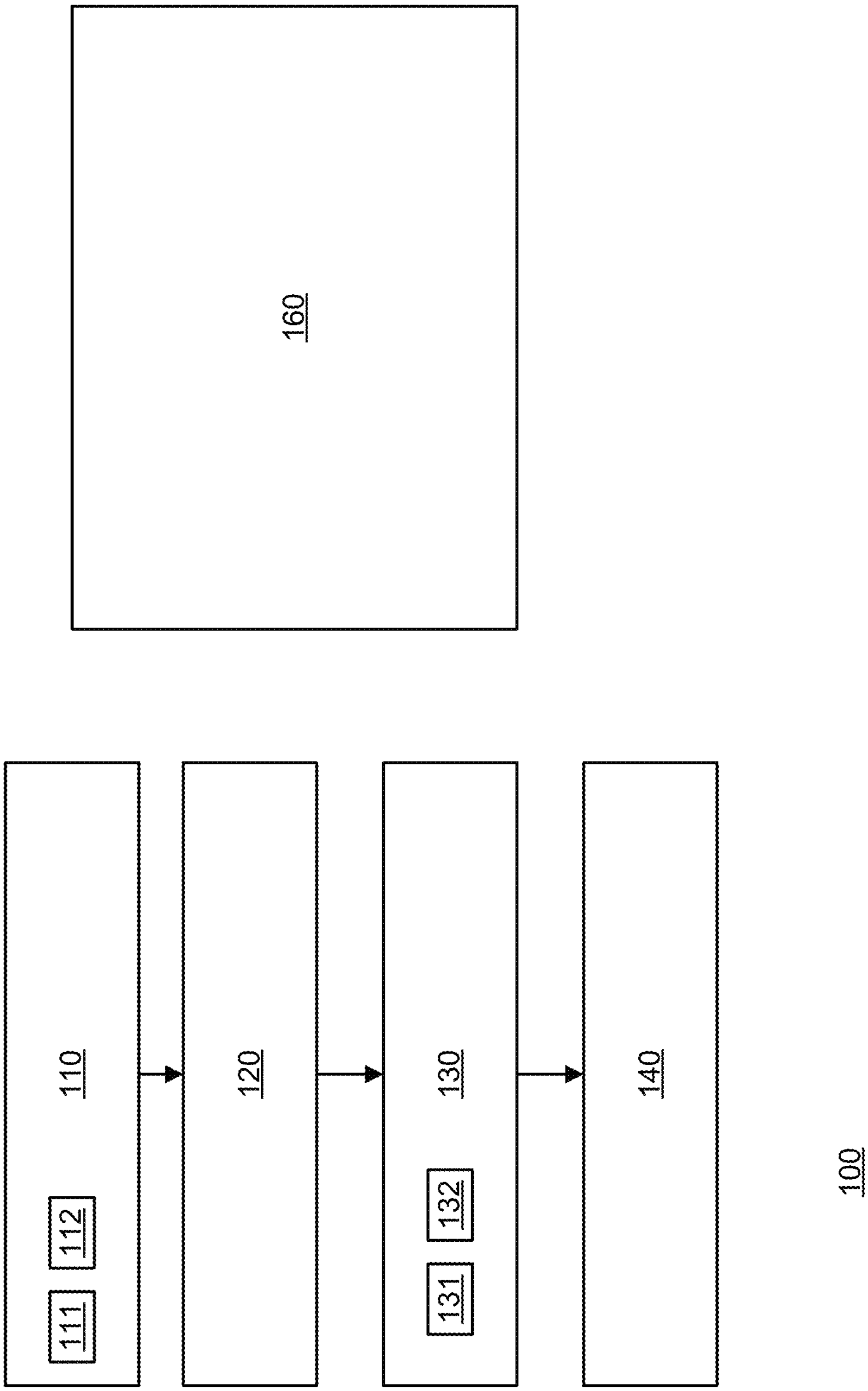
FIG. 151 illustrates an example of a method.

FIG. 151 illustrates an example of a method 100 for routing using longest prefix matching.

Figure 12:
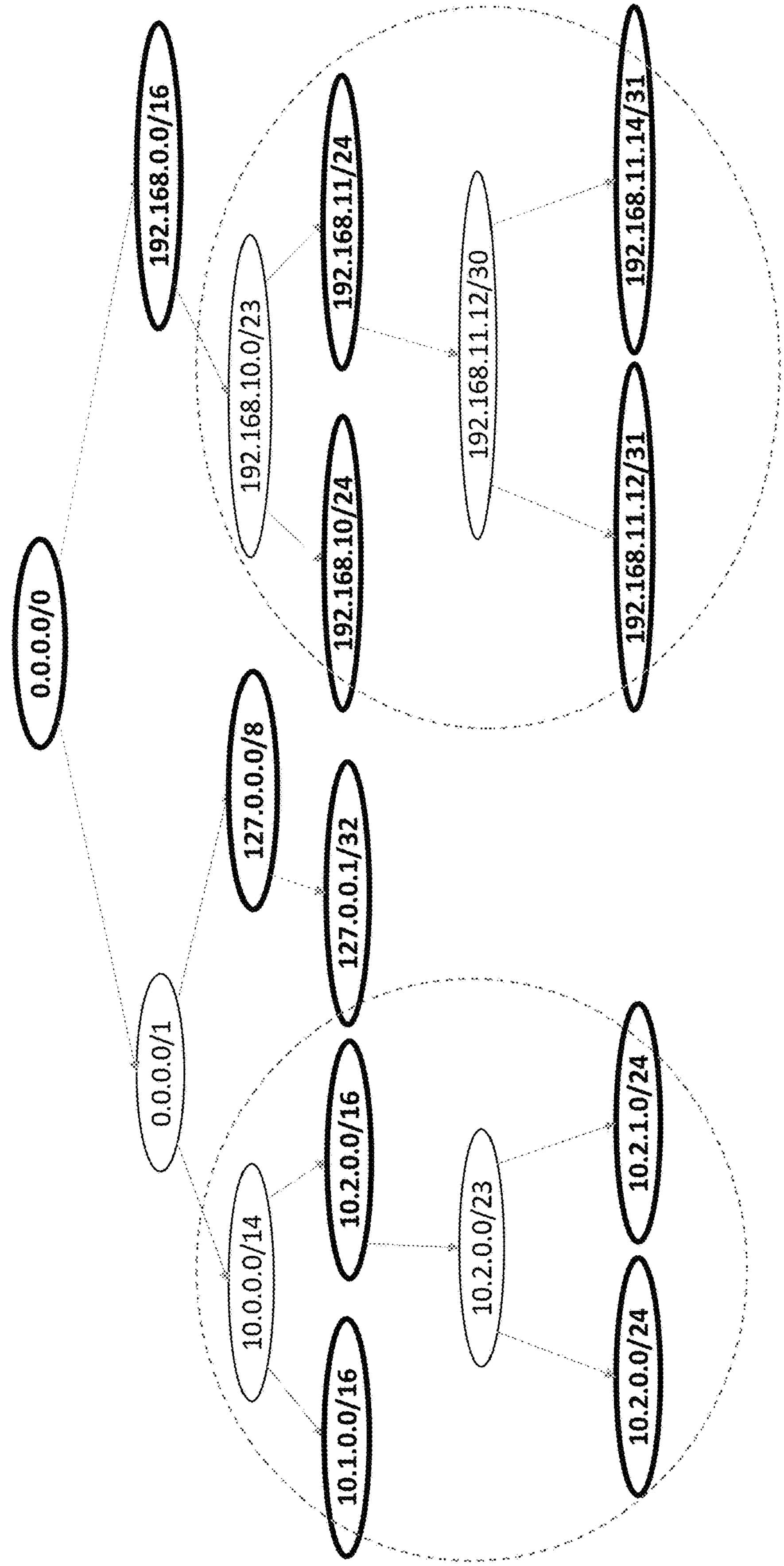
FIGS. 12-16 illustrate examples of nodes of trees and routing decisions.
Figure 13:
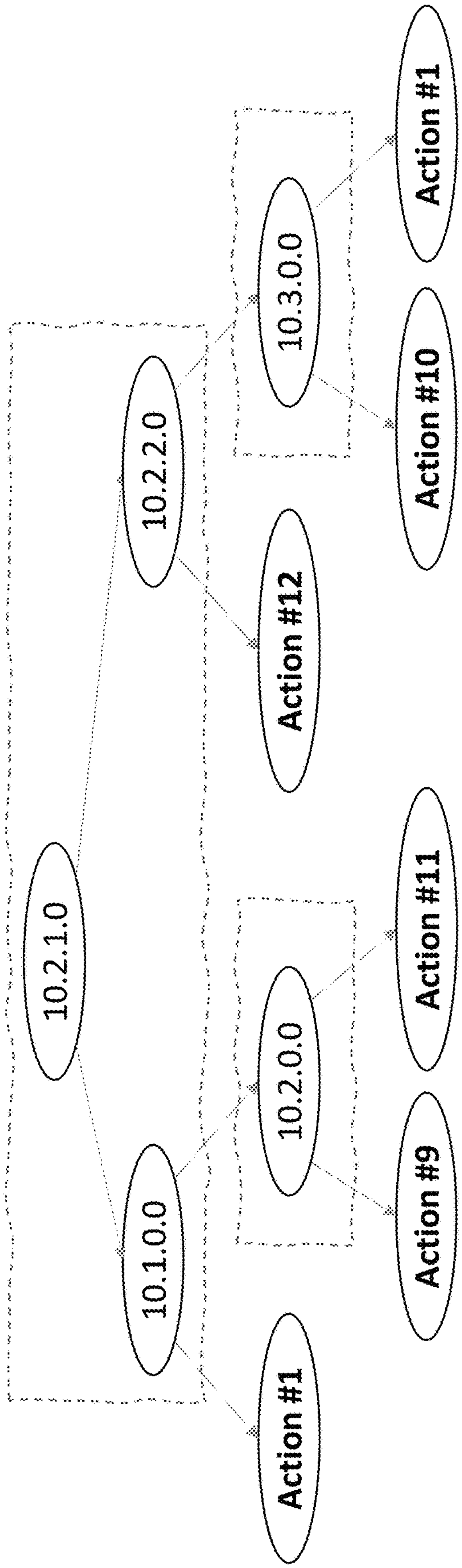
Figure 14:
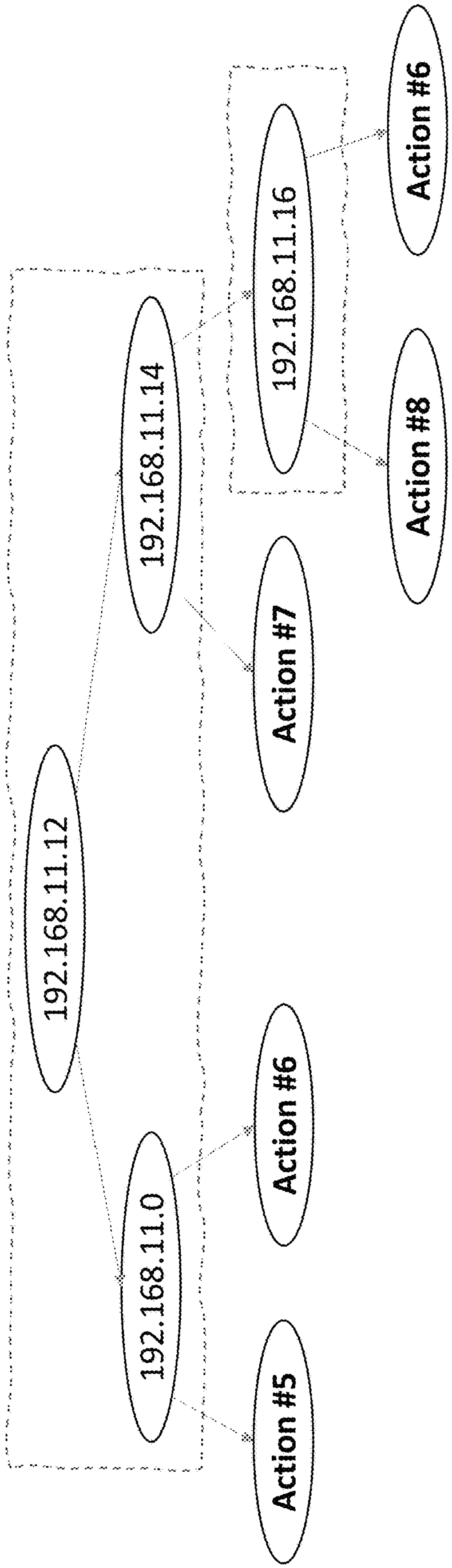
Figure 15:
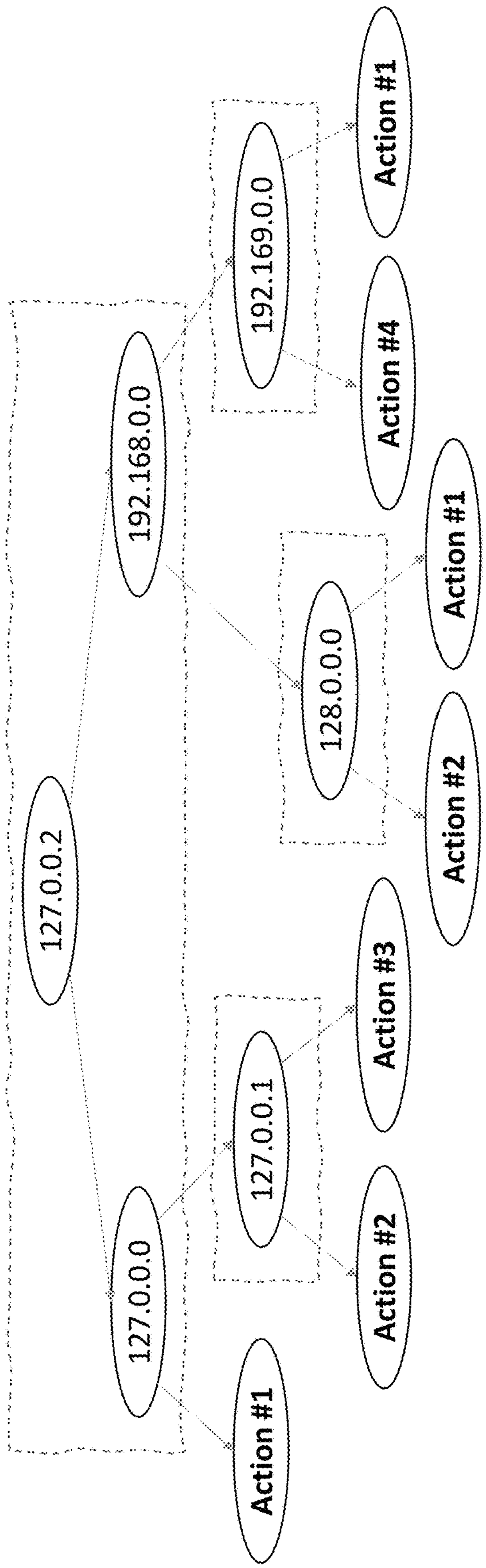
Figure 16:
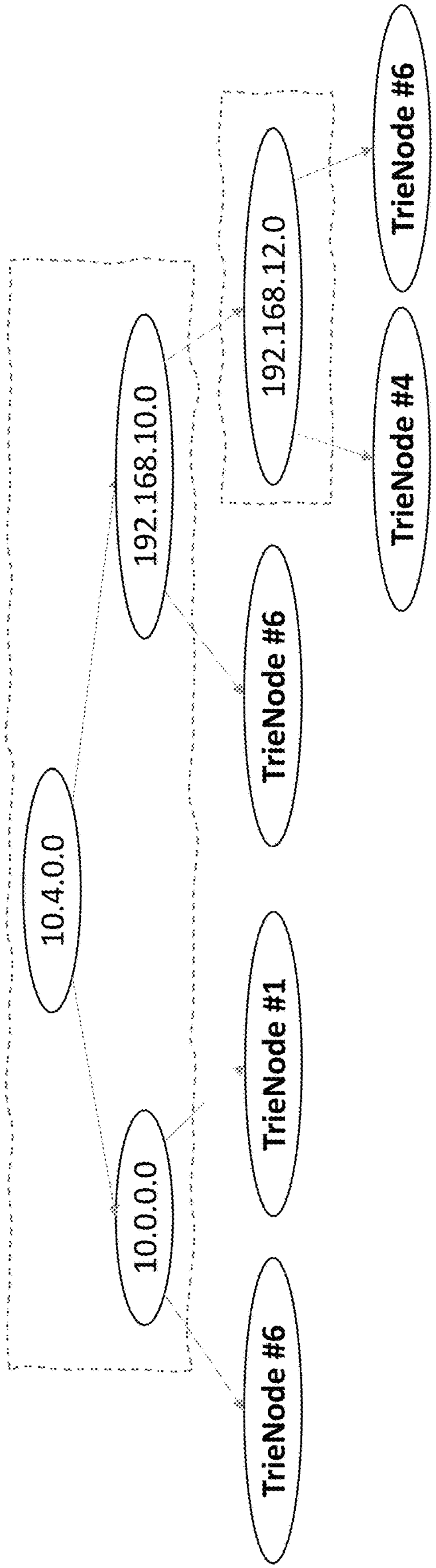
Figure 17:
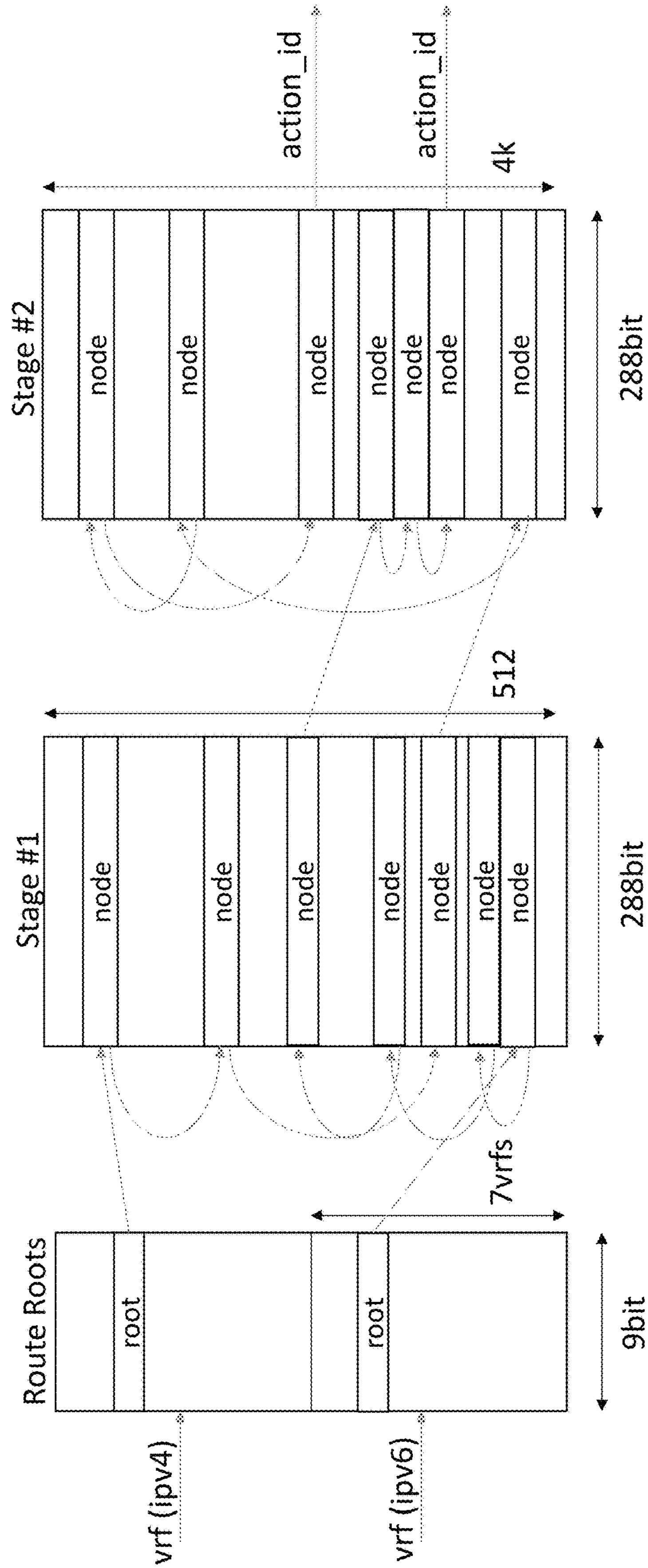
FIG. 17 illustrates an example of a implementing various levels of a tree in memory.
Figure 20:
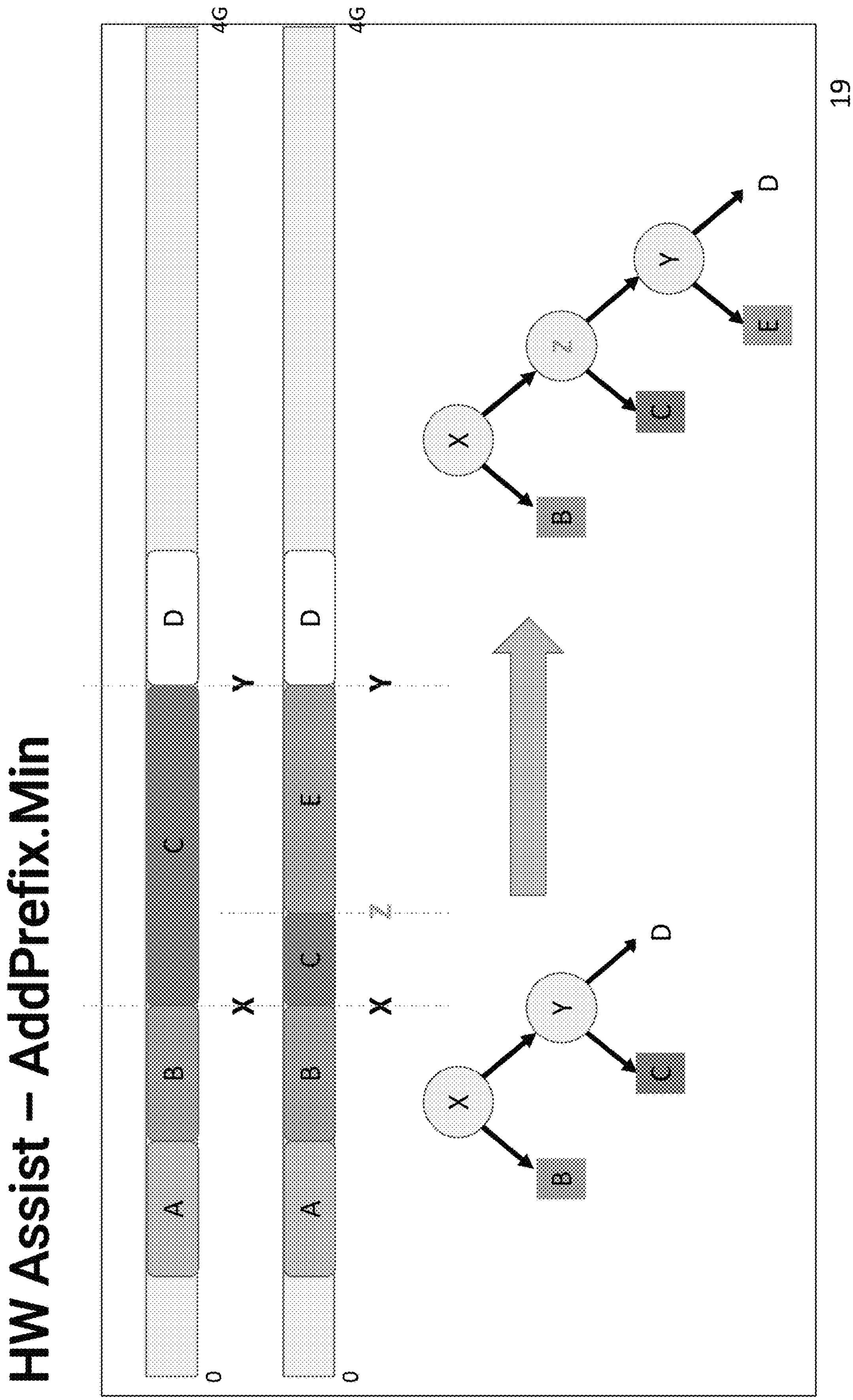
Figure 21:
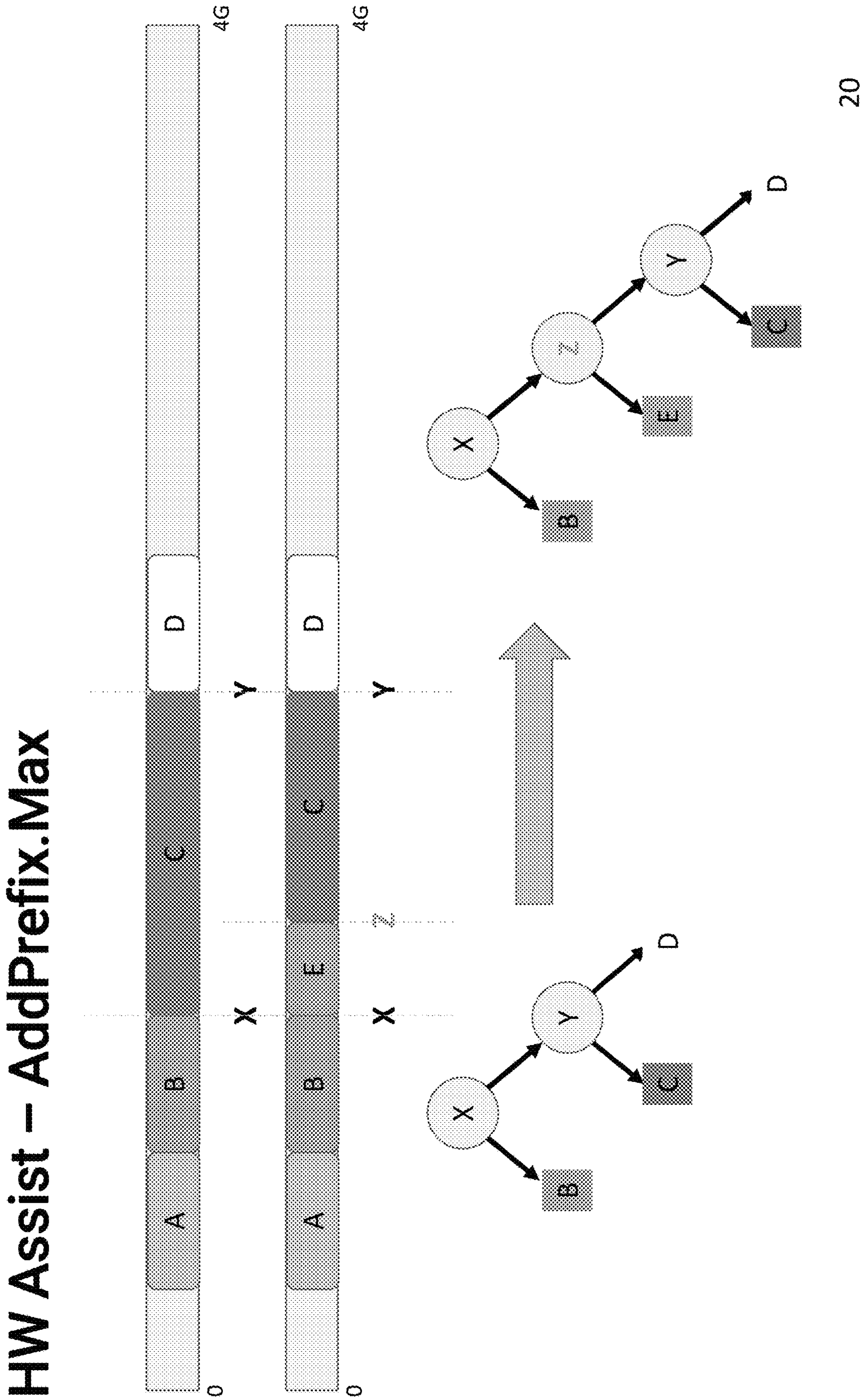
Figure 22:
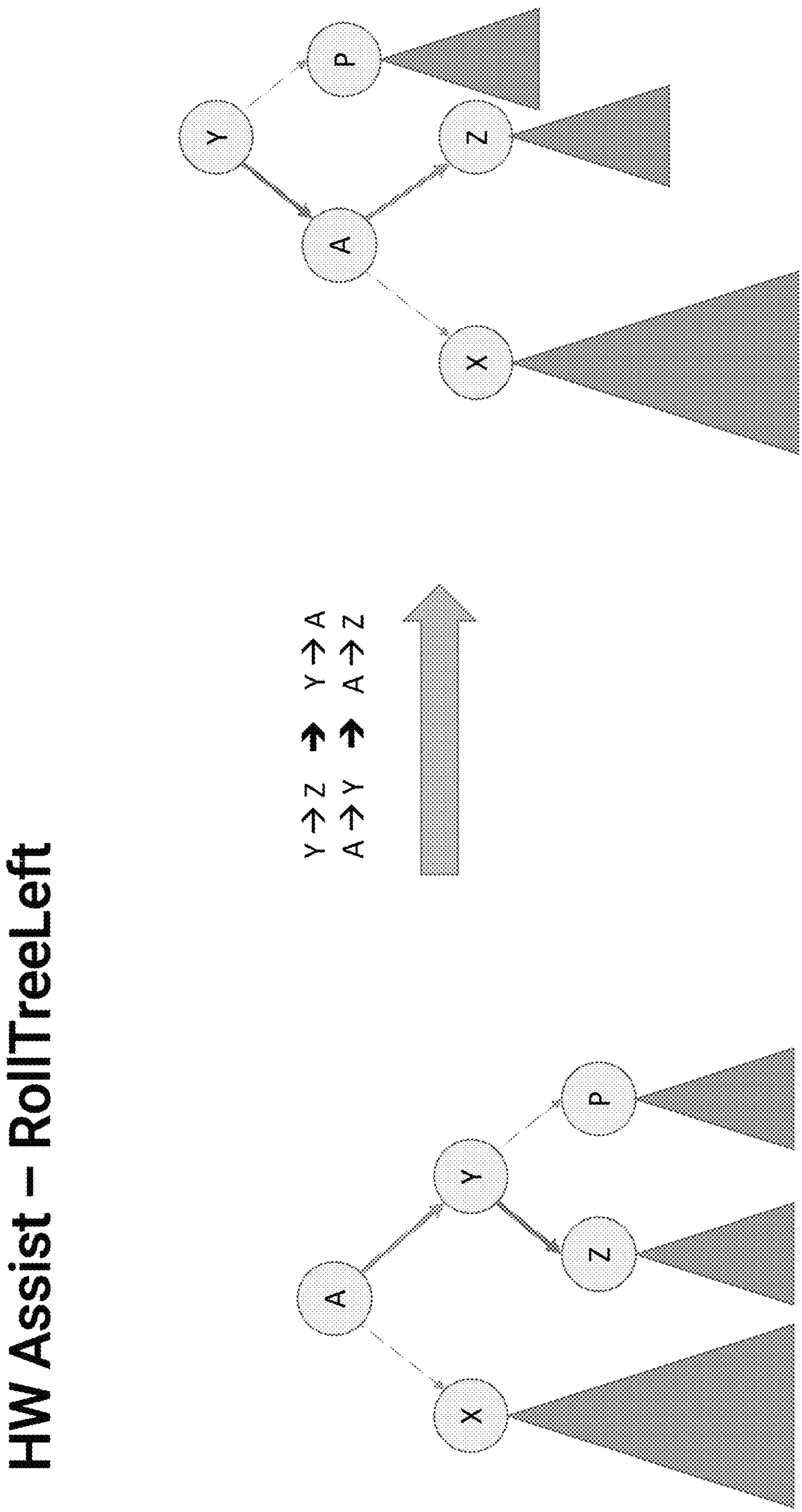
FIGS. 22-23 illustrate examples of basic operations used for replacing node boundary values.
Figure 23:
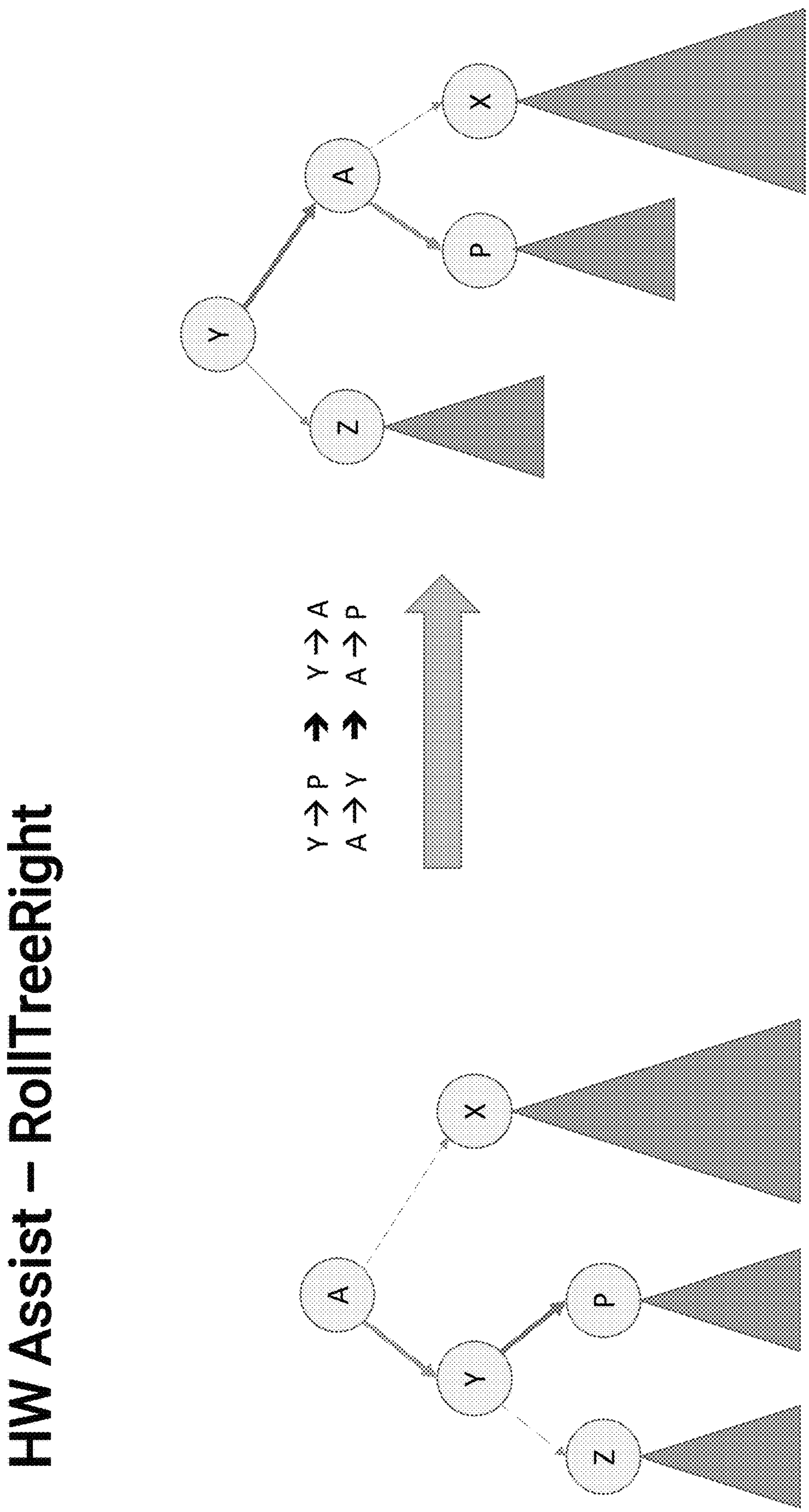
Figure 28:
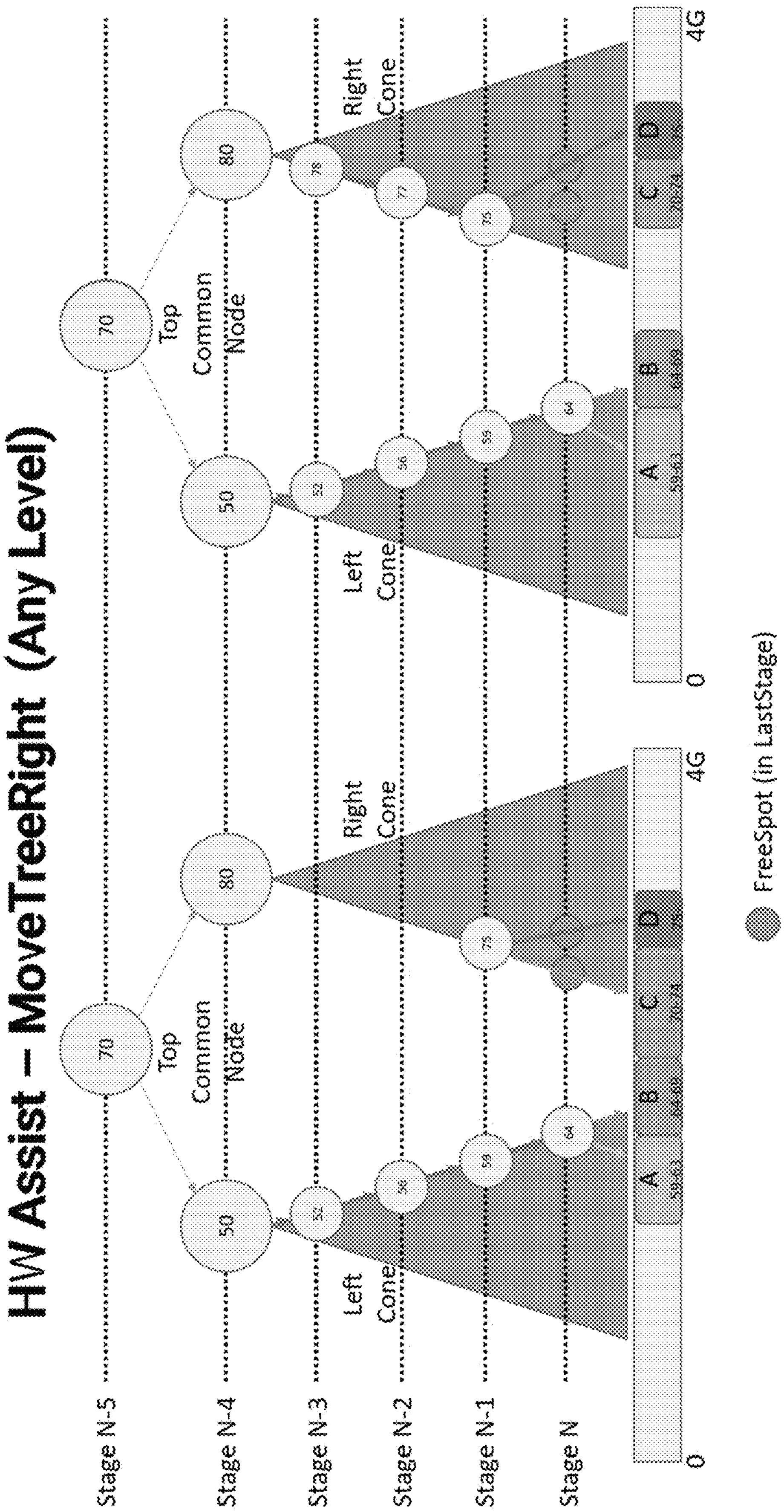
Figure 29:
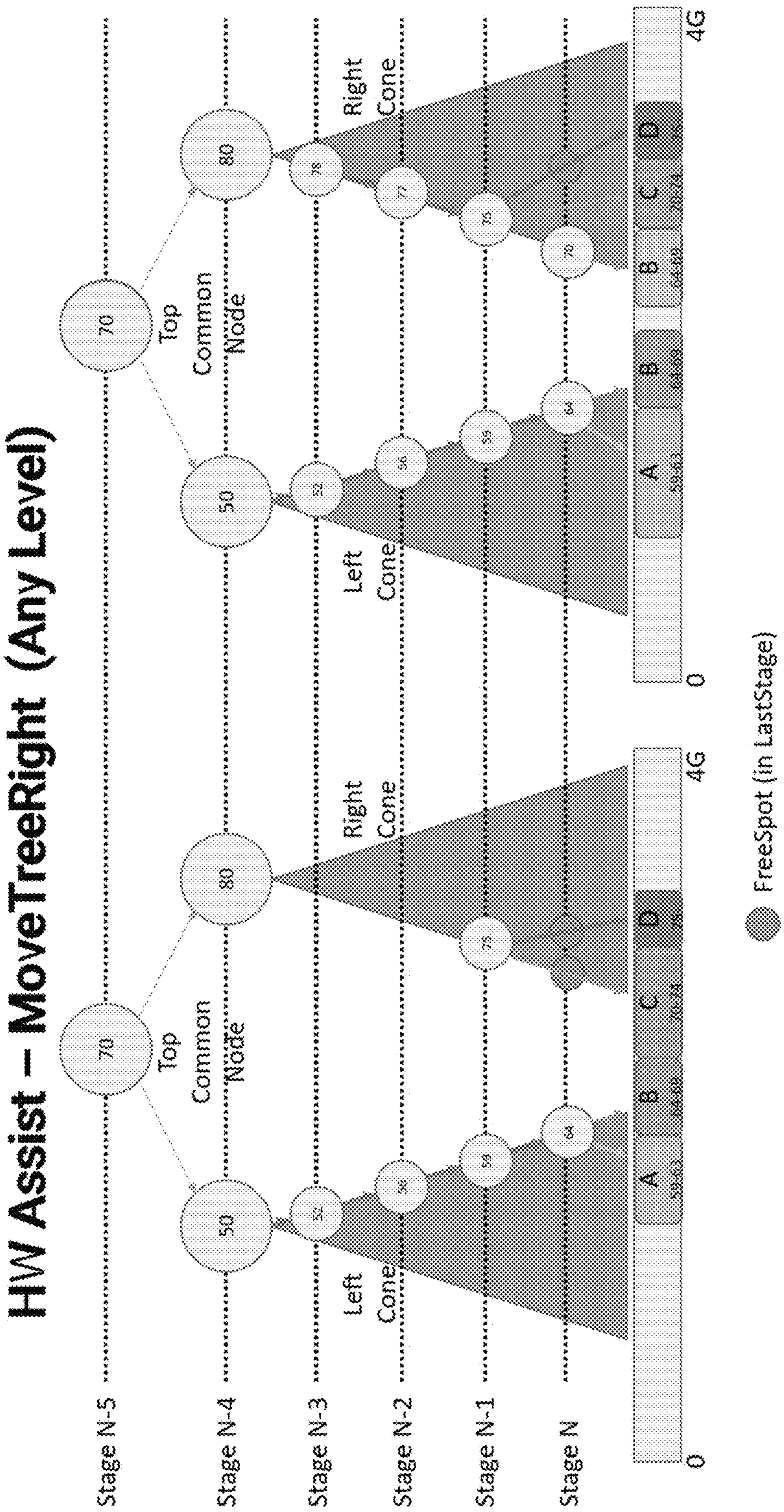
Figure 30:
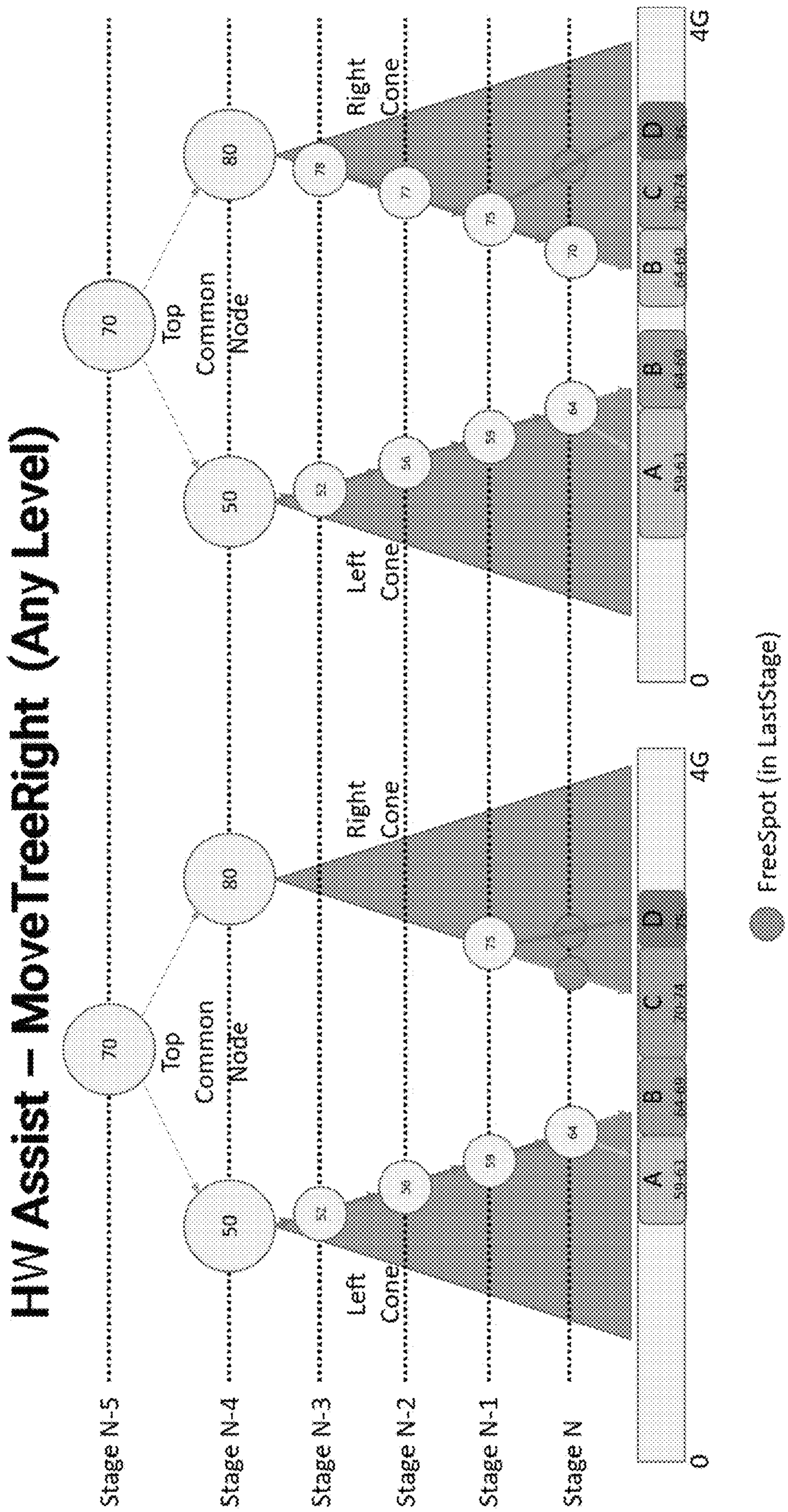
Figure 31:
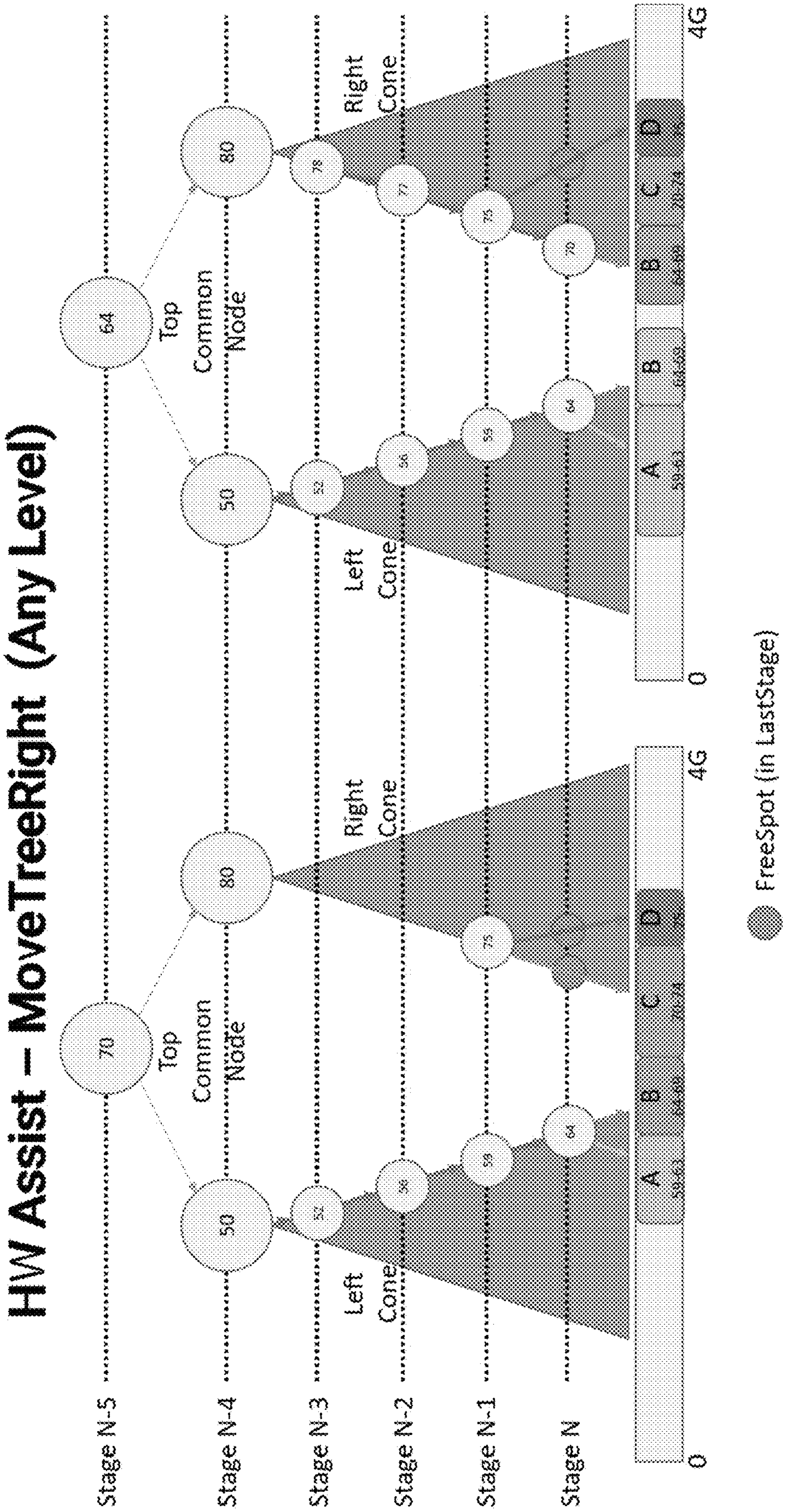
Figure 32:
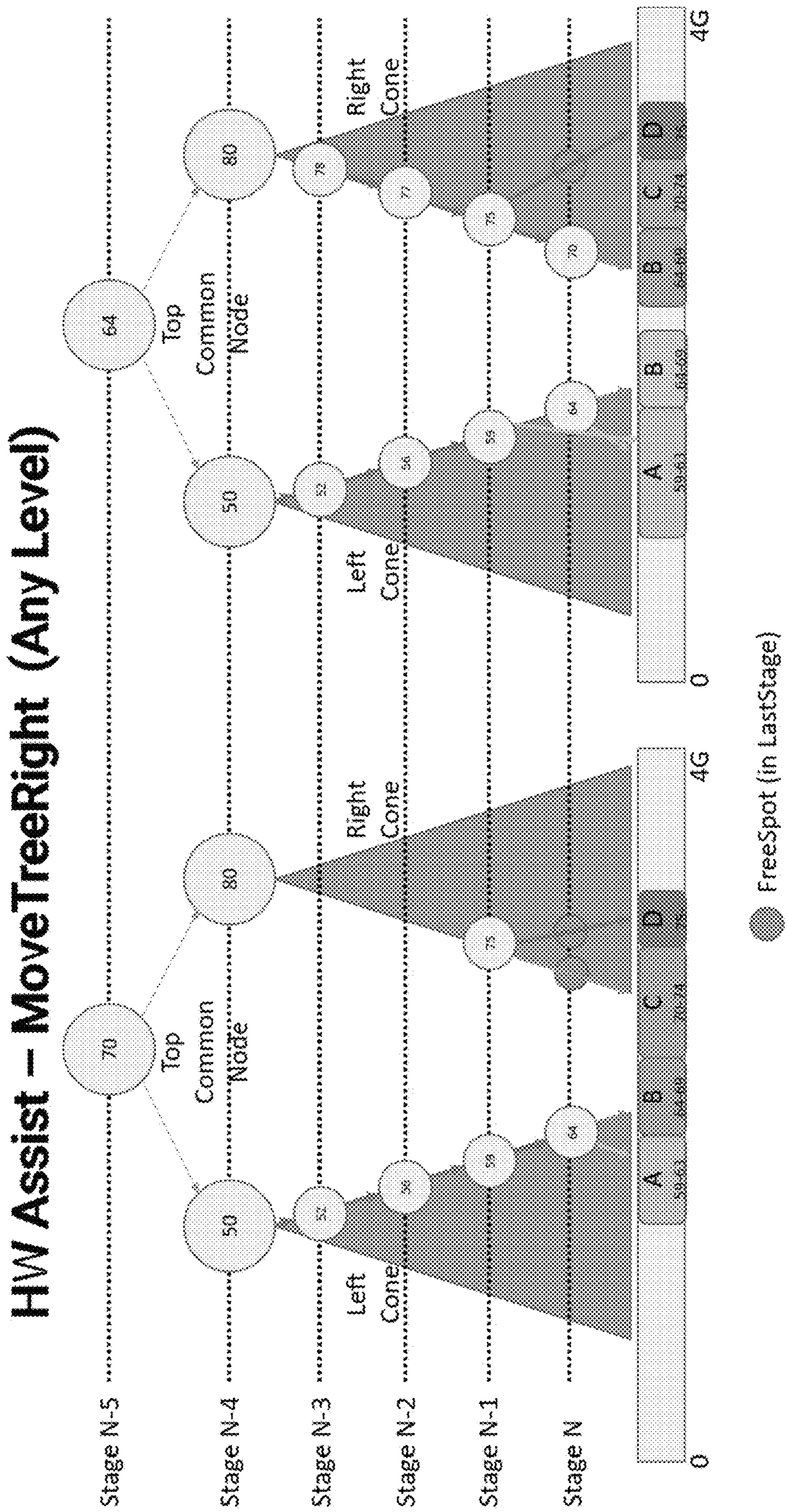
Figure 33:
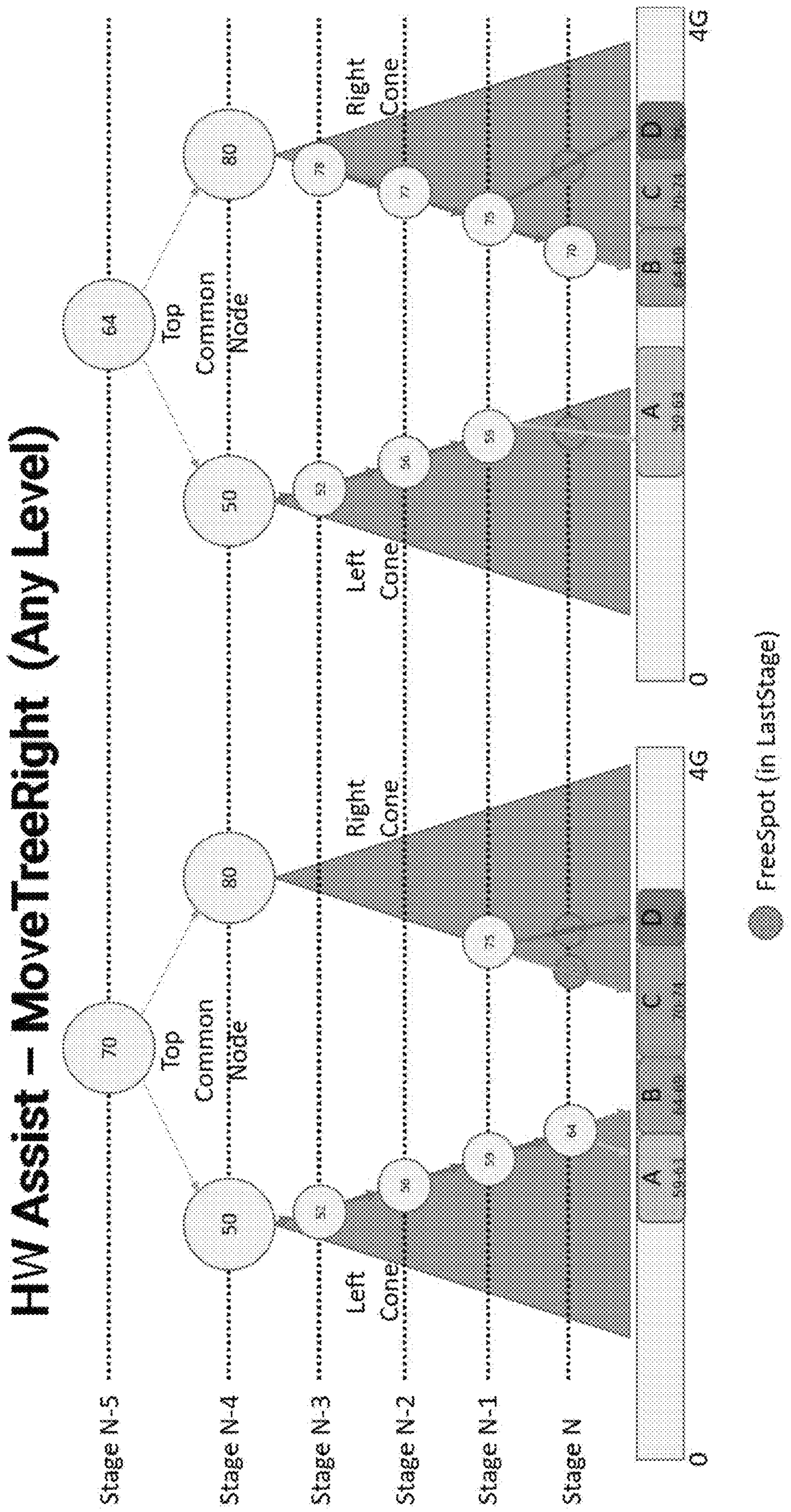
Figure 34:
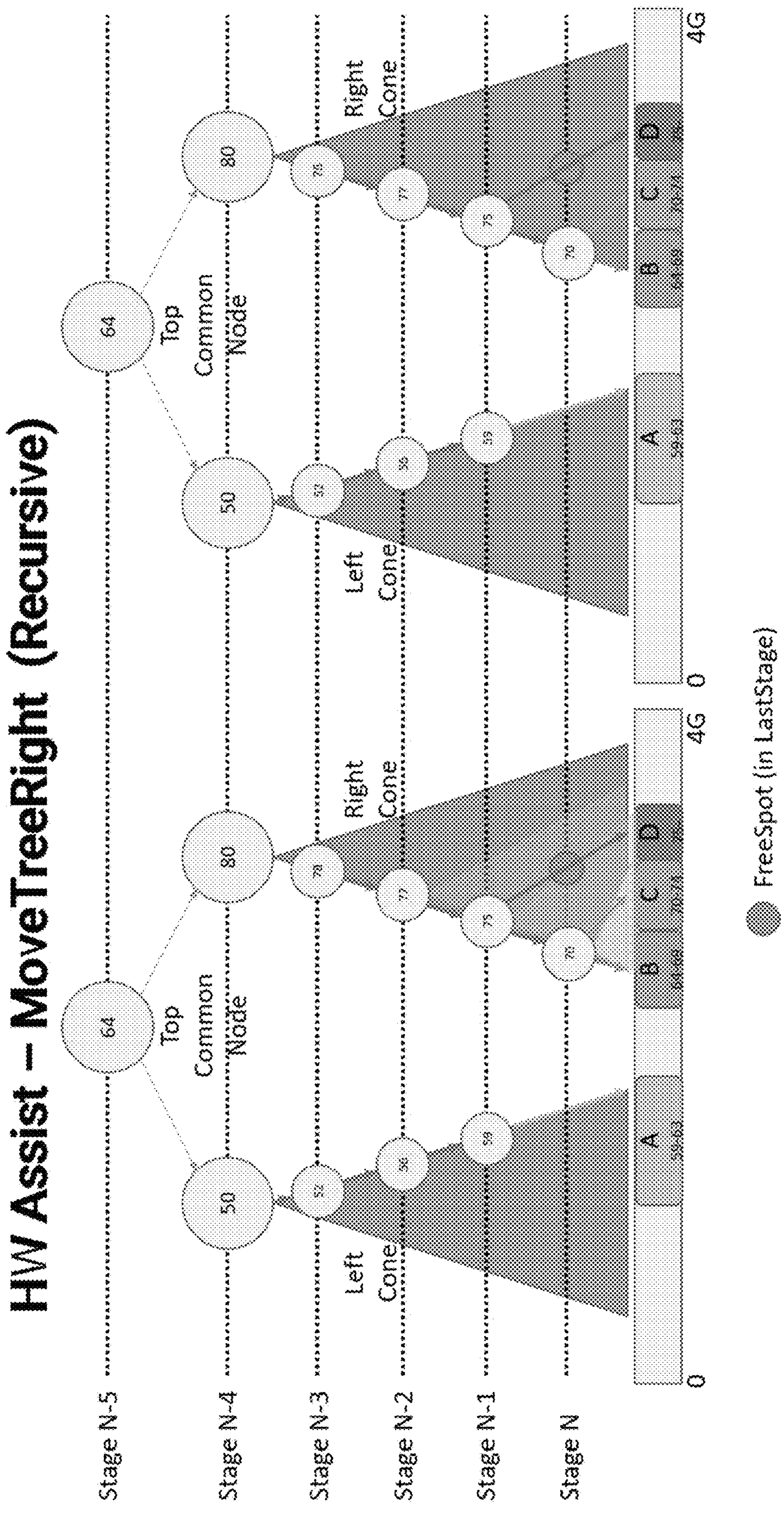
Figure 35:
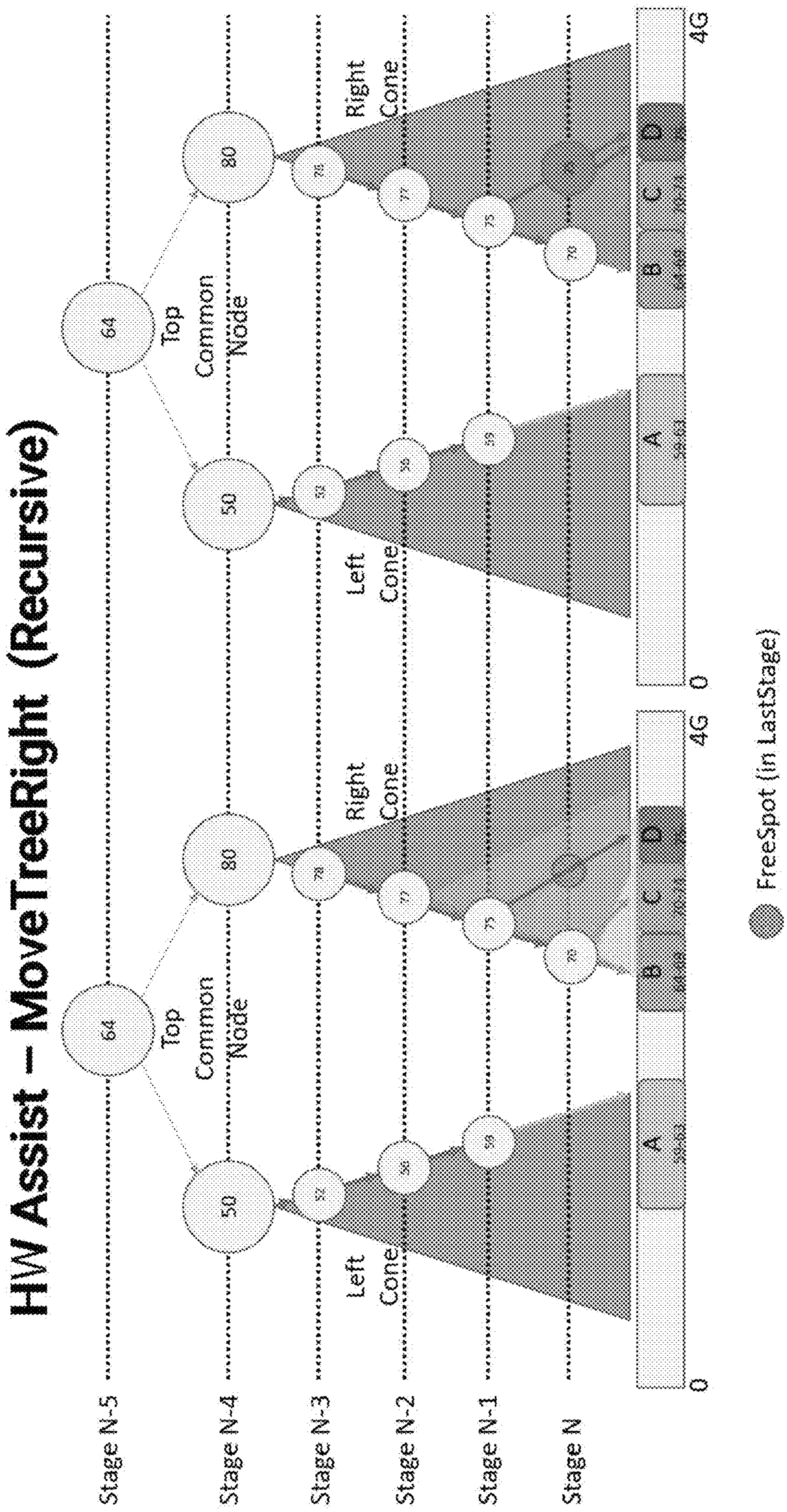
Figure 36:
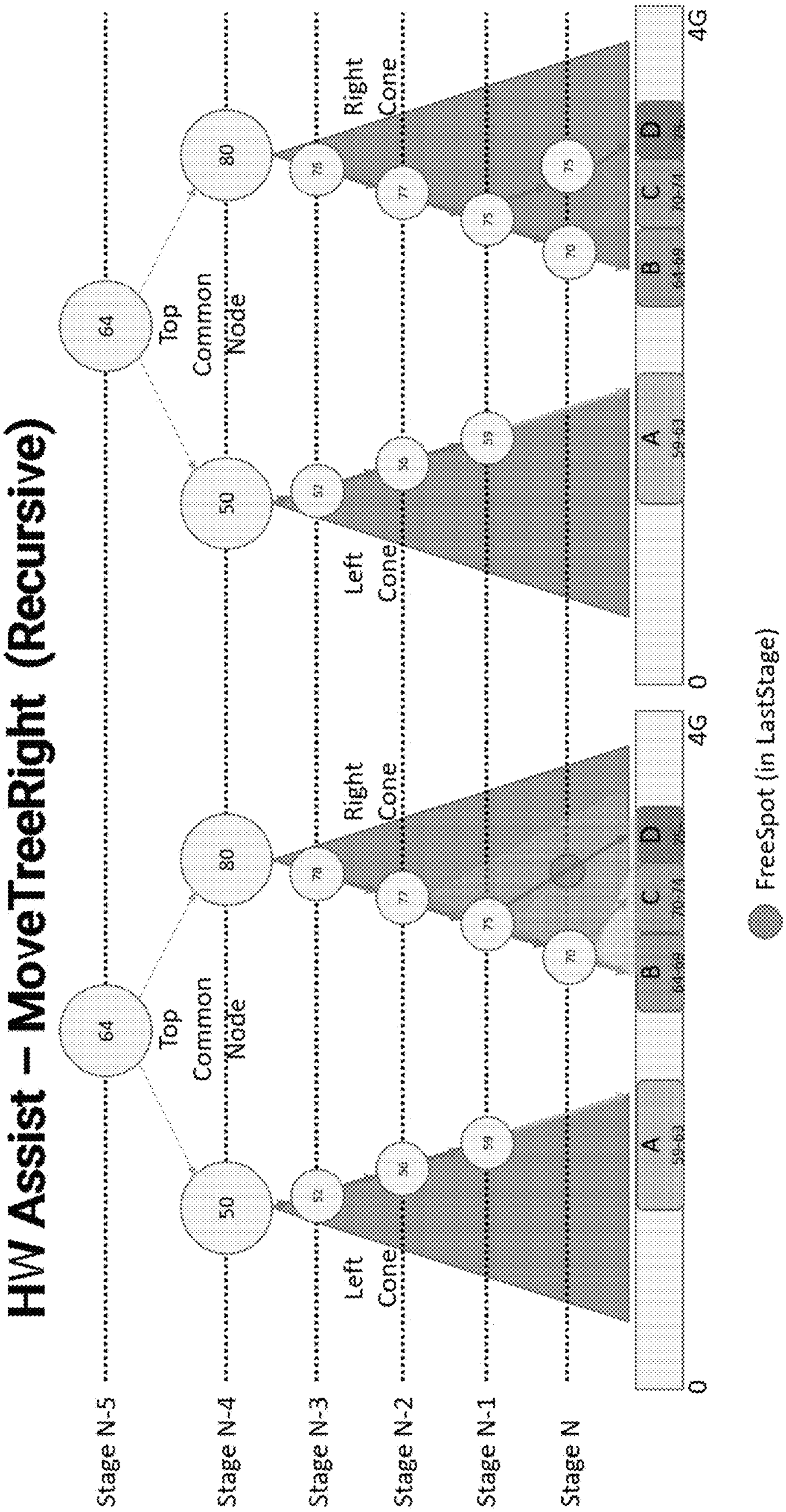
Figure 37:
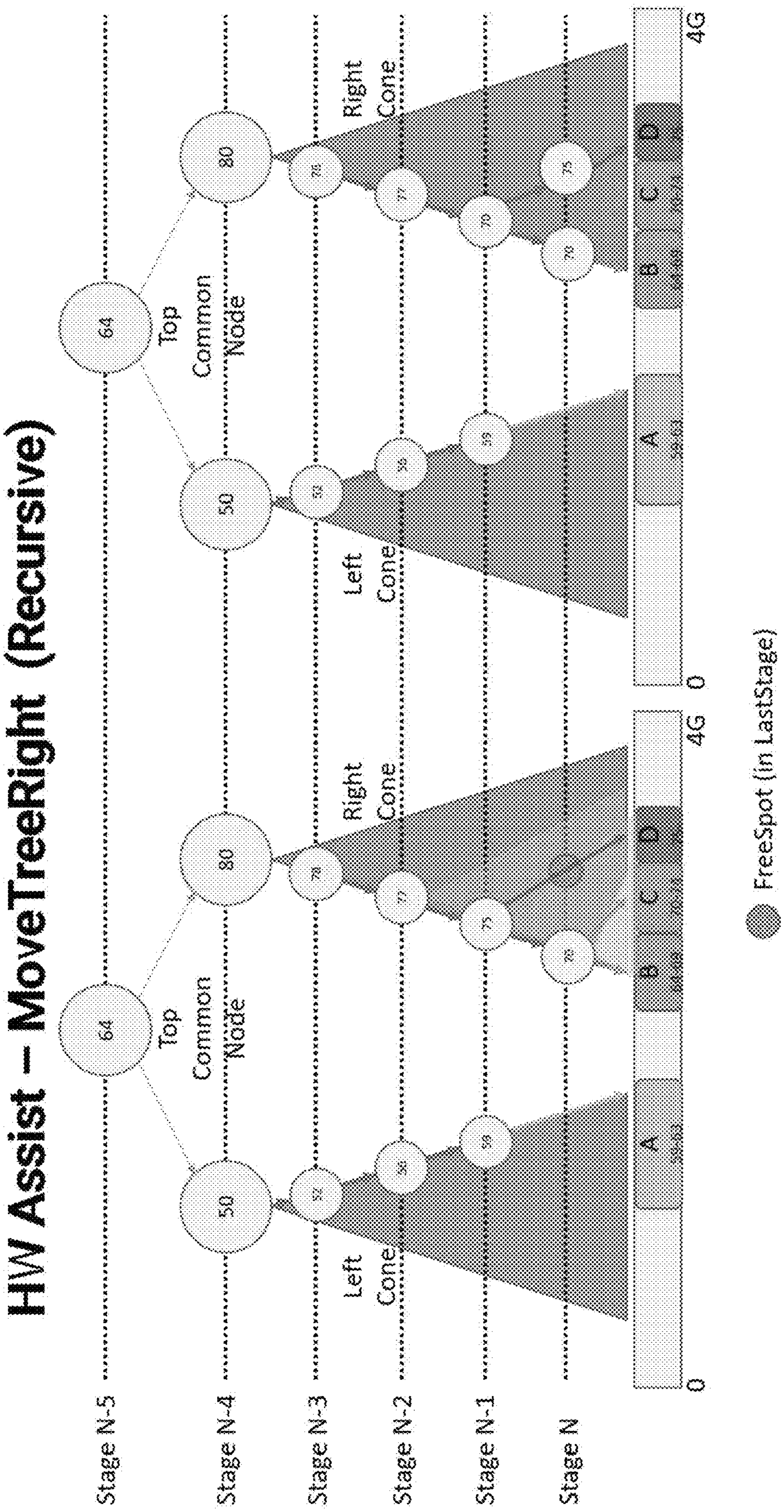
Figure 38:
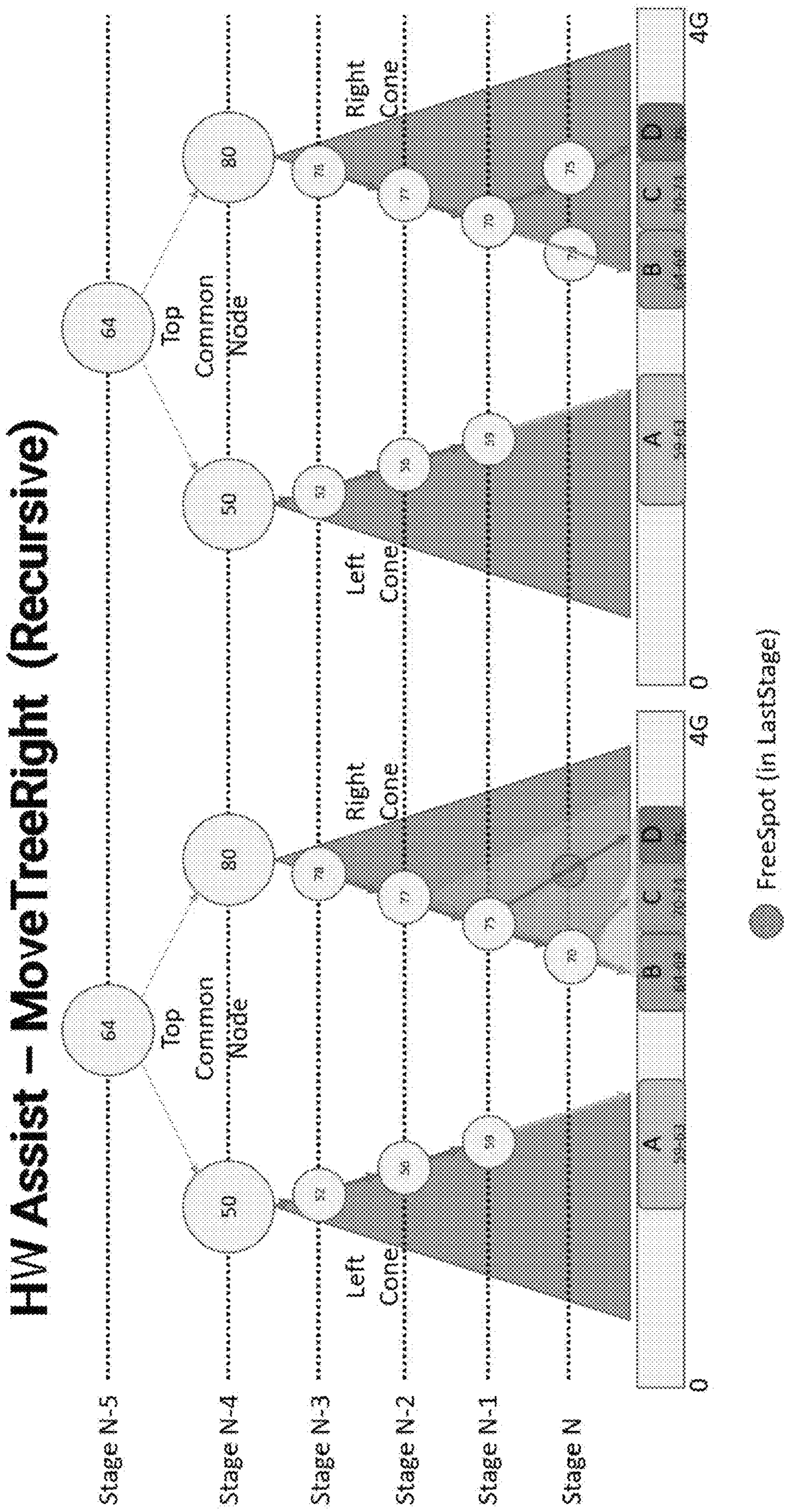
Figure 39:
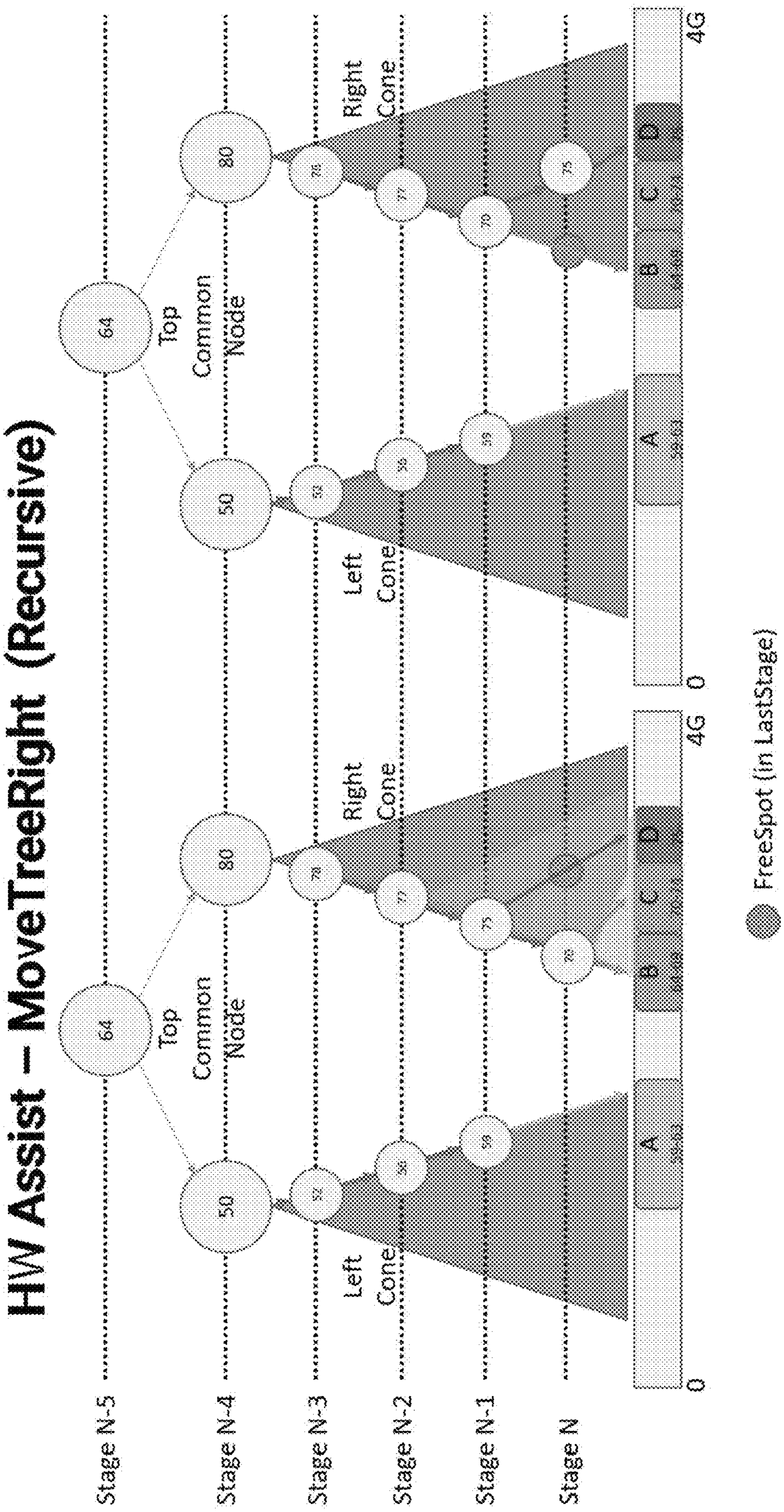
Figure 44:
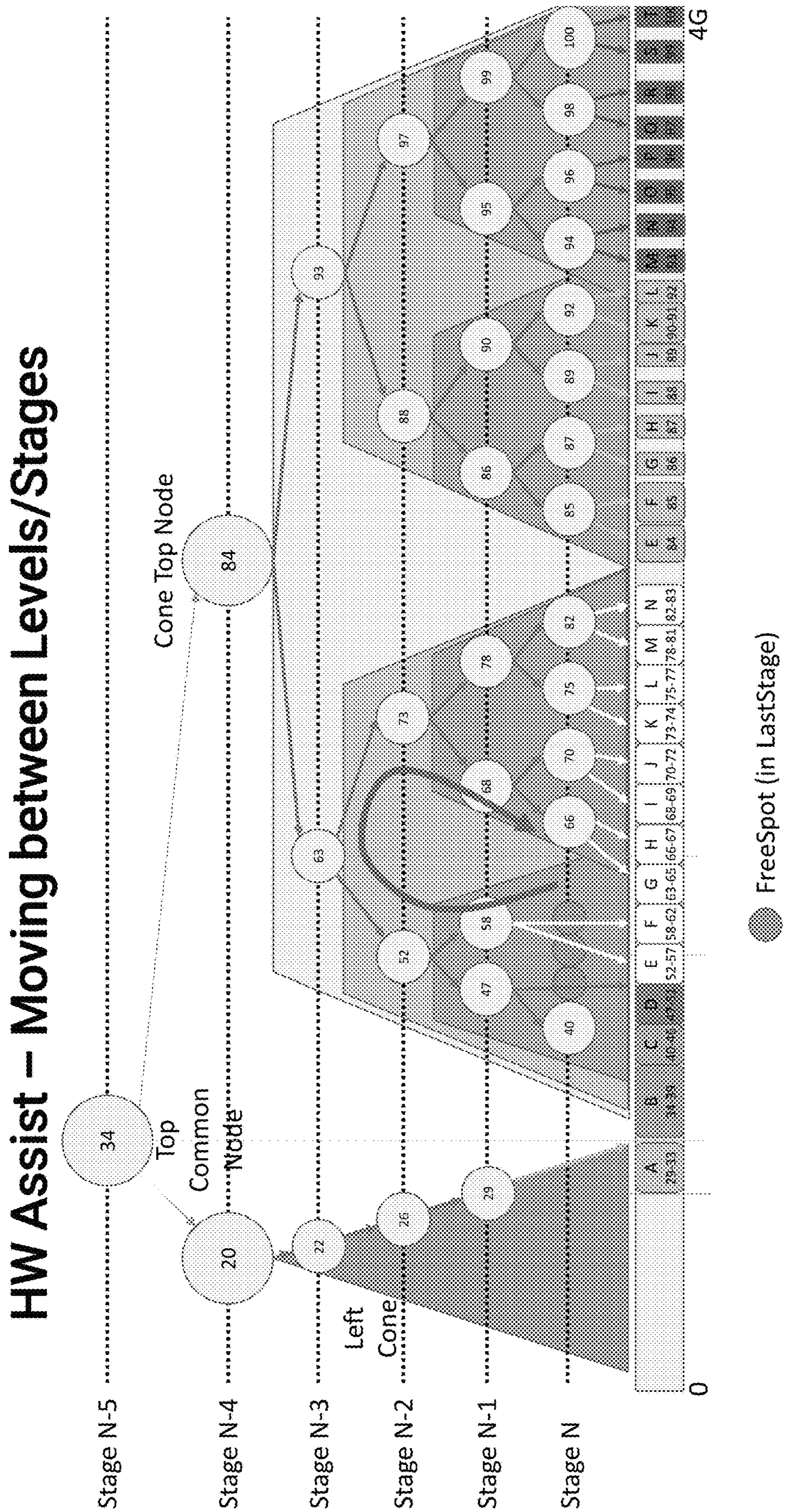
FIGS. 44-63 illustrate examples of updating the tree during multiple update iterations.
Figure 45:
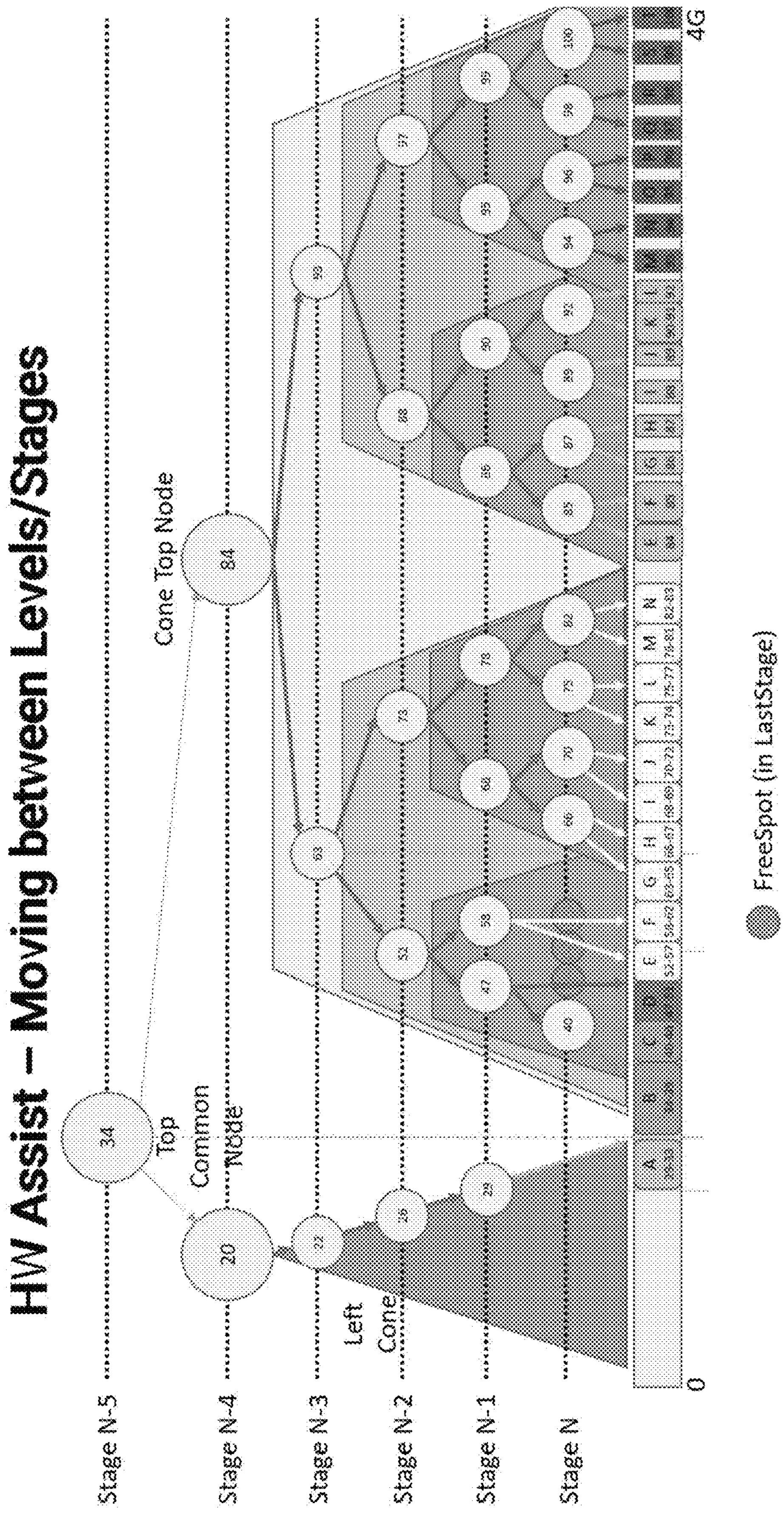
Figure 46:
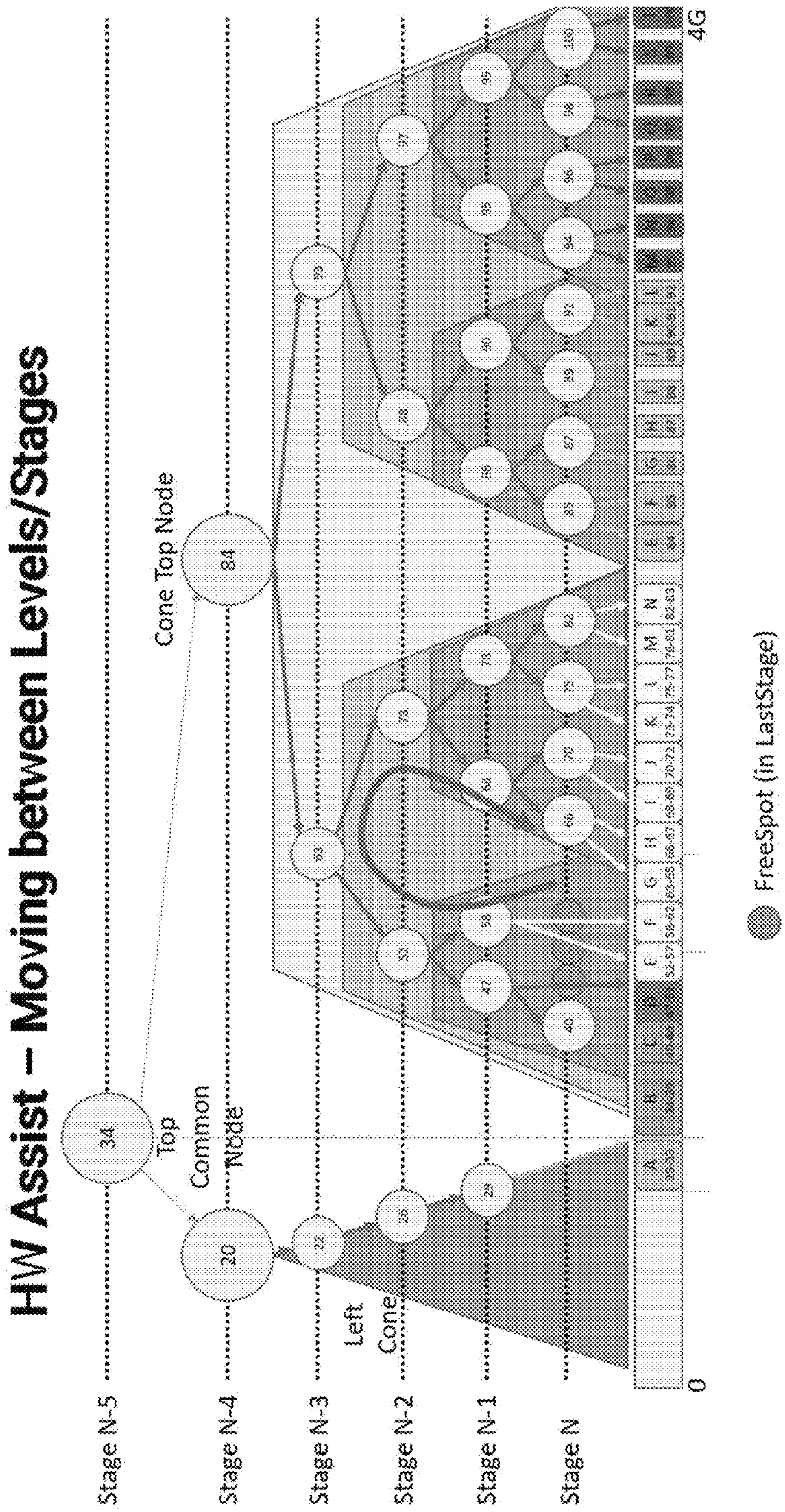
Figure 47:
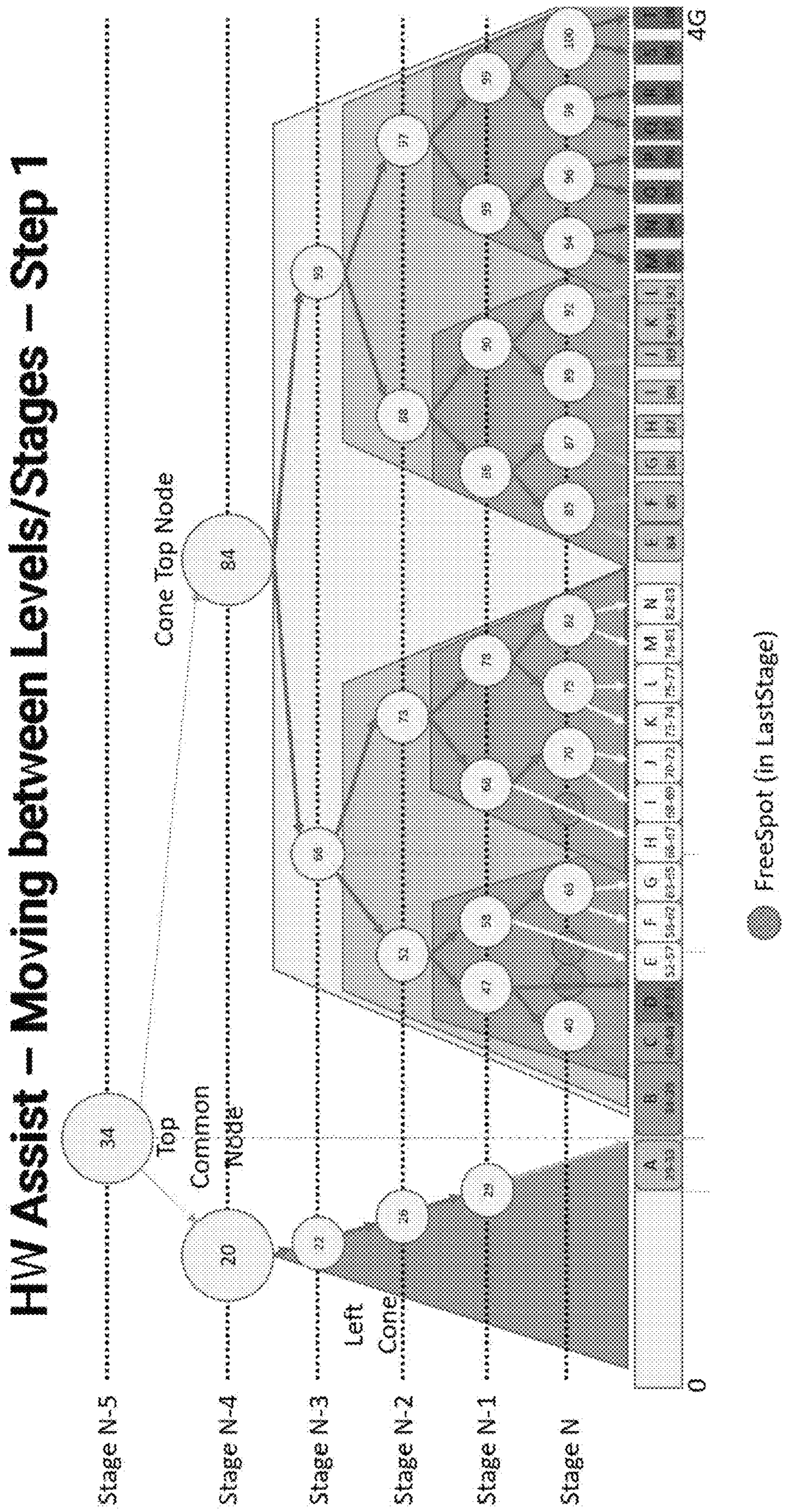
Figure 48:
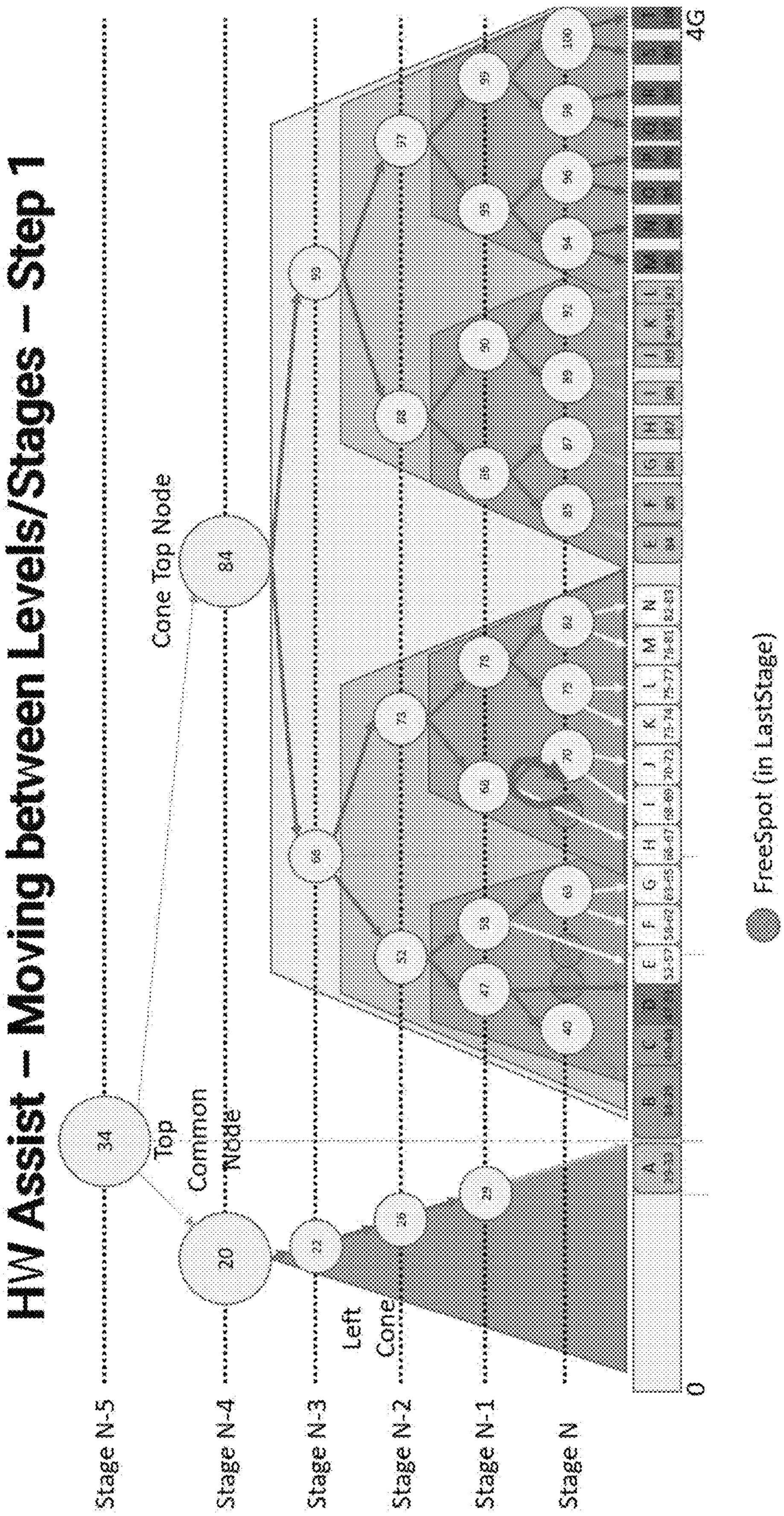
Figure 49:
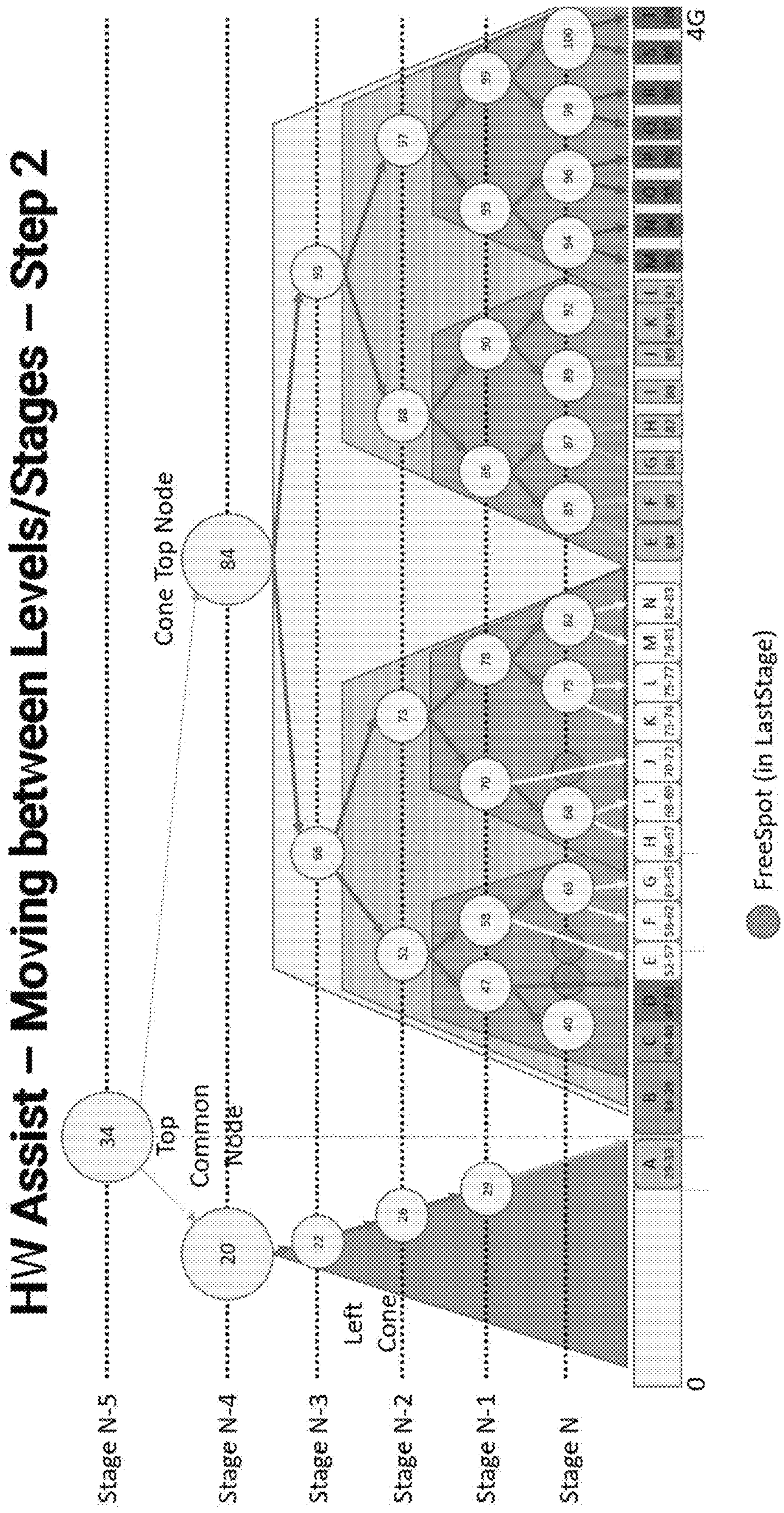
Figure 50:
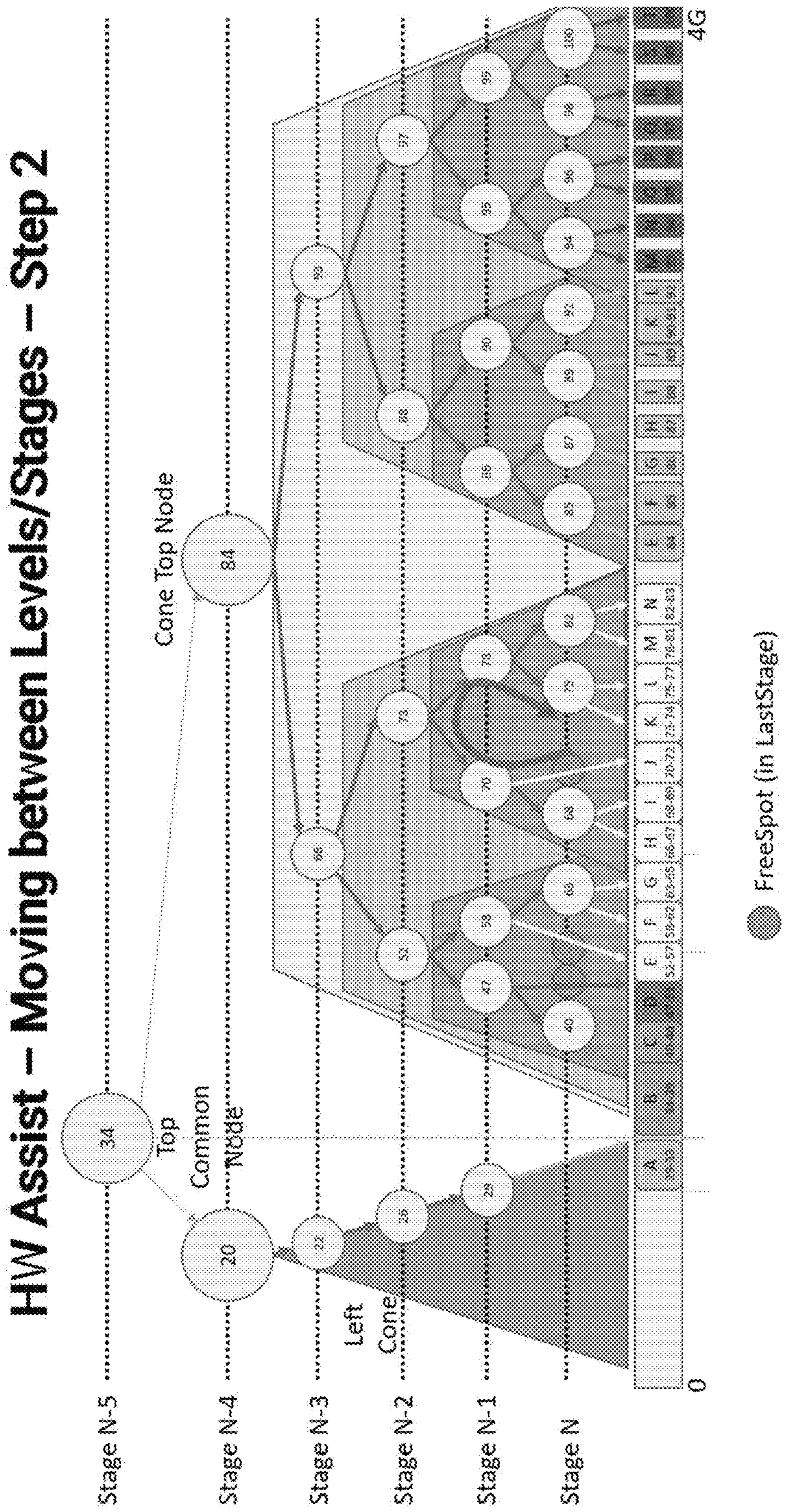
Figure 51:
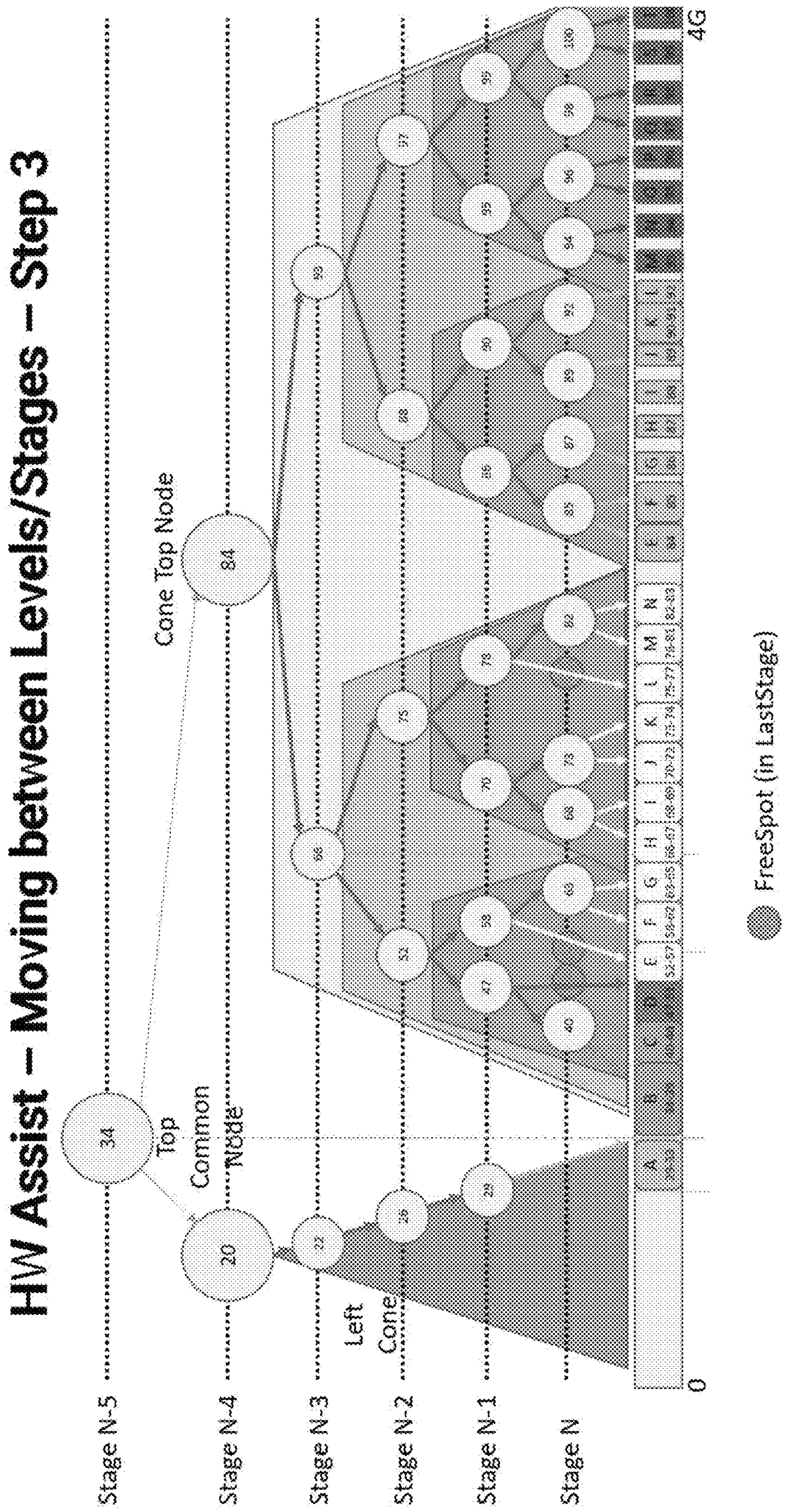
Figure 52:
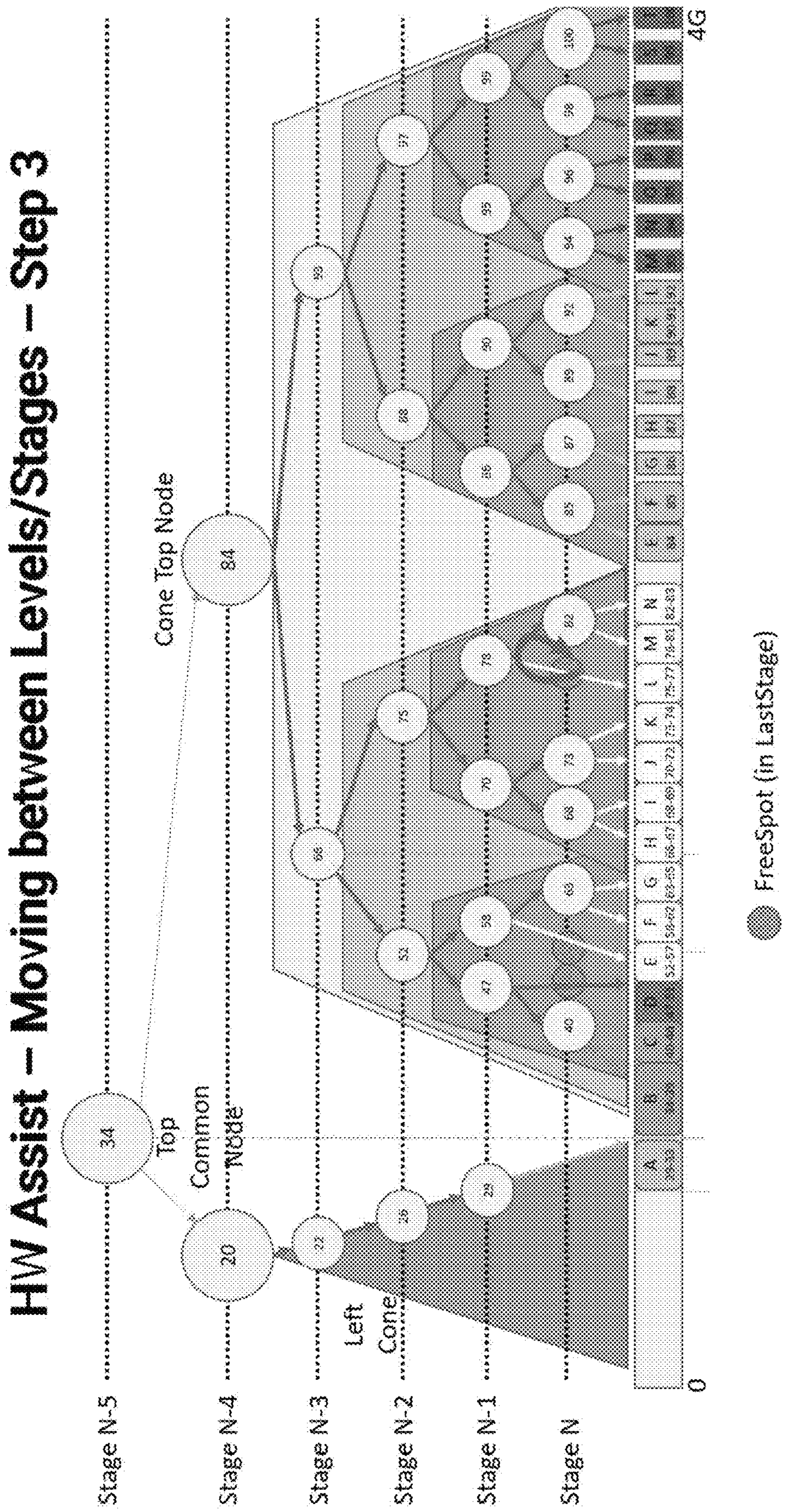
Figure 53:
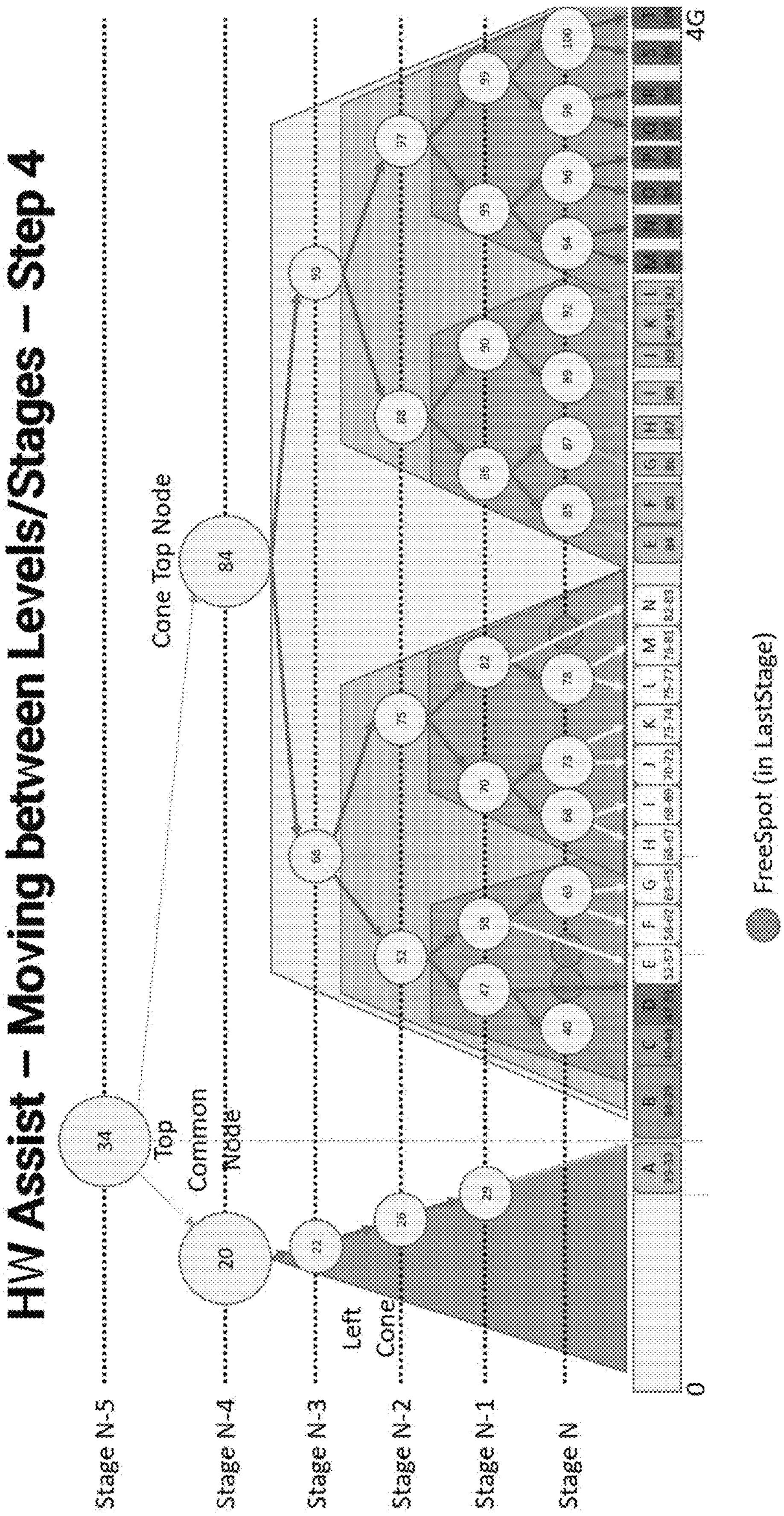
Figure 54:
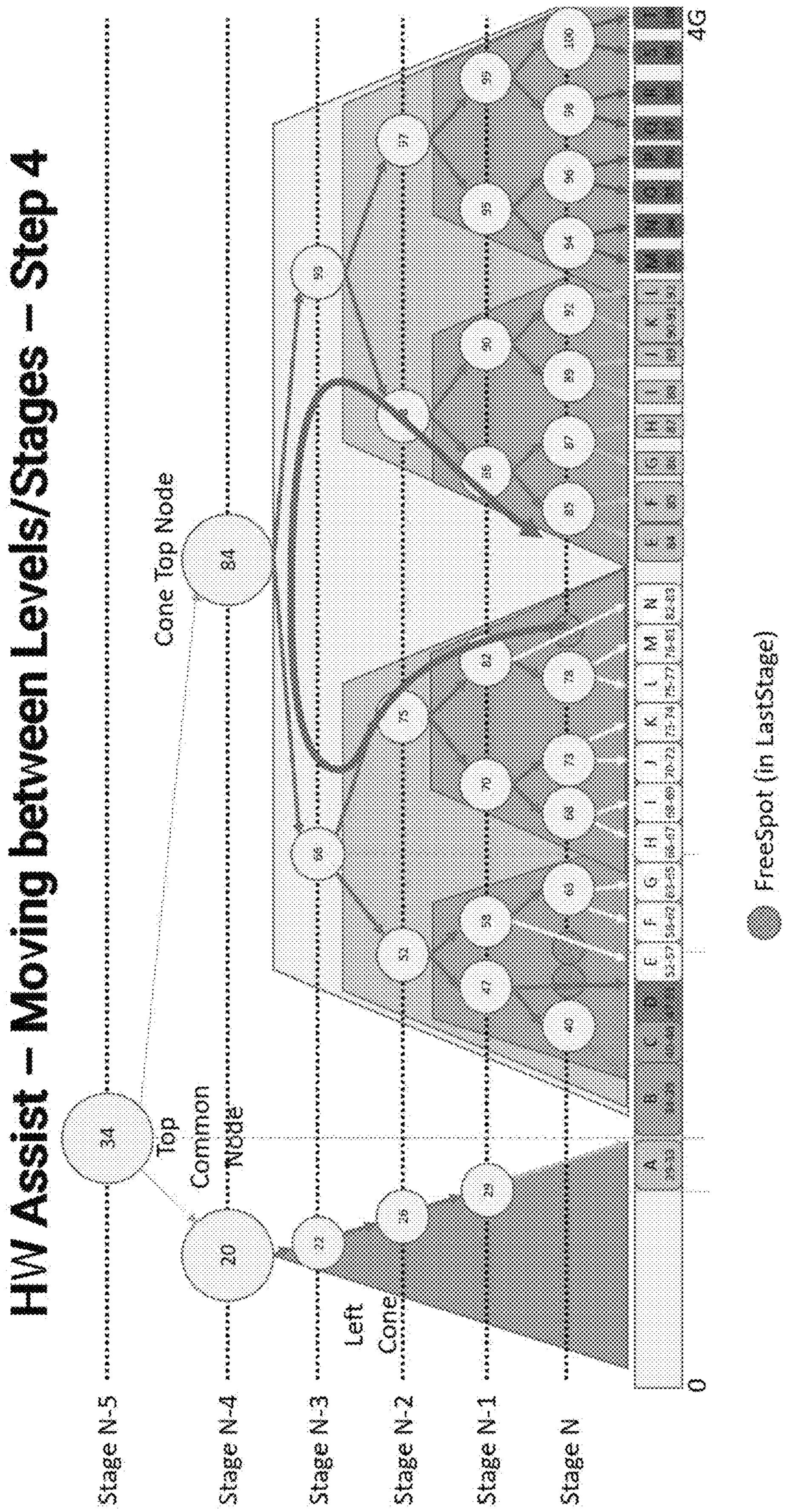
Figure 55:
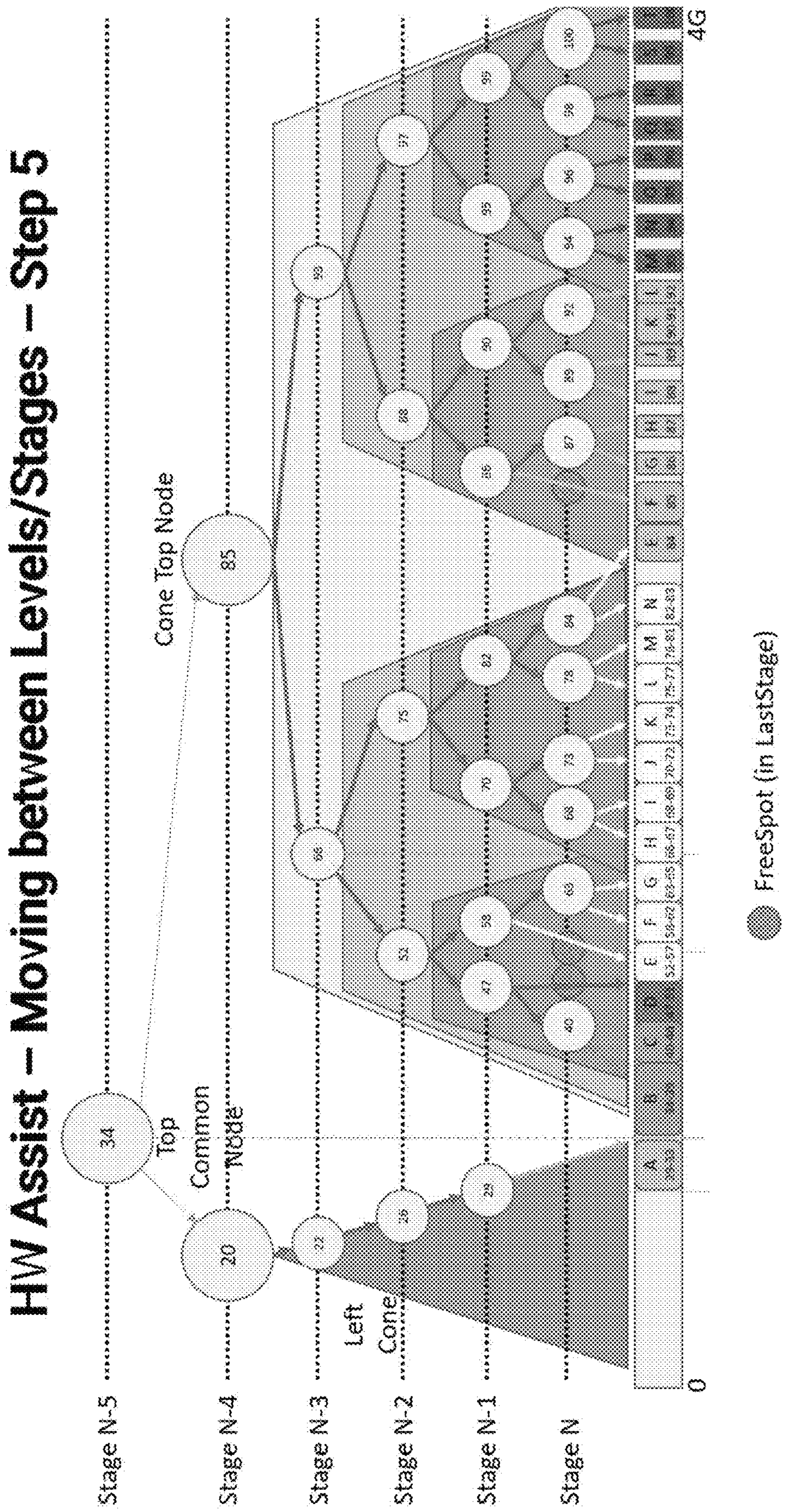
Figure 56:
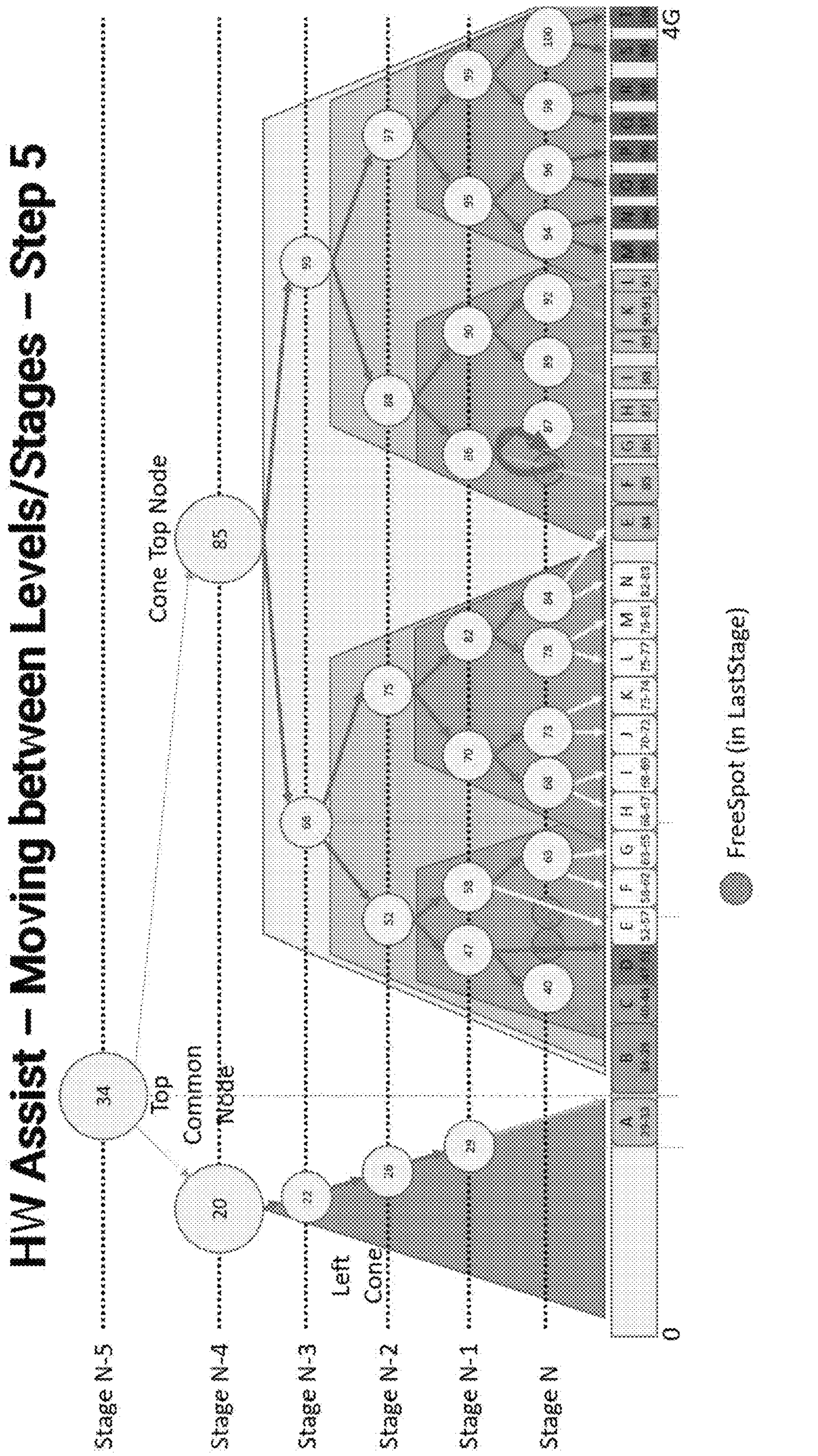
Figure 57:
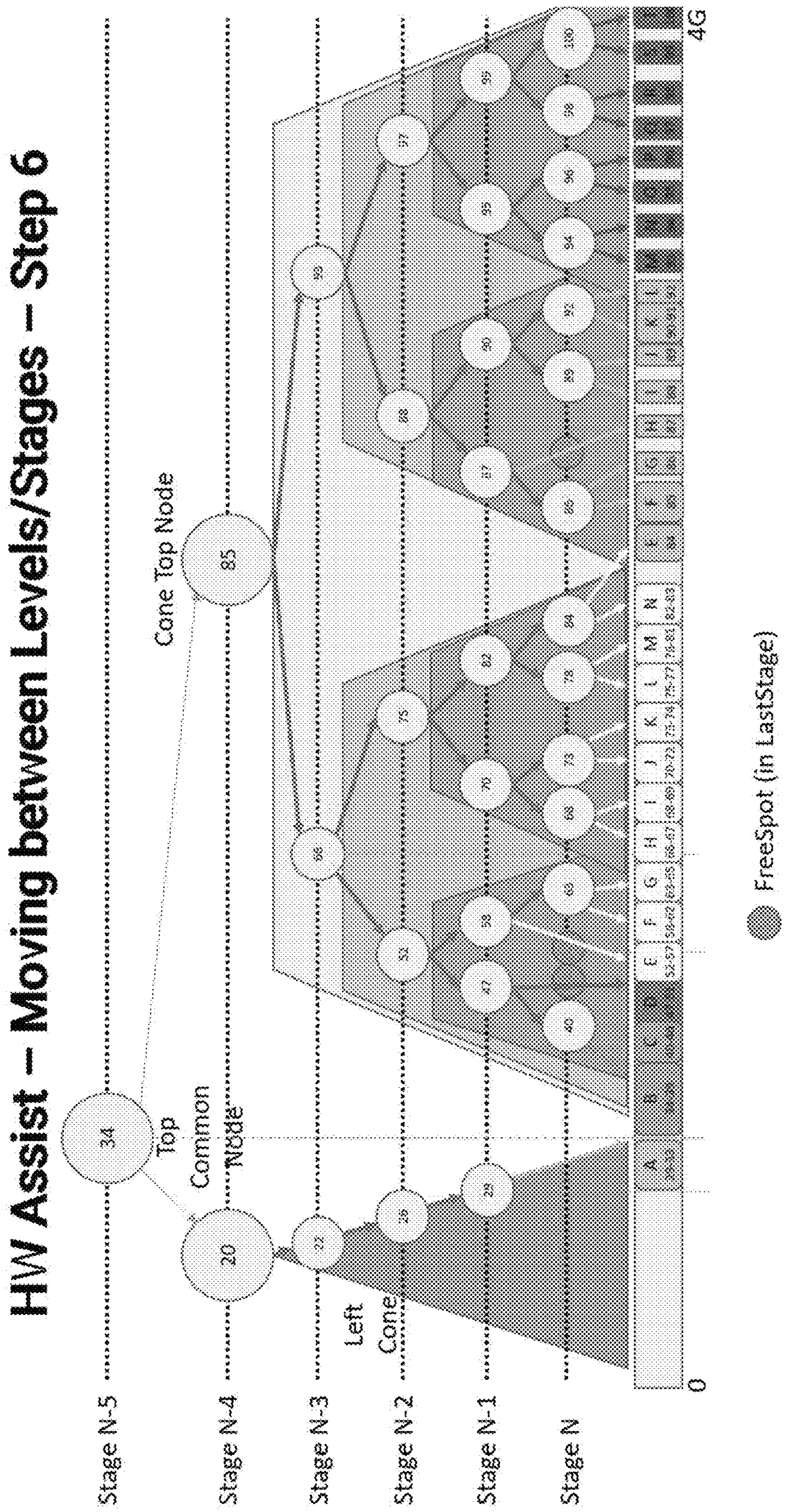
Figure 58:
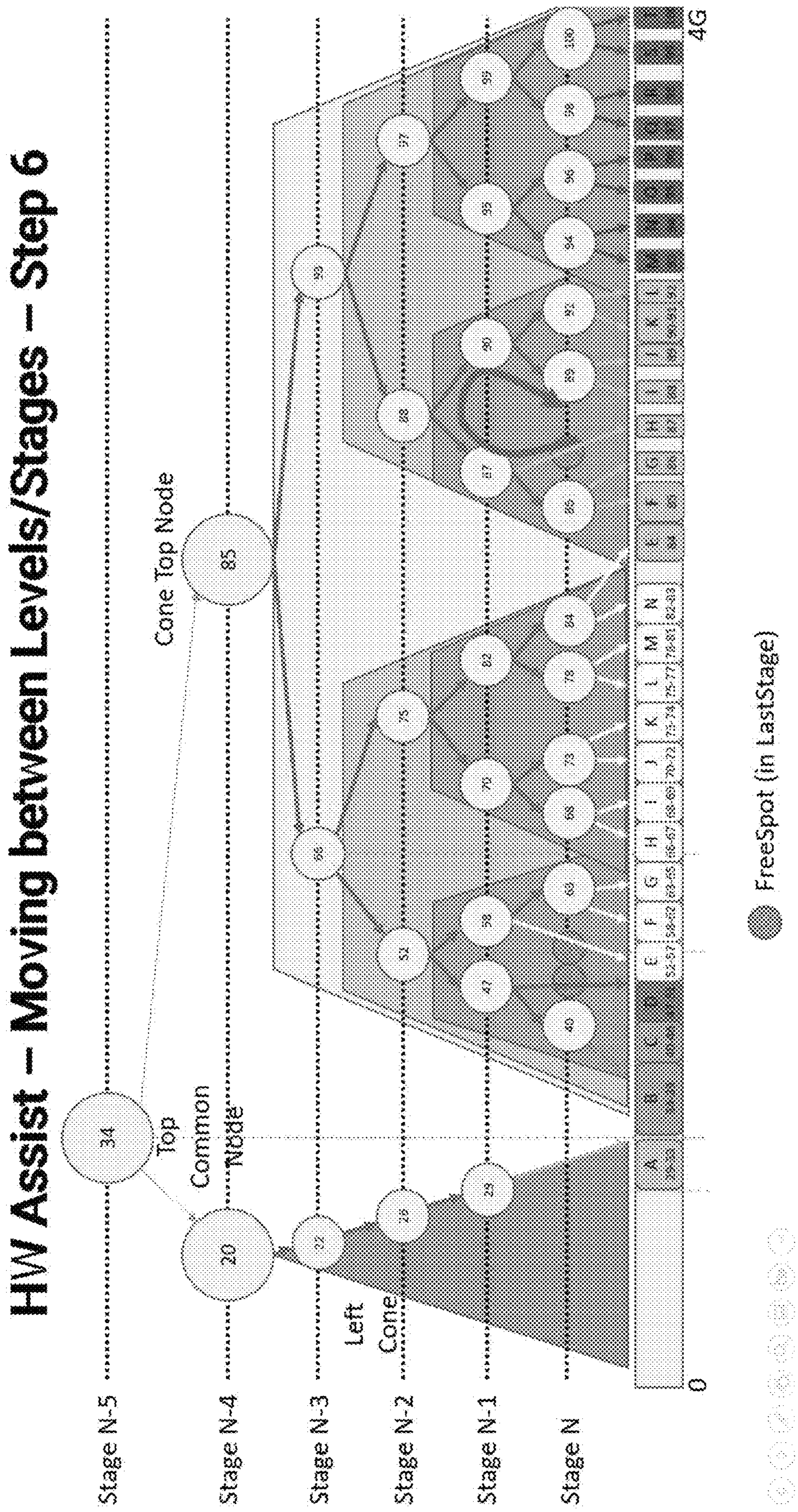
Figure 59:
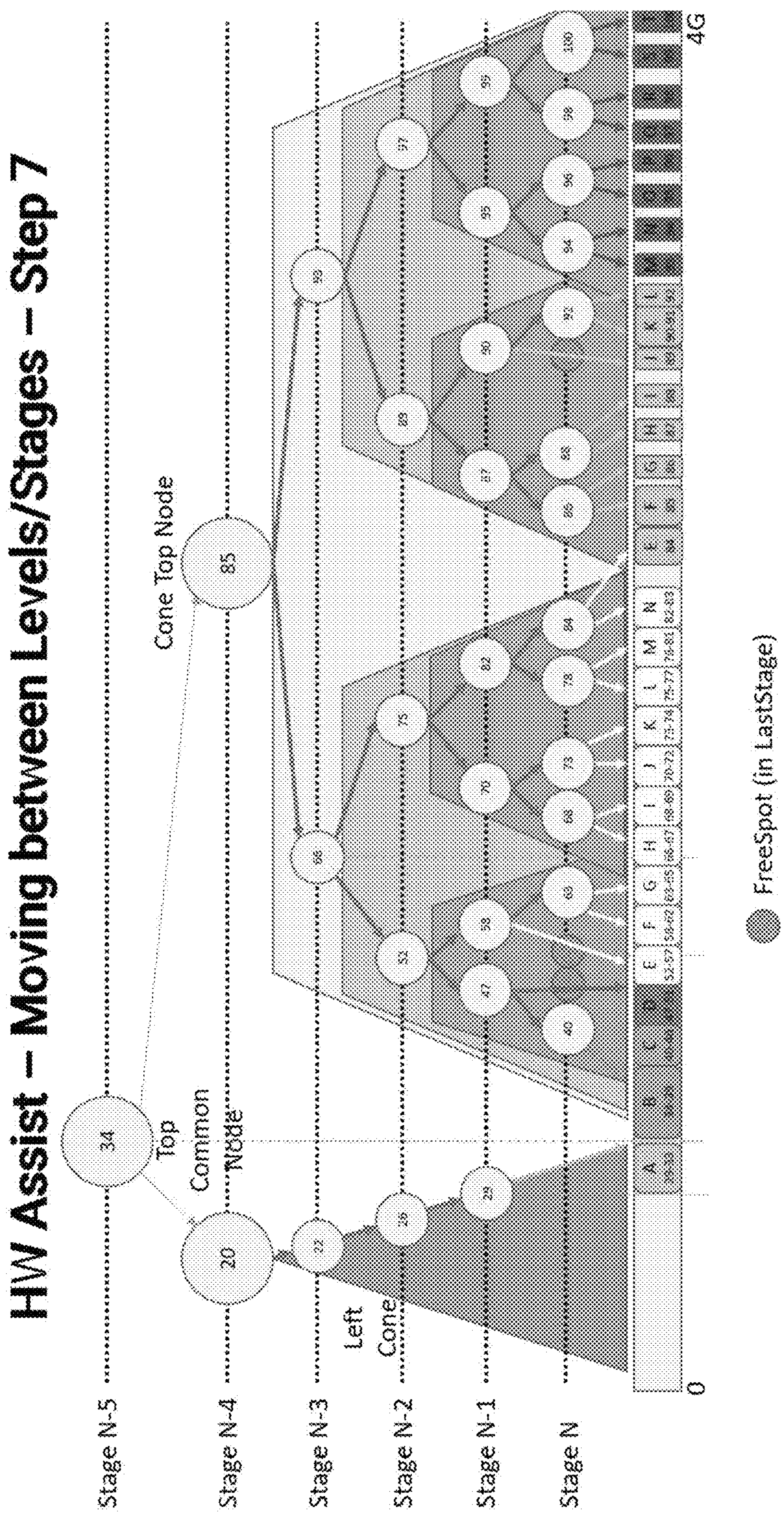
Figure 60:
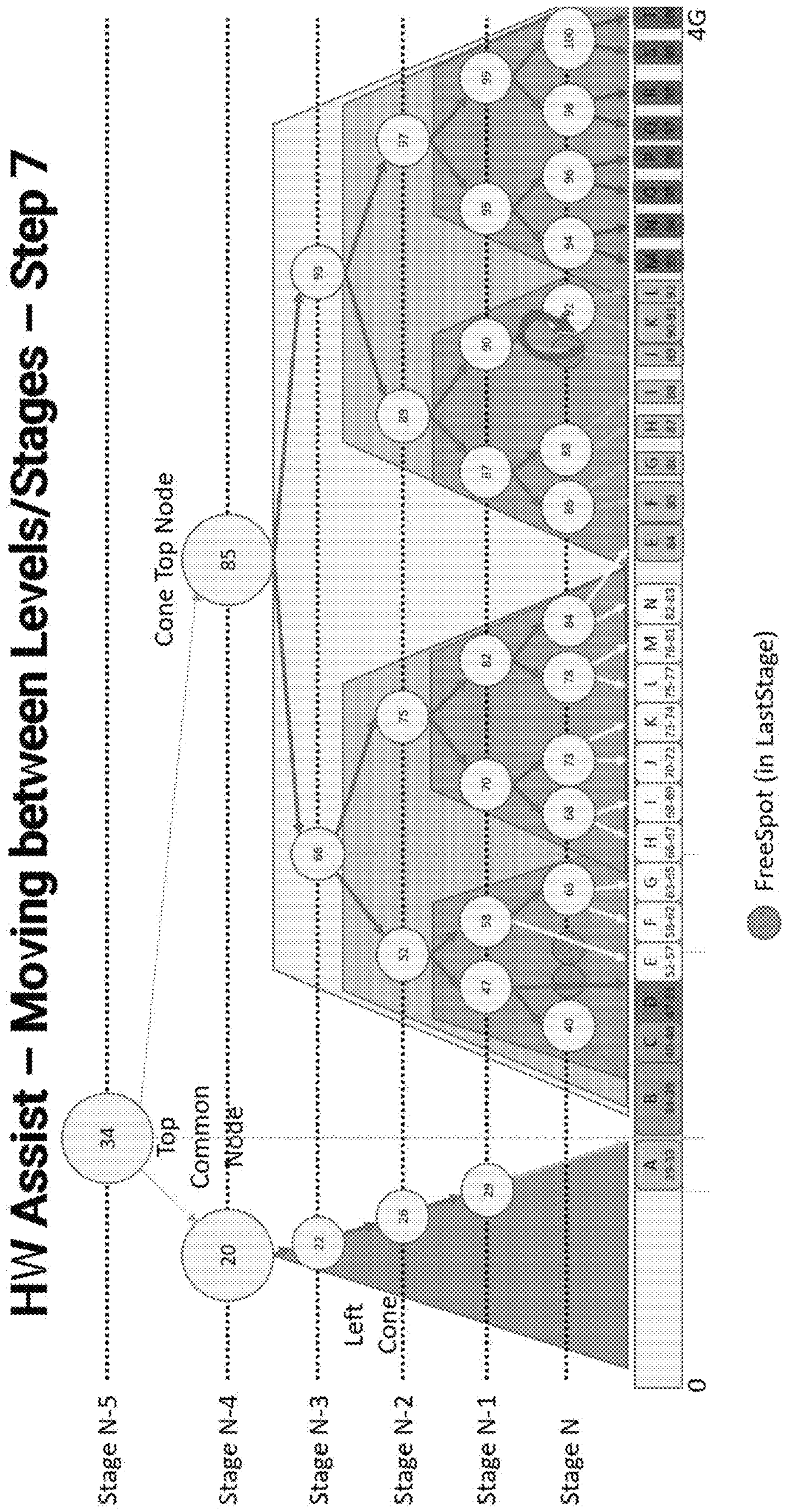
Figure 61:
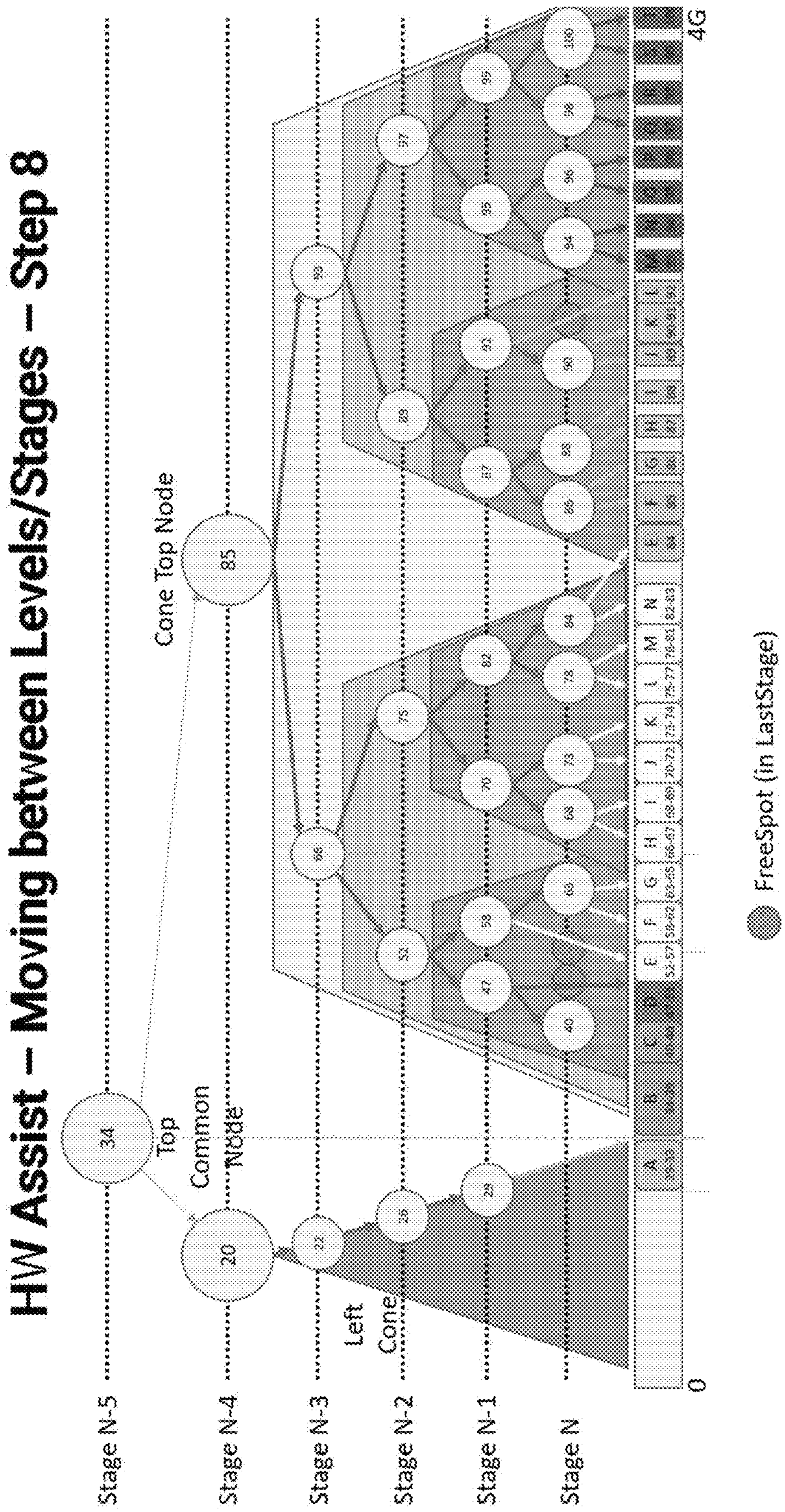
Figure 62:
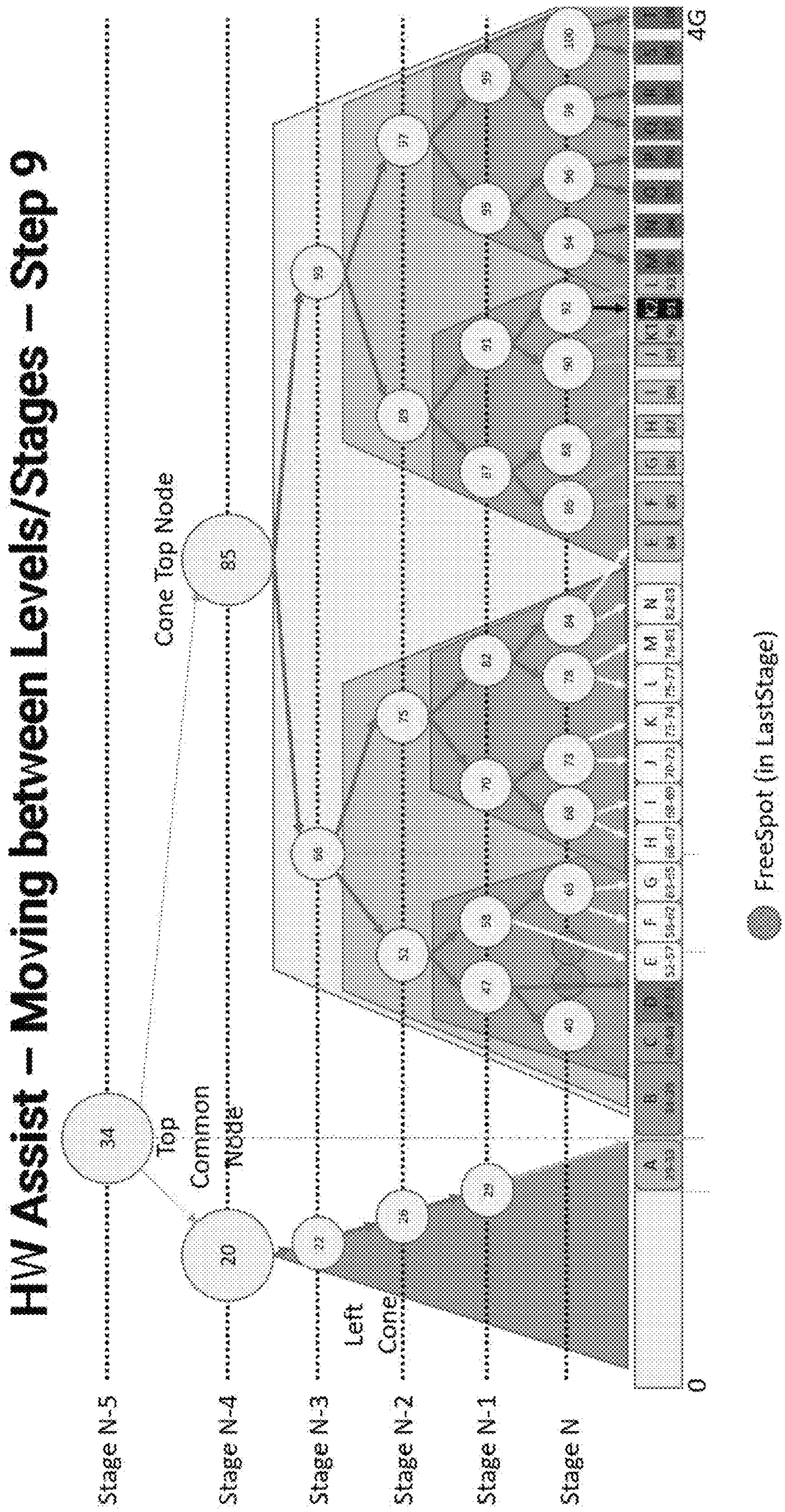
Figure 63:
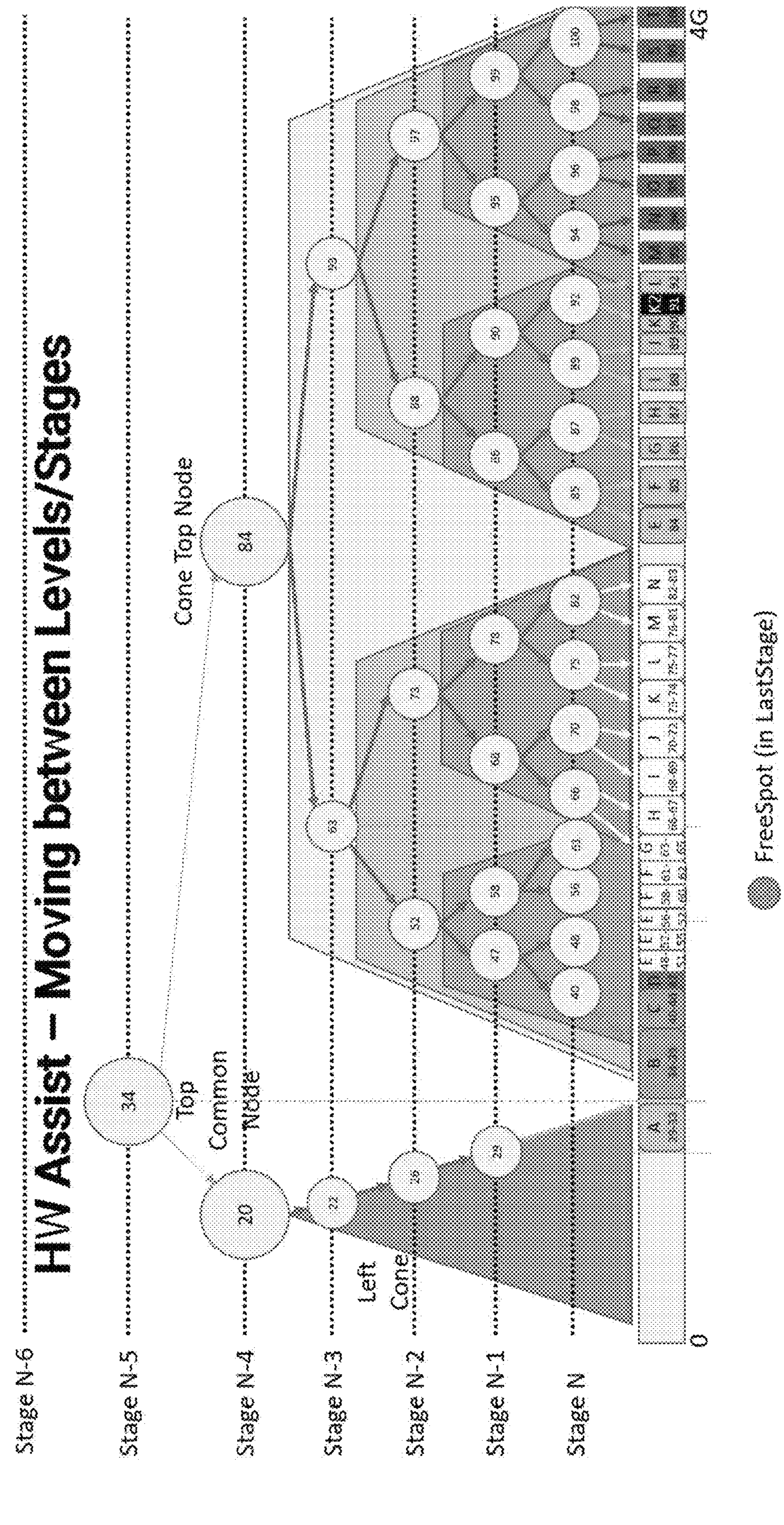
Figure 64:
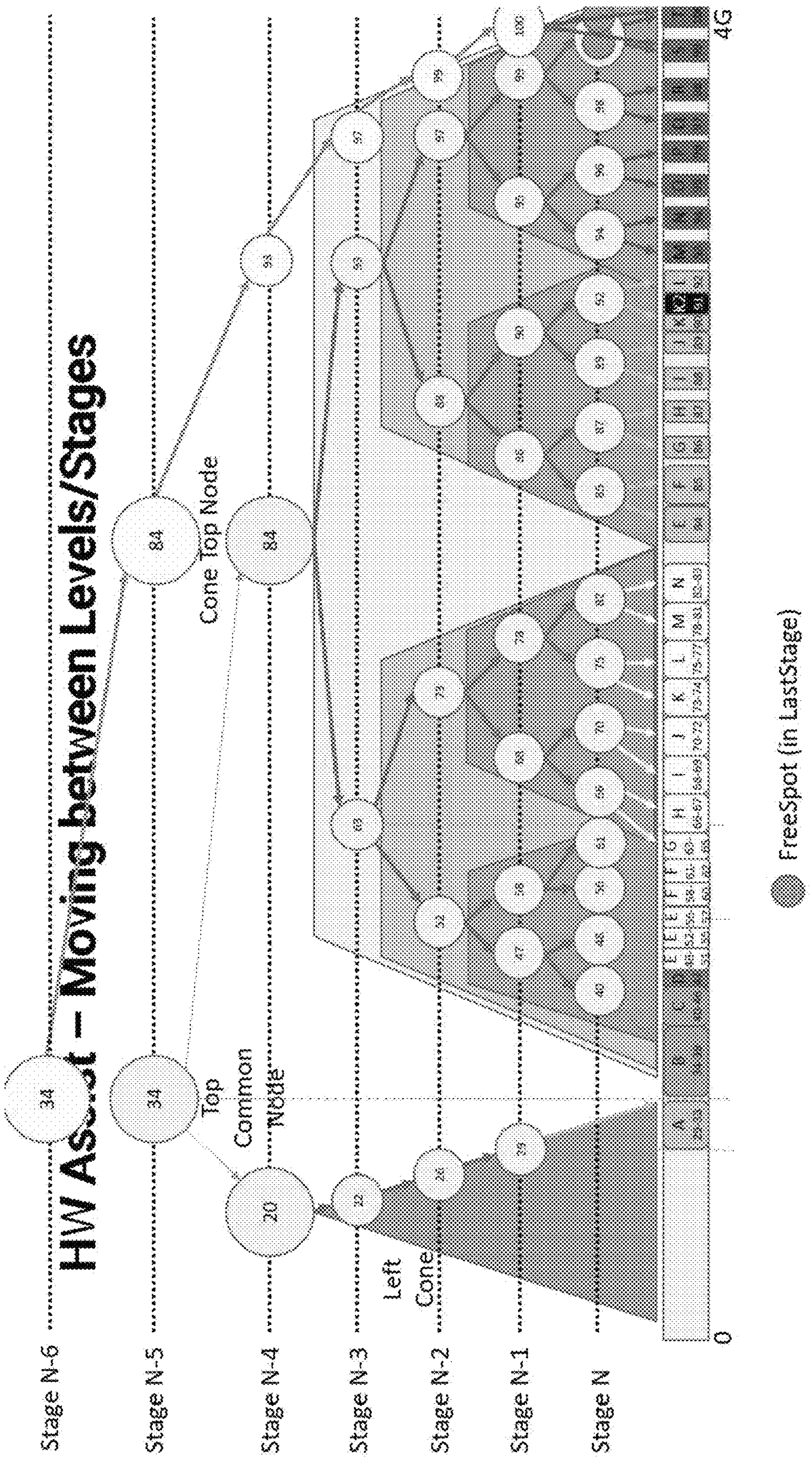
FIGS. 64-89 illustrate examples of updating the tree by adding nodes during multiple update iterations.
Figure 65:
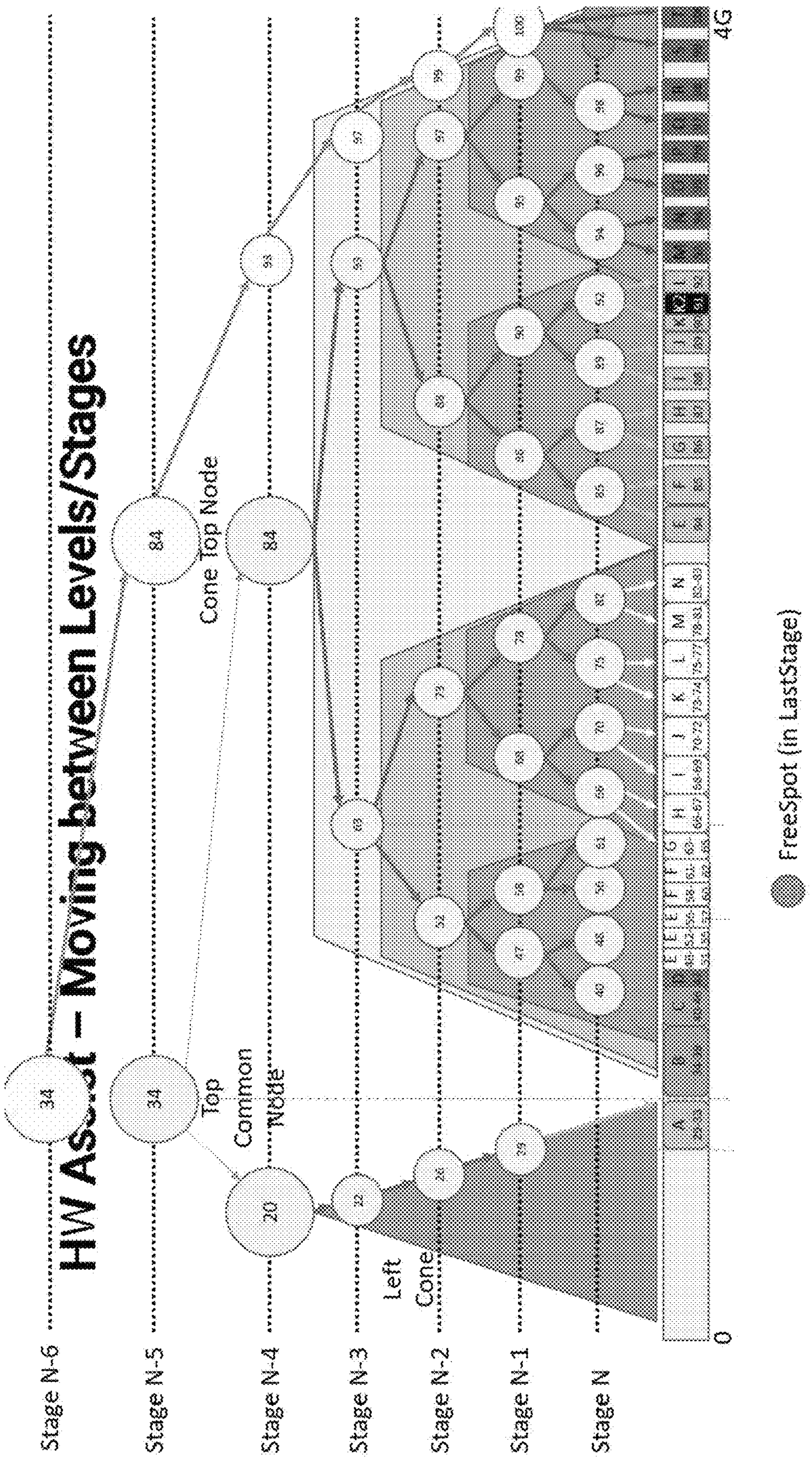
Figure 66:
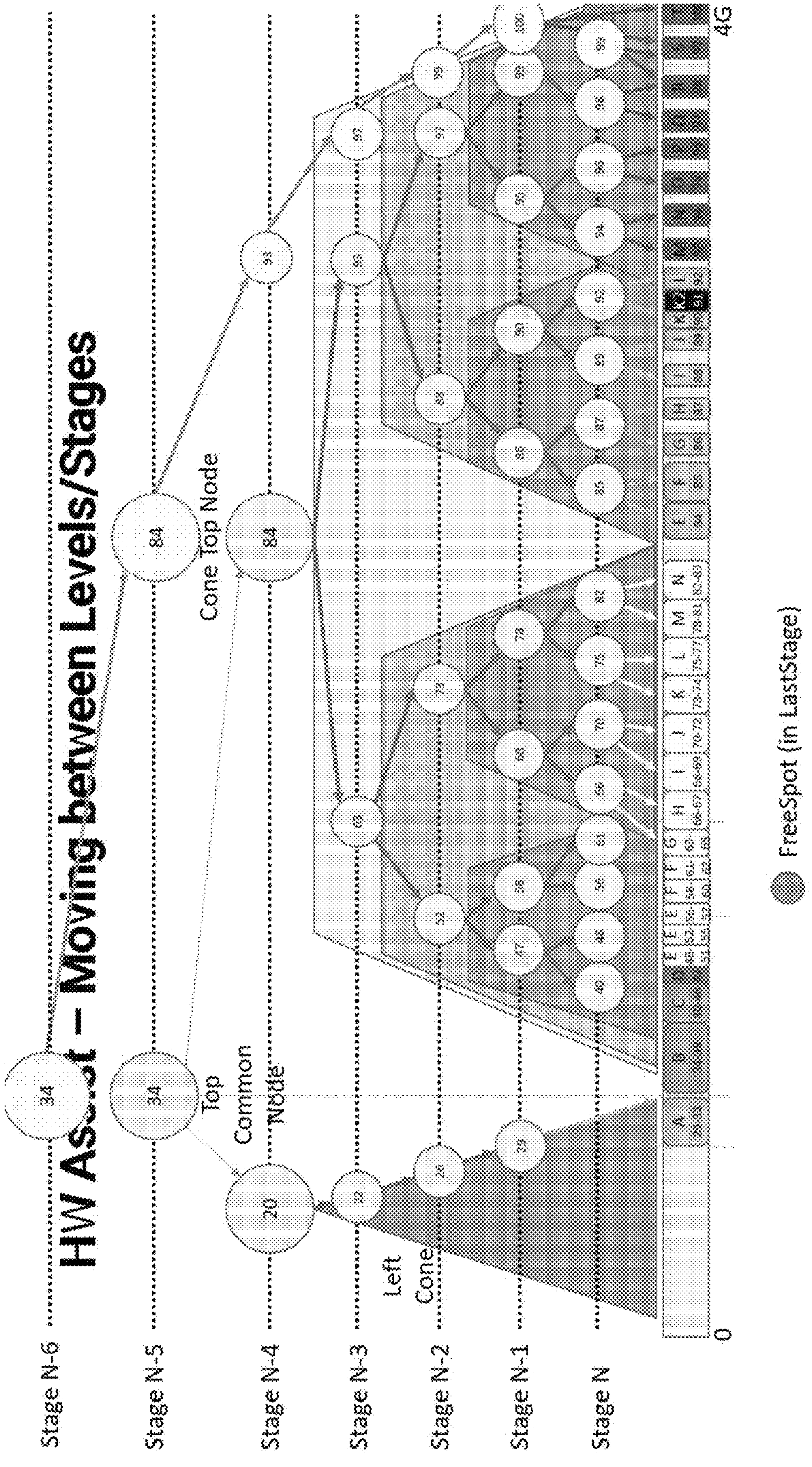
Figure 67:
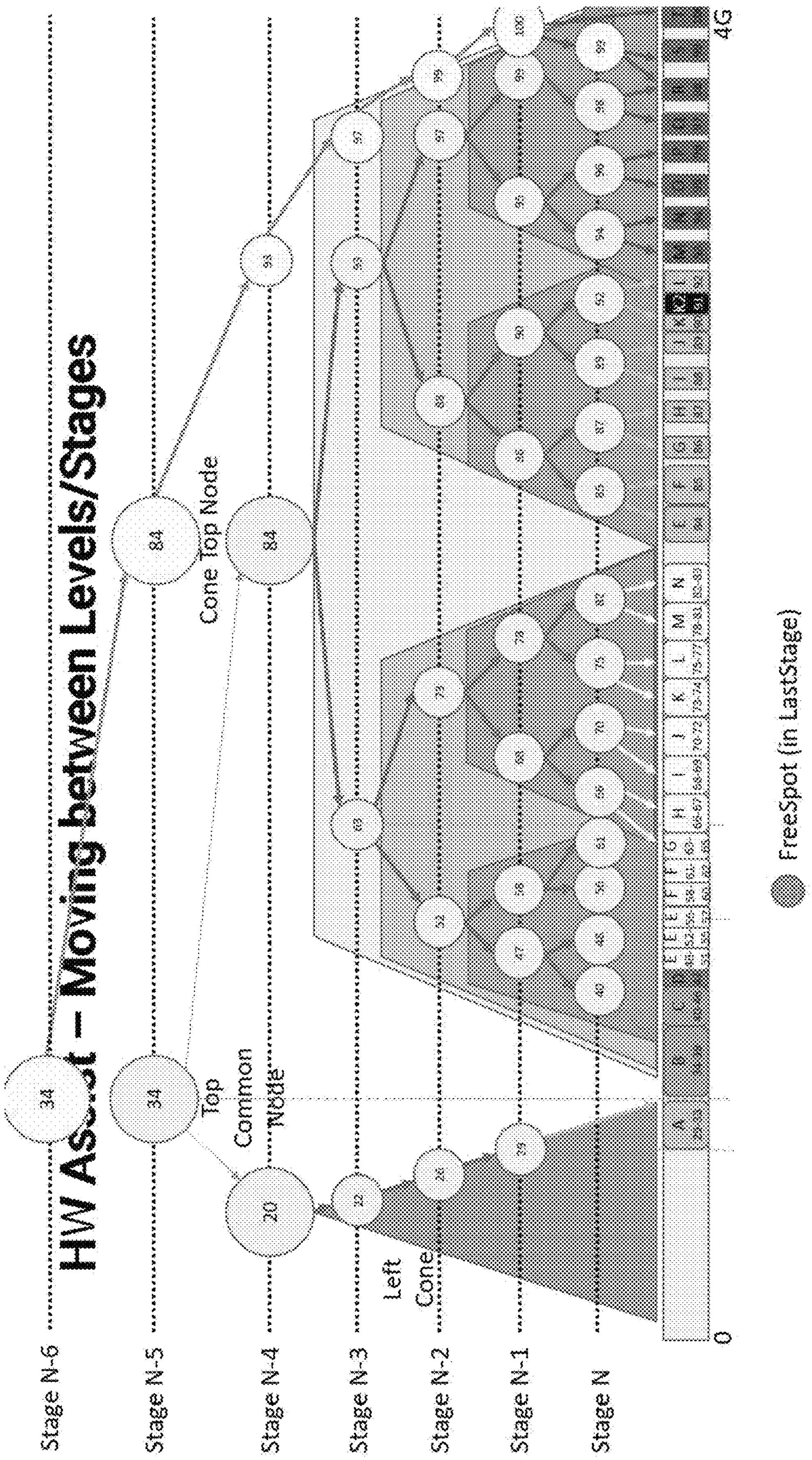
Figure 68:
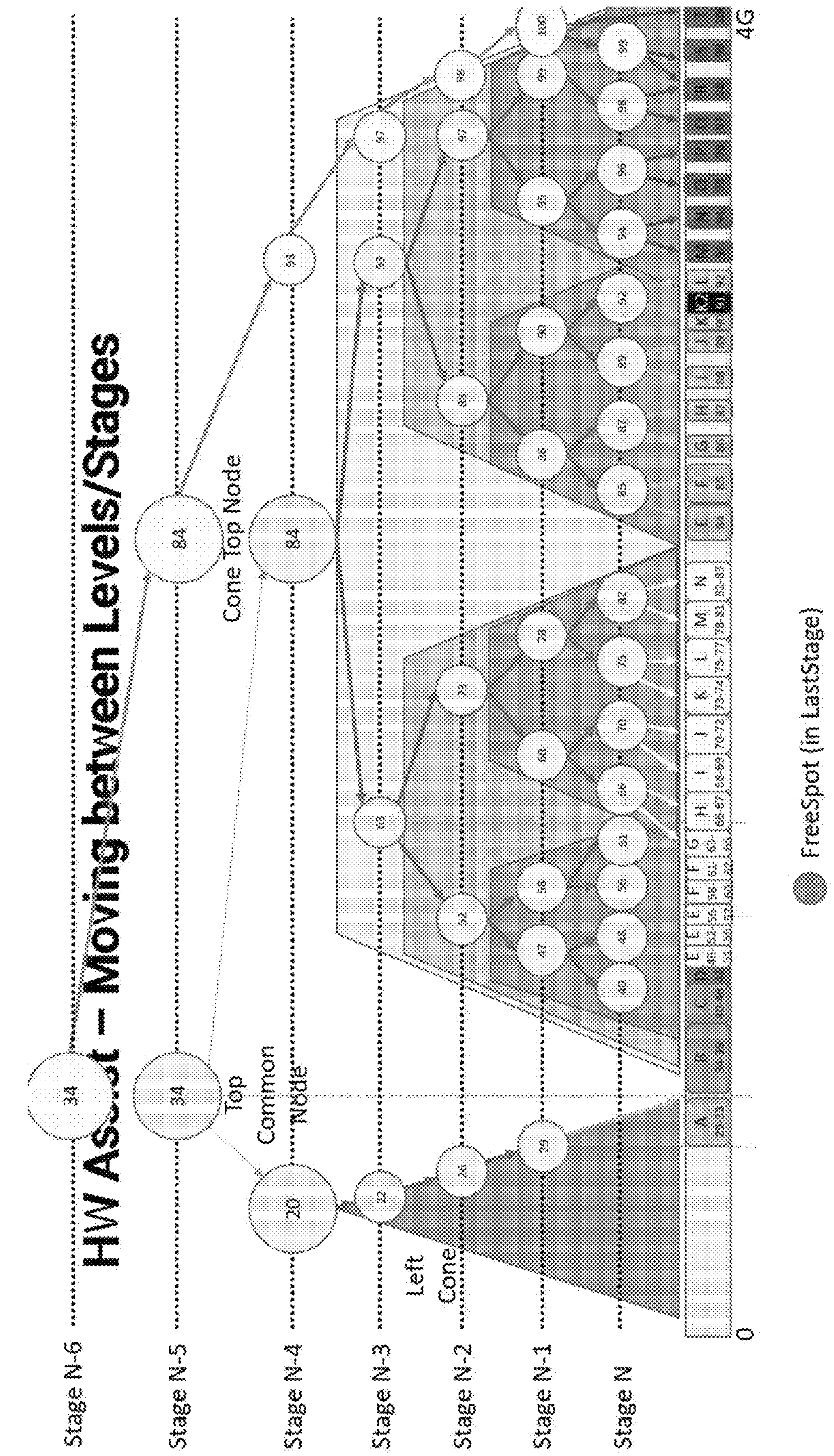
Figure 69:
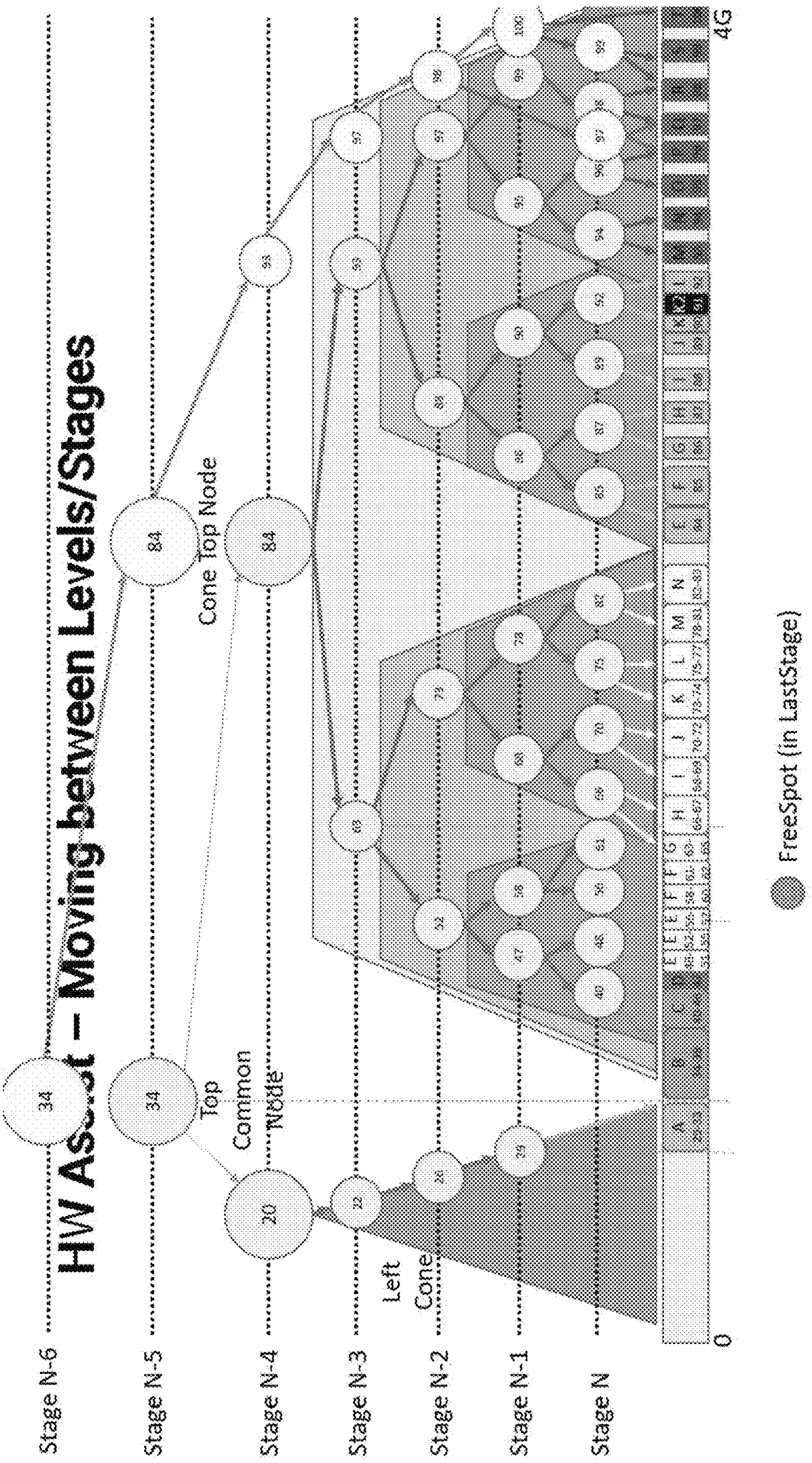
Figure 70:
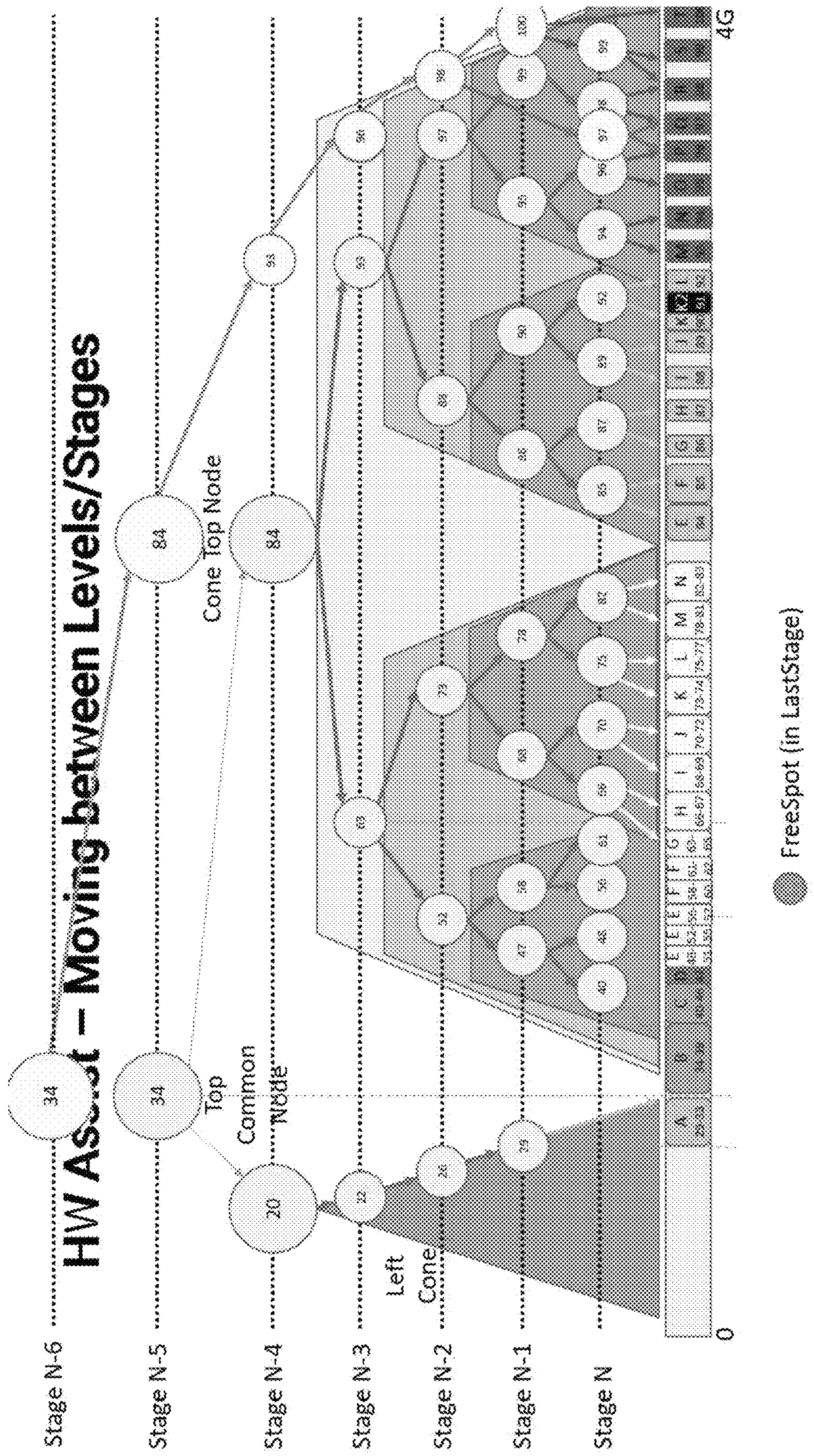
Figure 71:
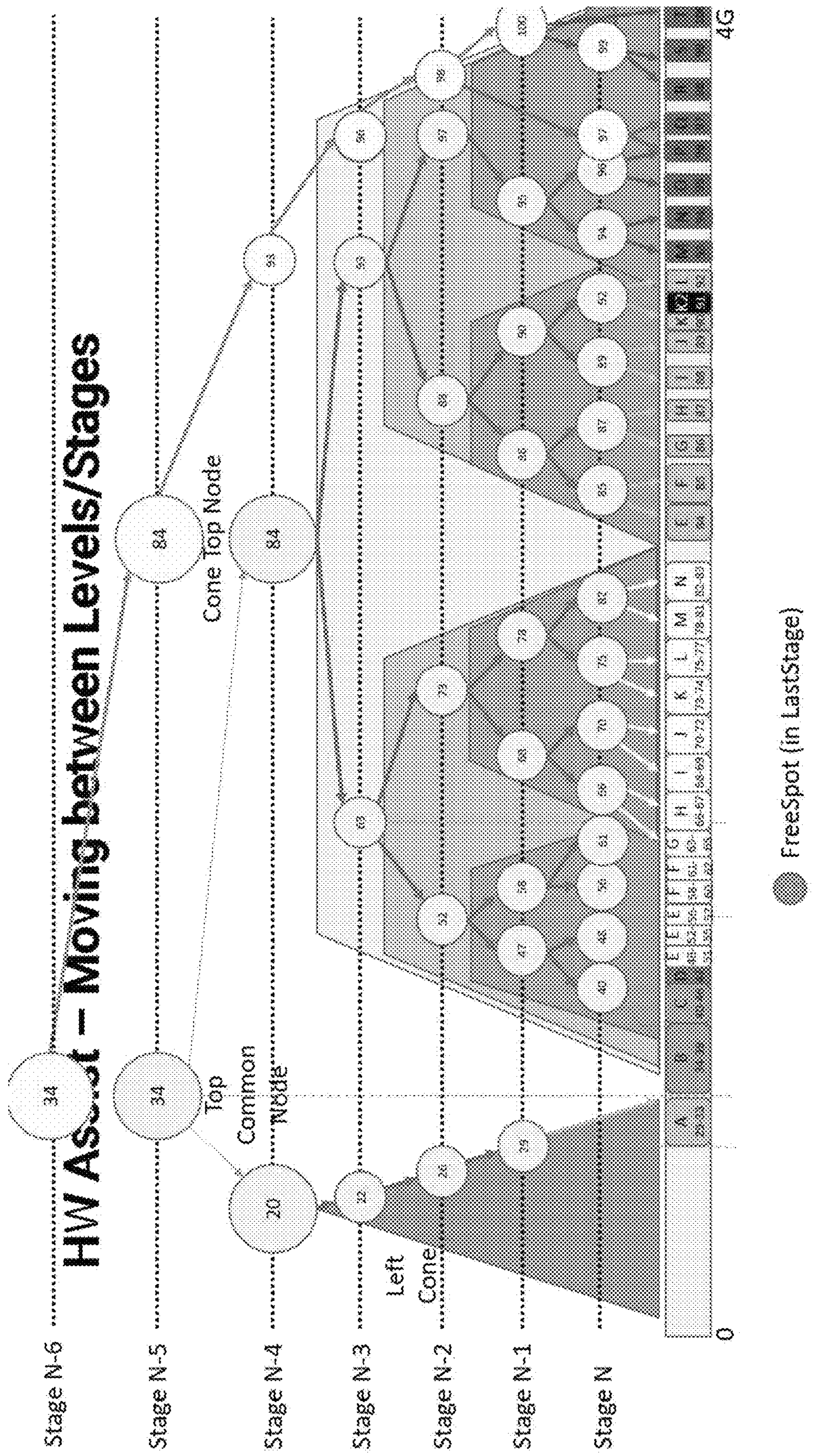
Figure 72:
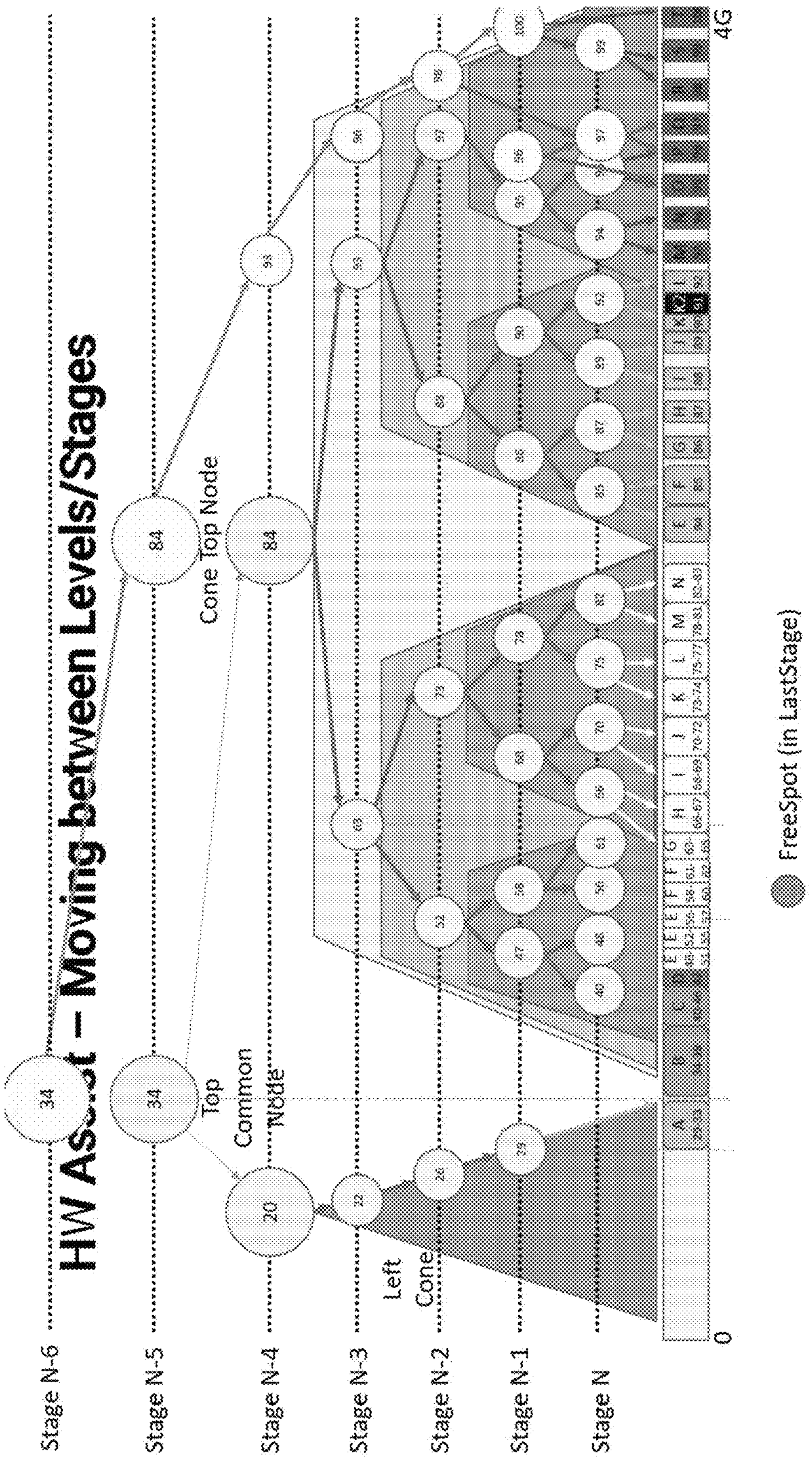
Figure 73:
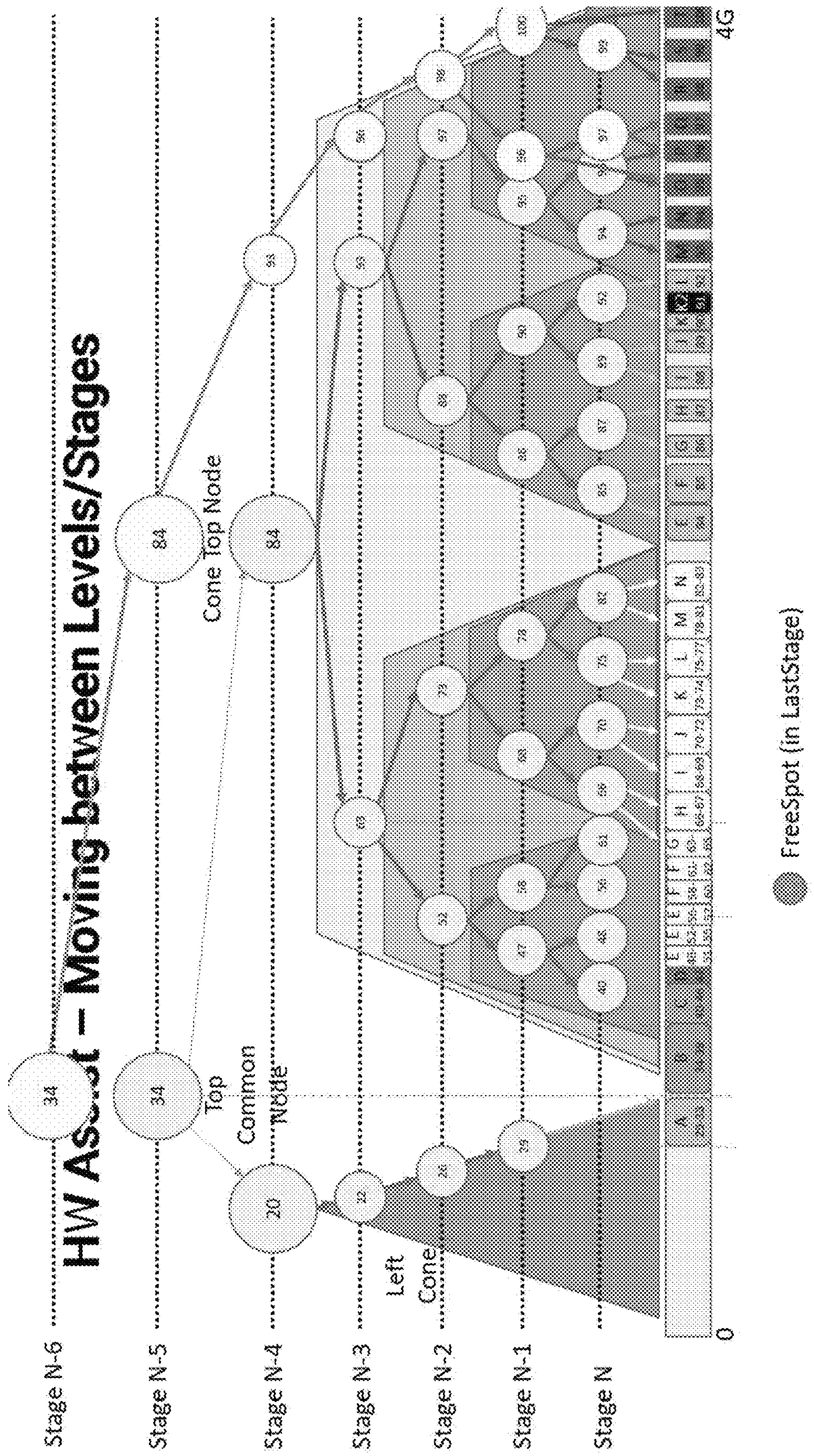
Figure 74:
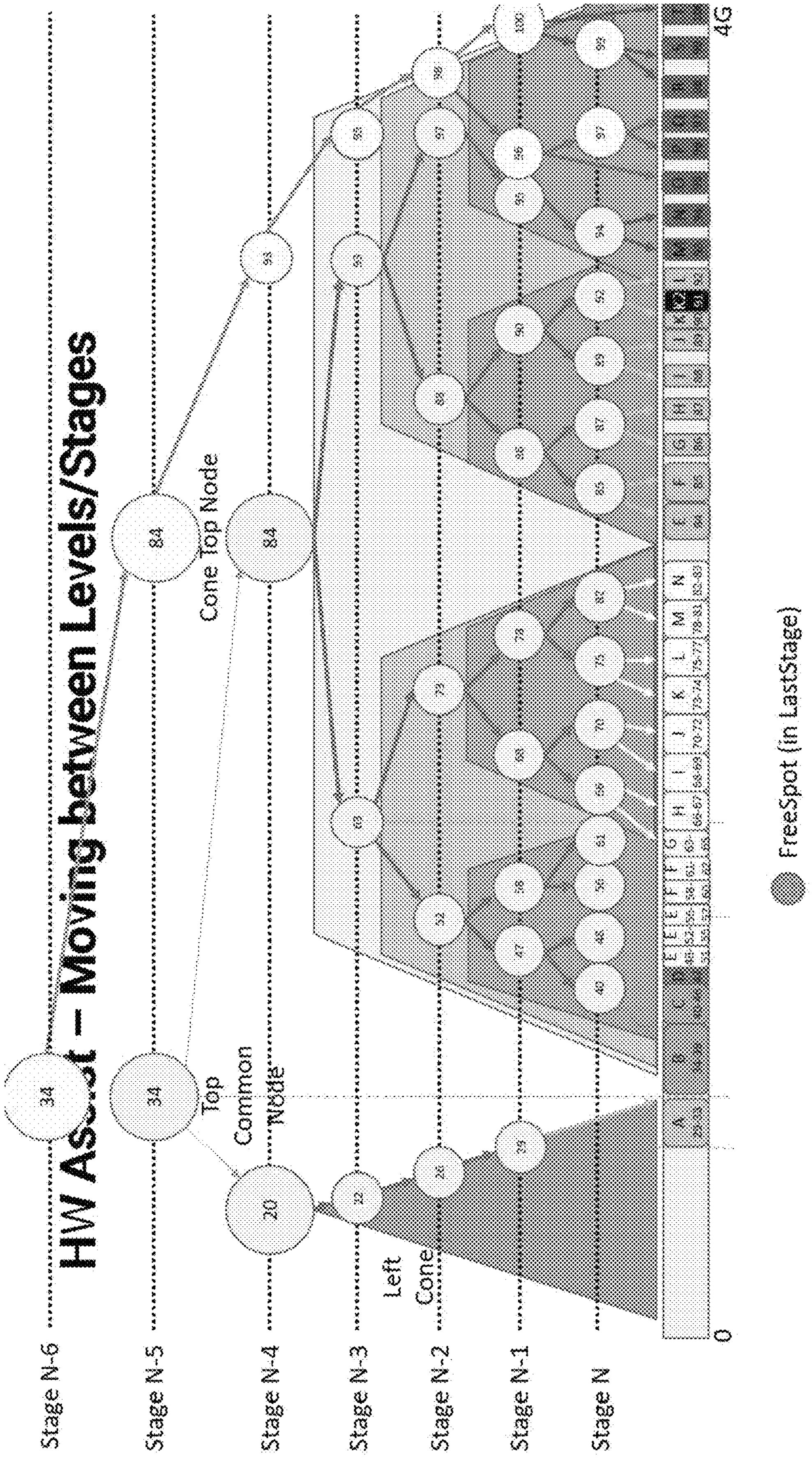
Figure 75:
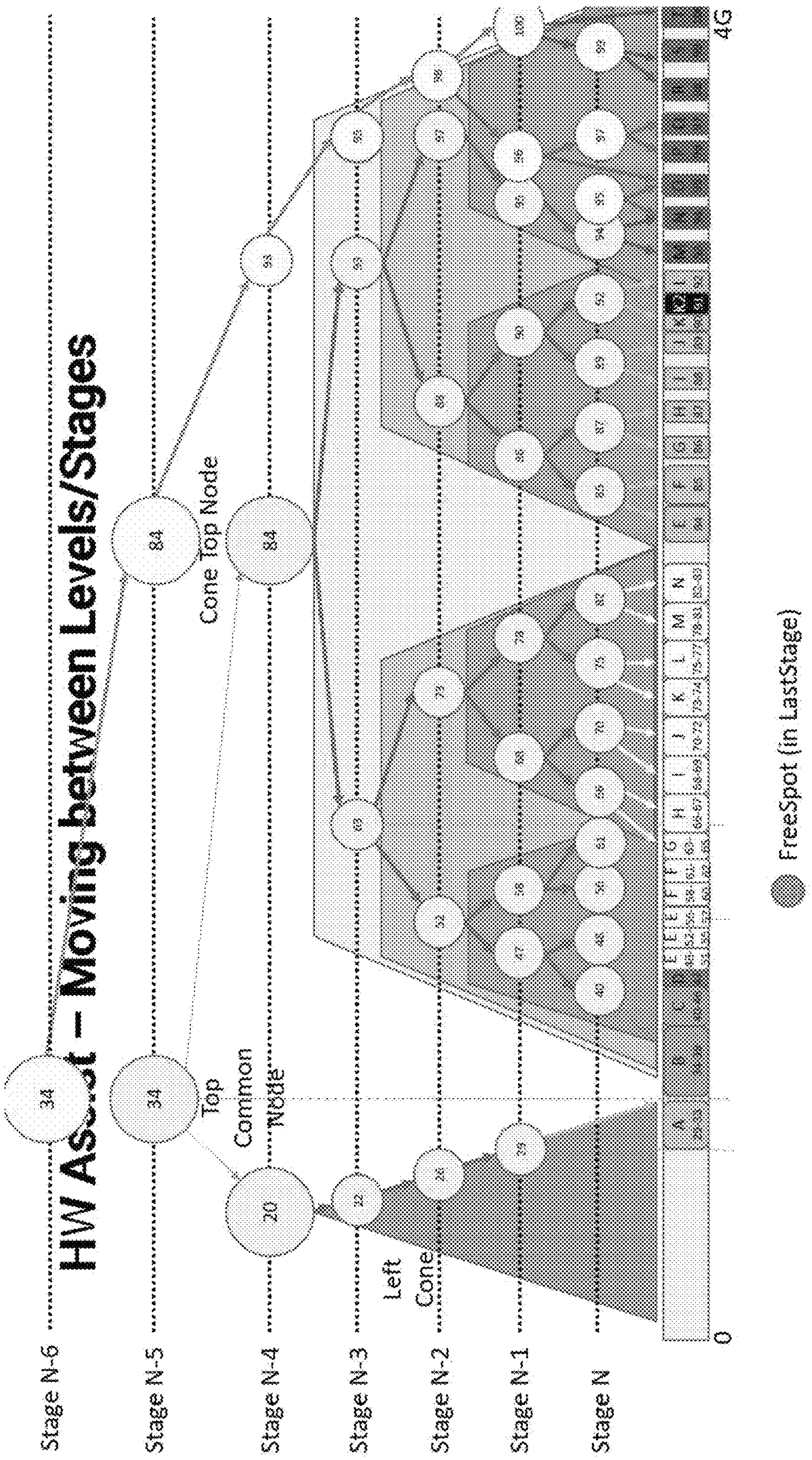
Figure 76:
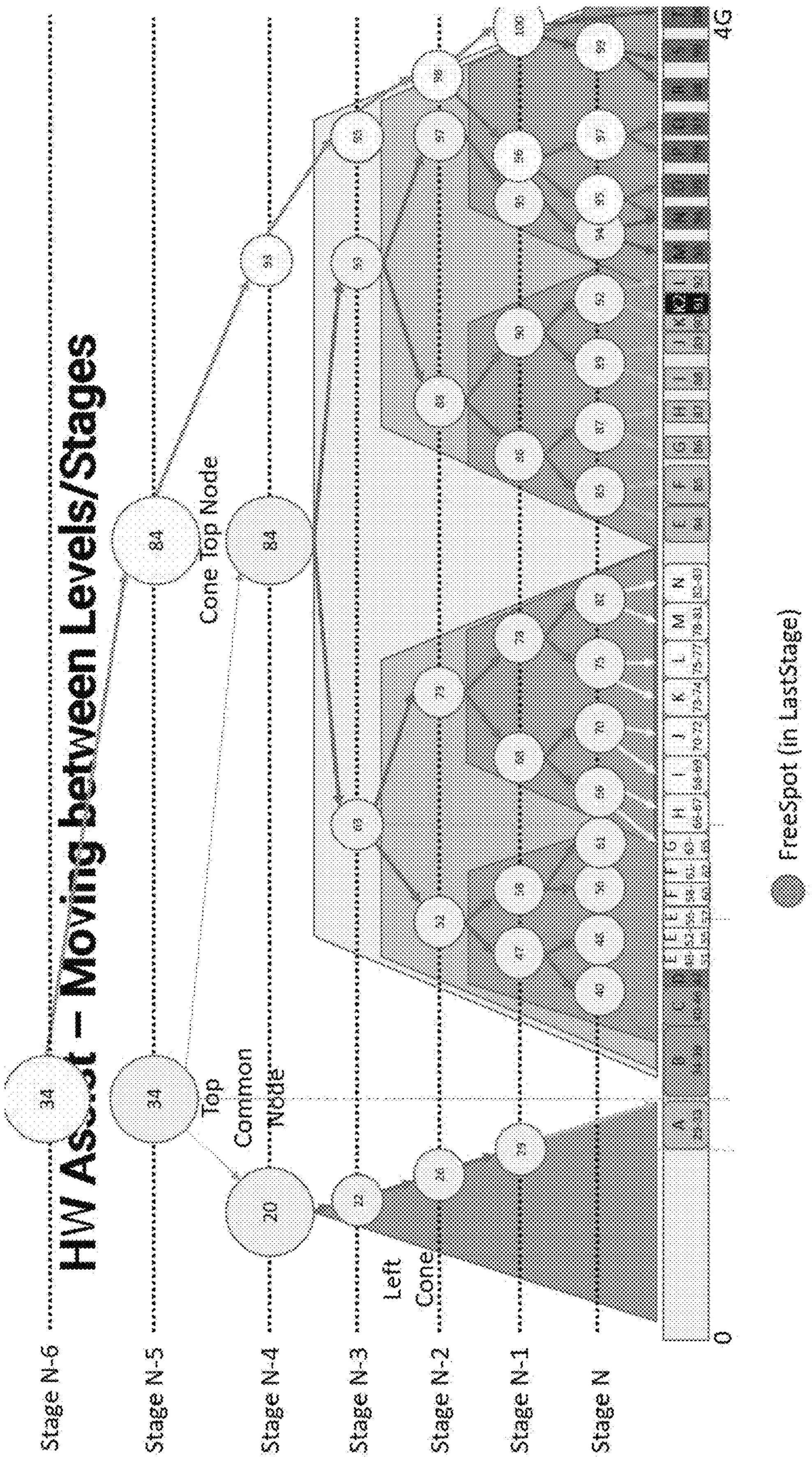
Figure 77:
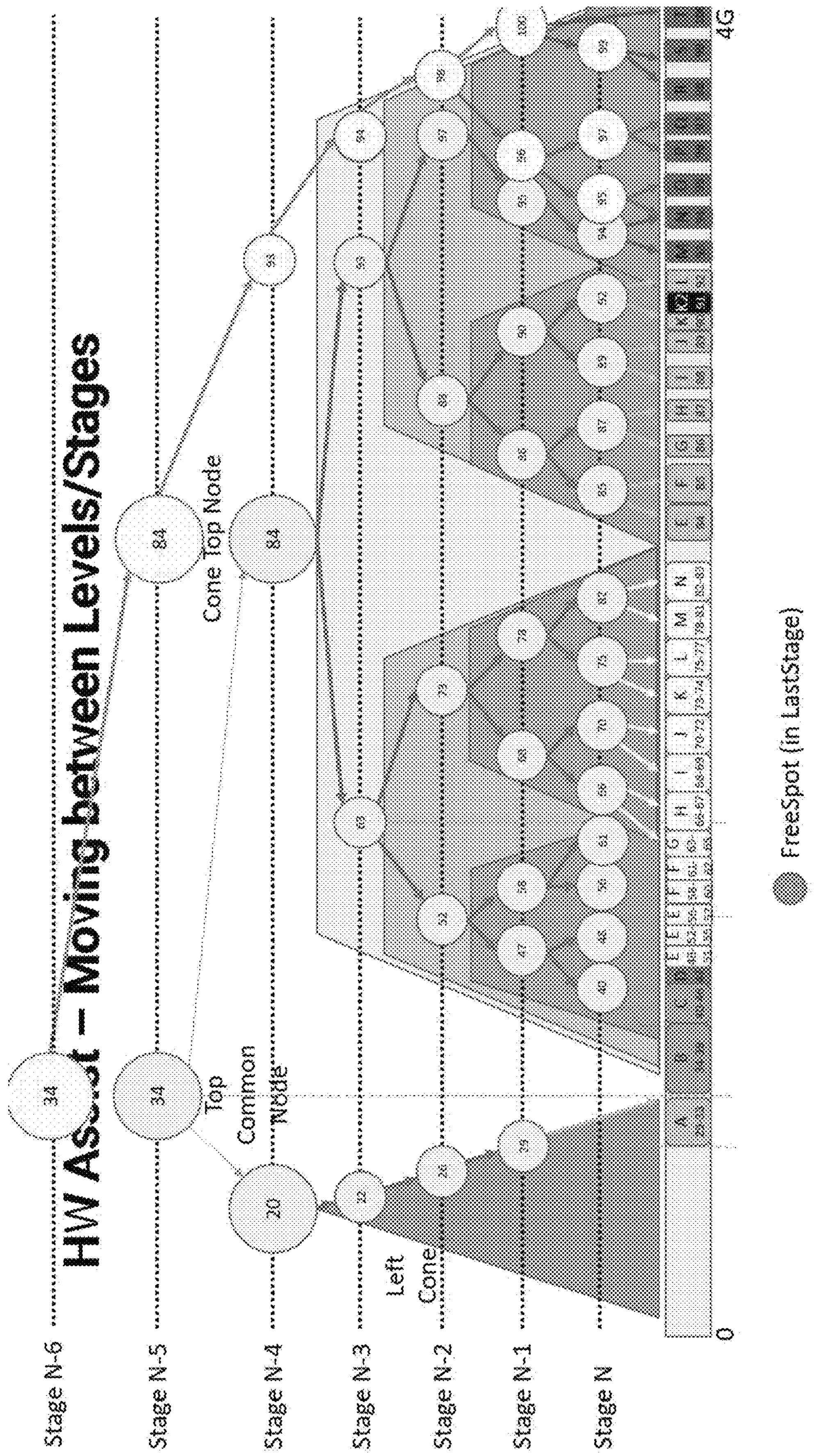
Figure 78:
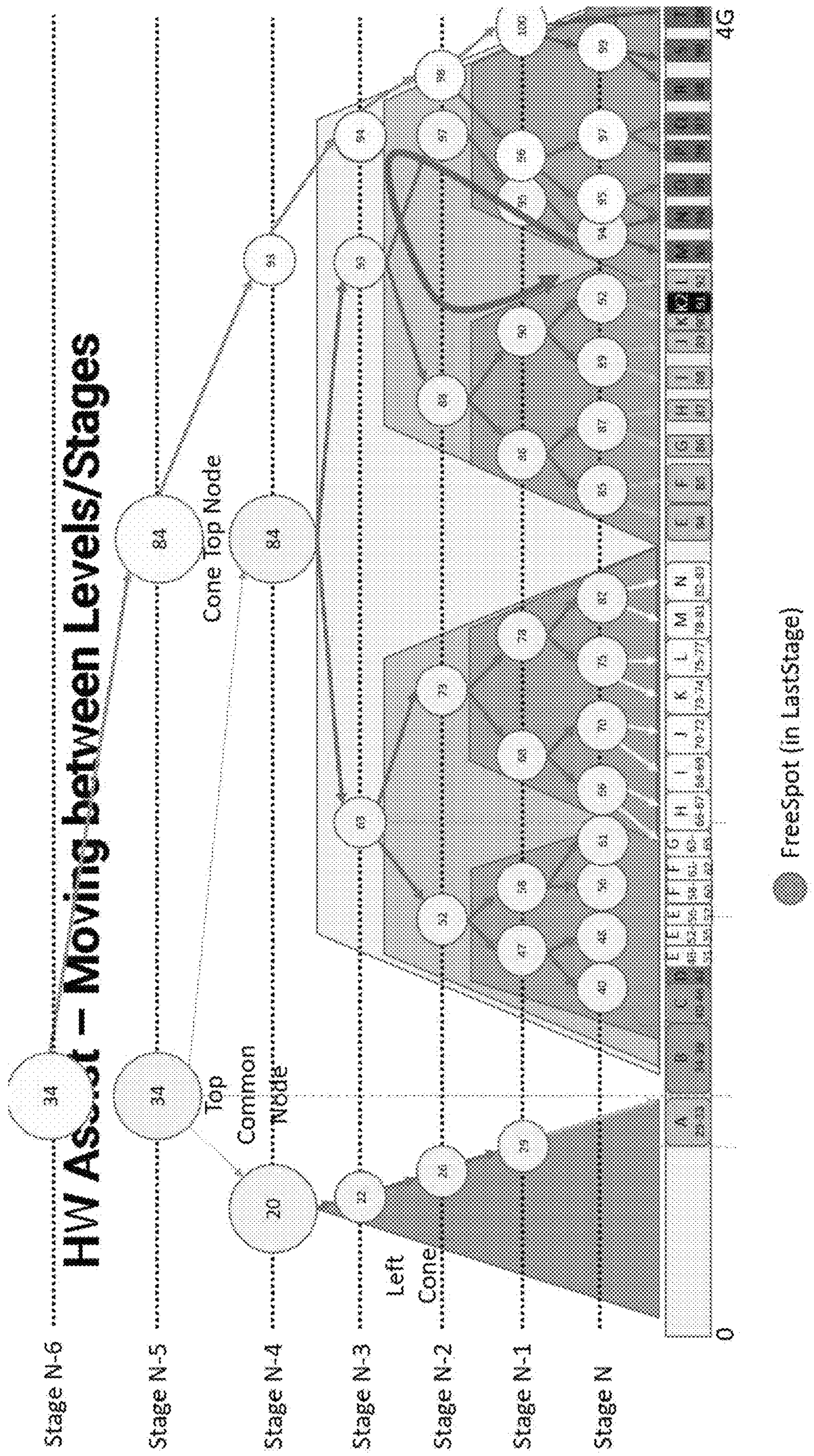
Figure 79:
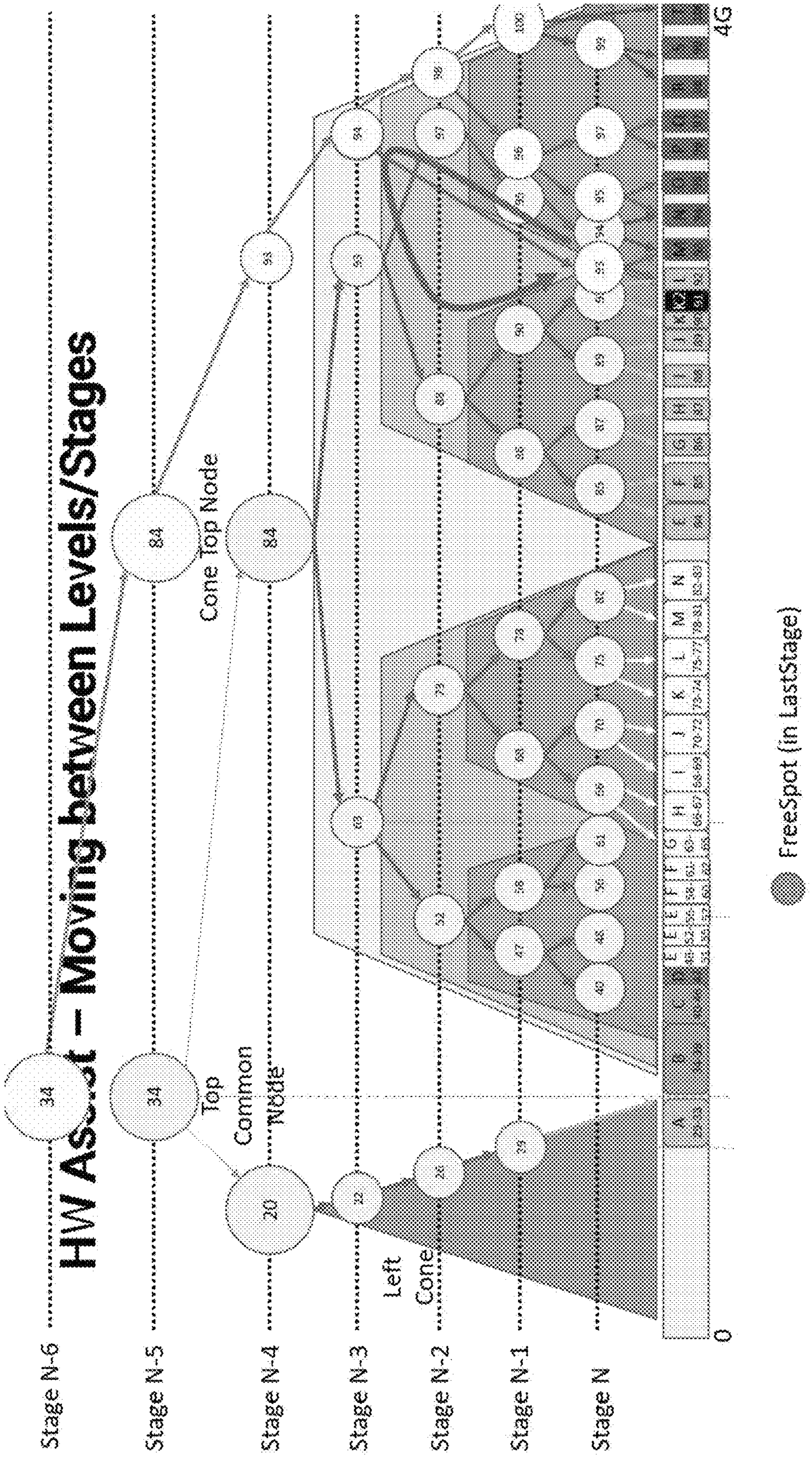
Figure 80:
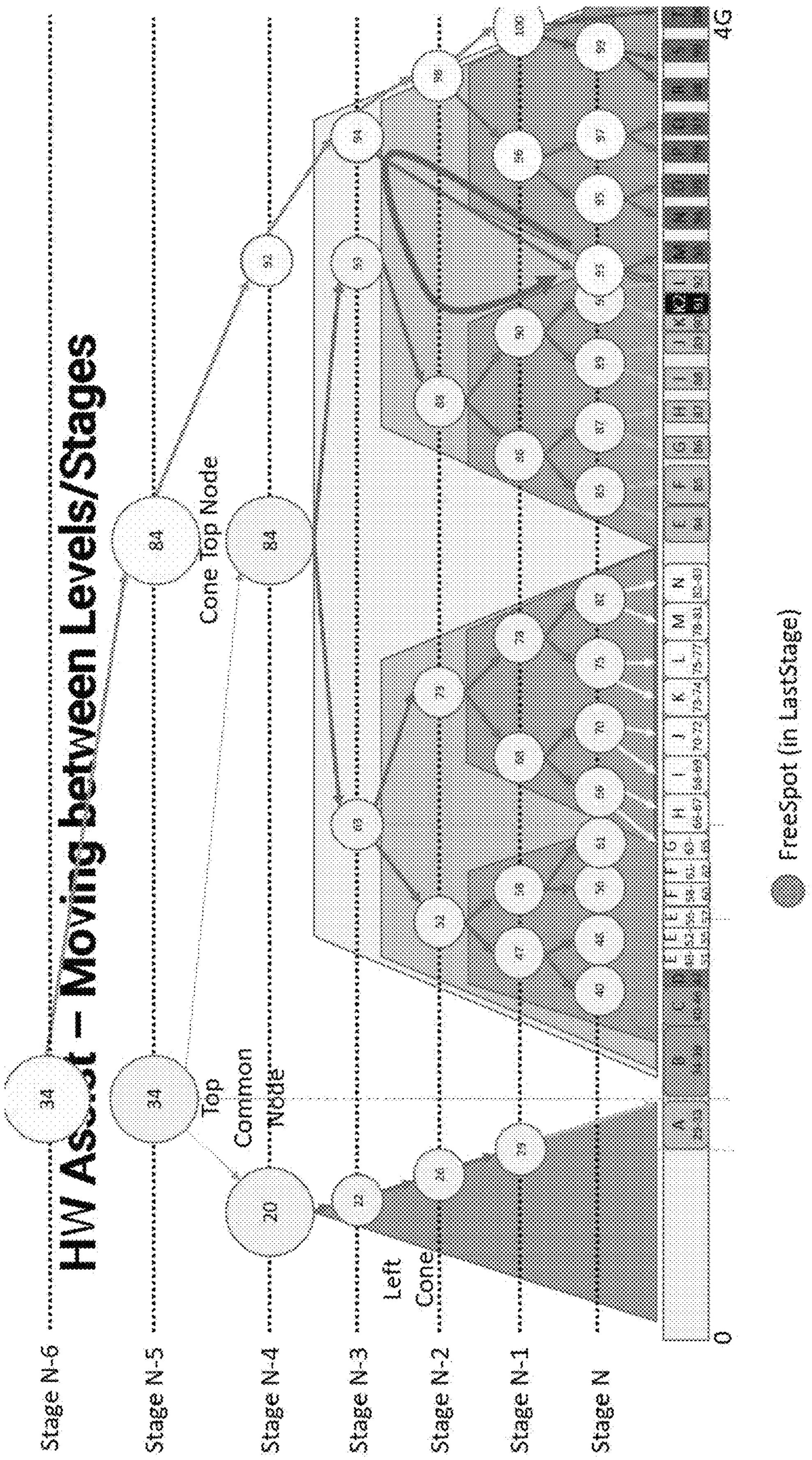
Figure 81:
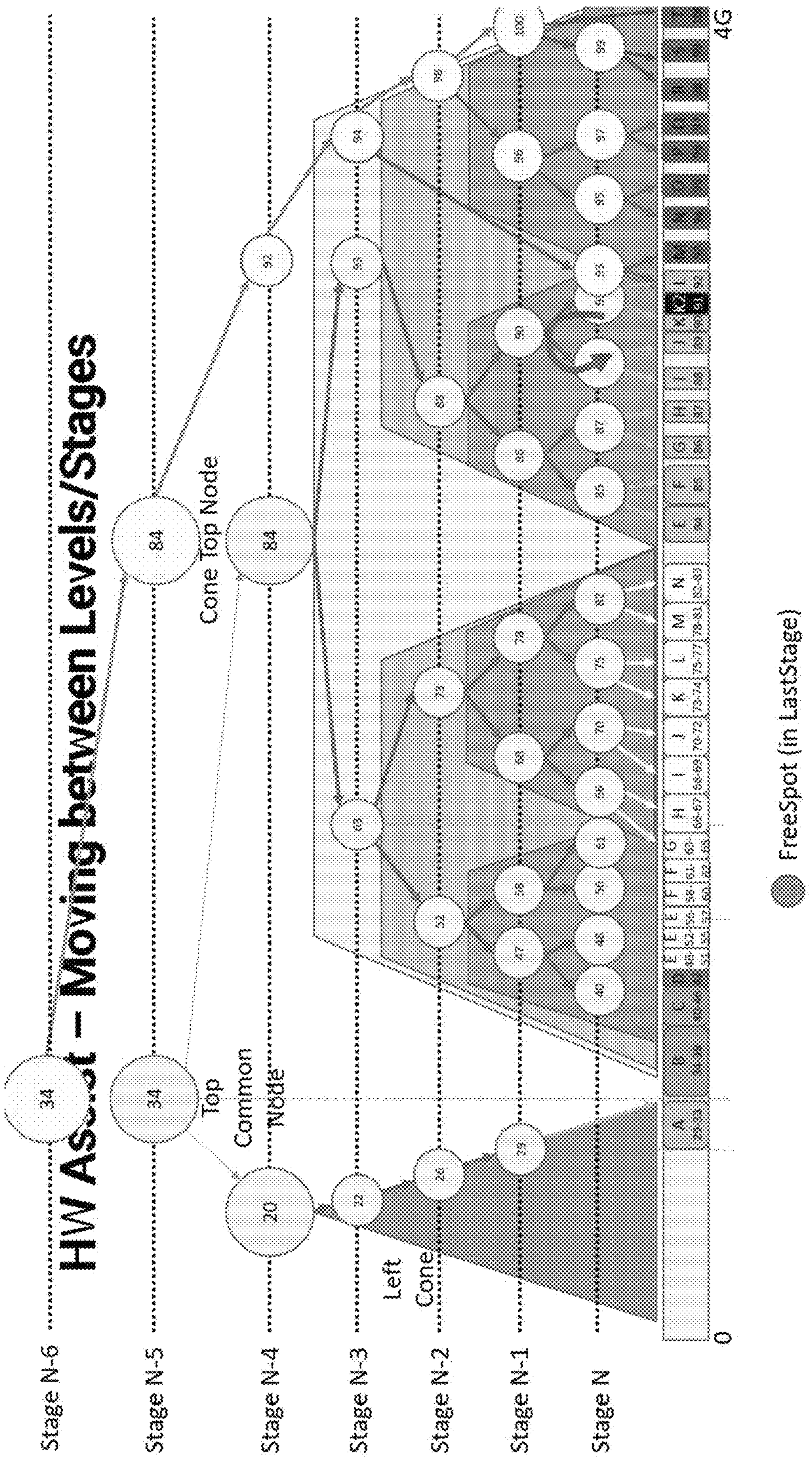
Figure 82:
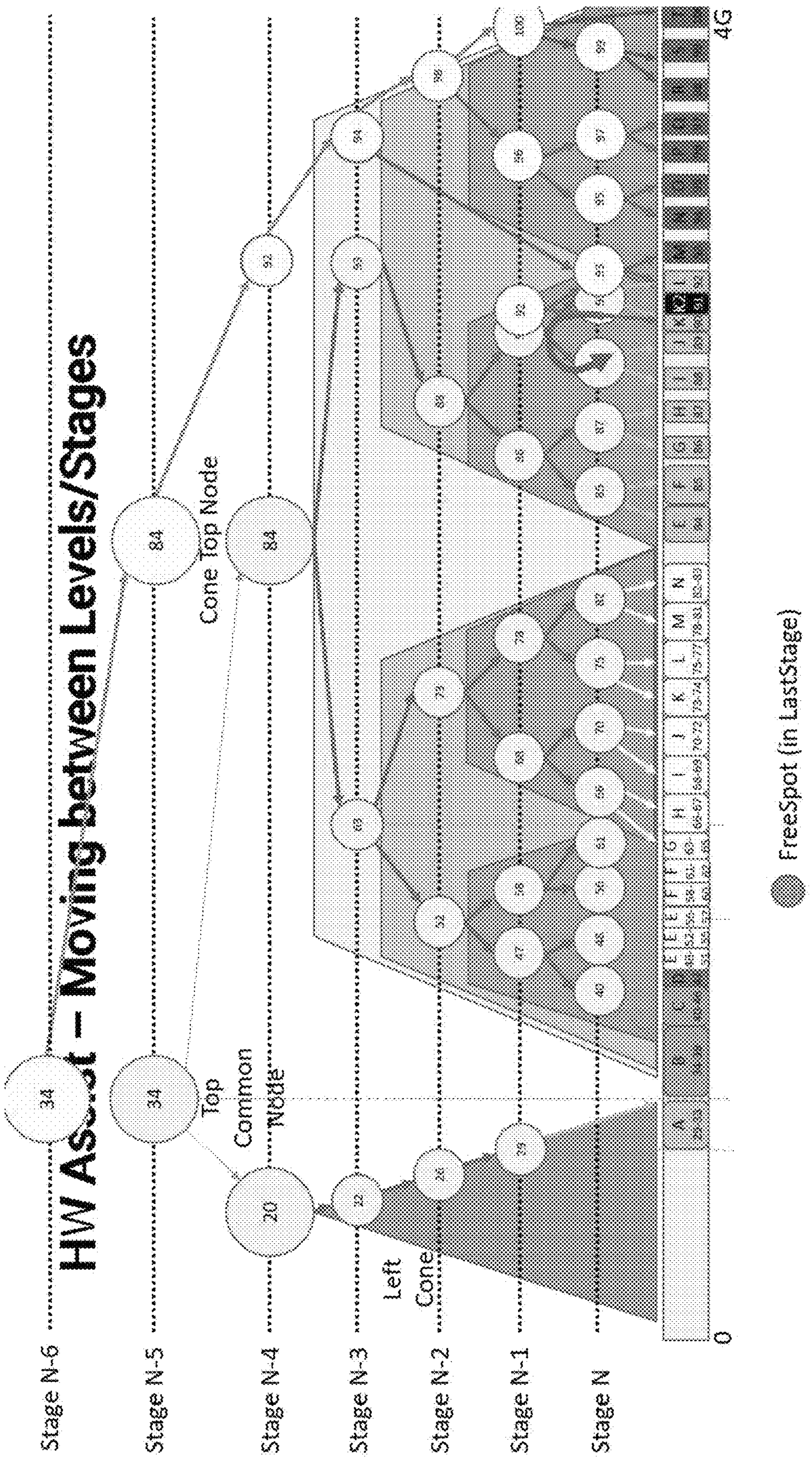
Figure 83:
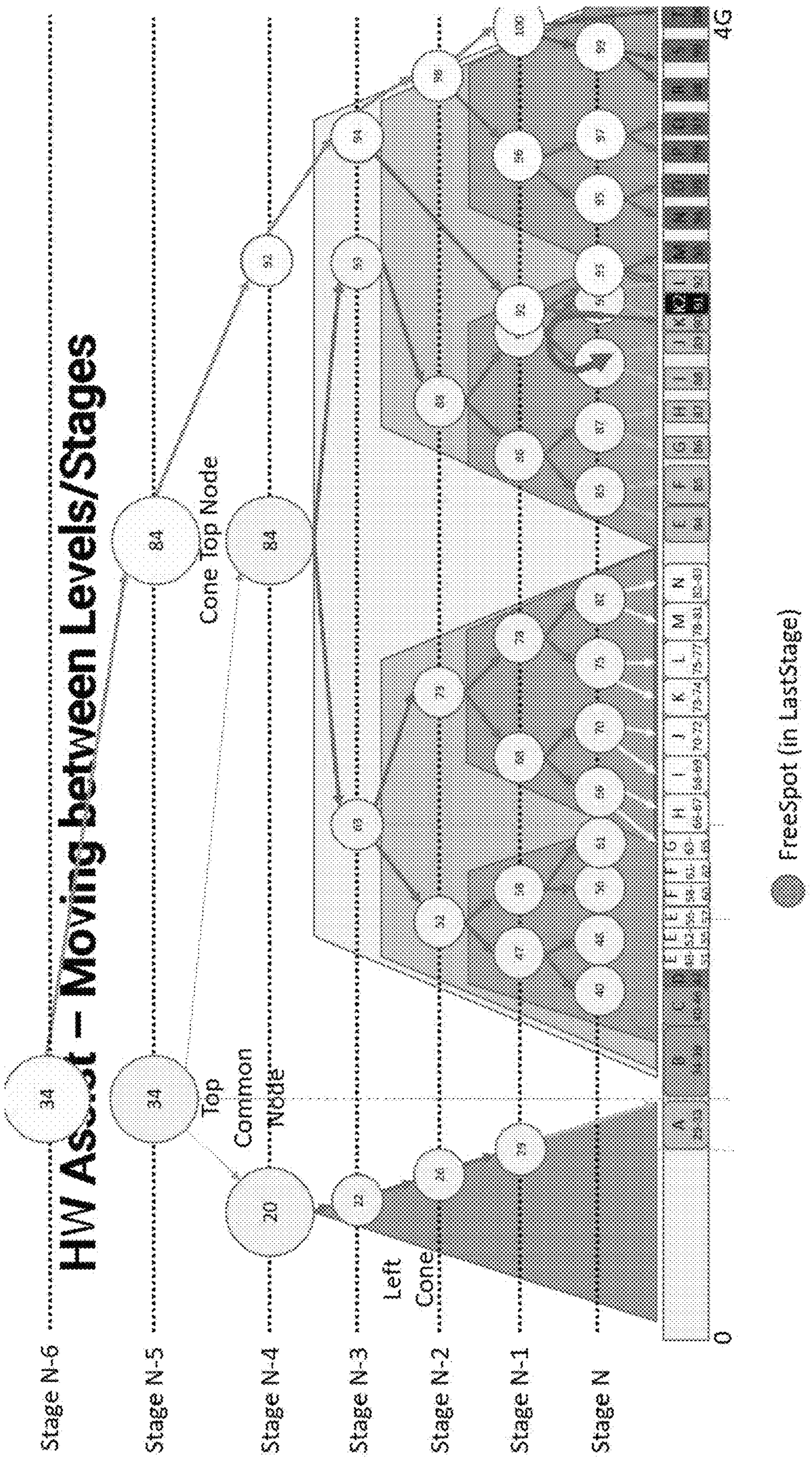
Figure 84:
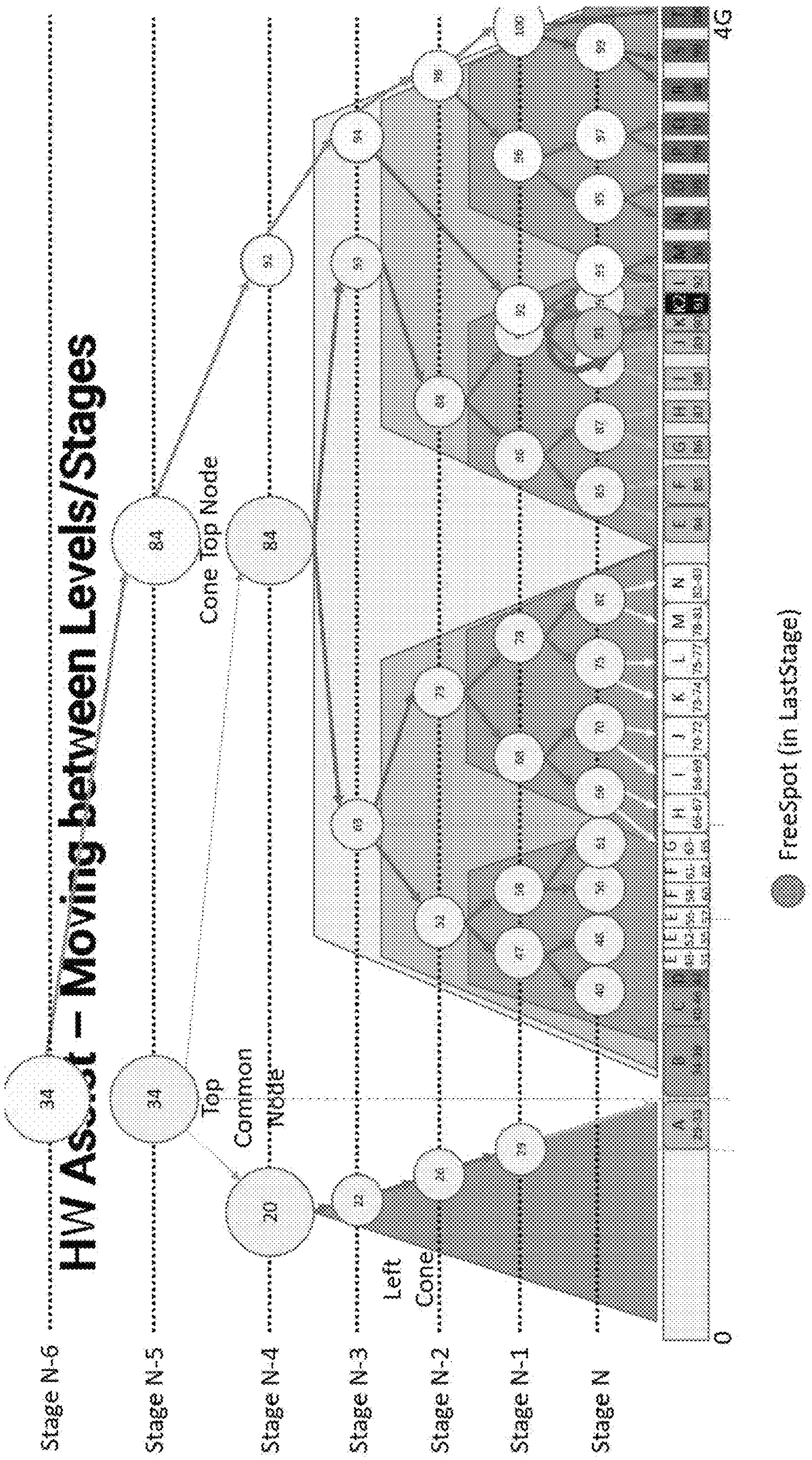
Figure 85:
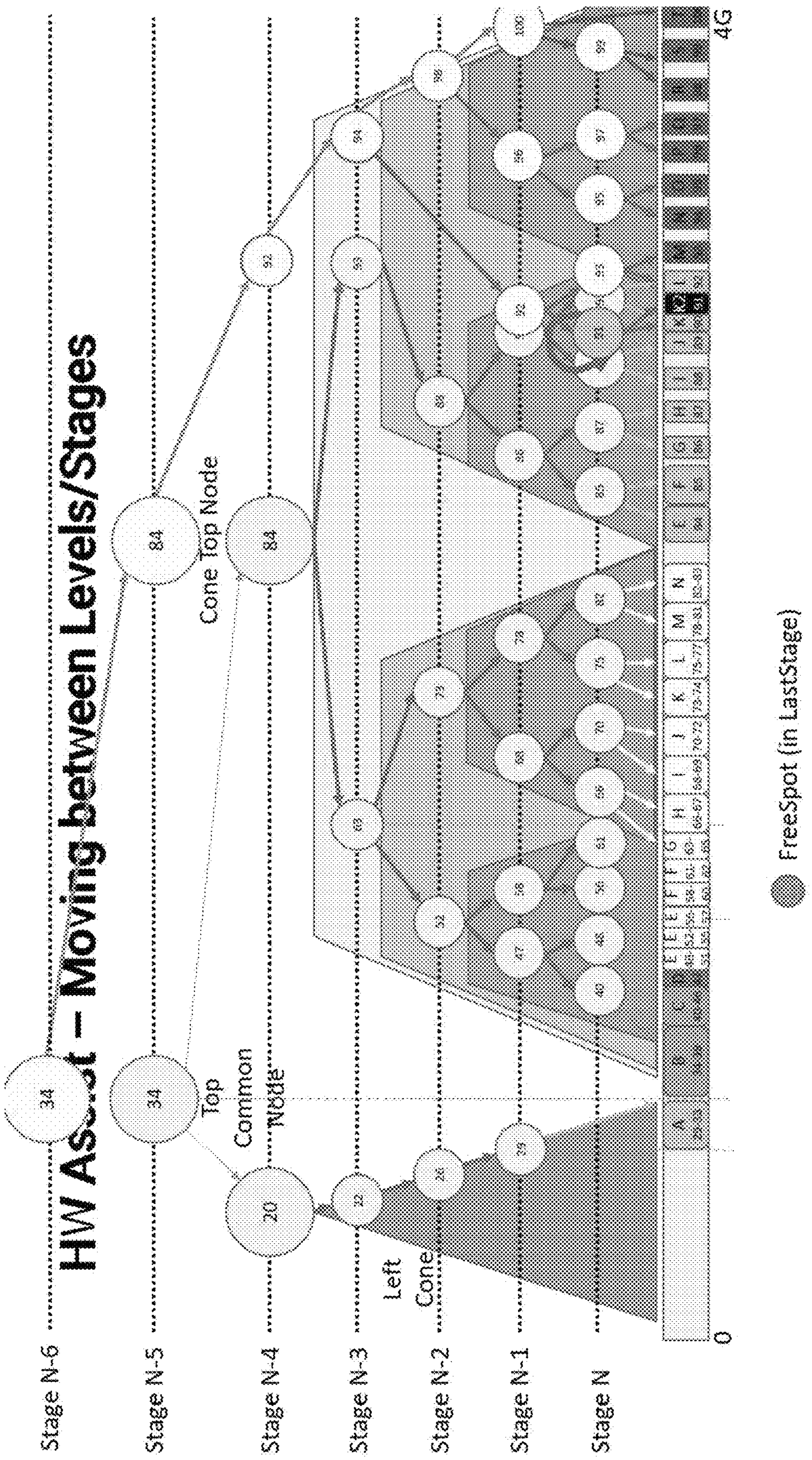
Figure 86:
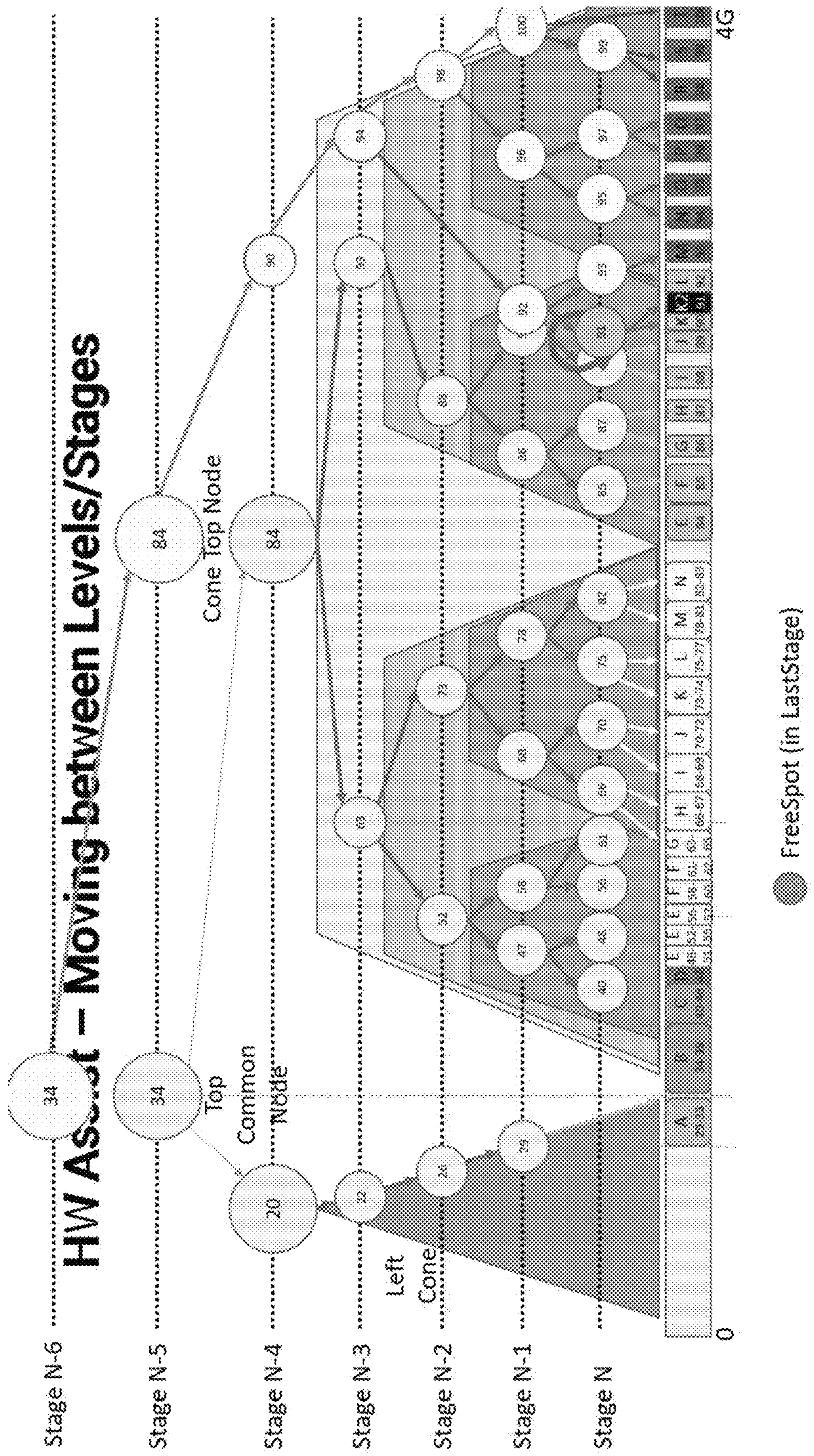
Figure 87:
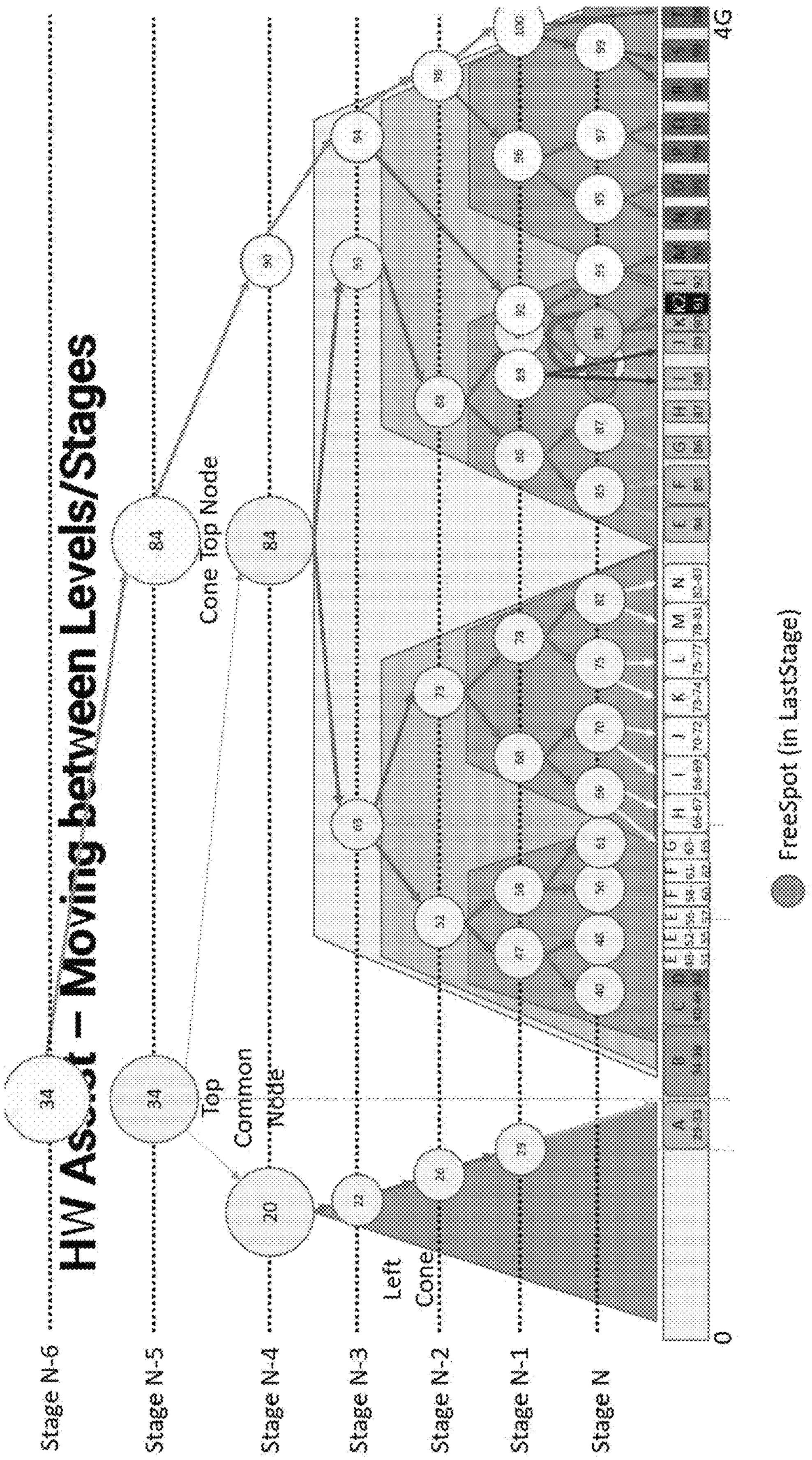
Figure 88:
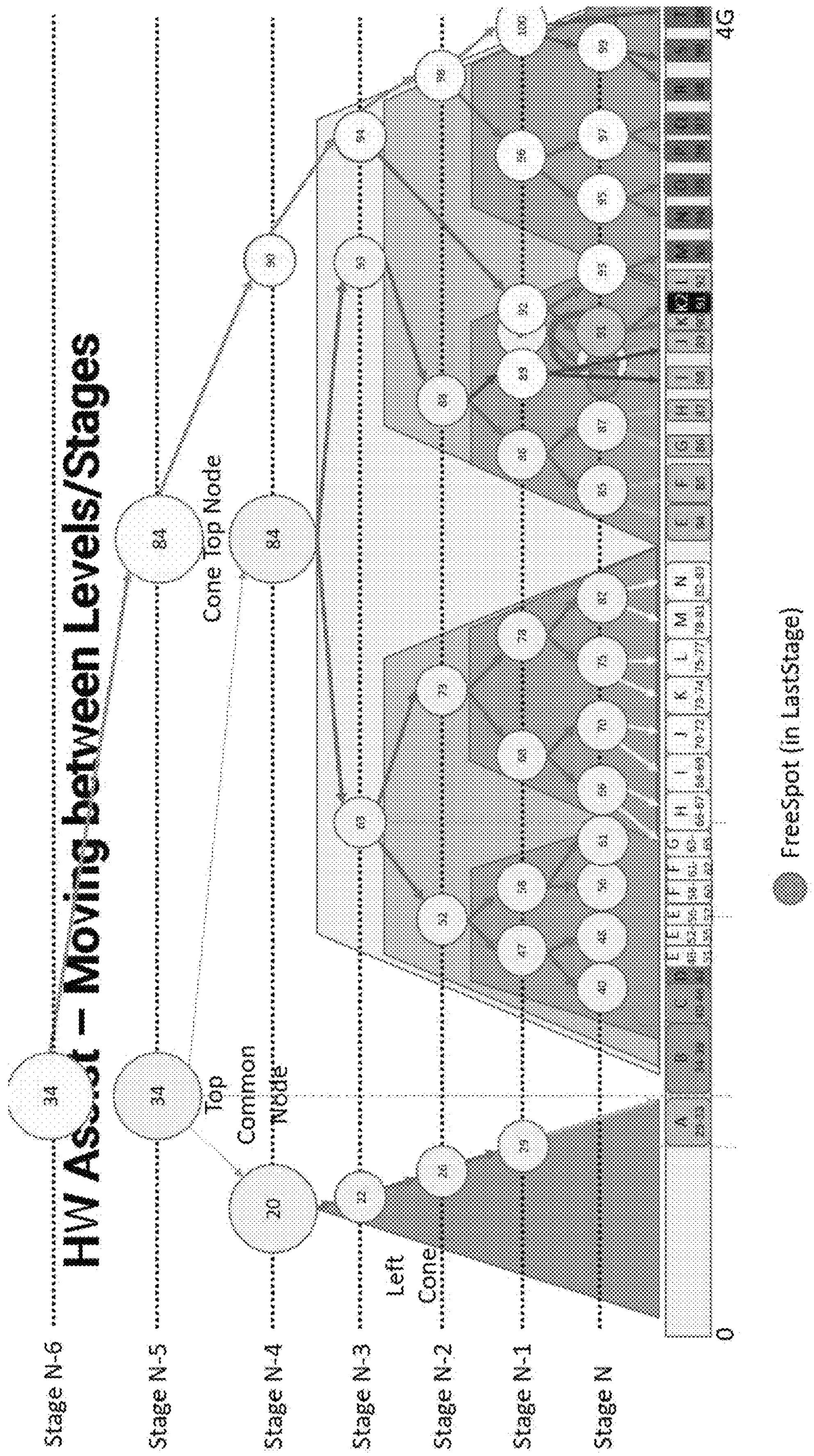
Figure 89:
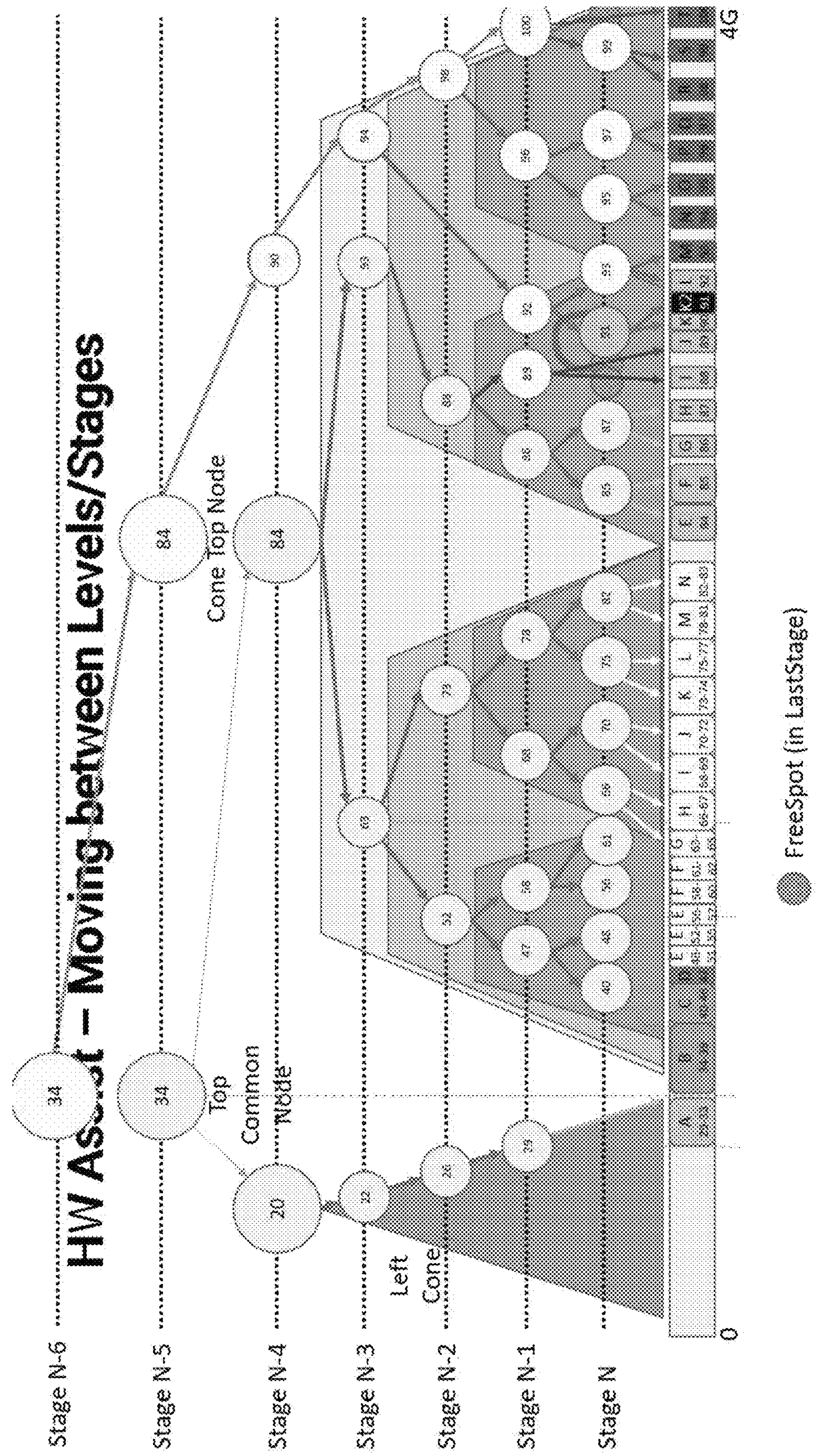
Figure 90:
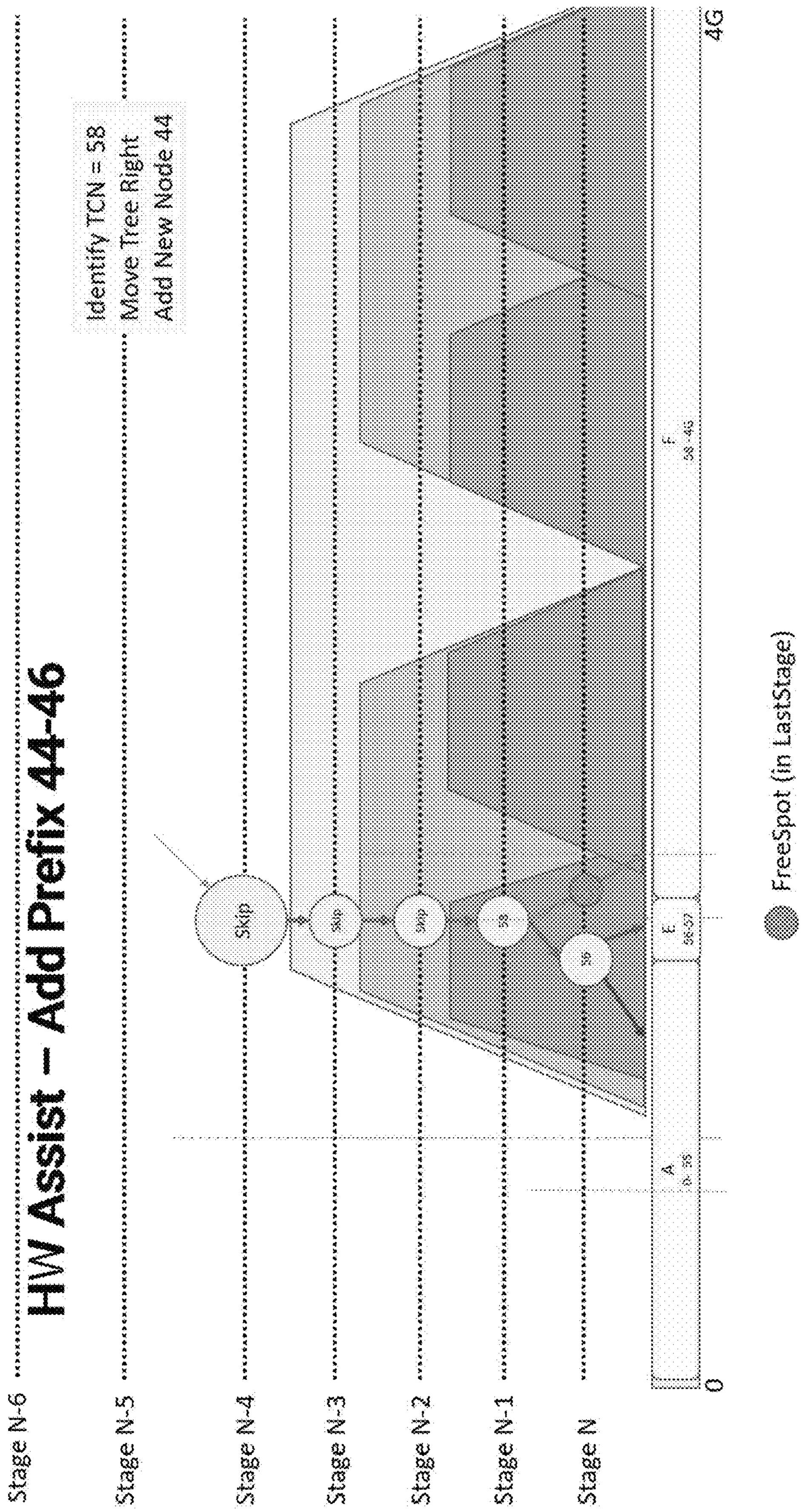
FIGS. 90-99 illustrate examples of updating the tree by adding prefixes during multiple update iterations.
Figure 91:
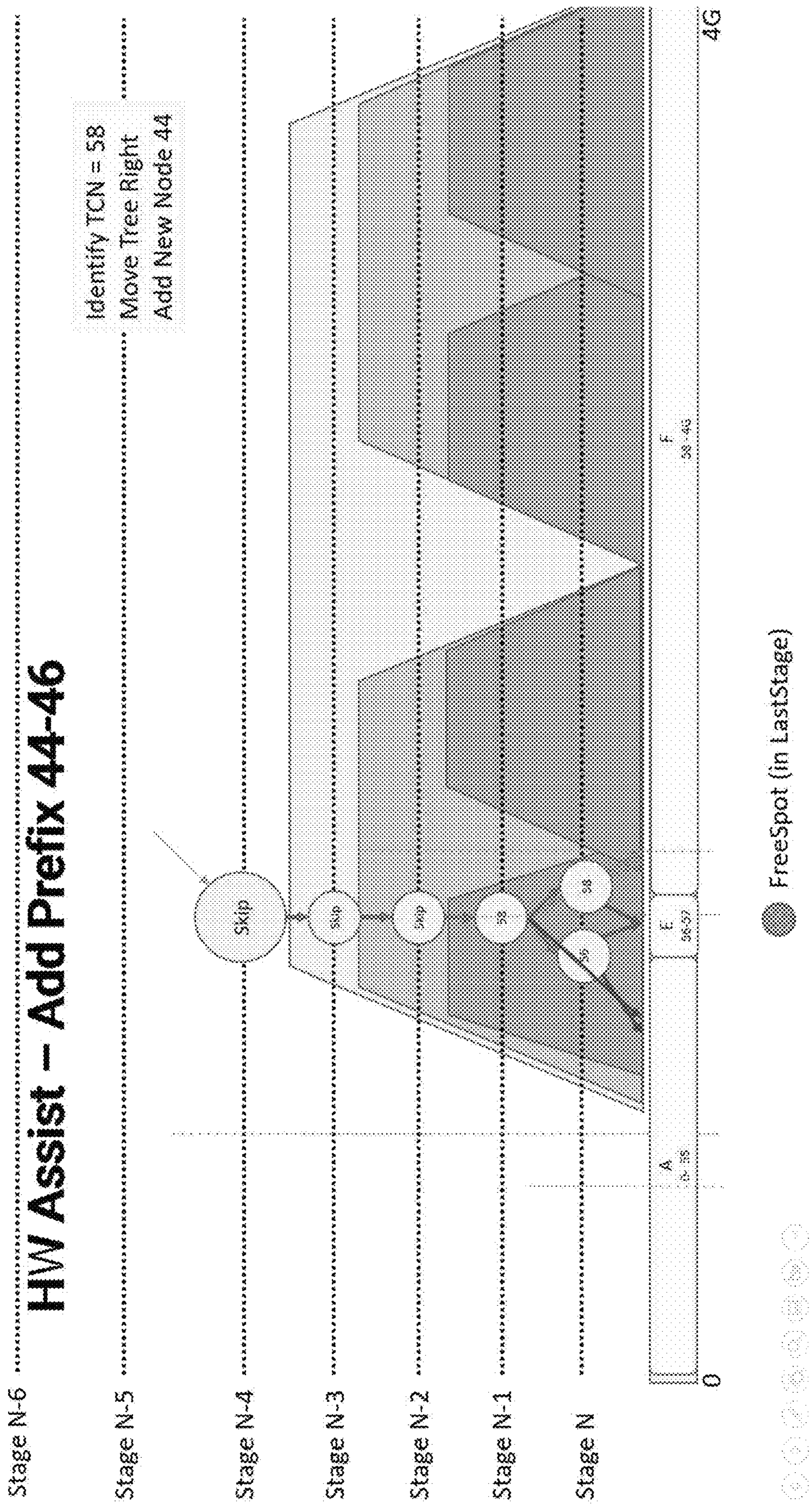
Figure 92:
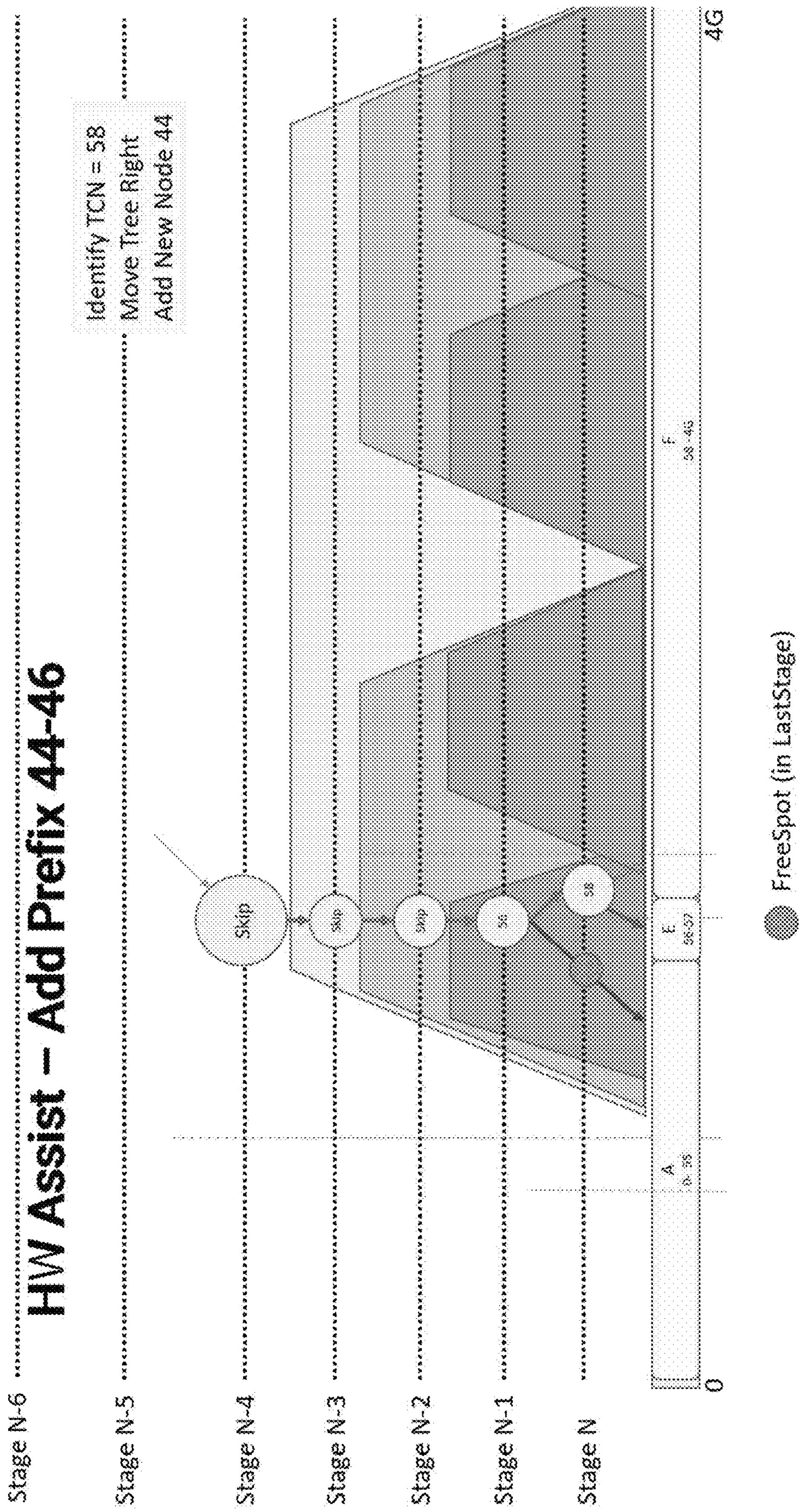
Figure 93:
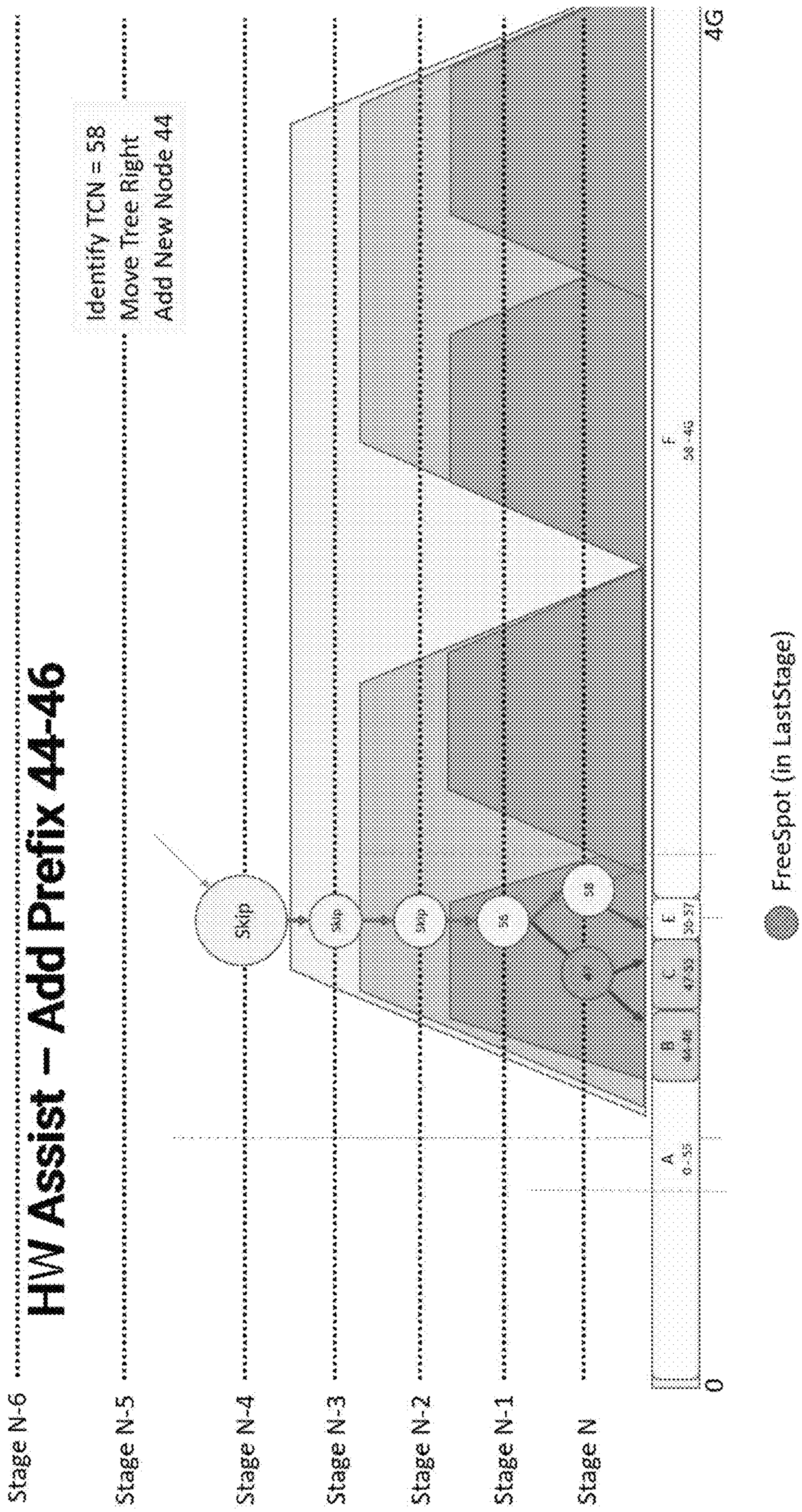
Figure 94:
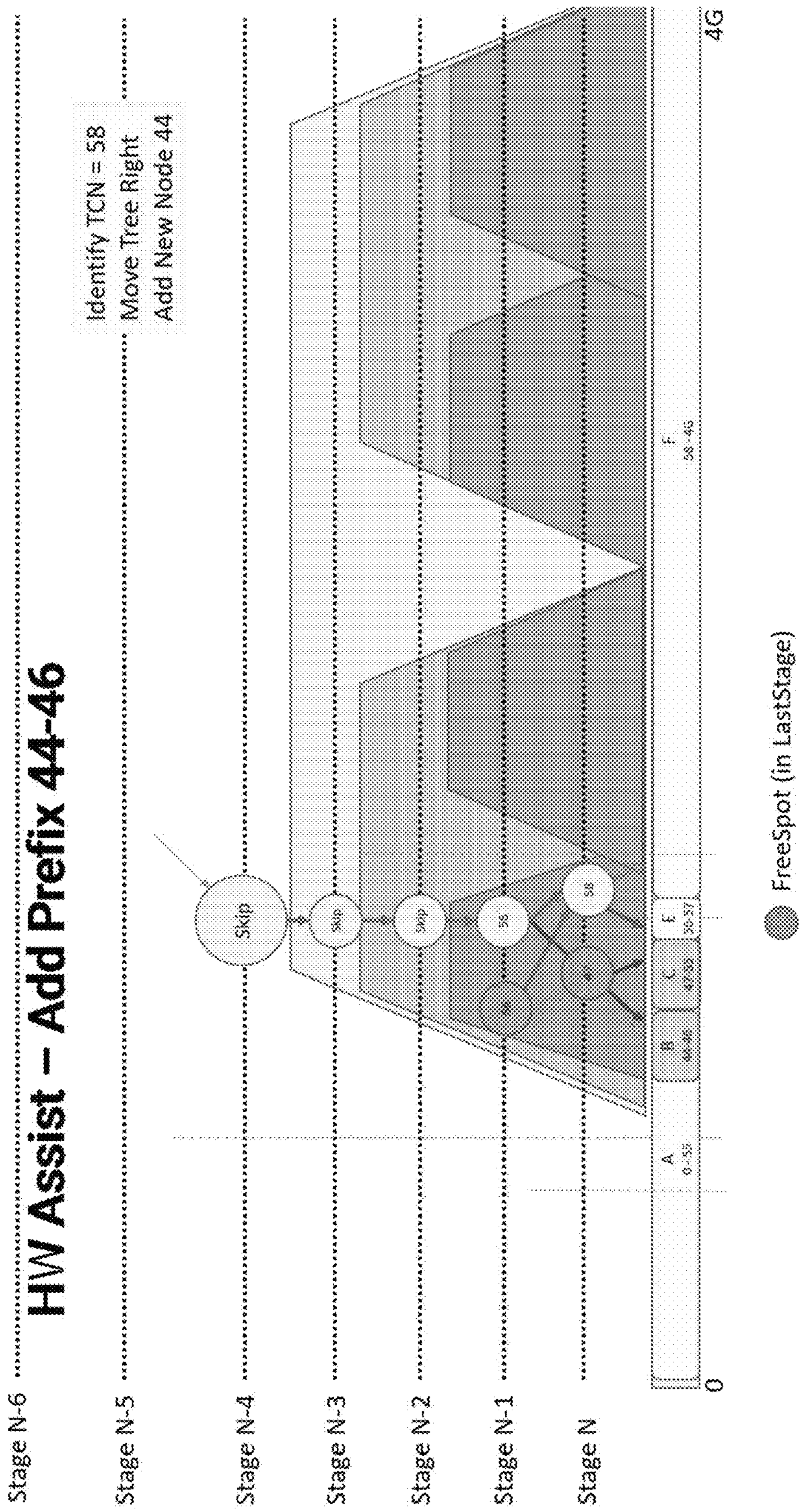
Figure 95:
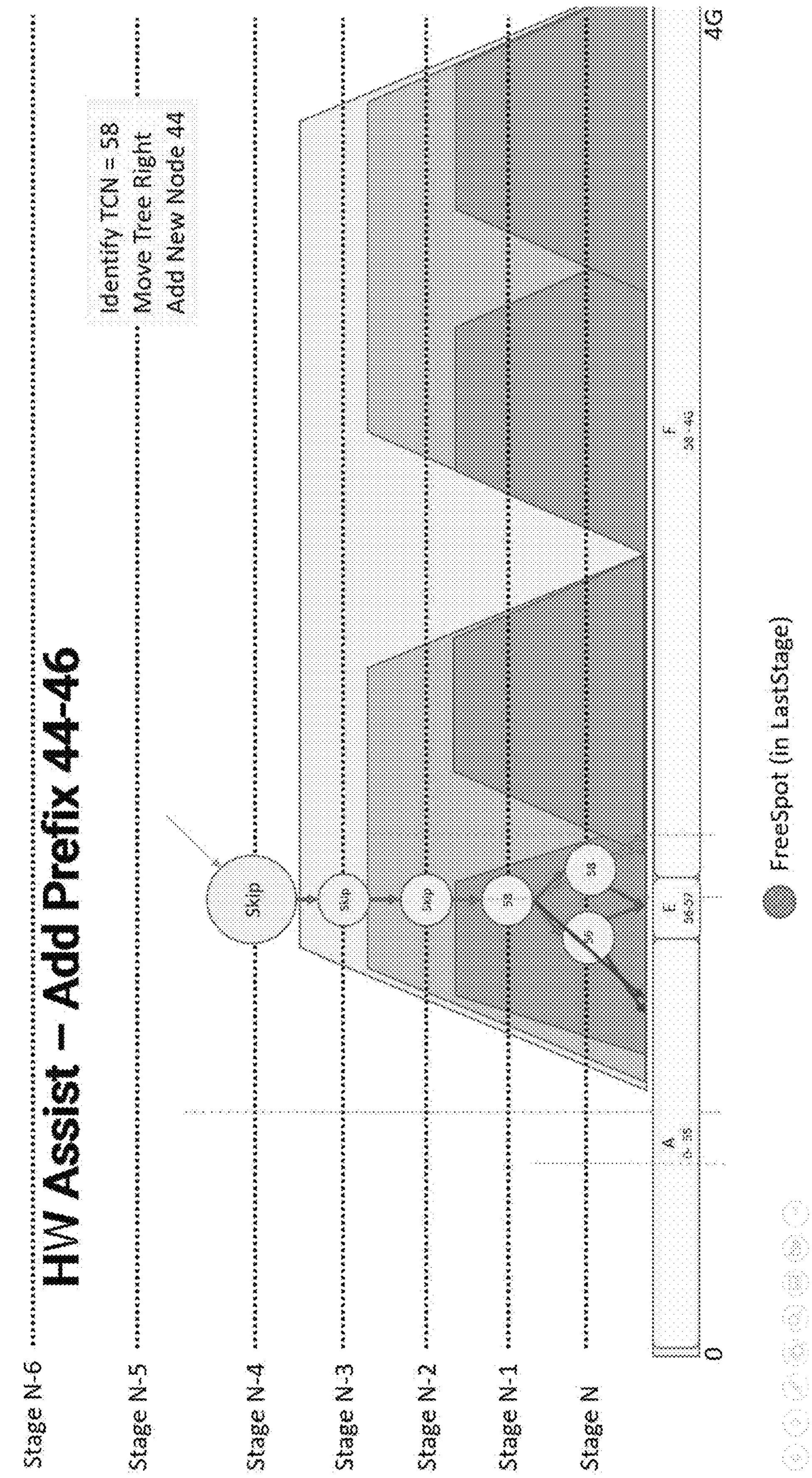
Figure 96:
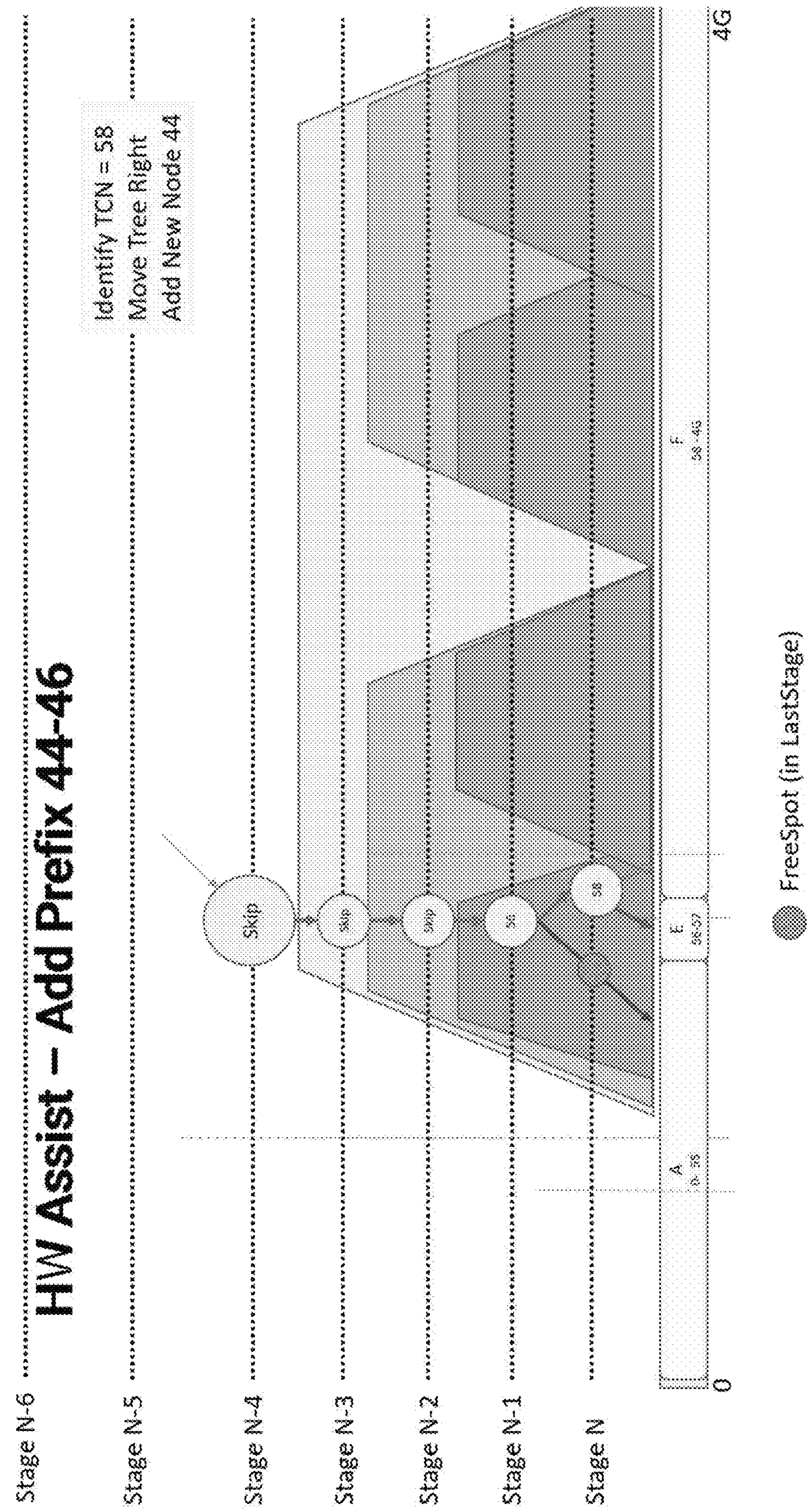
Figure 97:
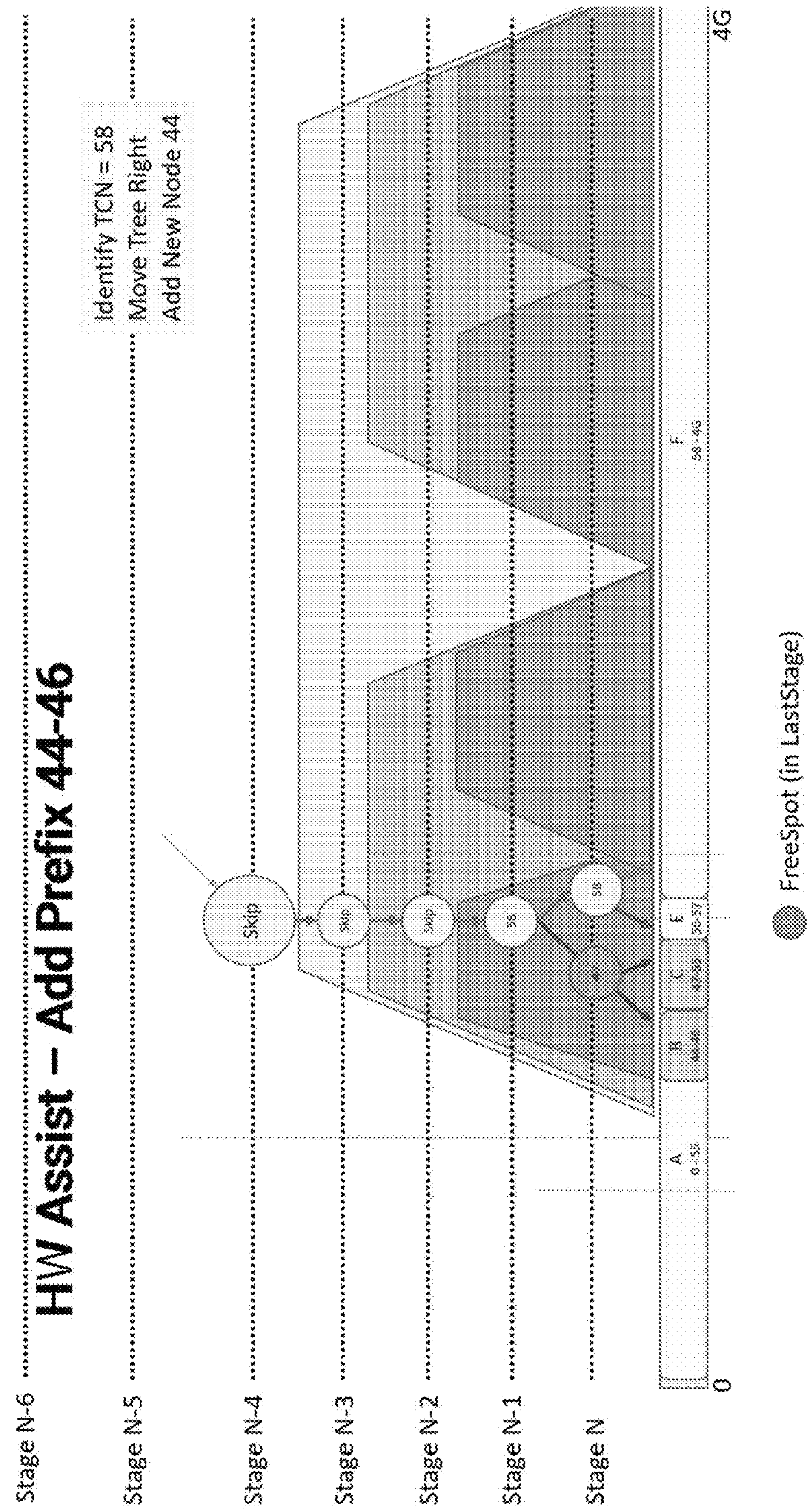
Figure 98:
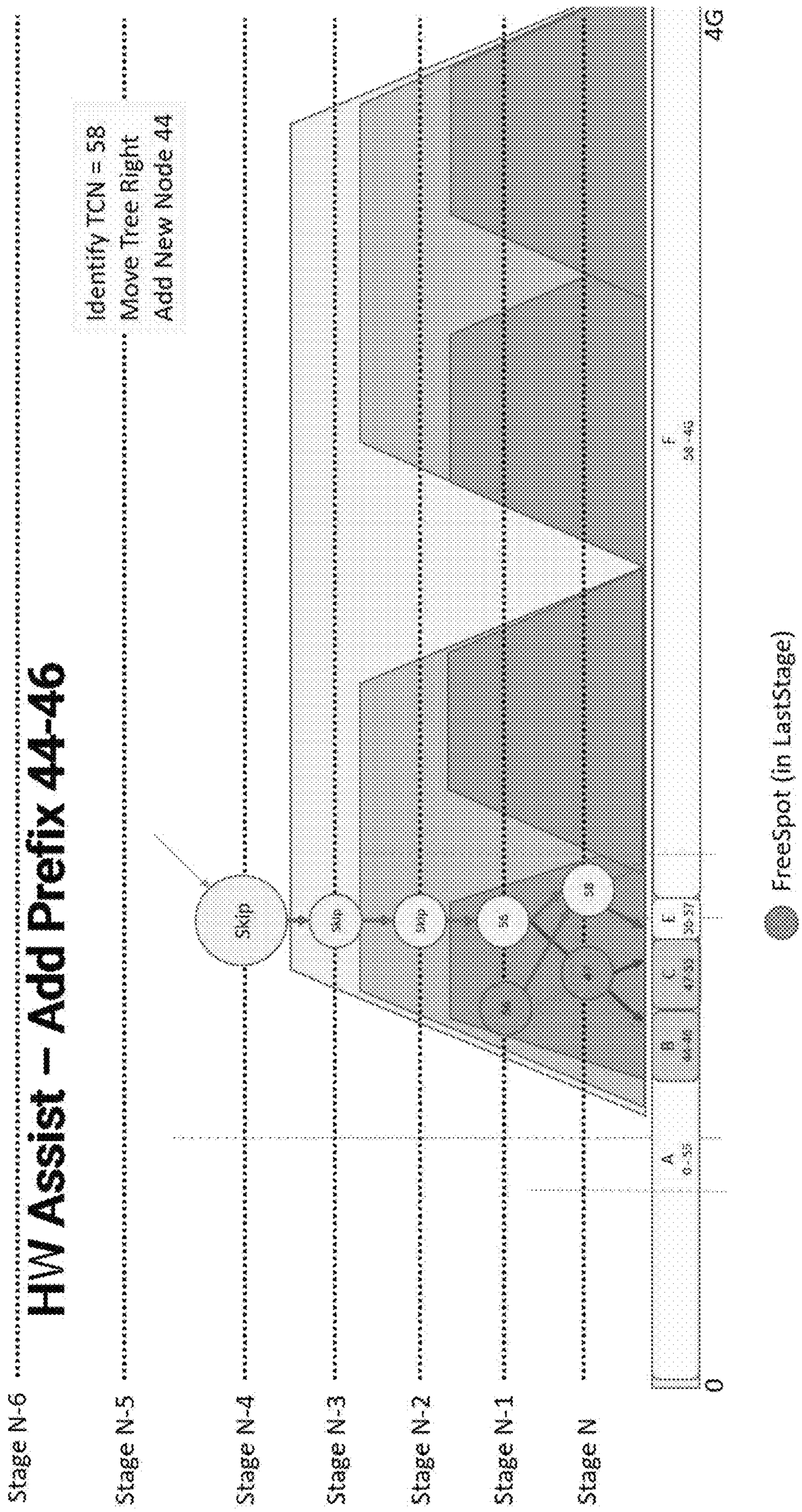
Figure 99:
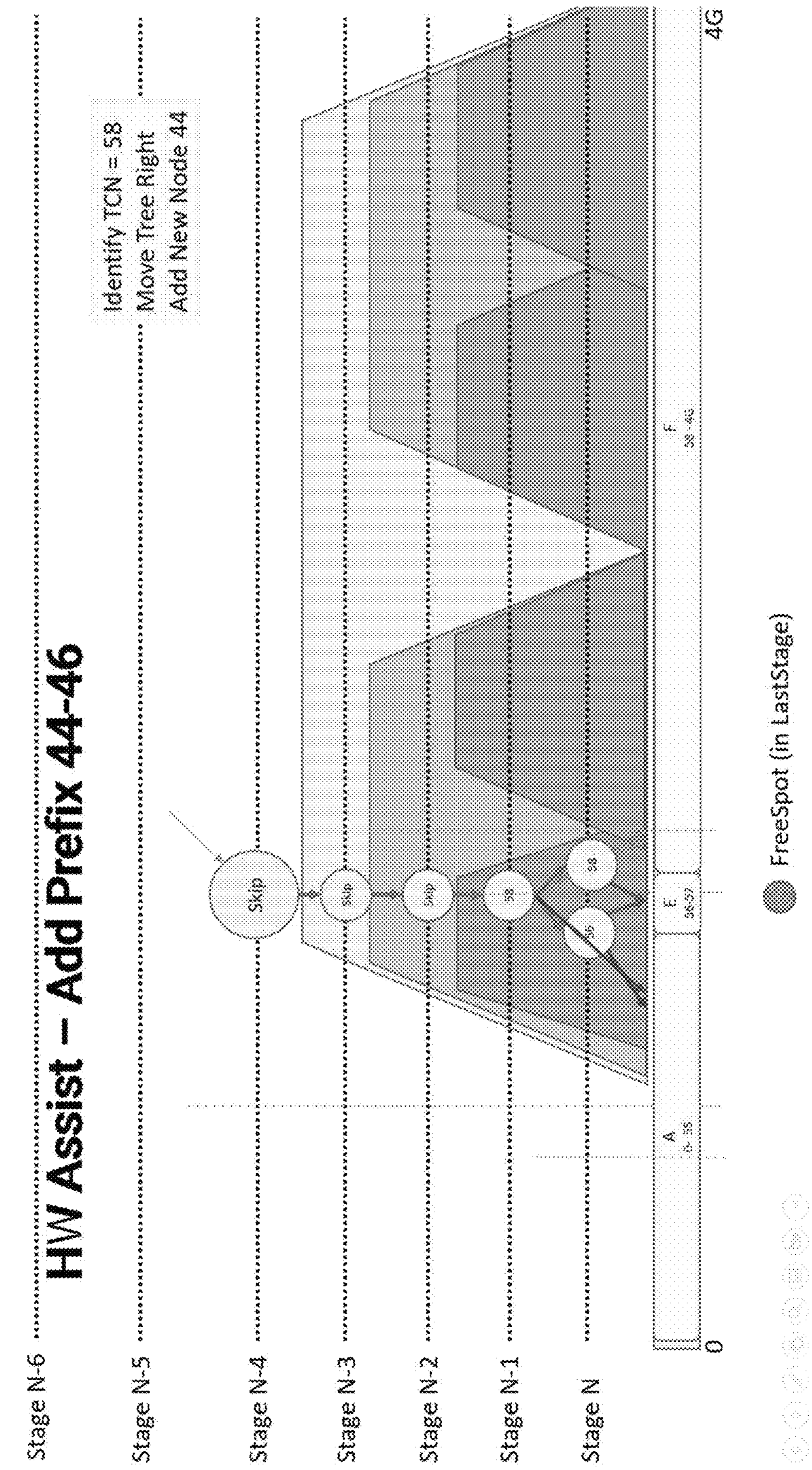
Figure 101:
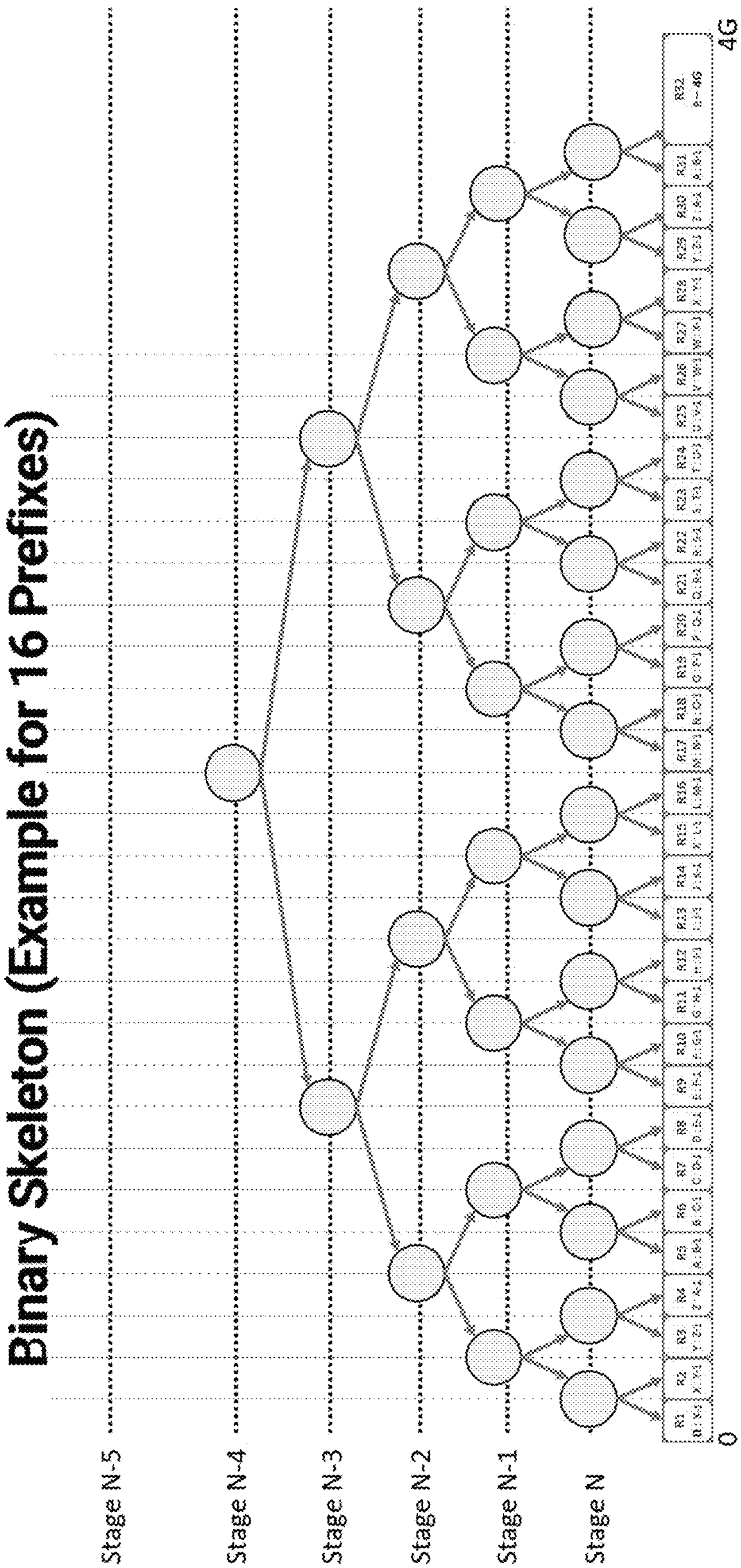
Figure 102:
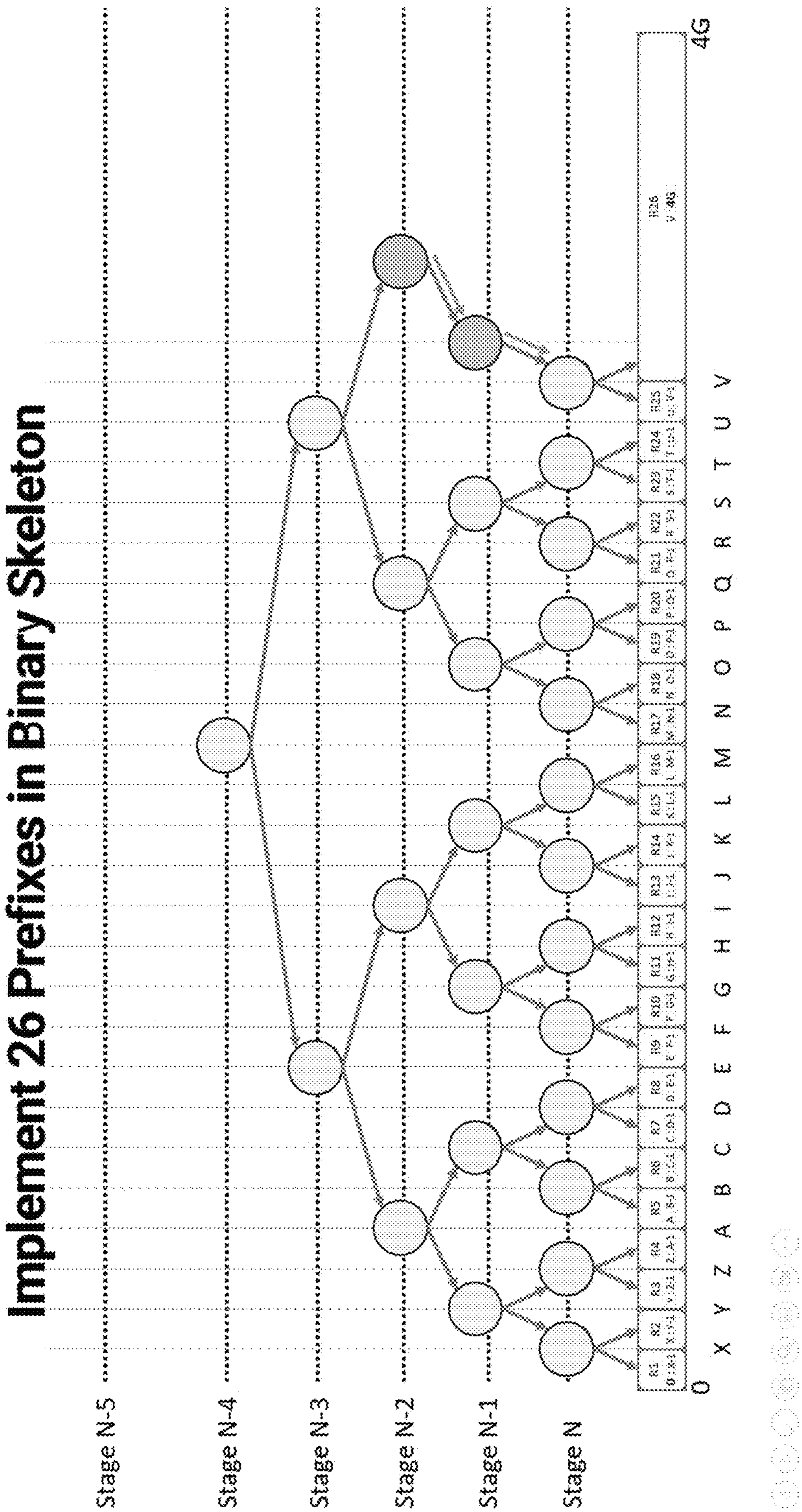
Figure 103:
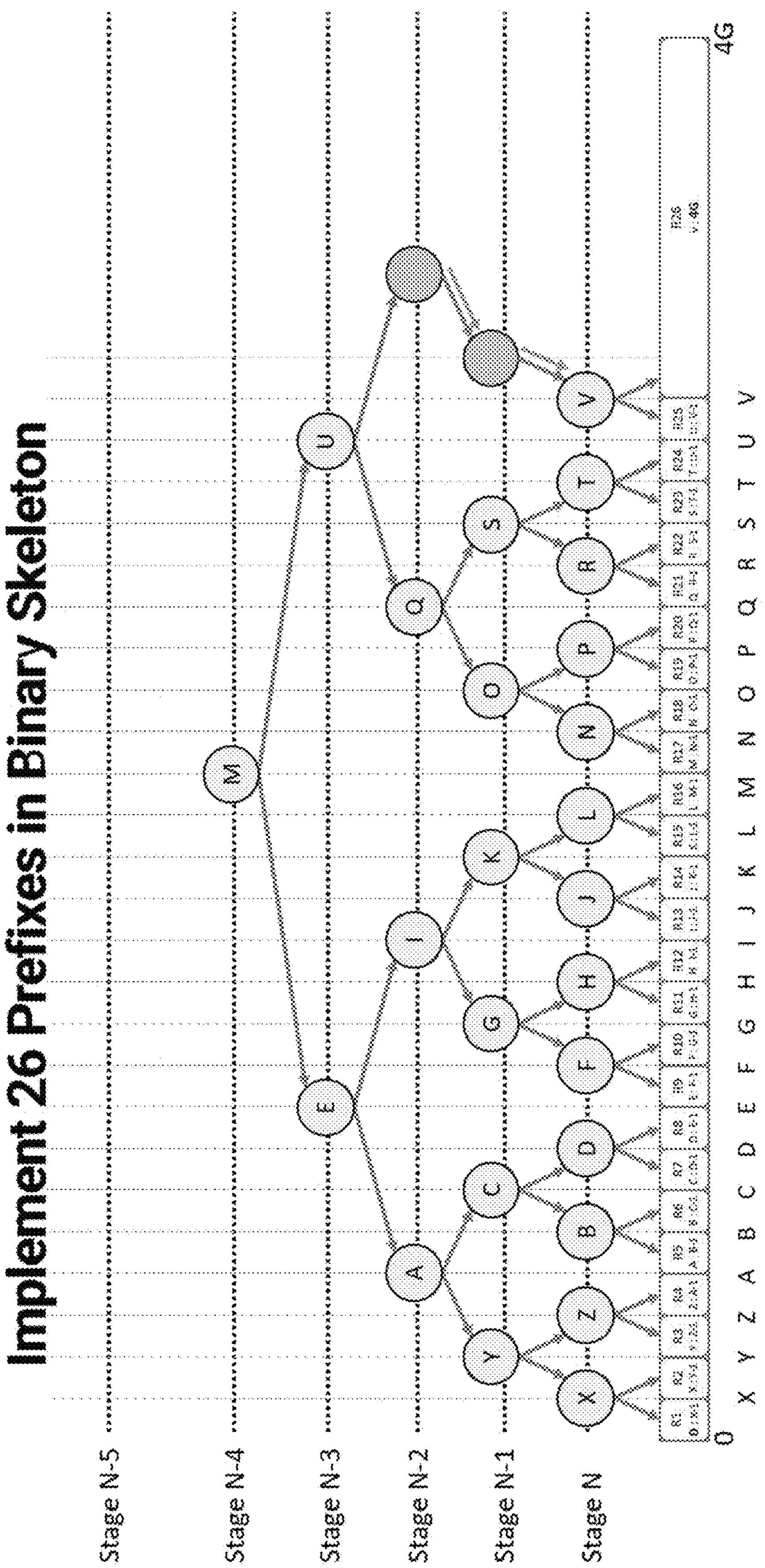
Figure 104:
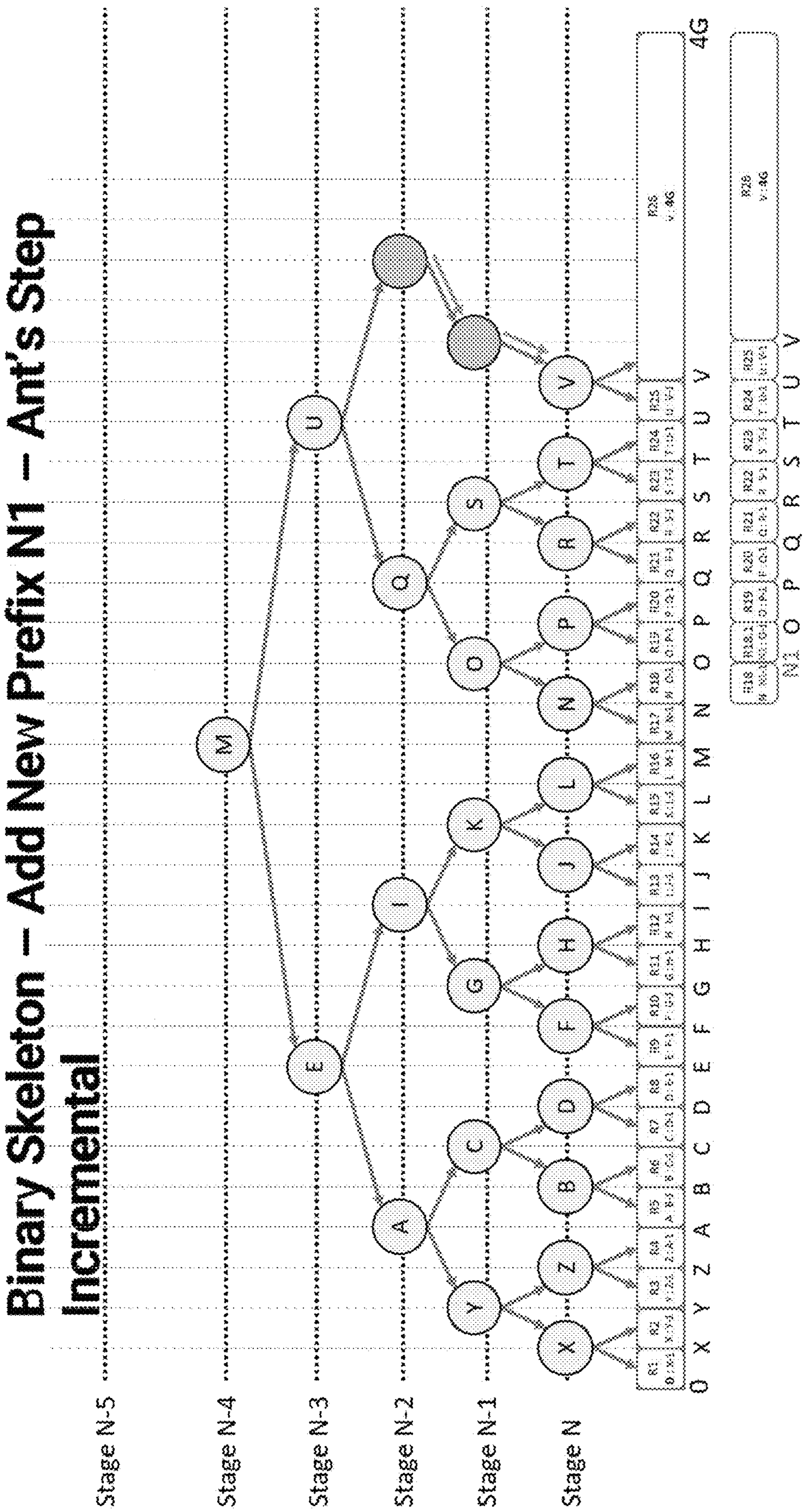
Figure 105:
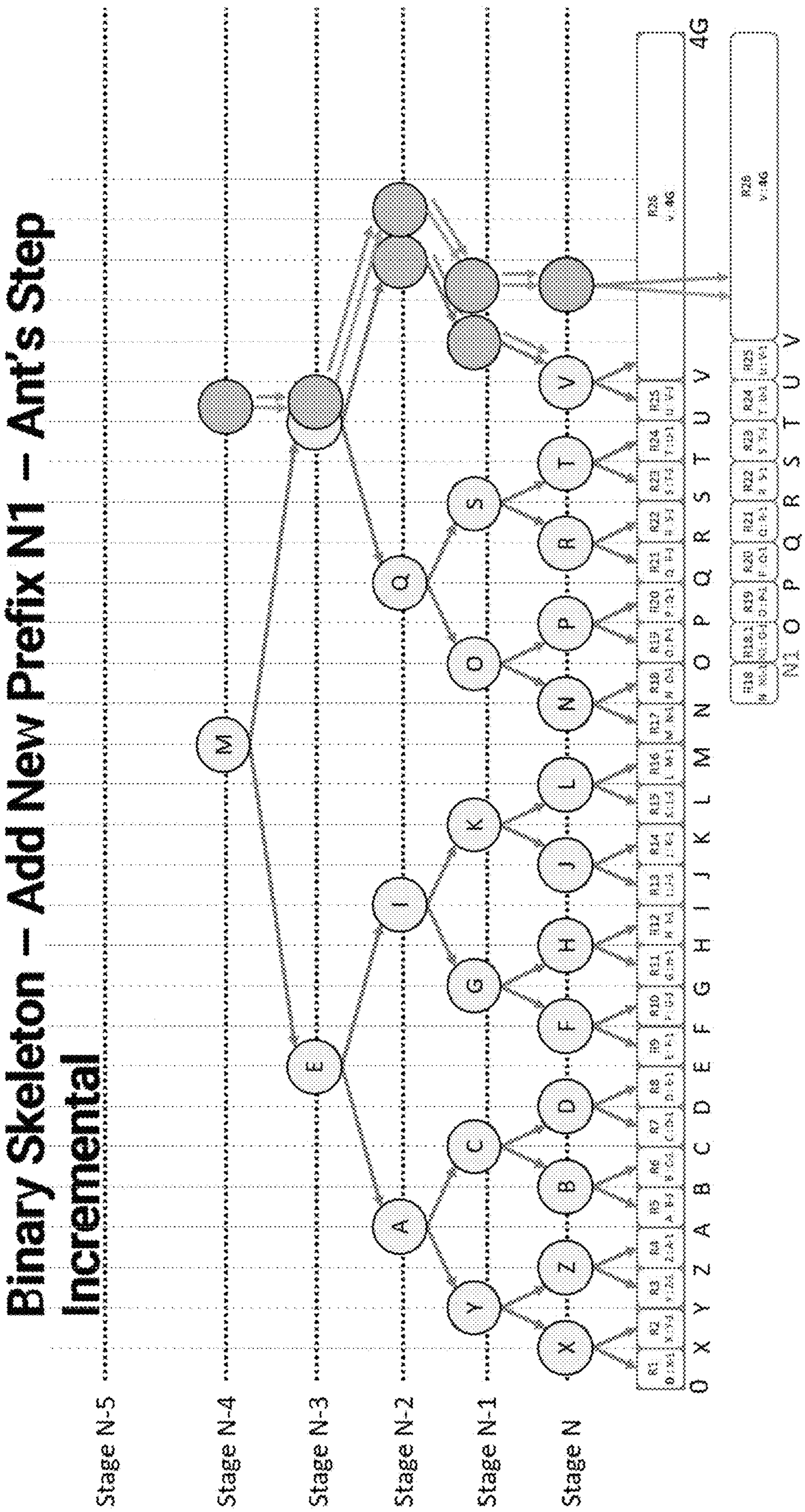
Figure 106:
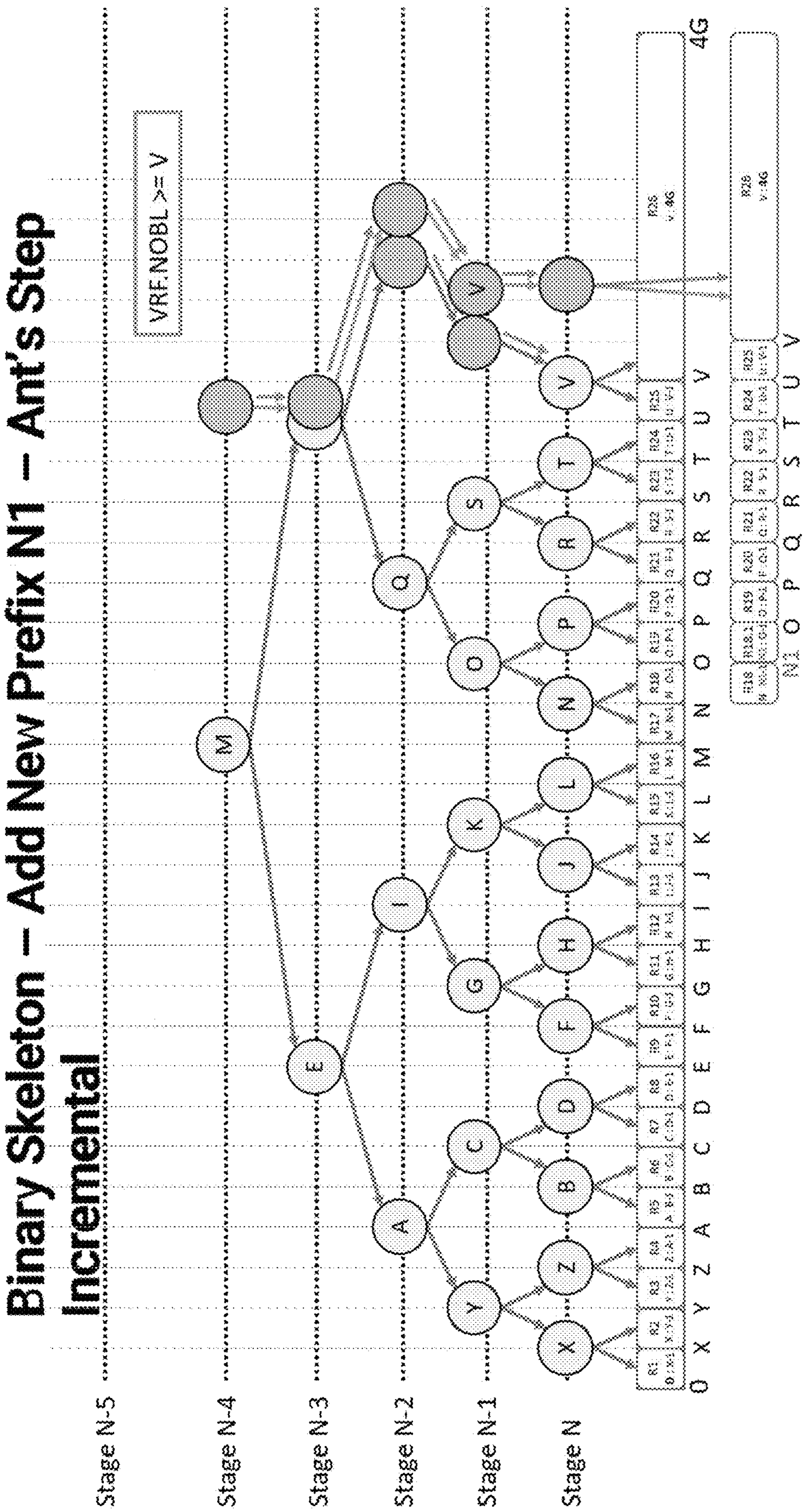
Figure 107:
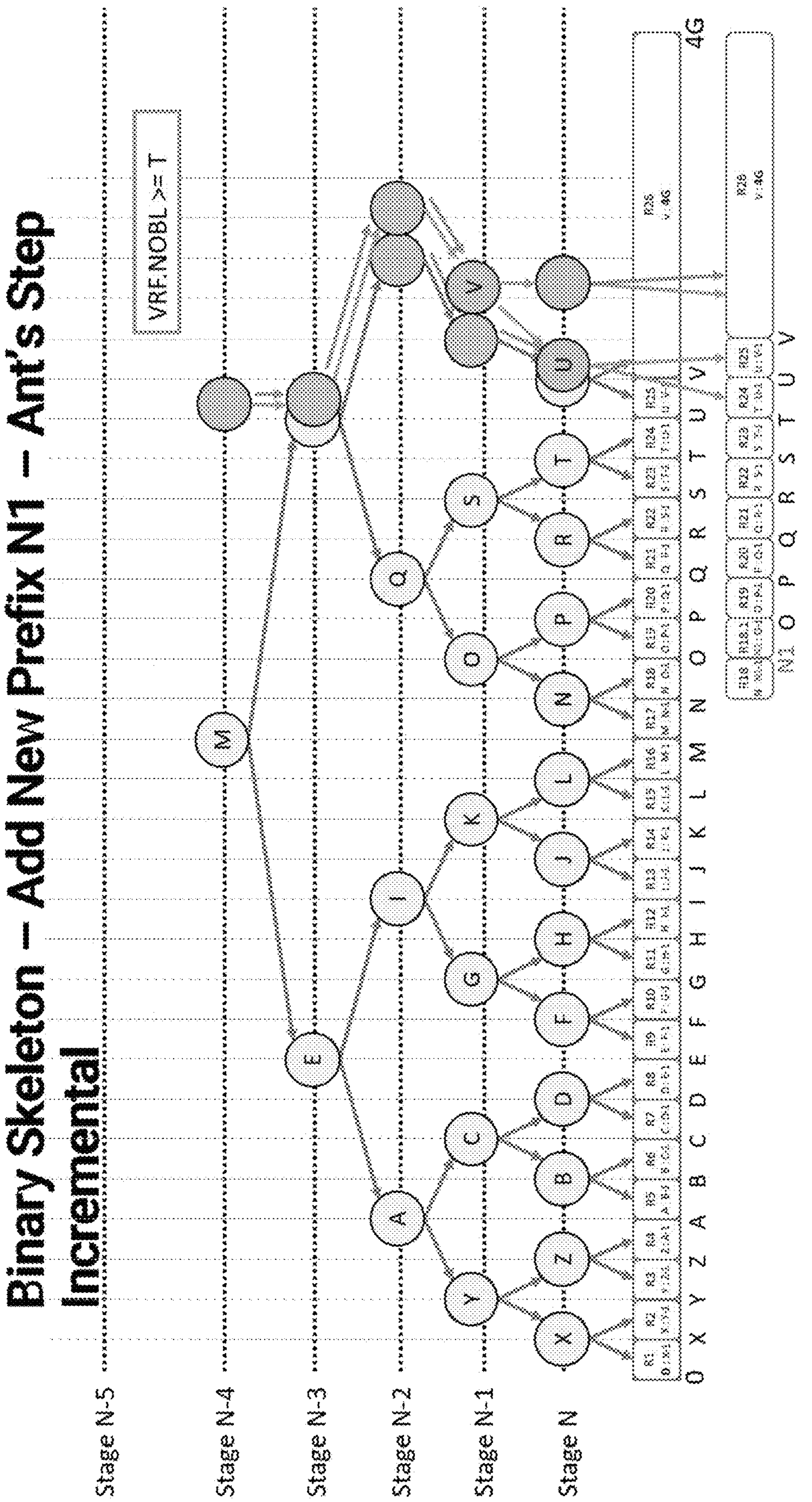
Figure 108:
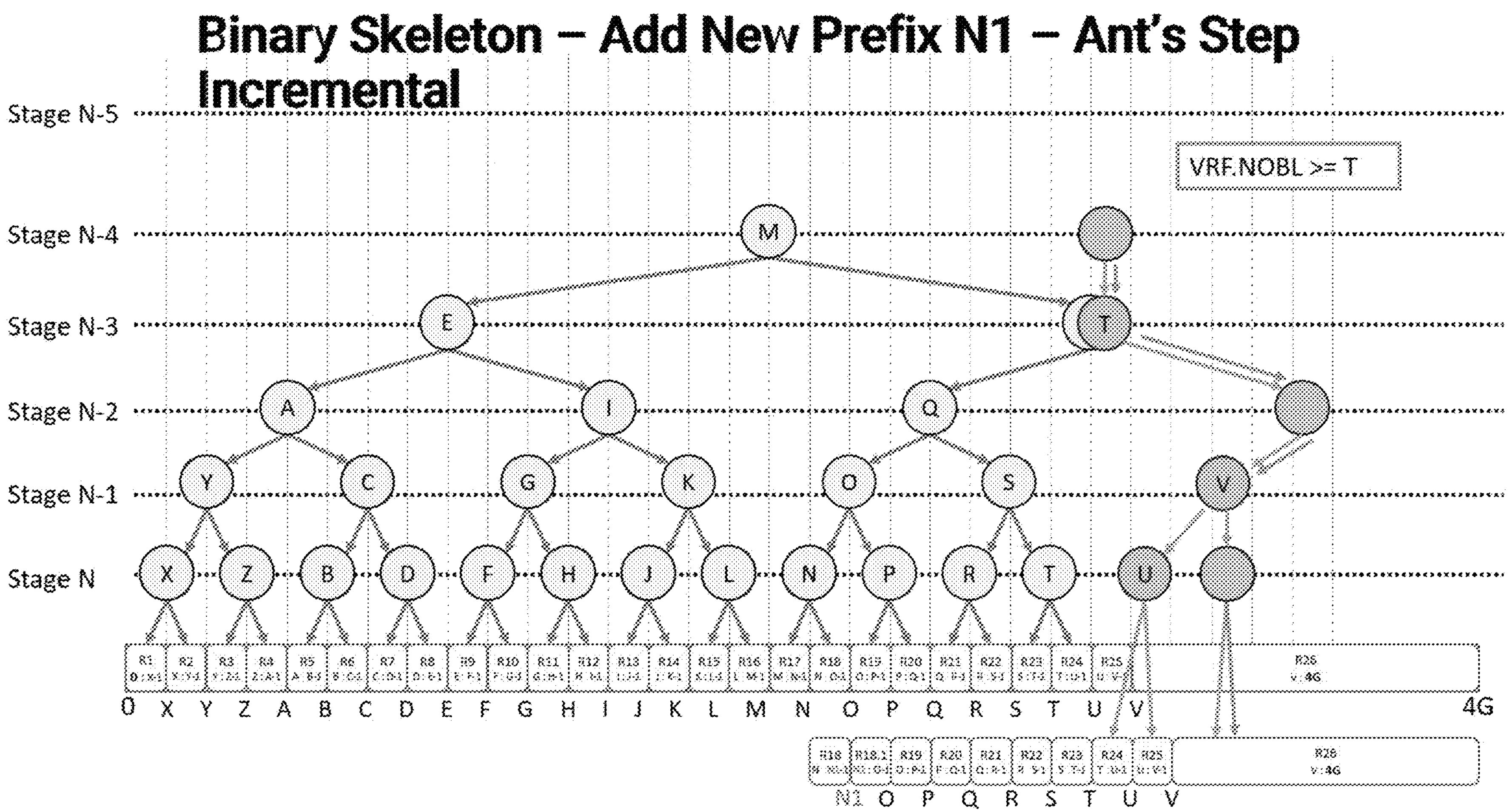
Figure 109:
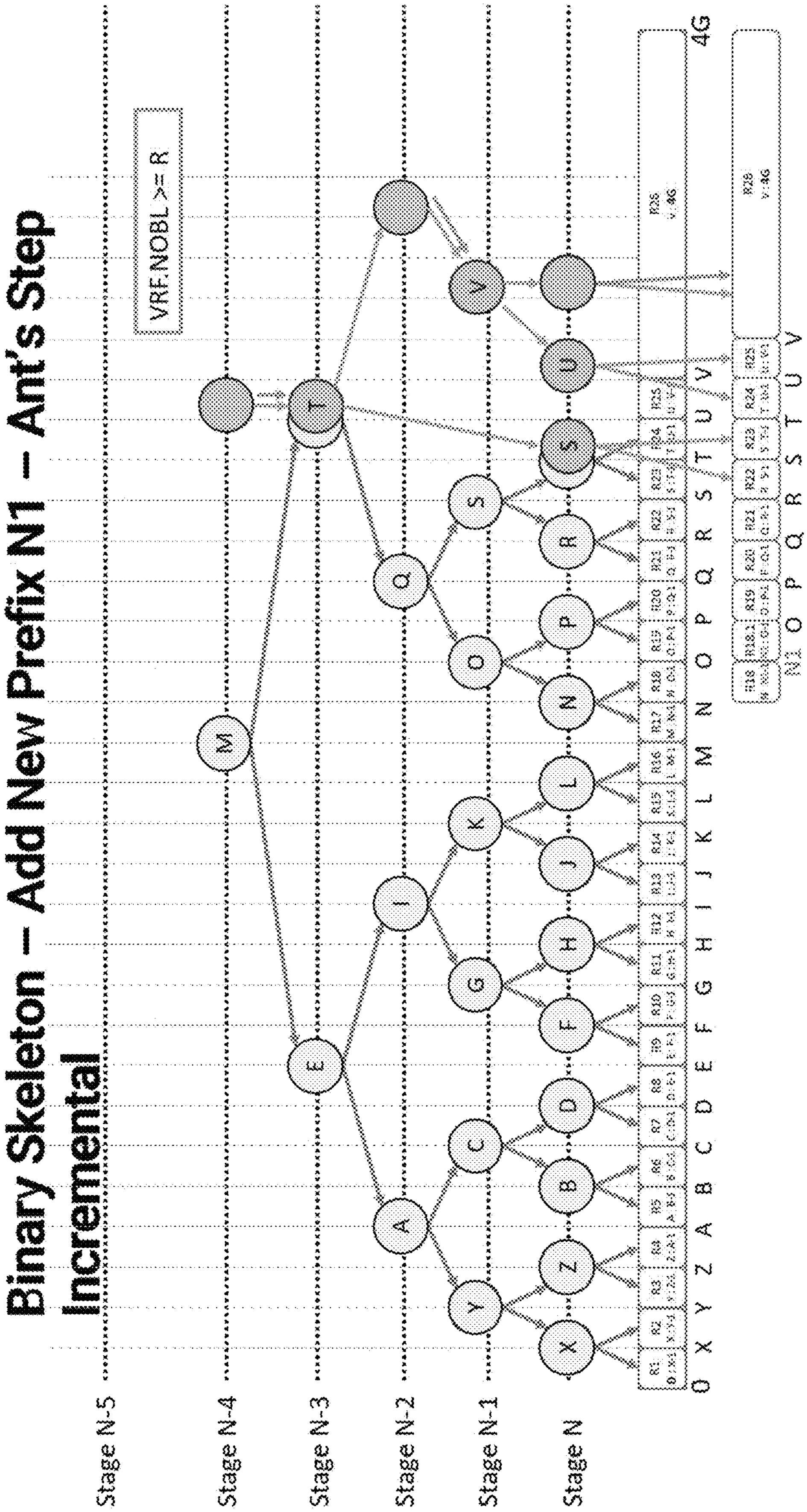
Figure 110:
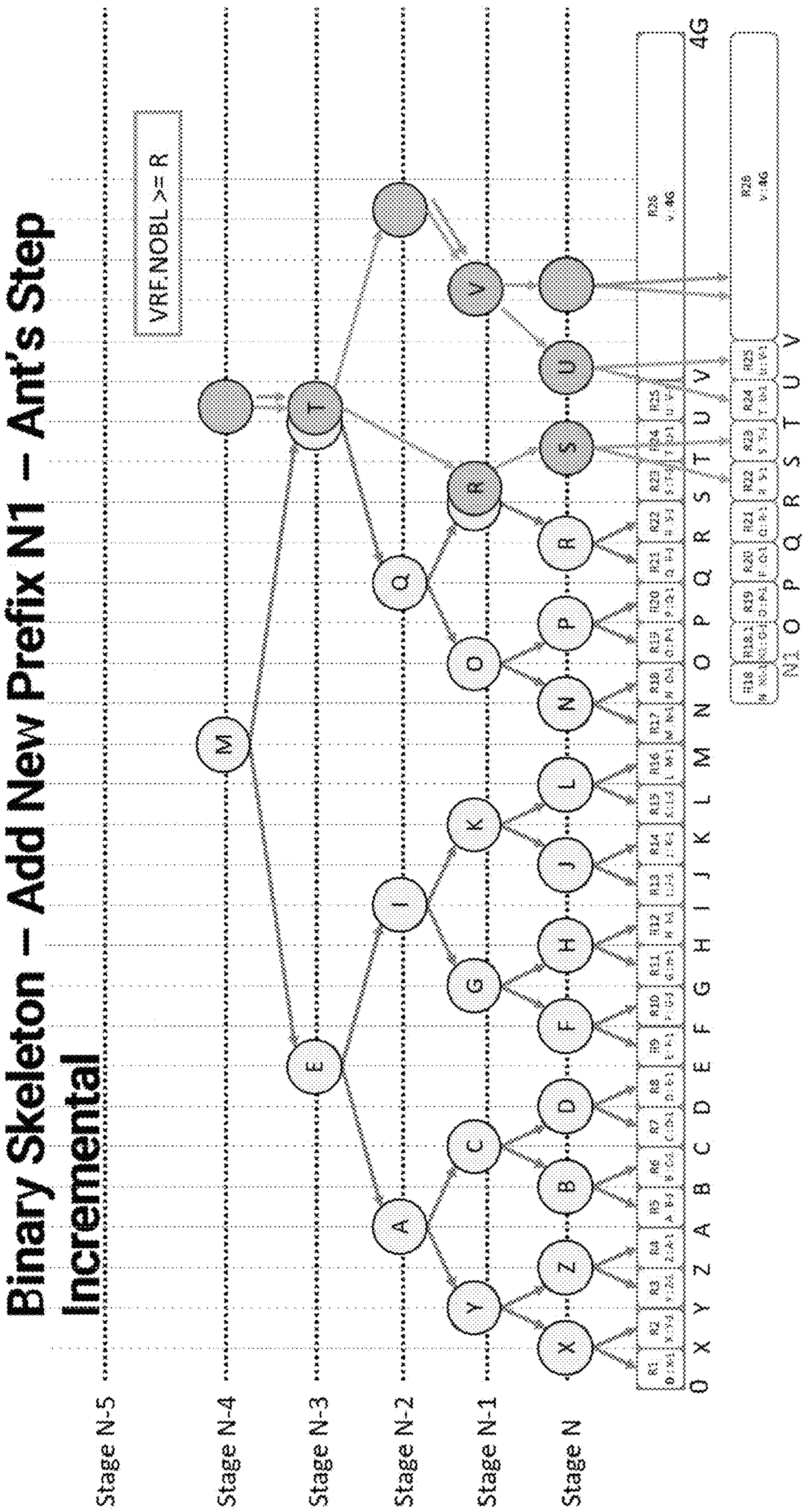
Figure 111:
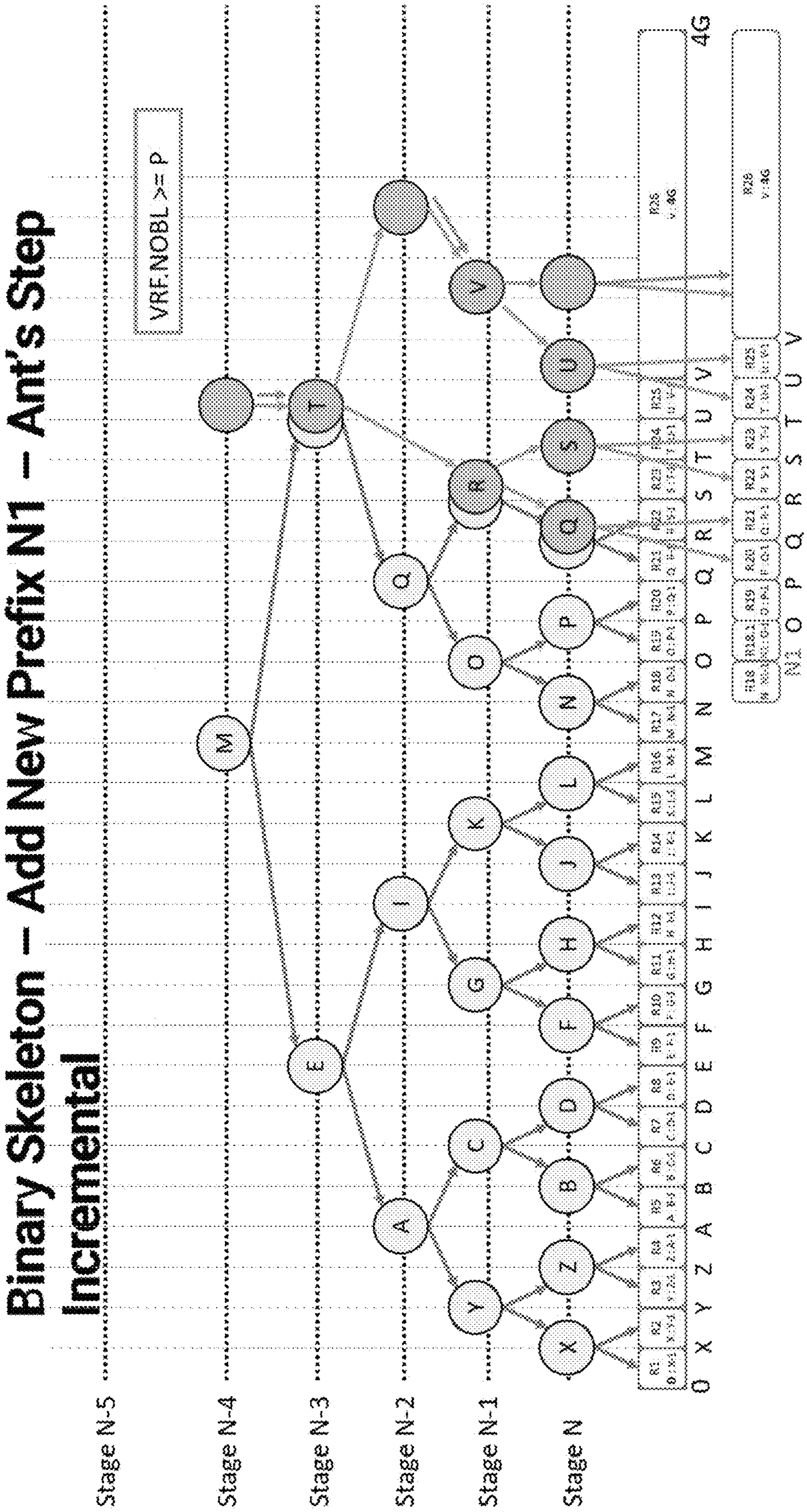
Figure 112:
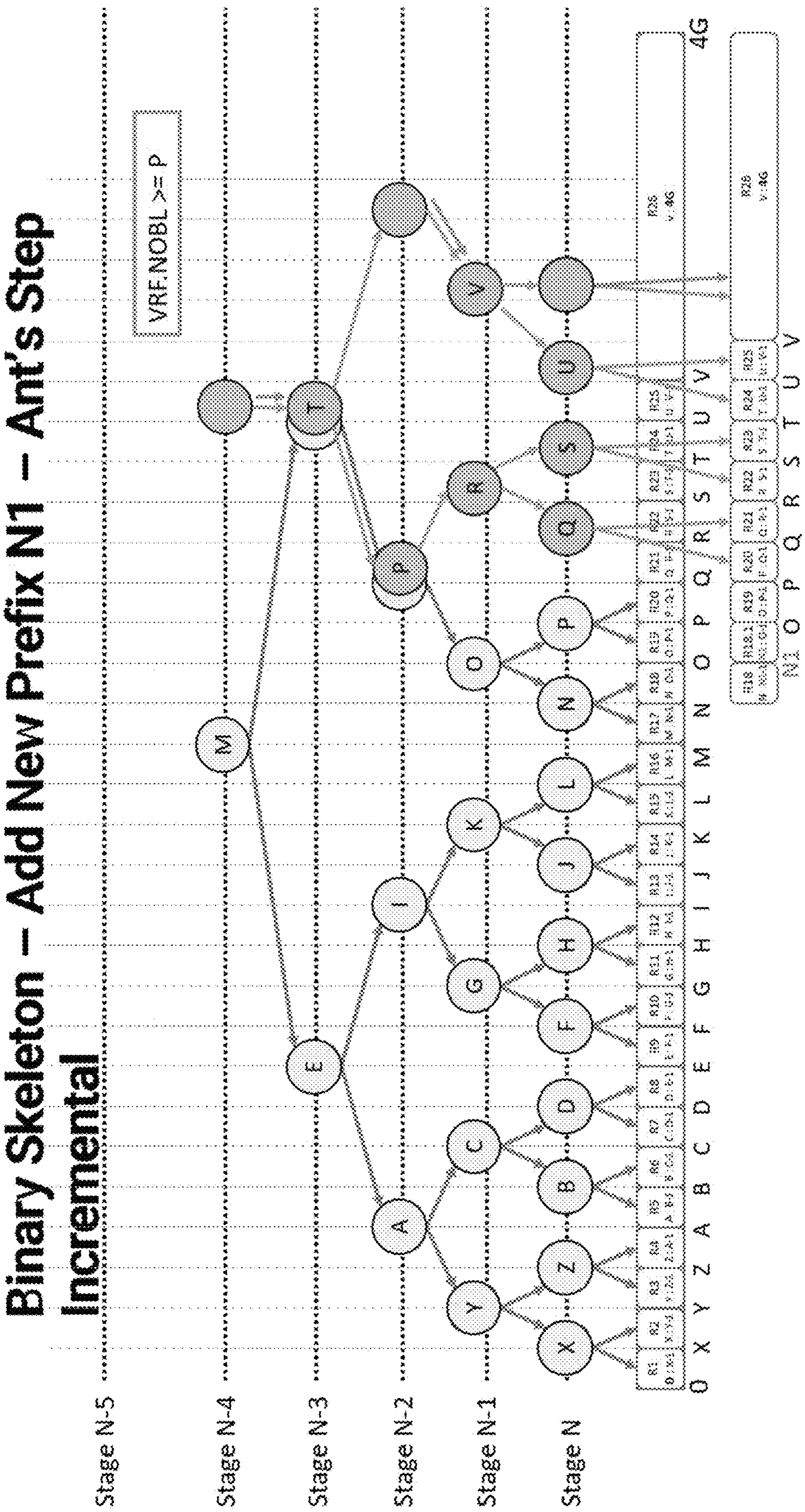
Figure 113:
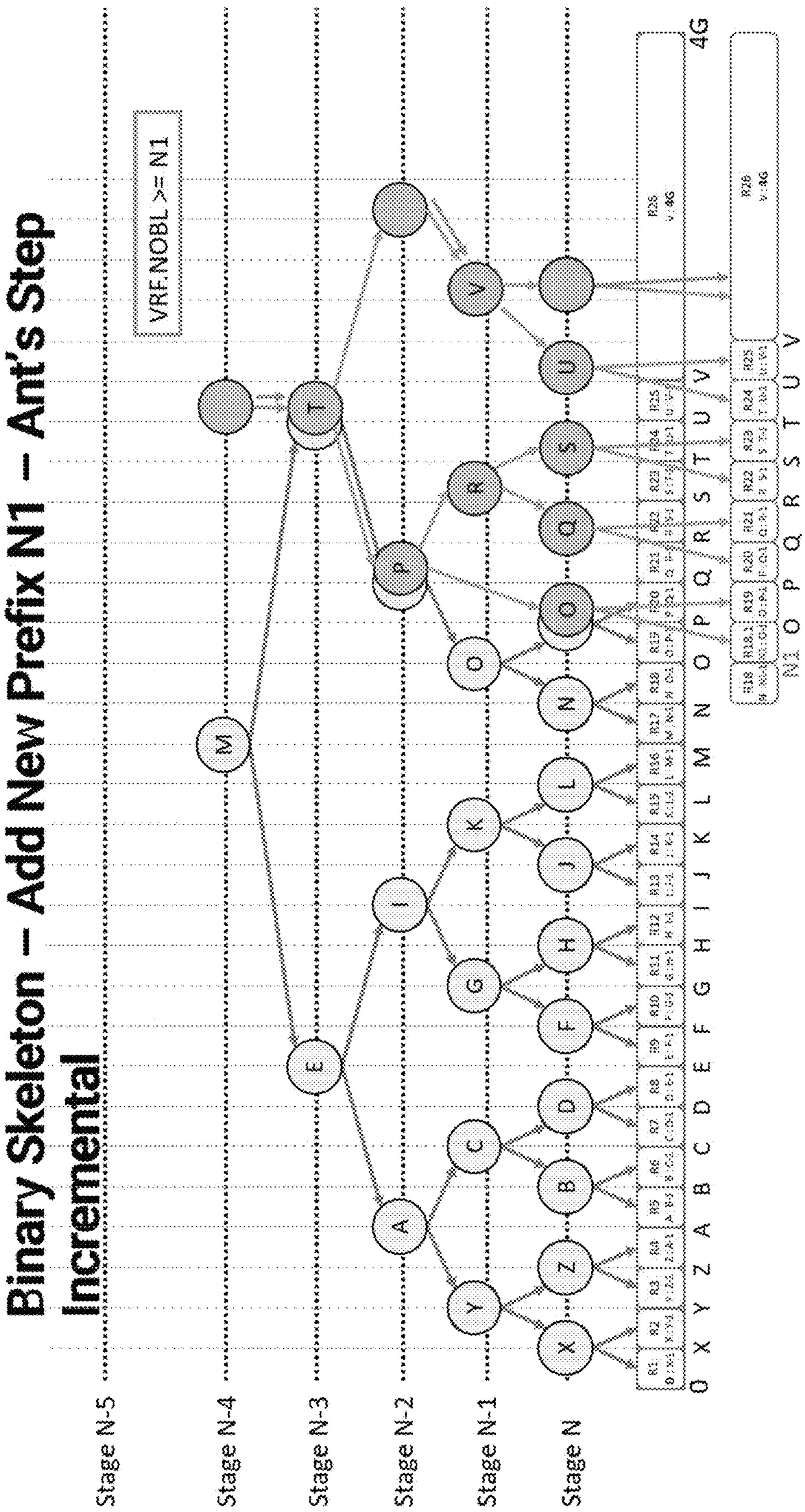
Figure 114:
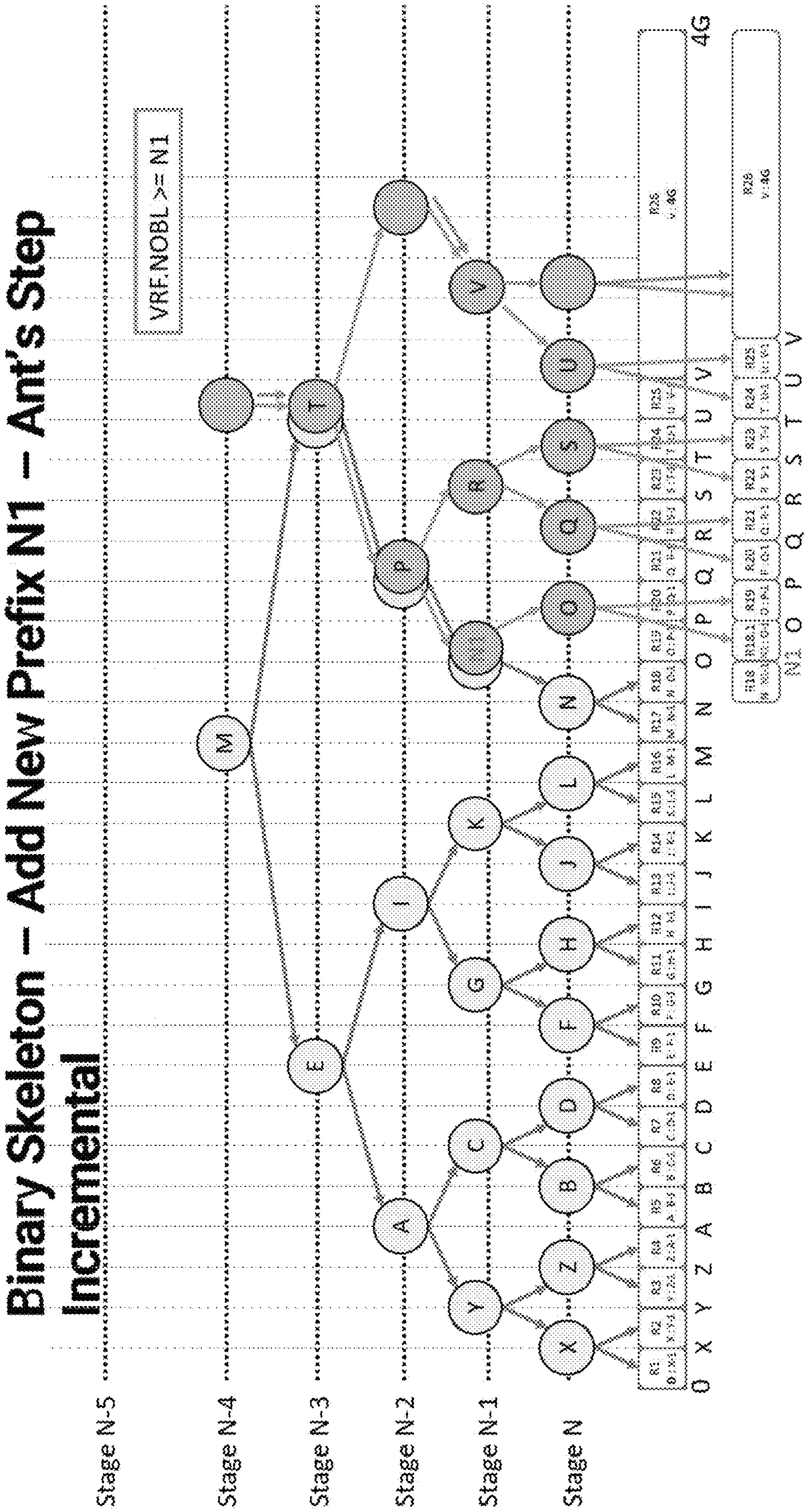
Figure 115:
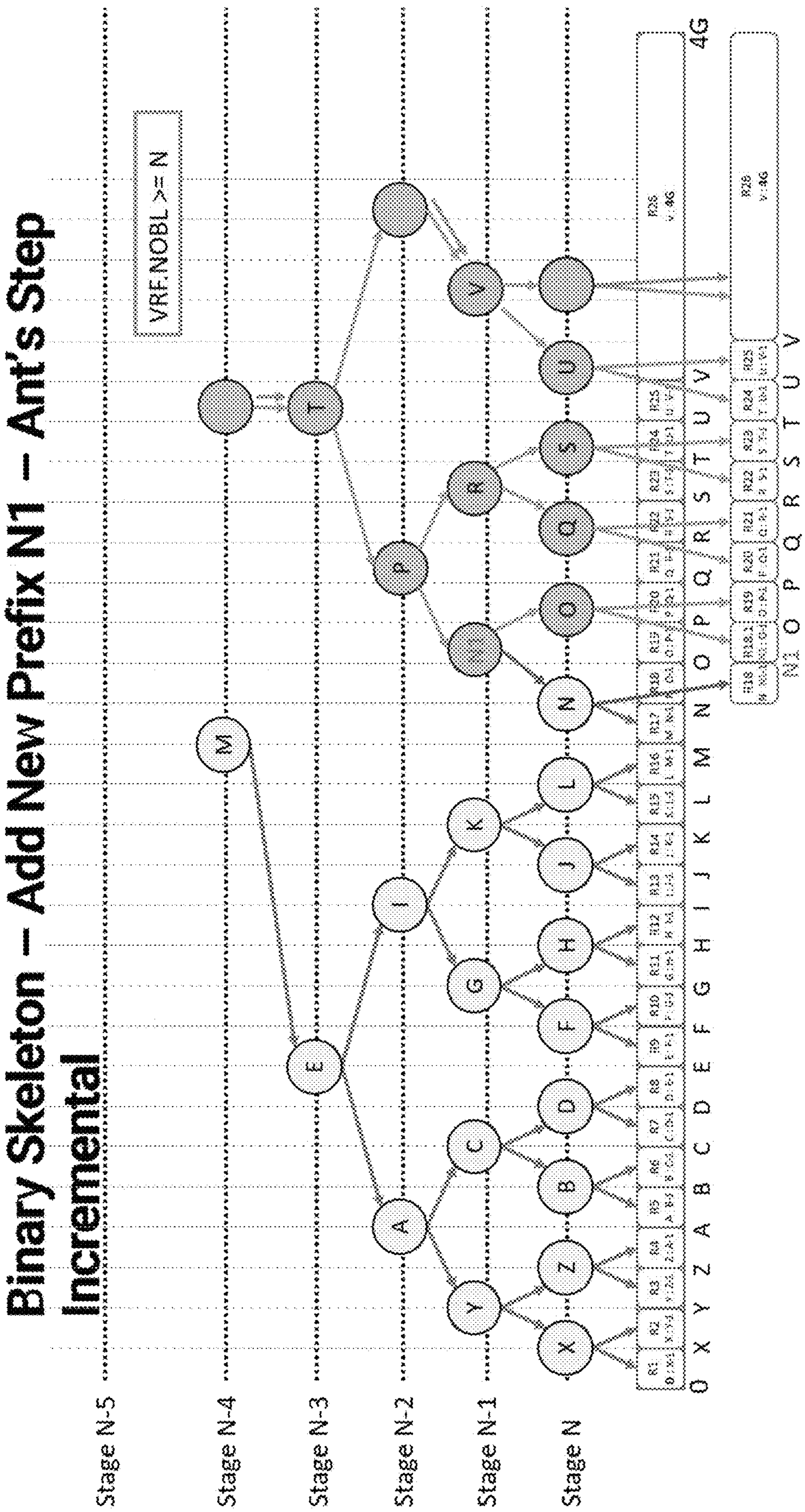
Figure 116:
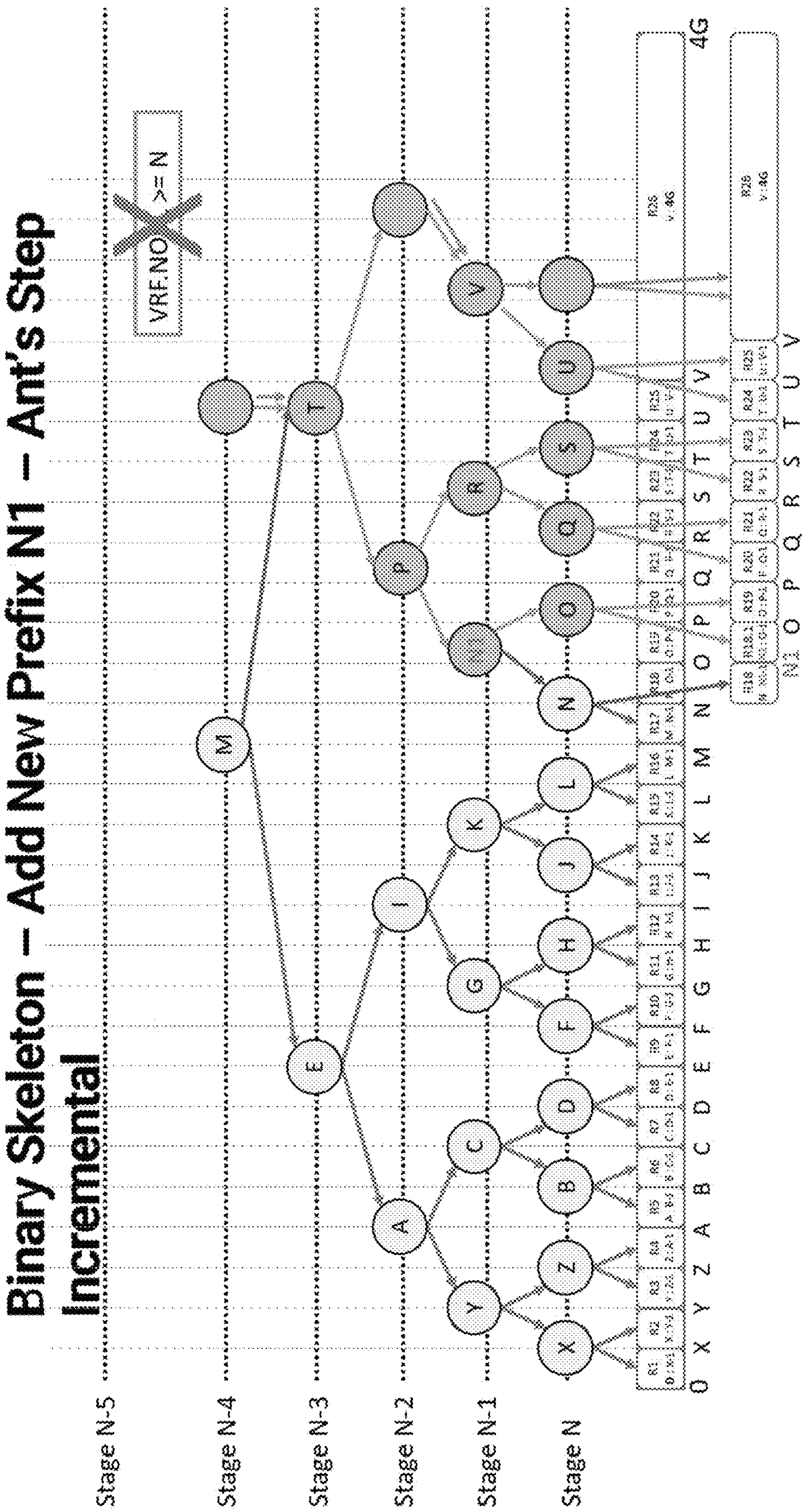
Figure 117:
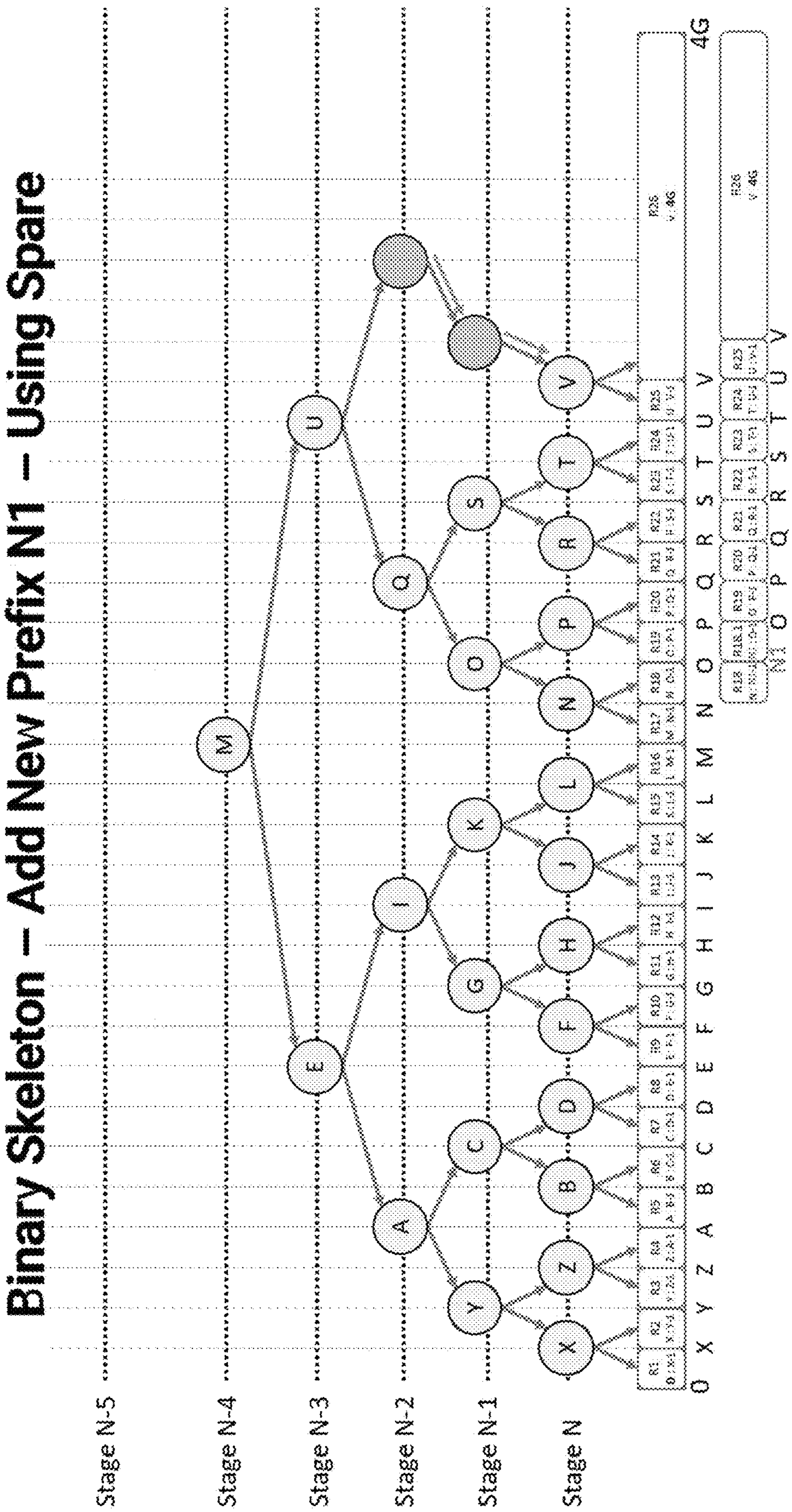
Figure 118:
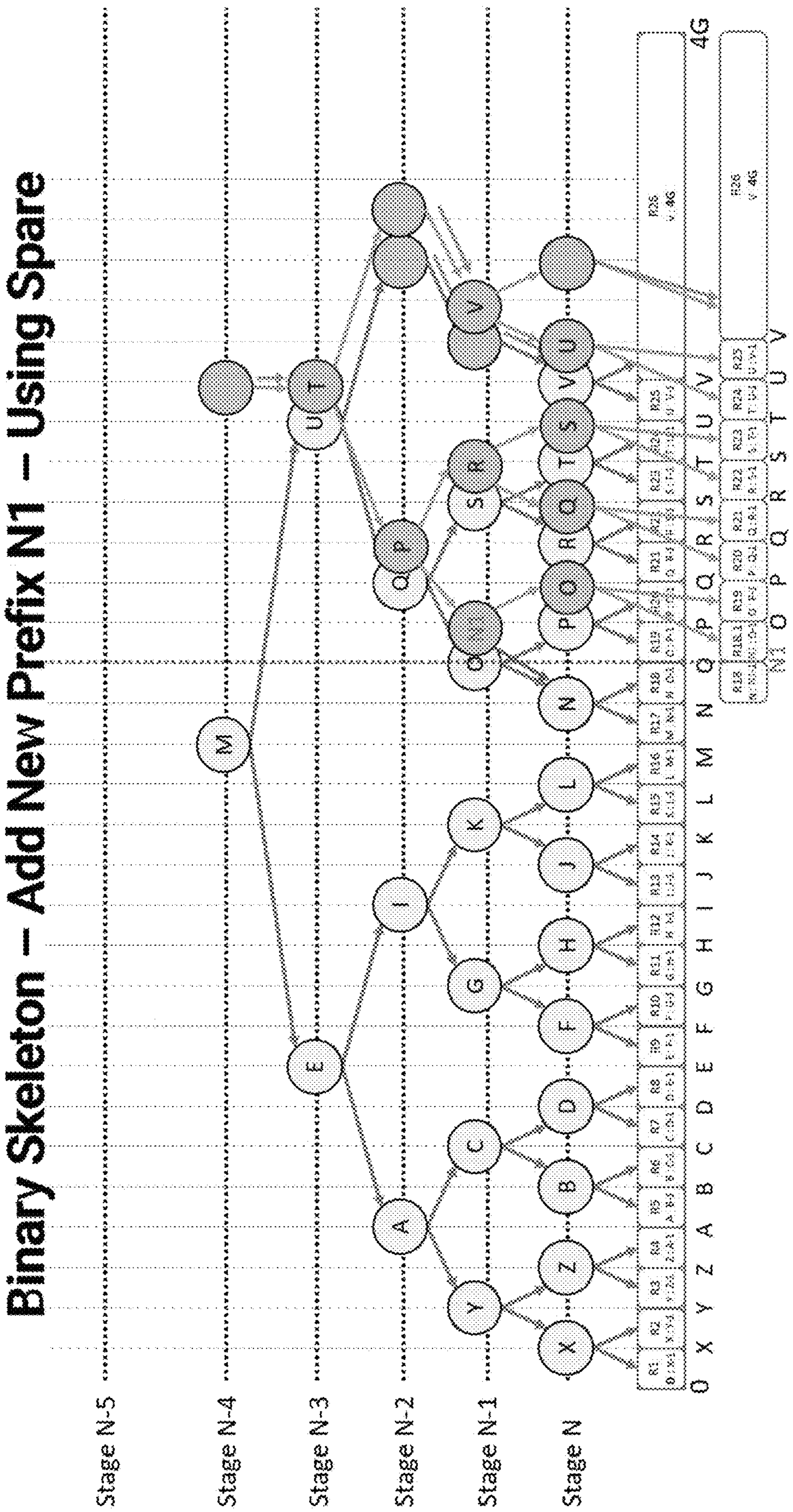
Figure 119:
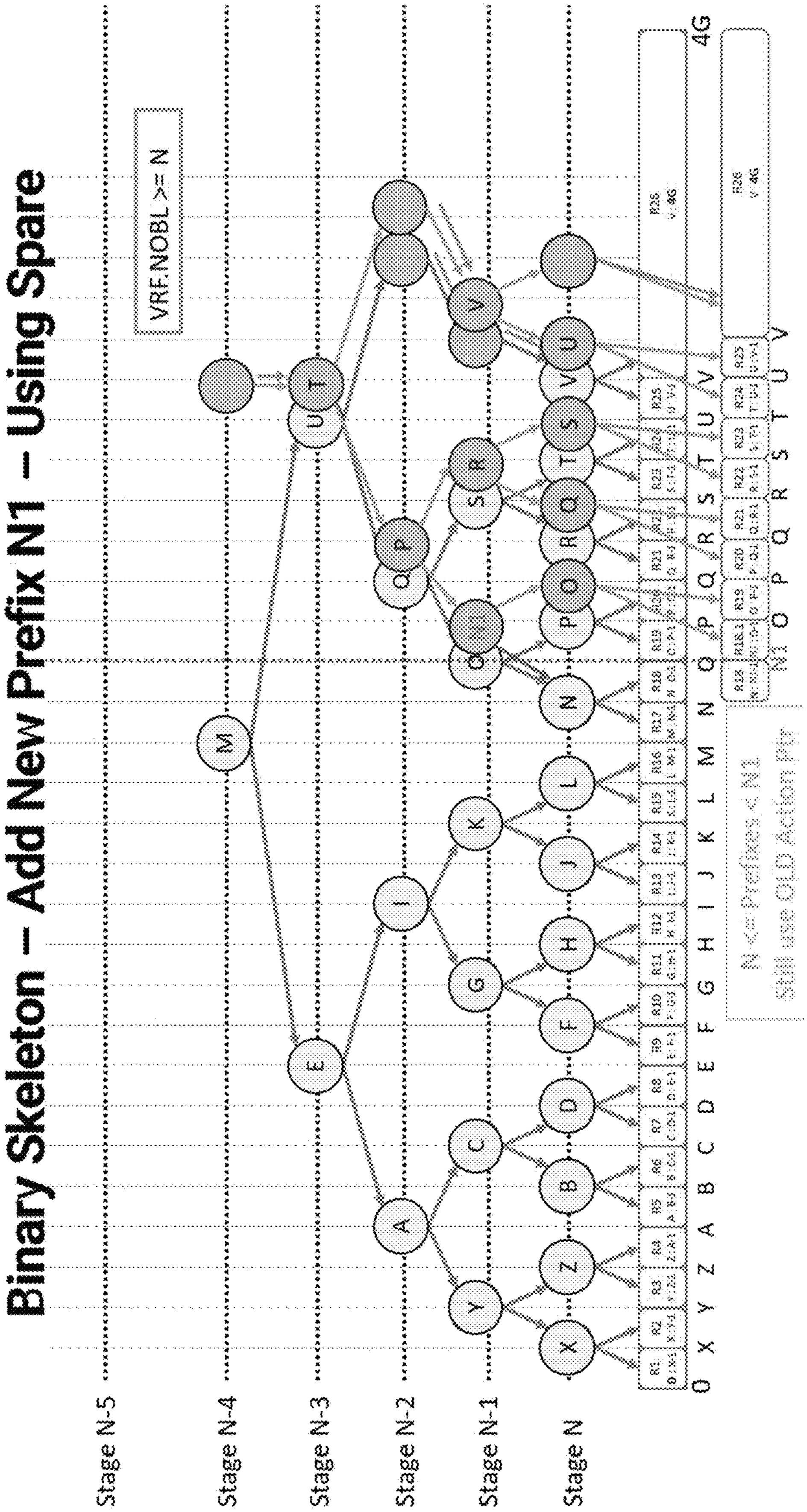
Figure 120:
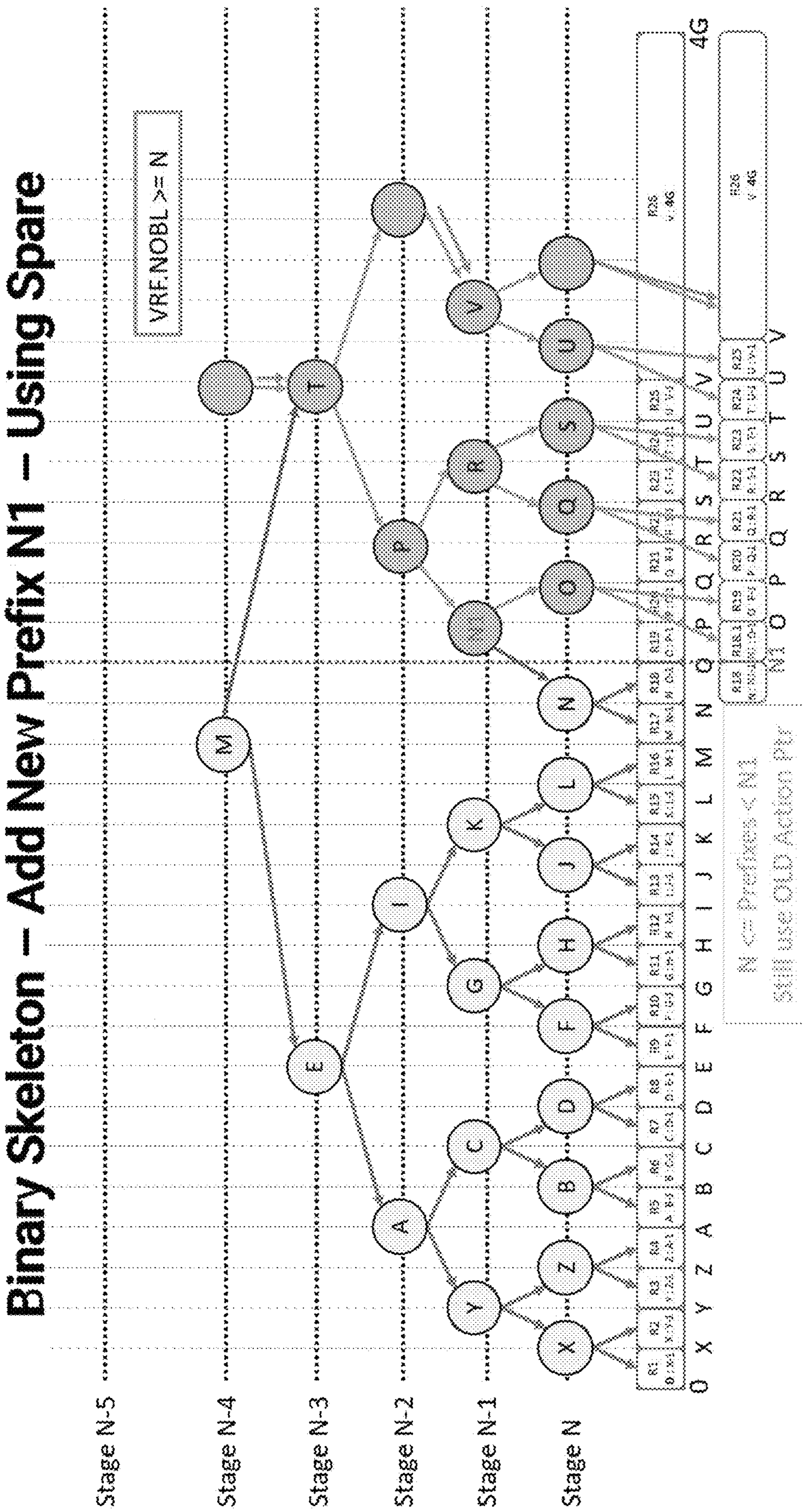
Figure 121:
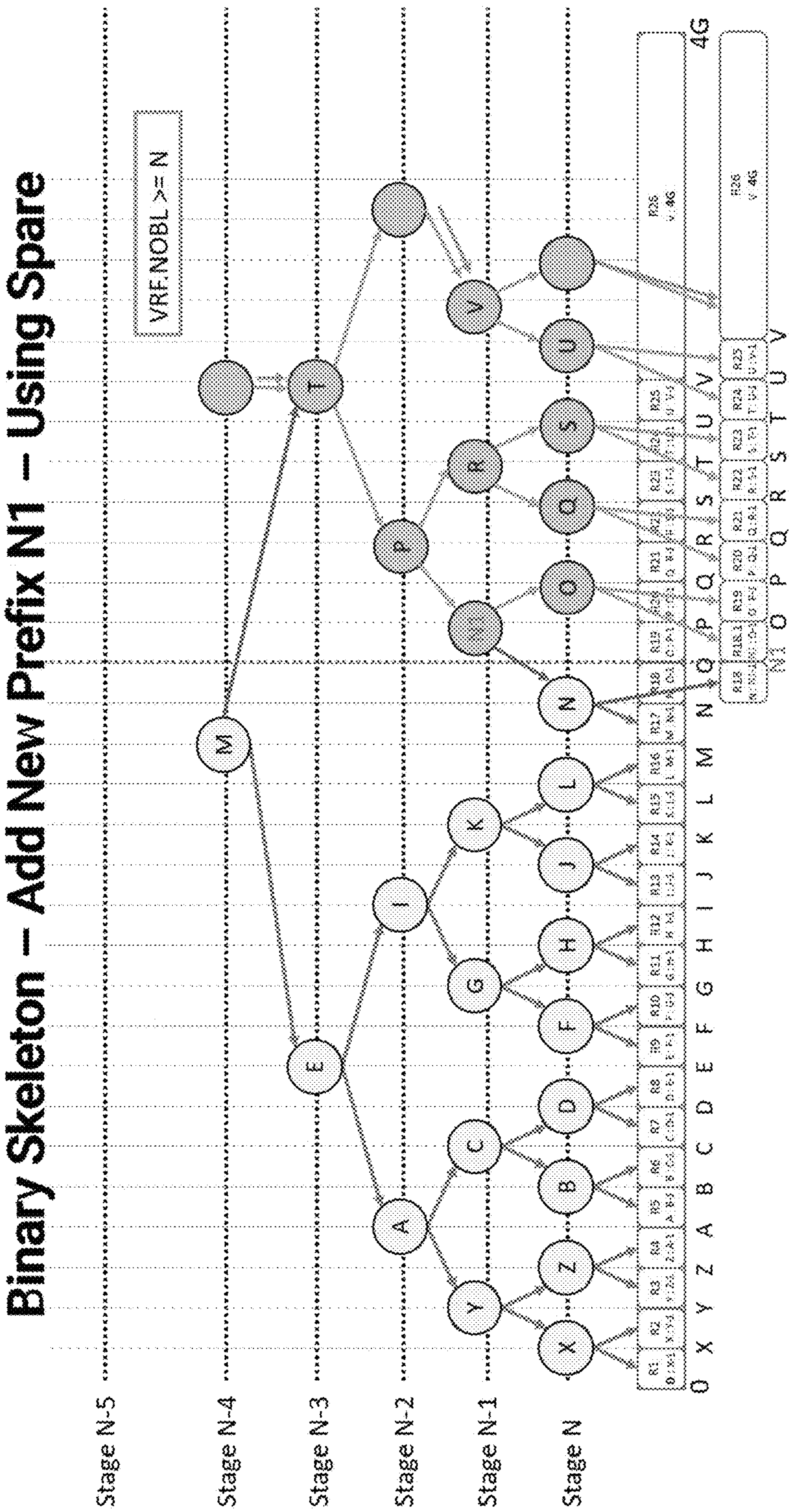
Figure 122:
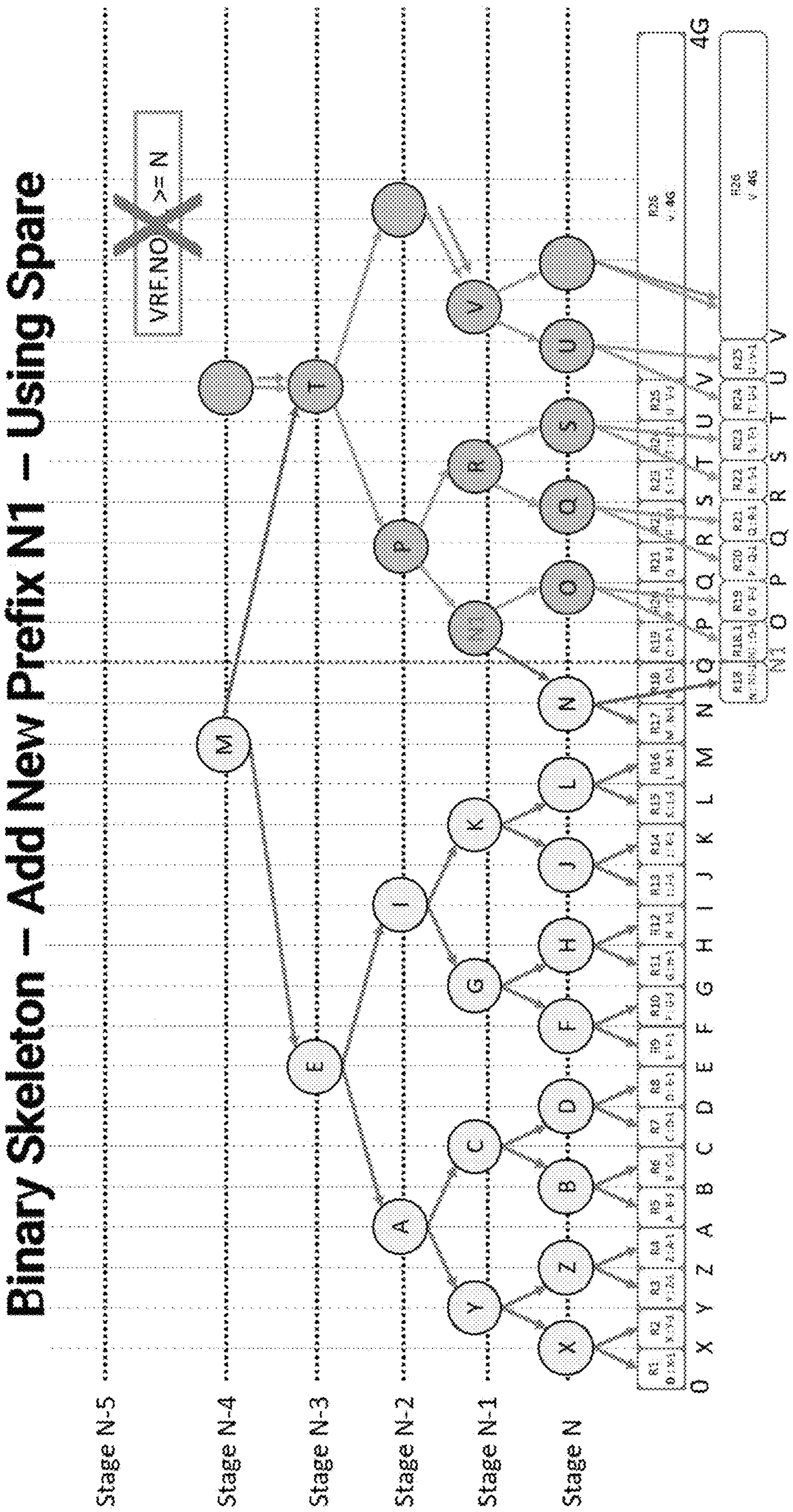
Figure 123:
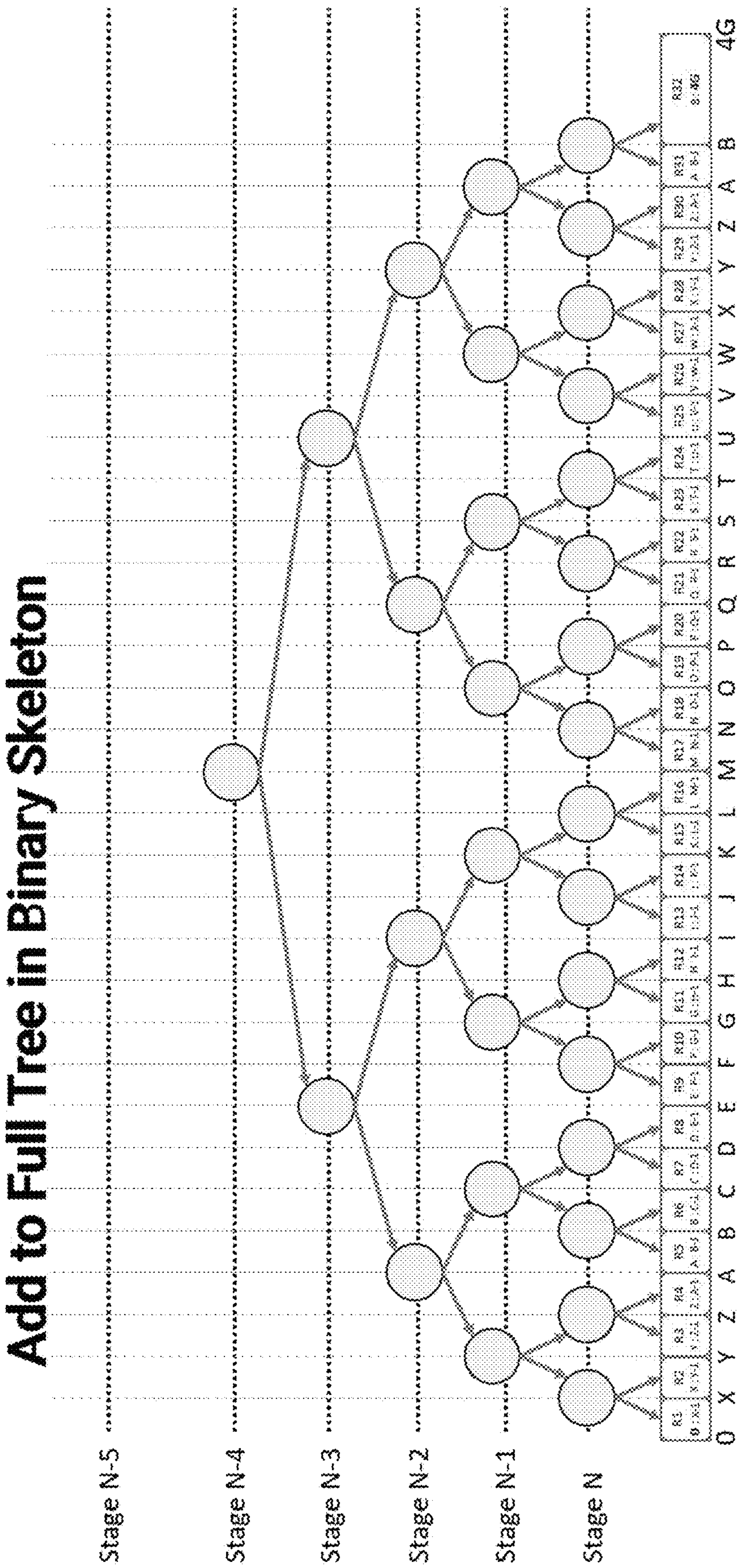
Figure 124:
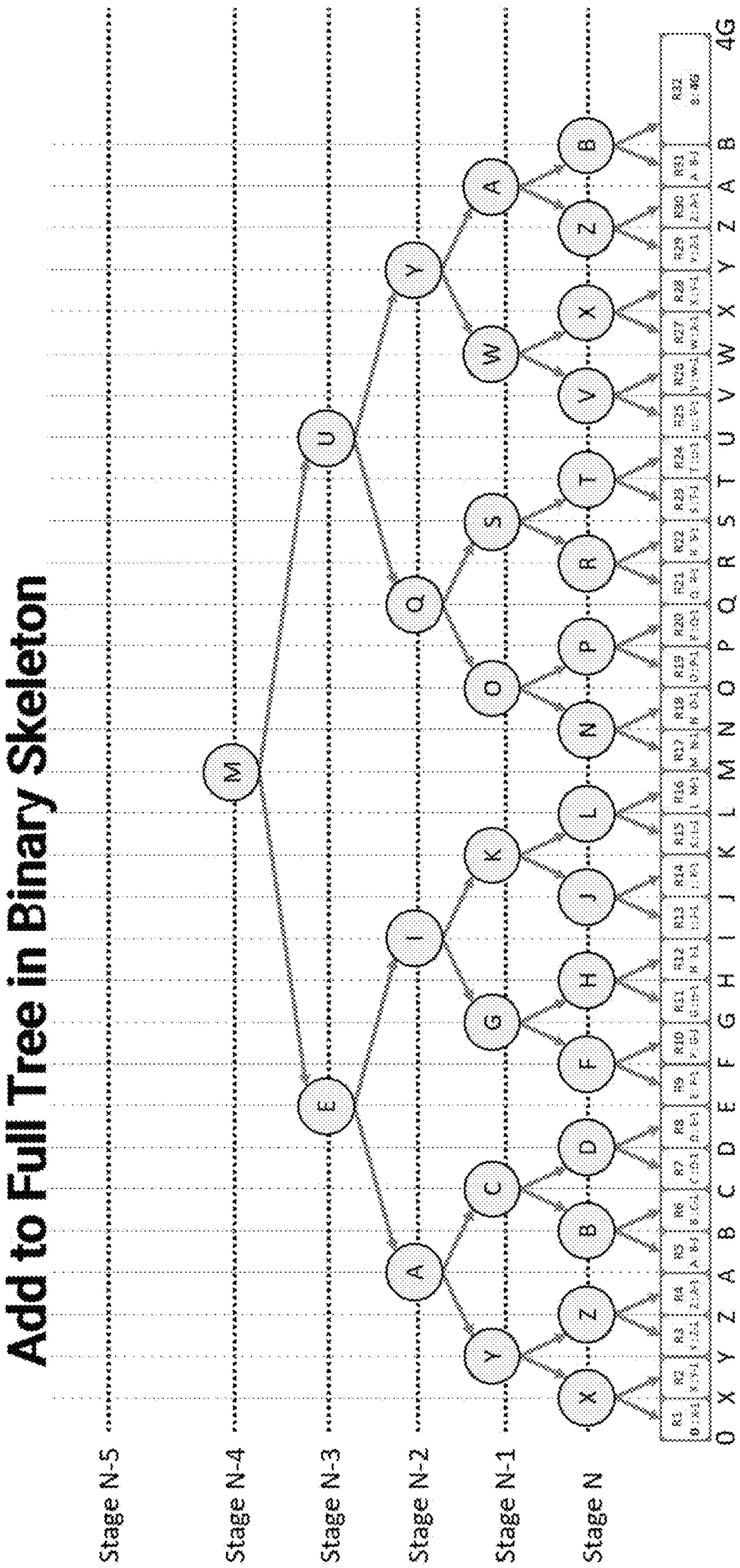
Figure 125:
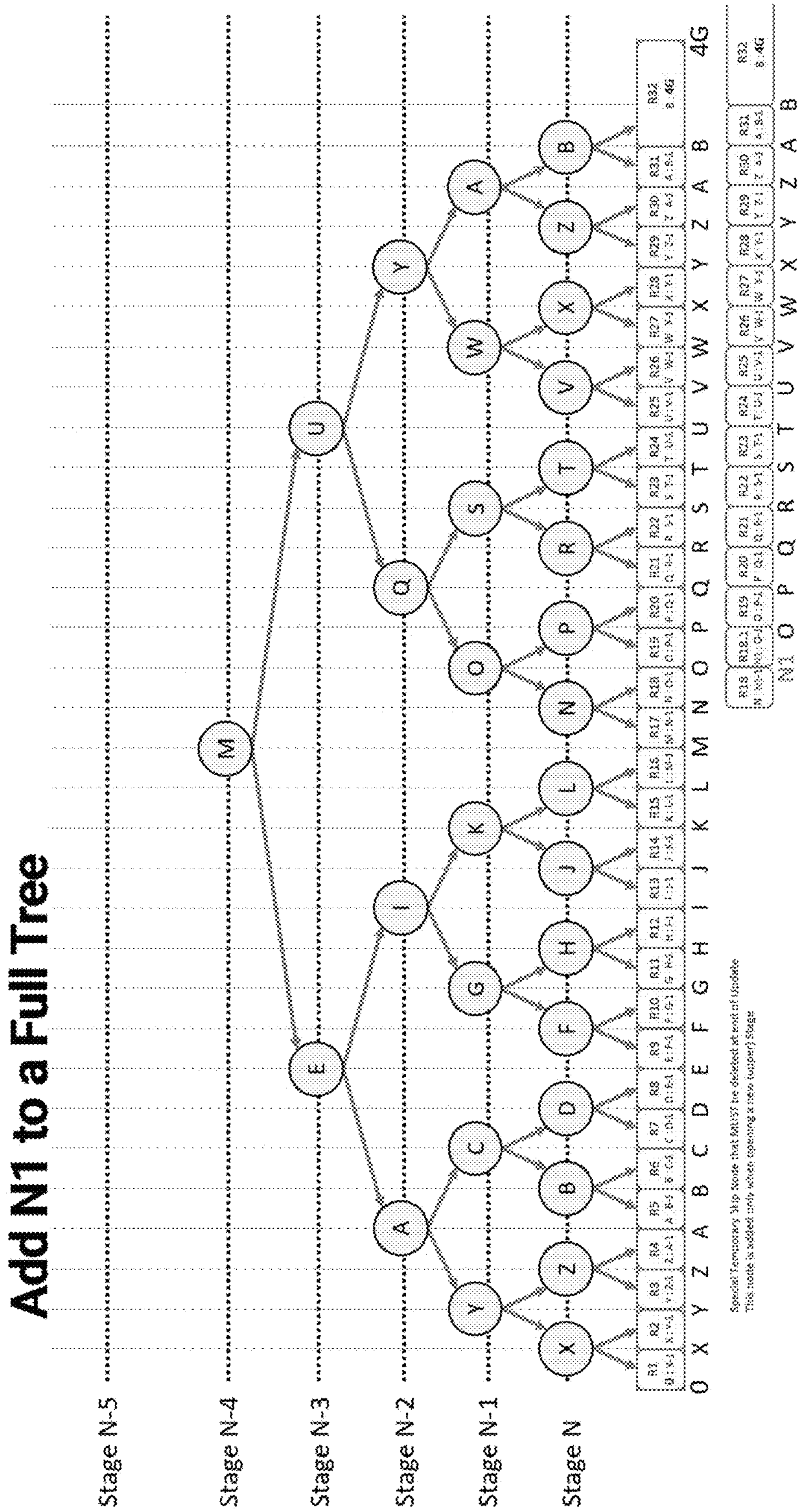
Figure 126:
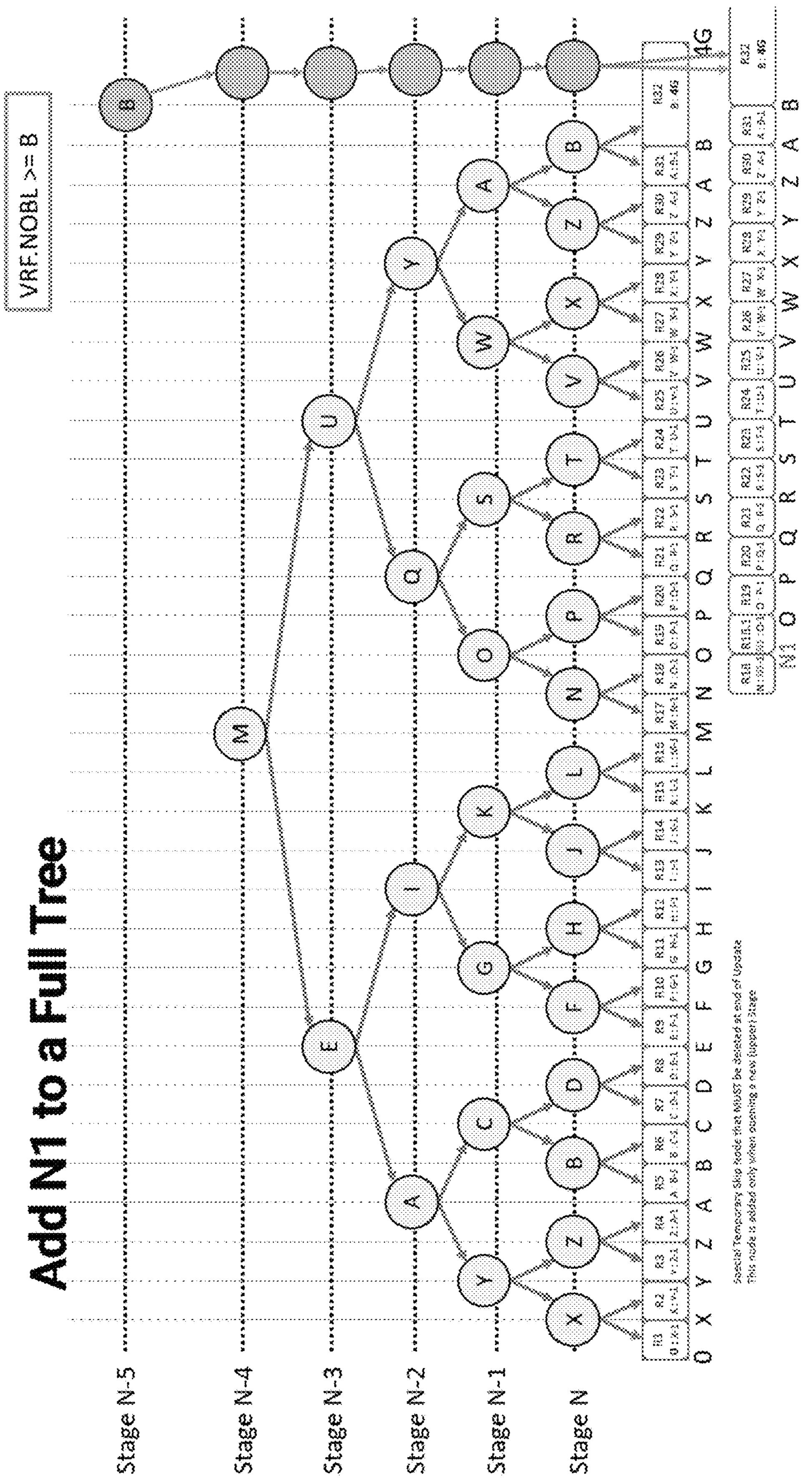
Figure 127:
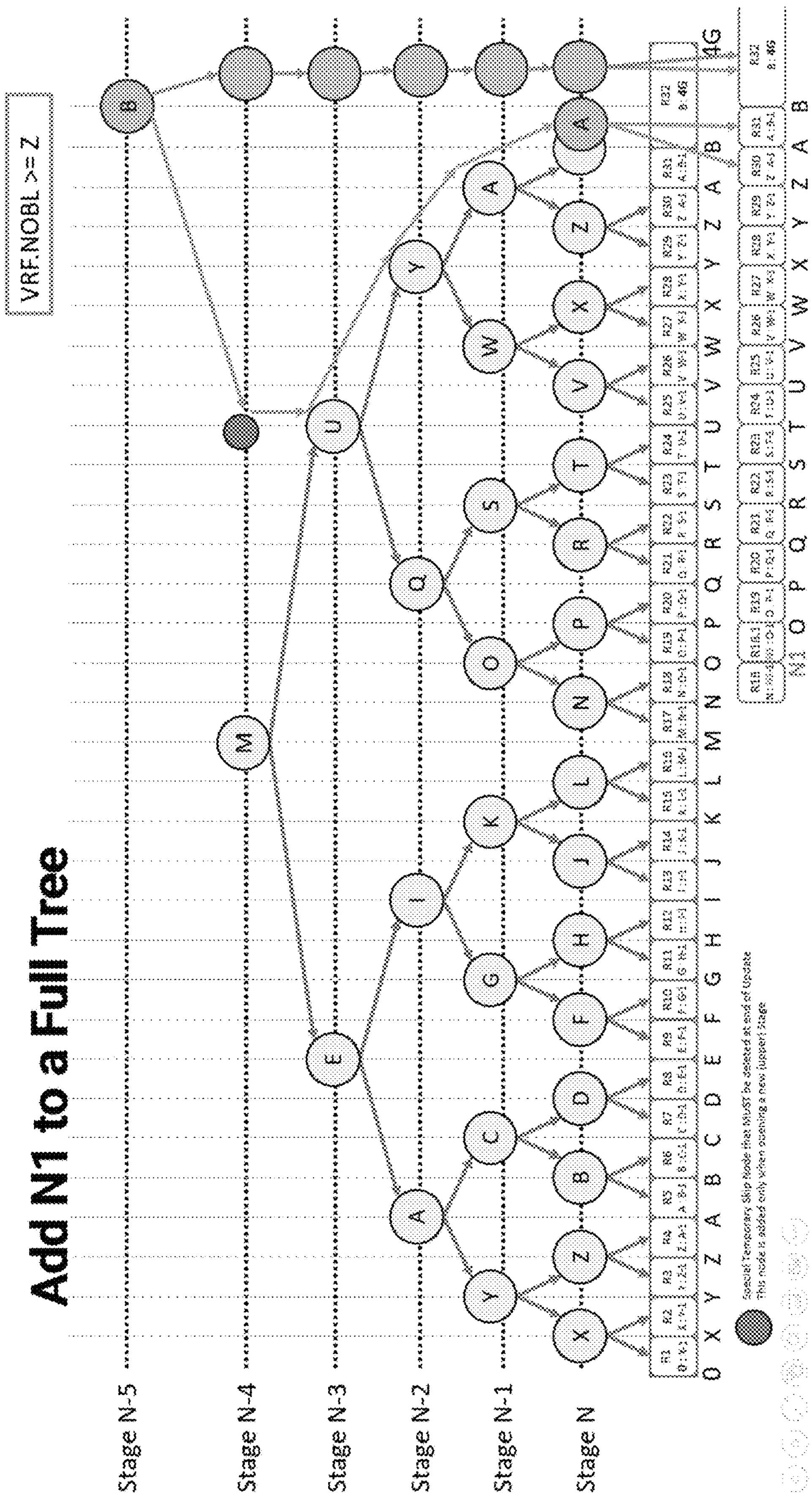
Figure 128:
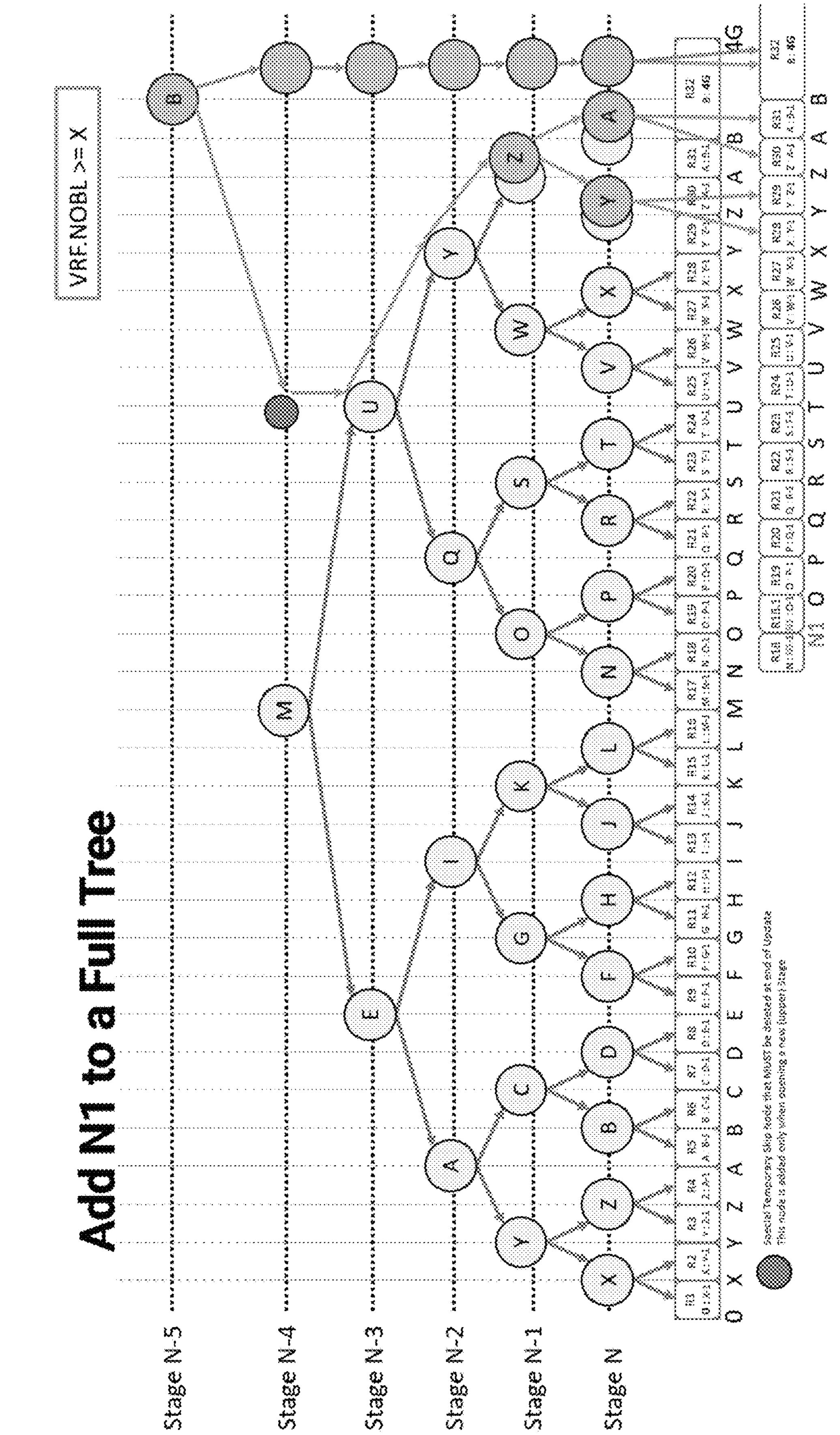
Figure 129:
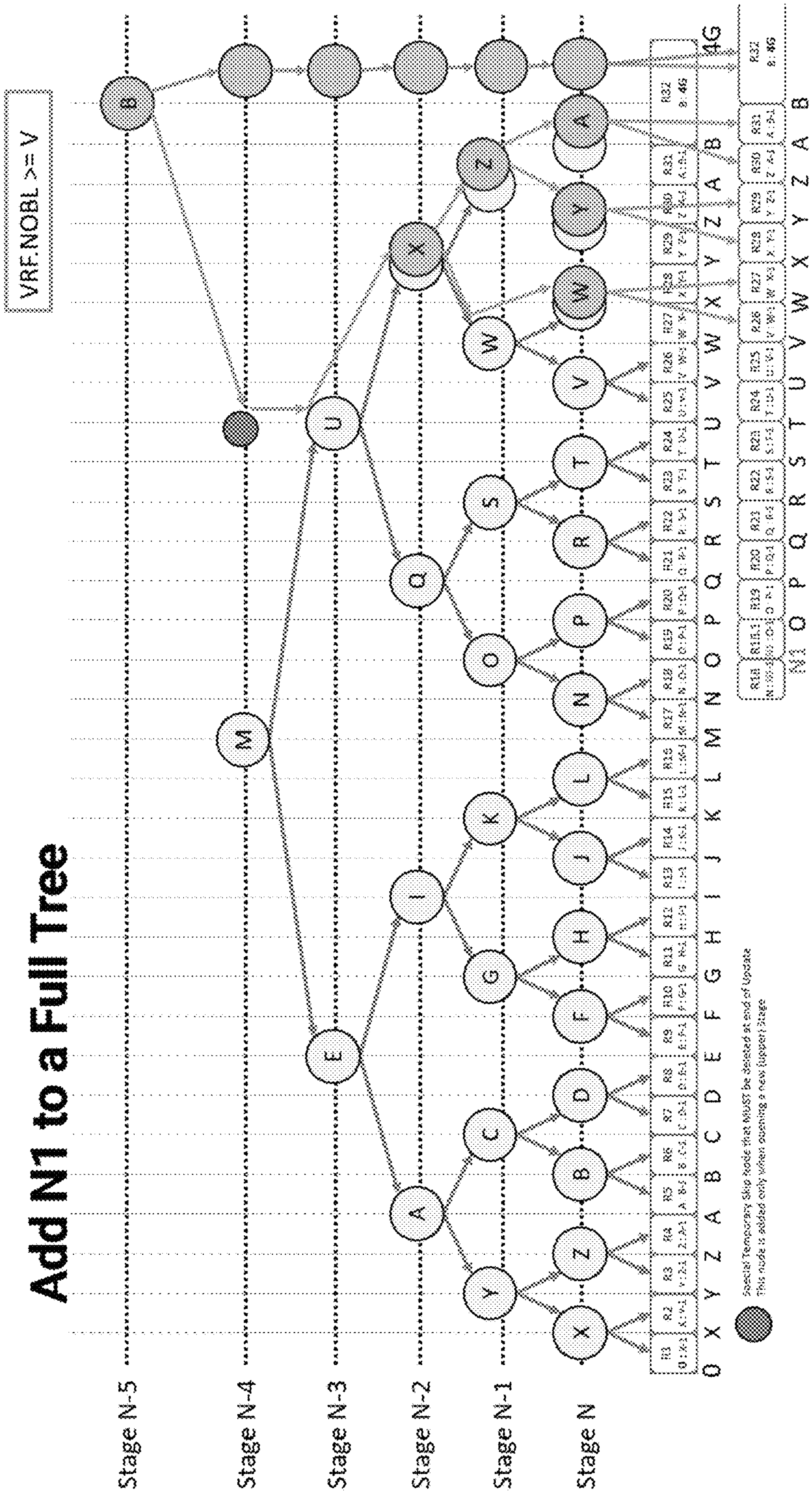
Figure 130:
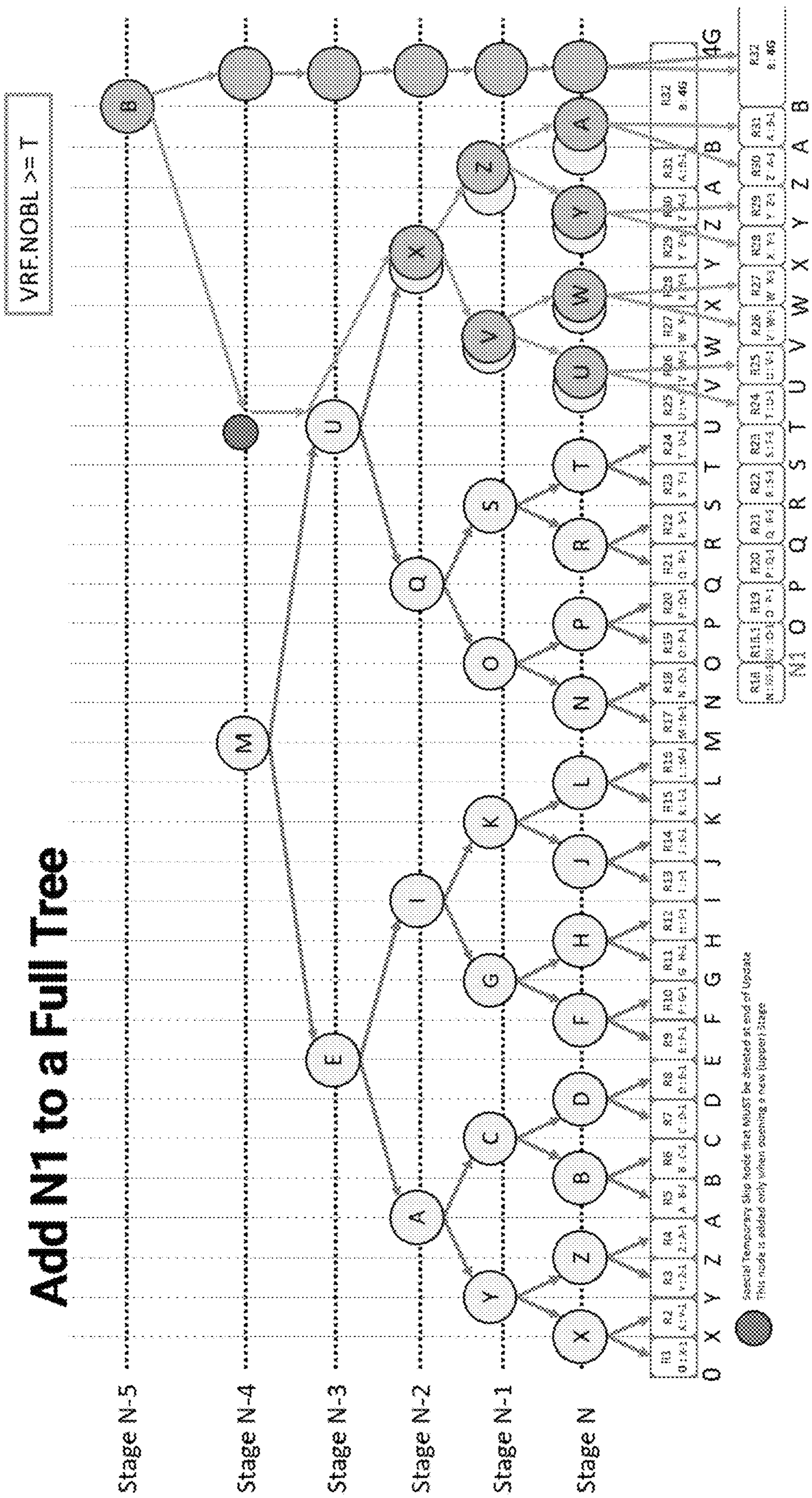
Figure 131:
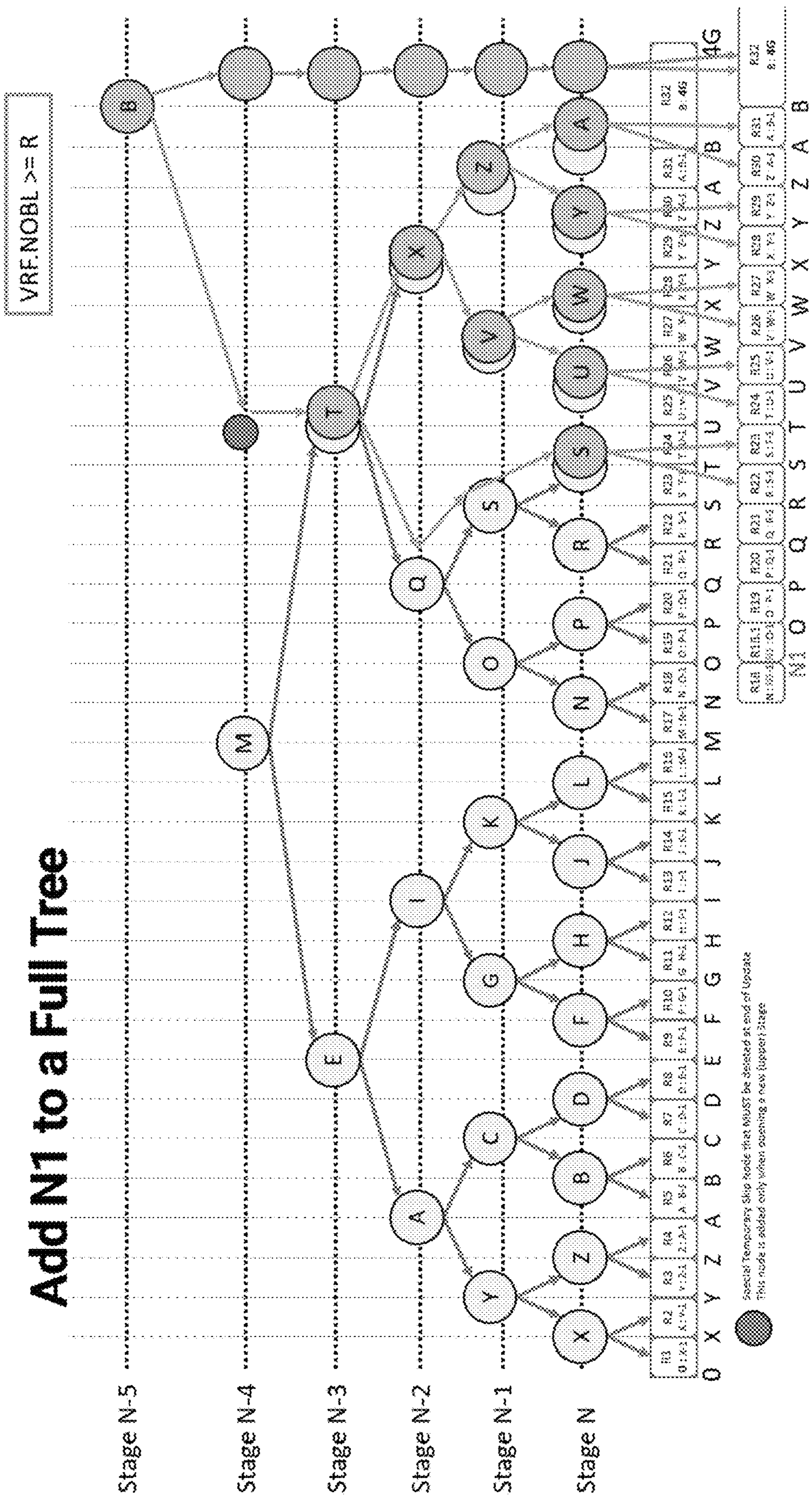
Figure 132:
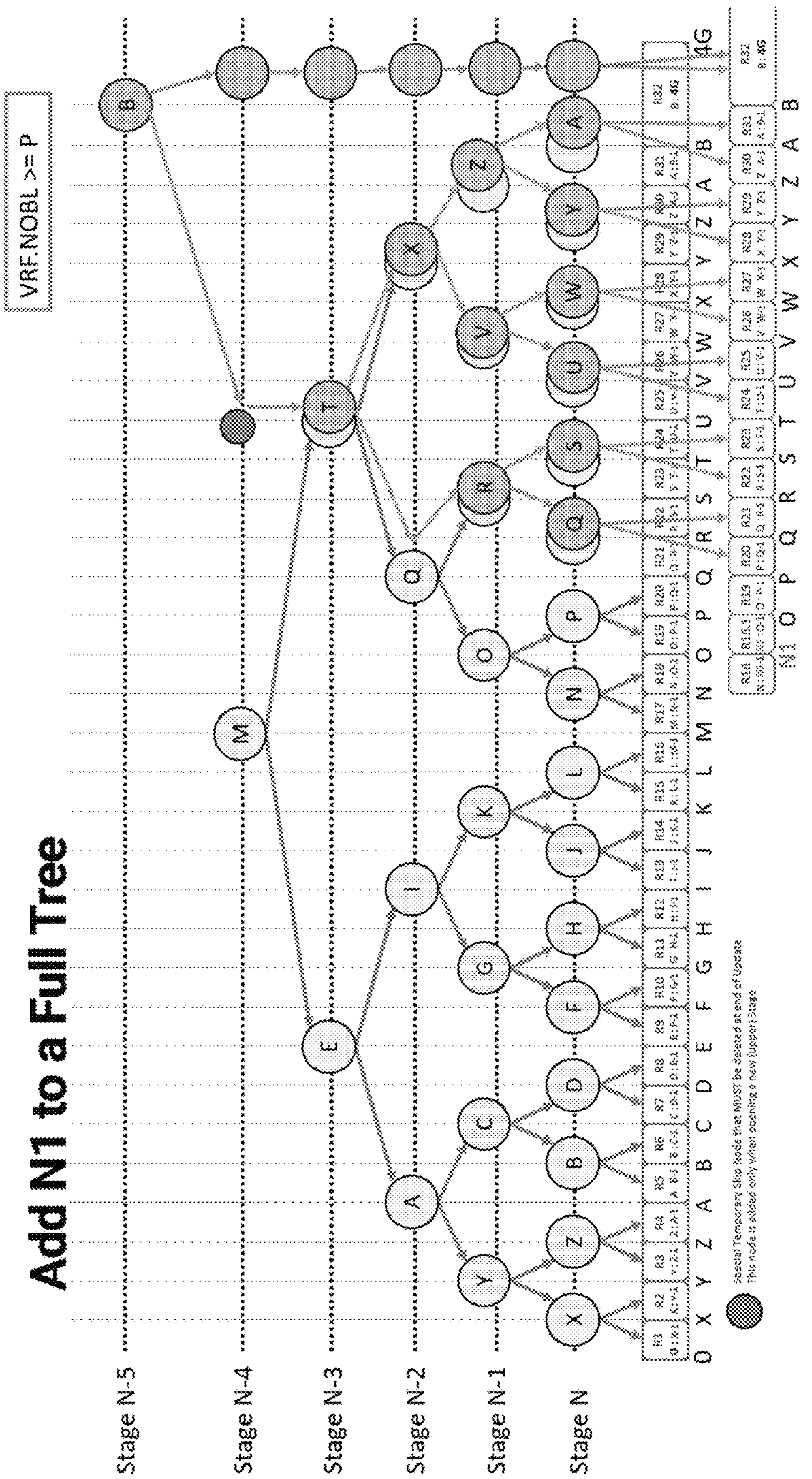
Figure 133:
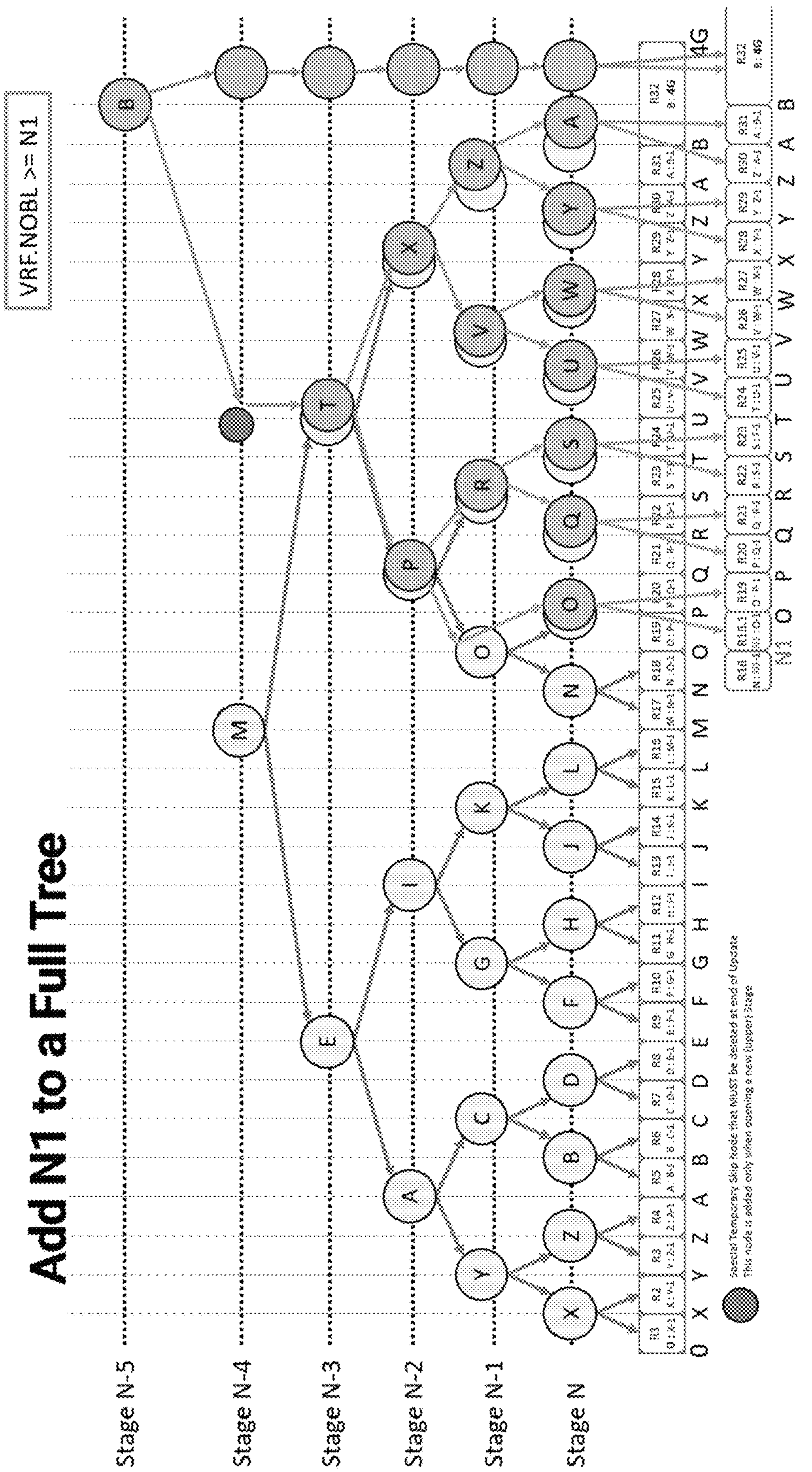
Figure 134:
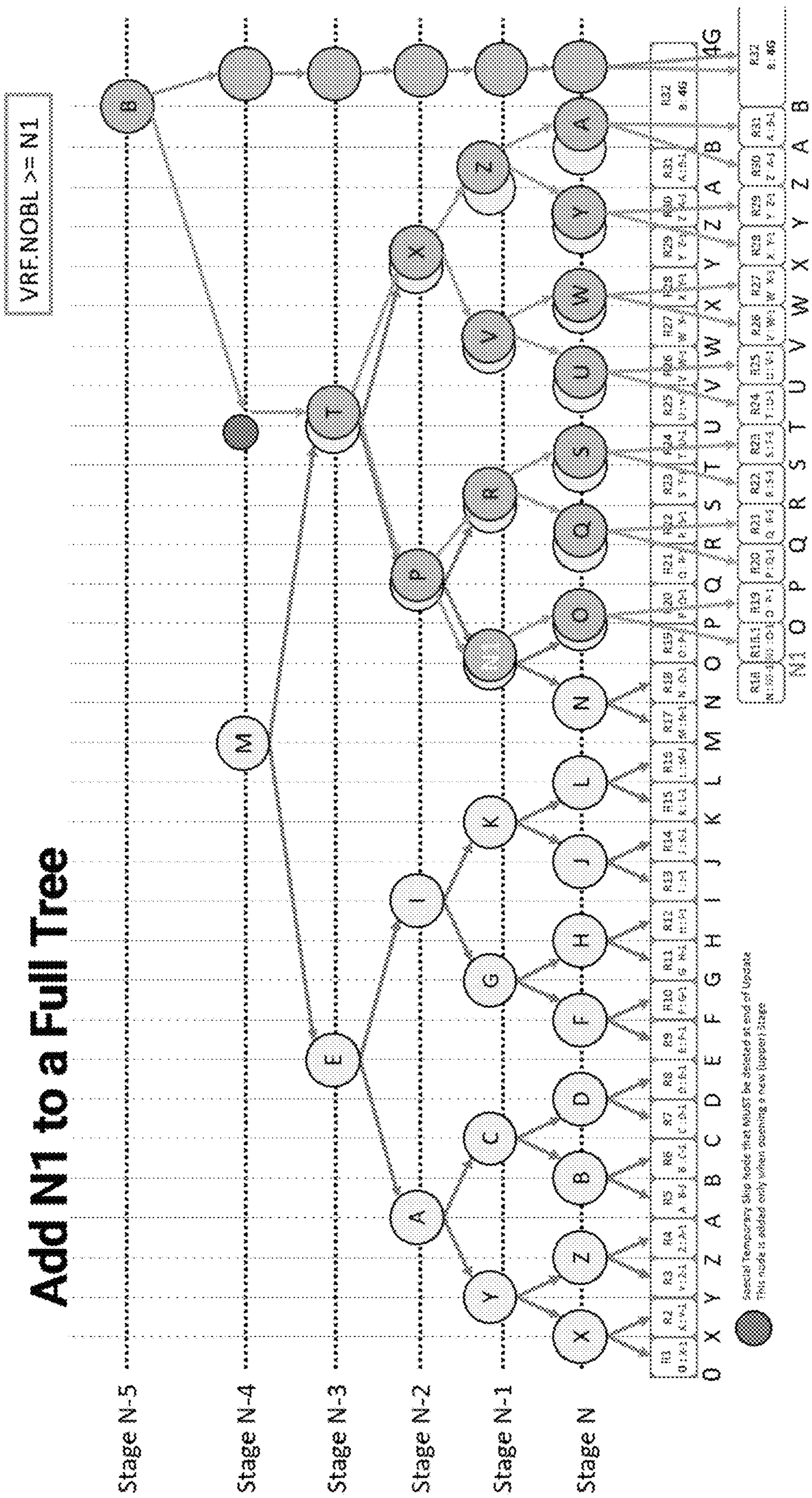
Figure 135:
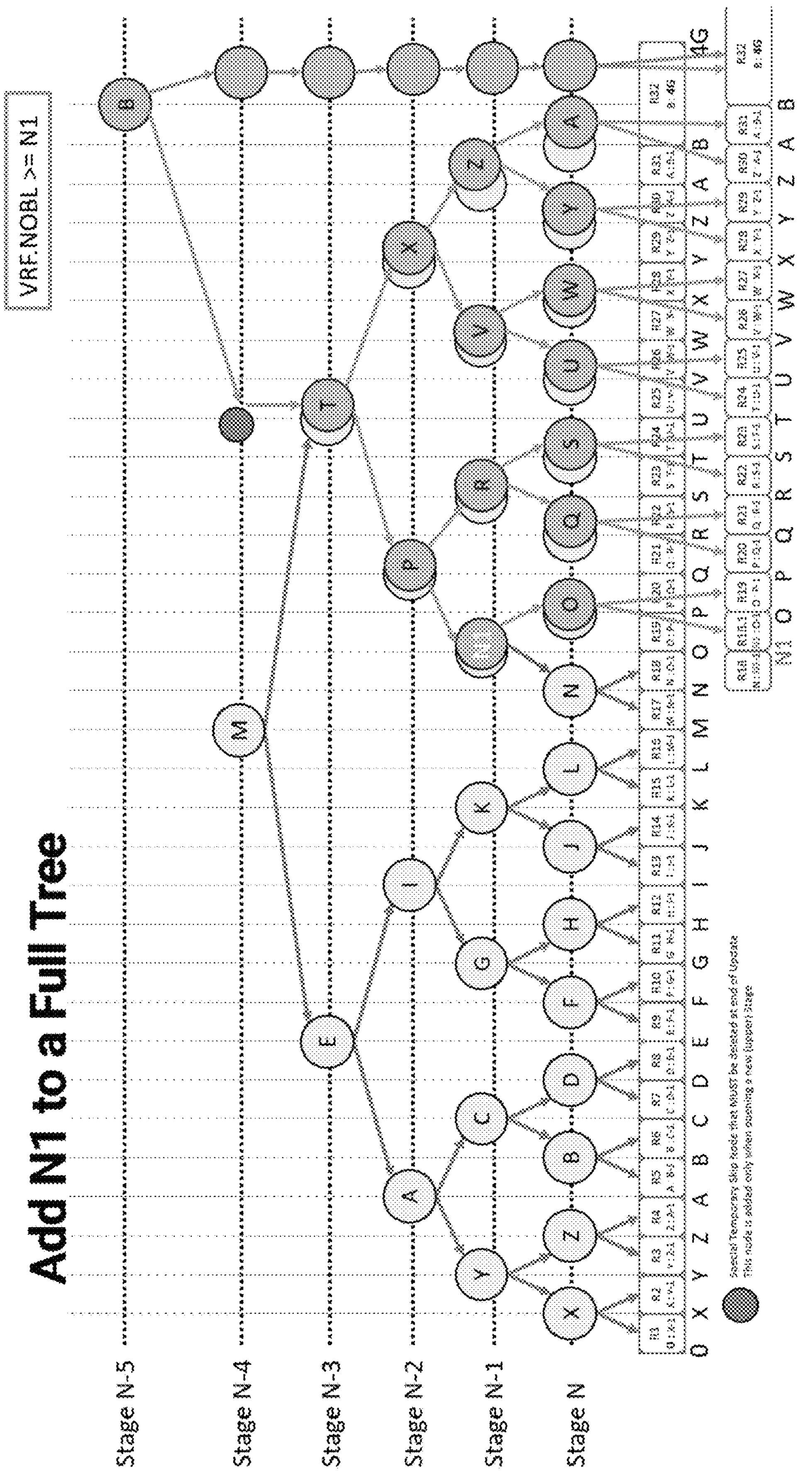
Figure 136:
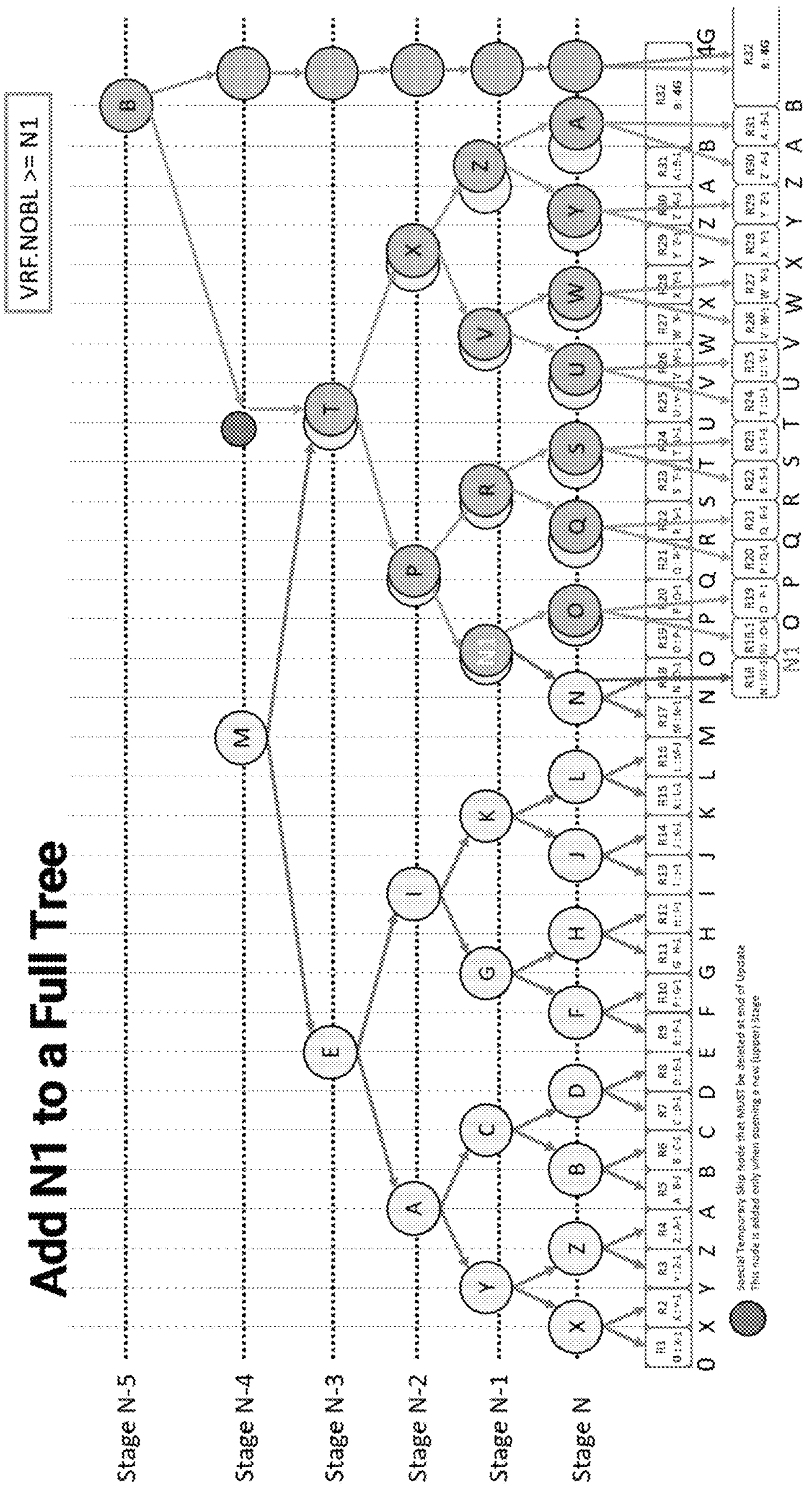
Figure 137:
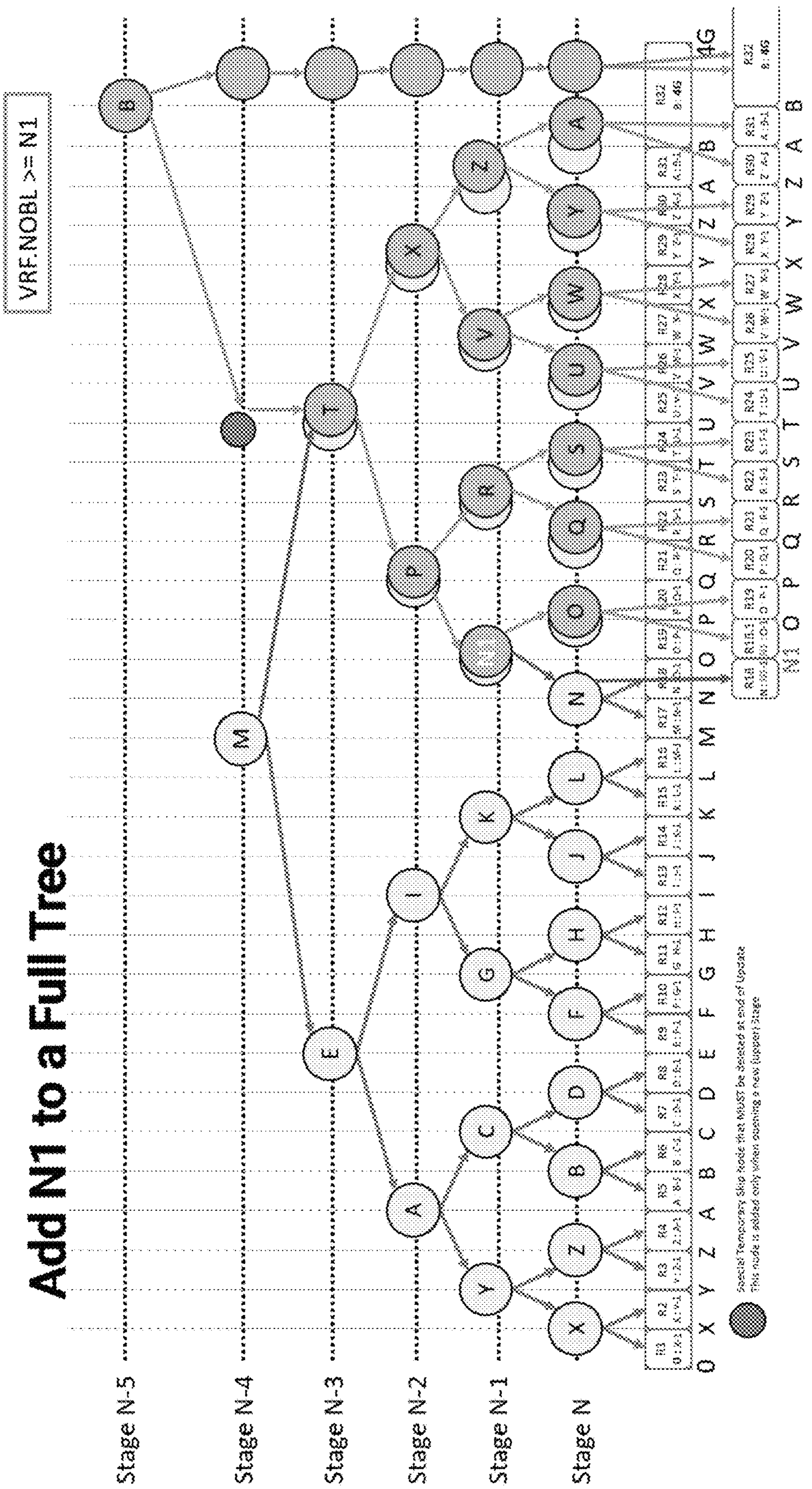
Figure 138:
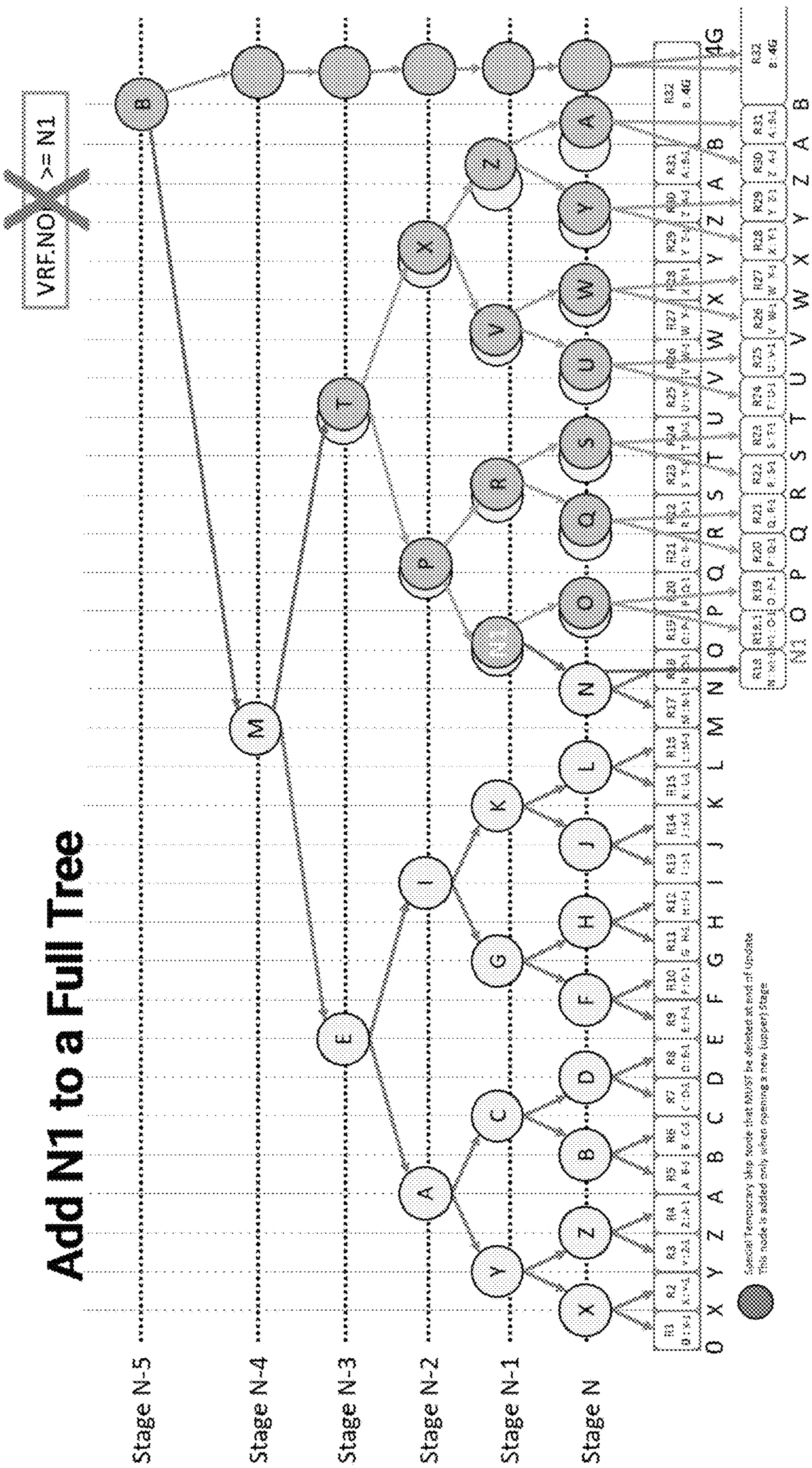
Figure 139:
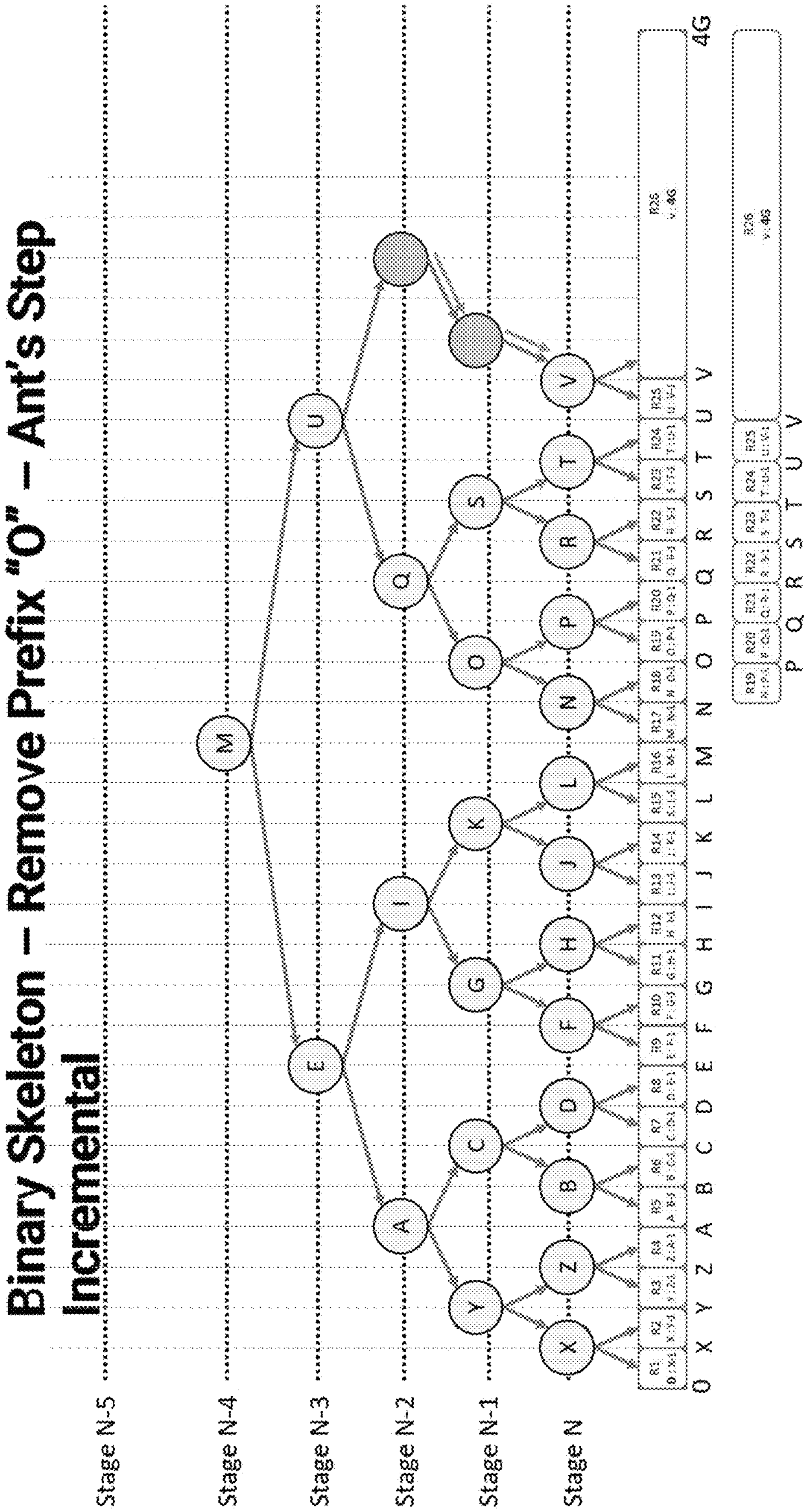
Figure 140:
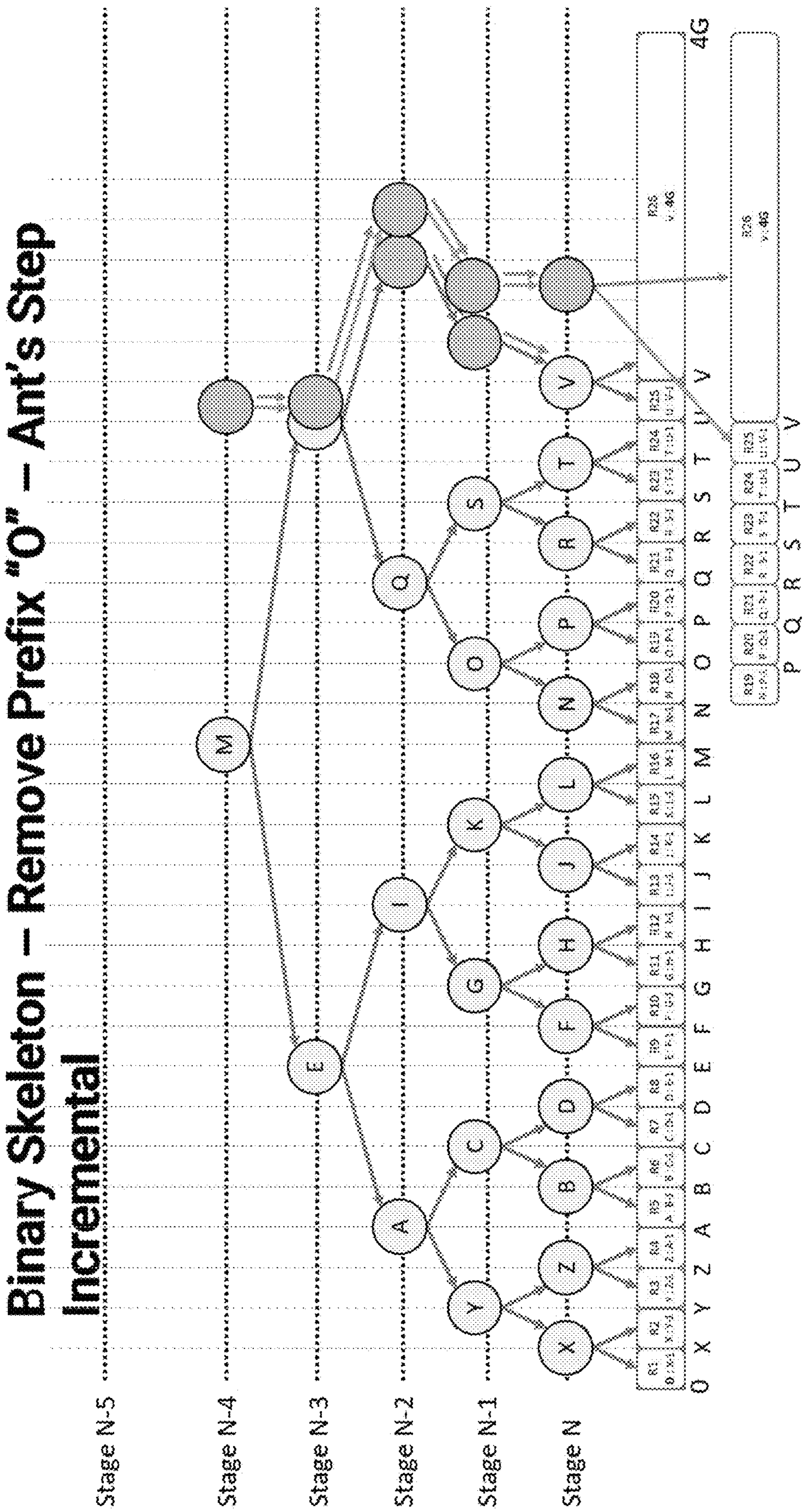
Figure 141:
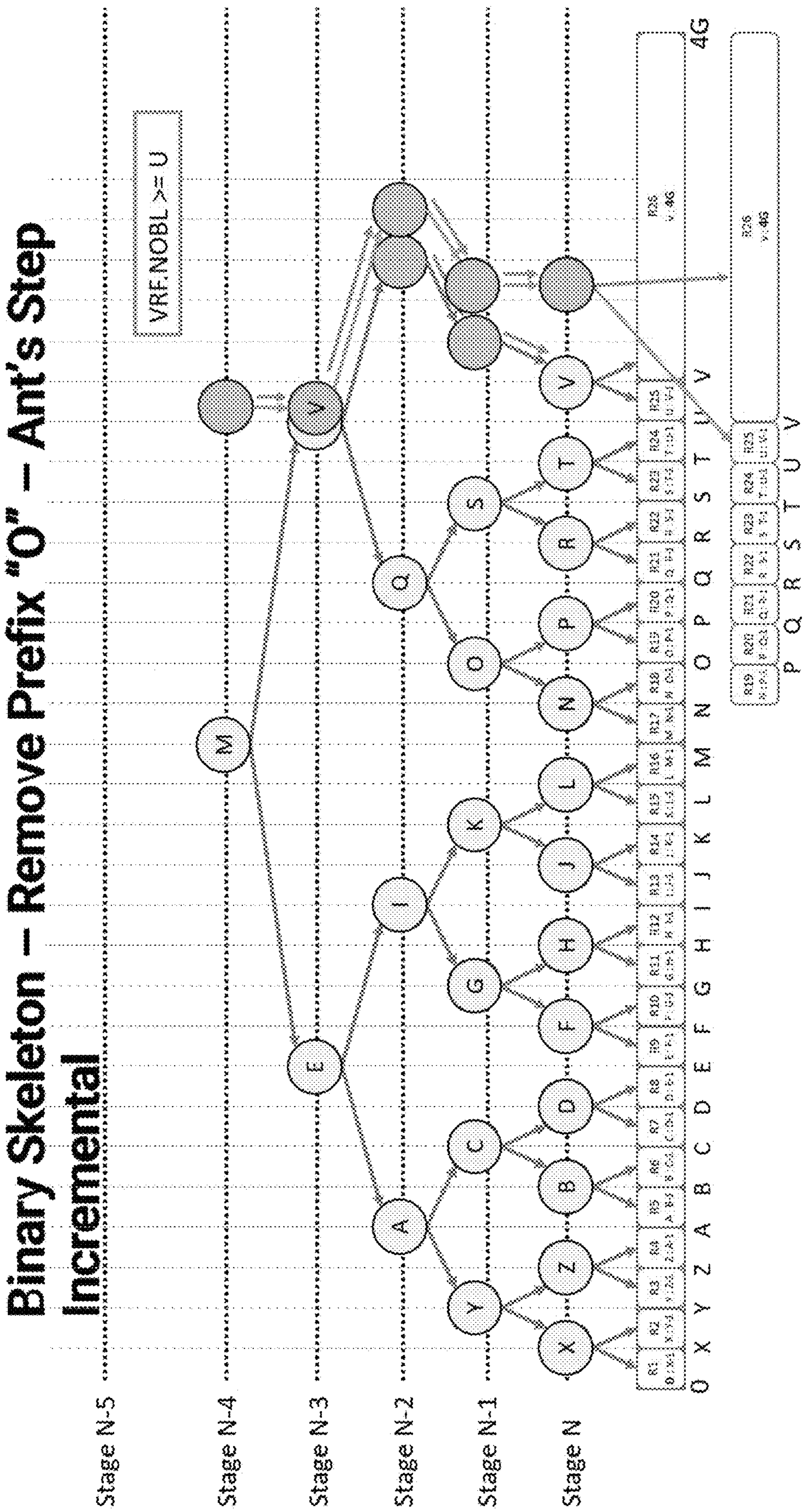
Figure 142:
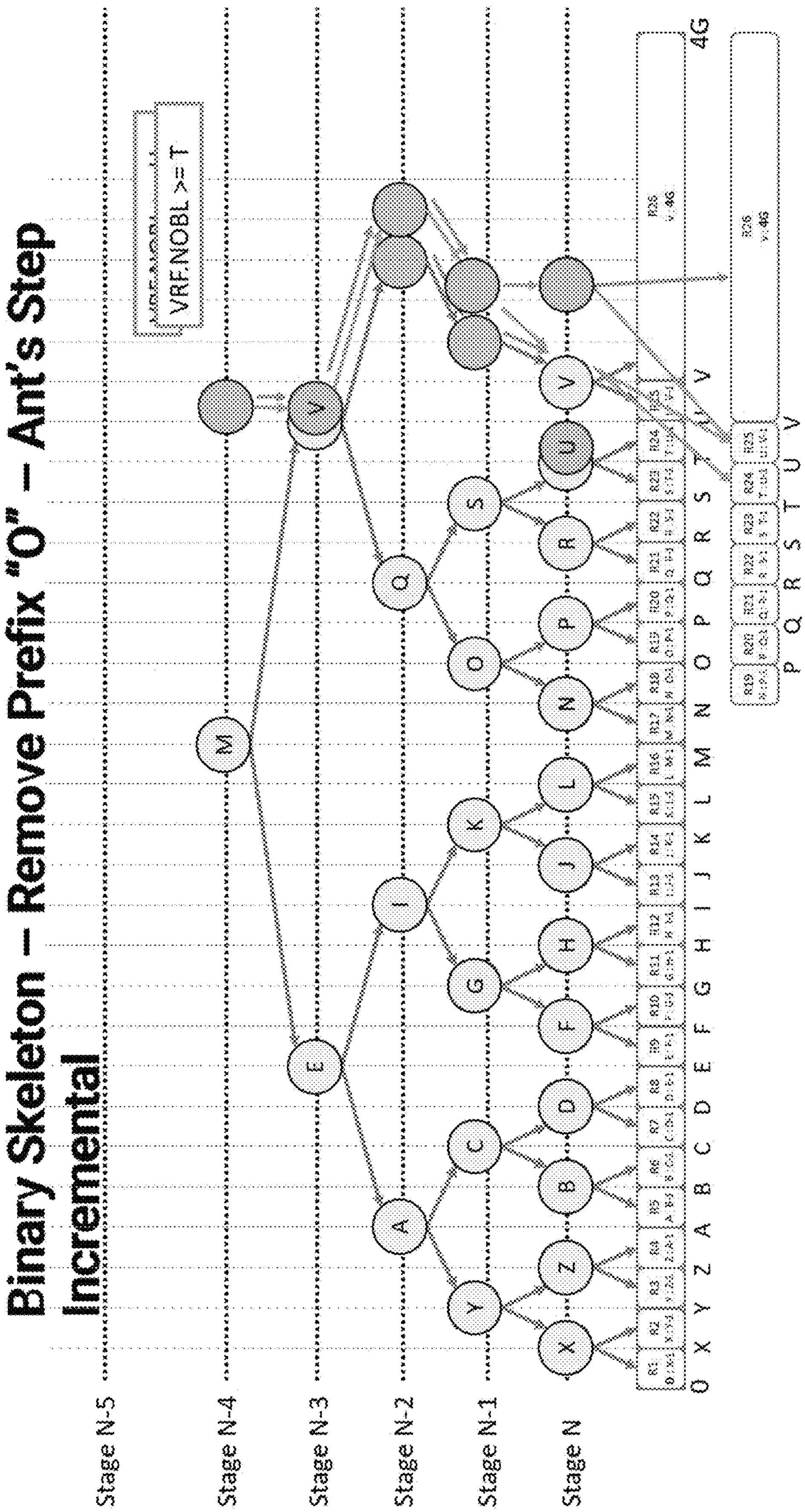
Figure 143:
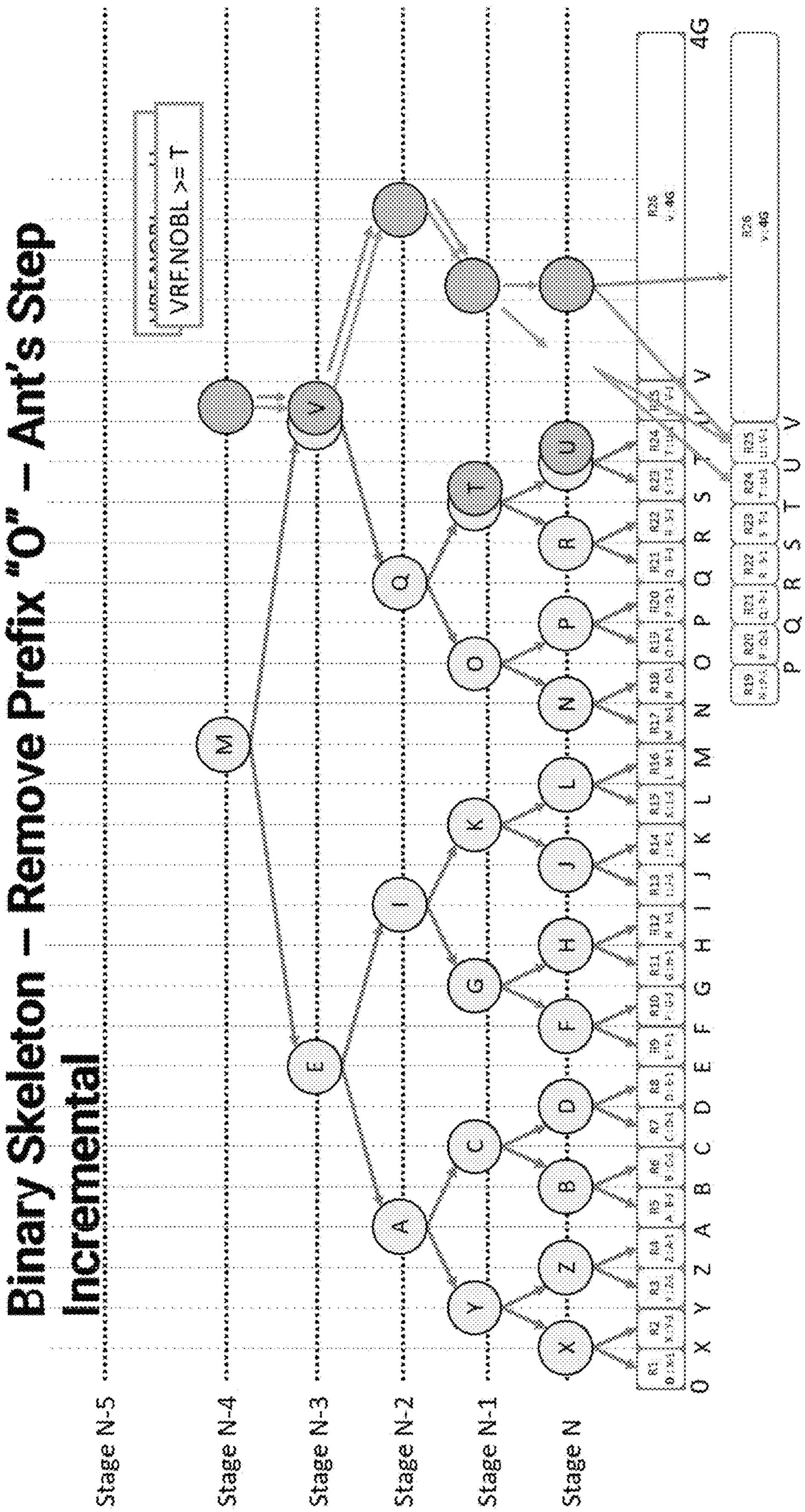
Figure 144:
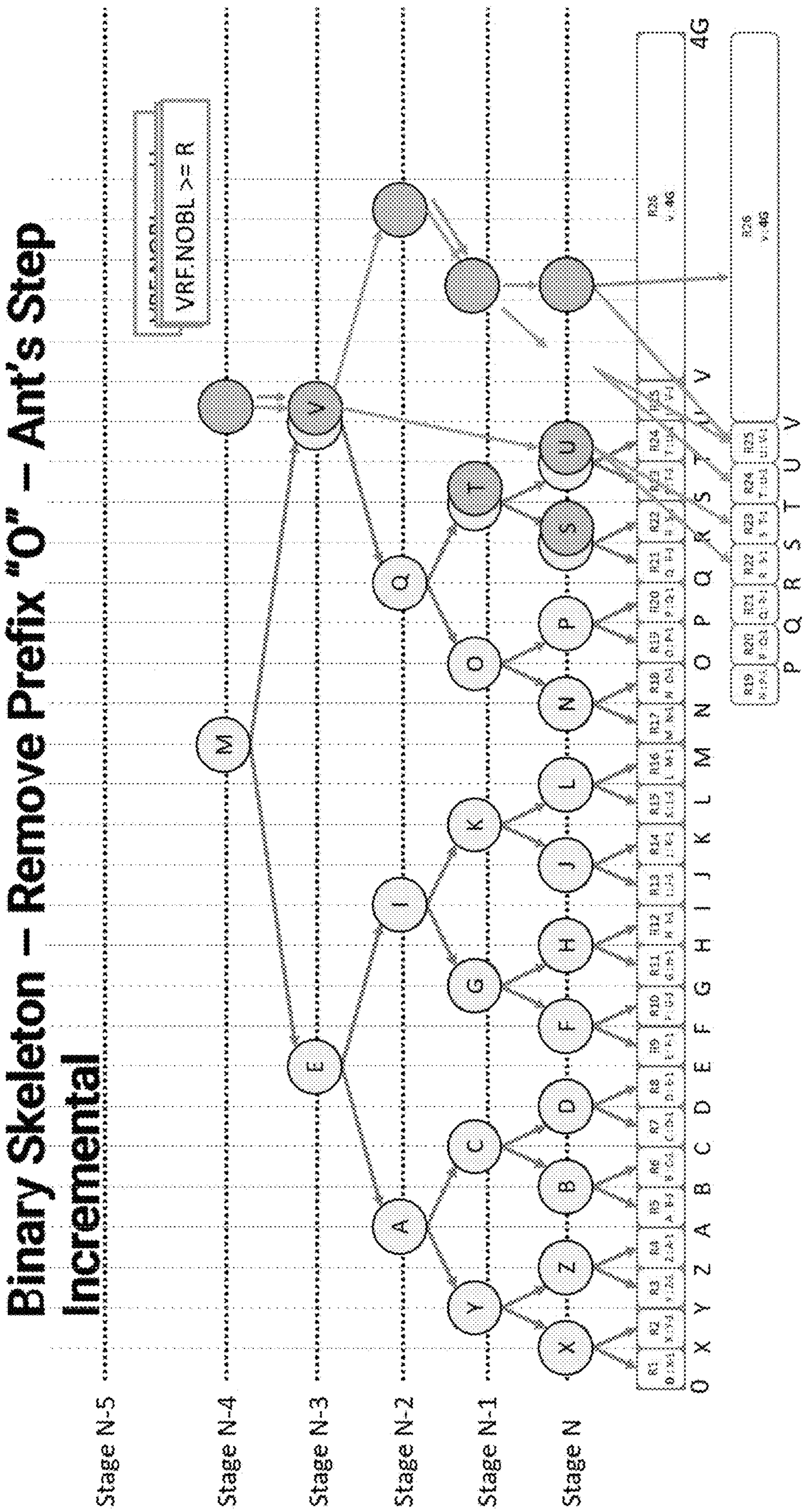
Figure 145:
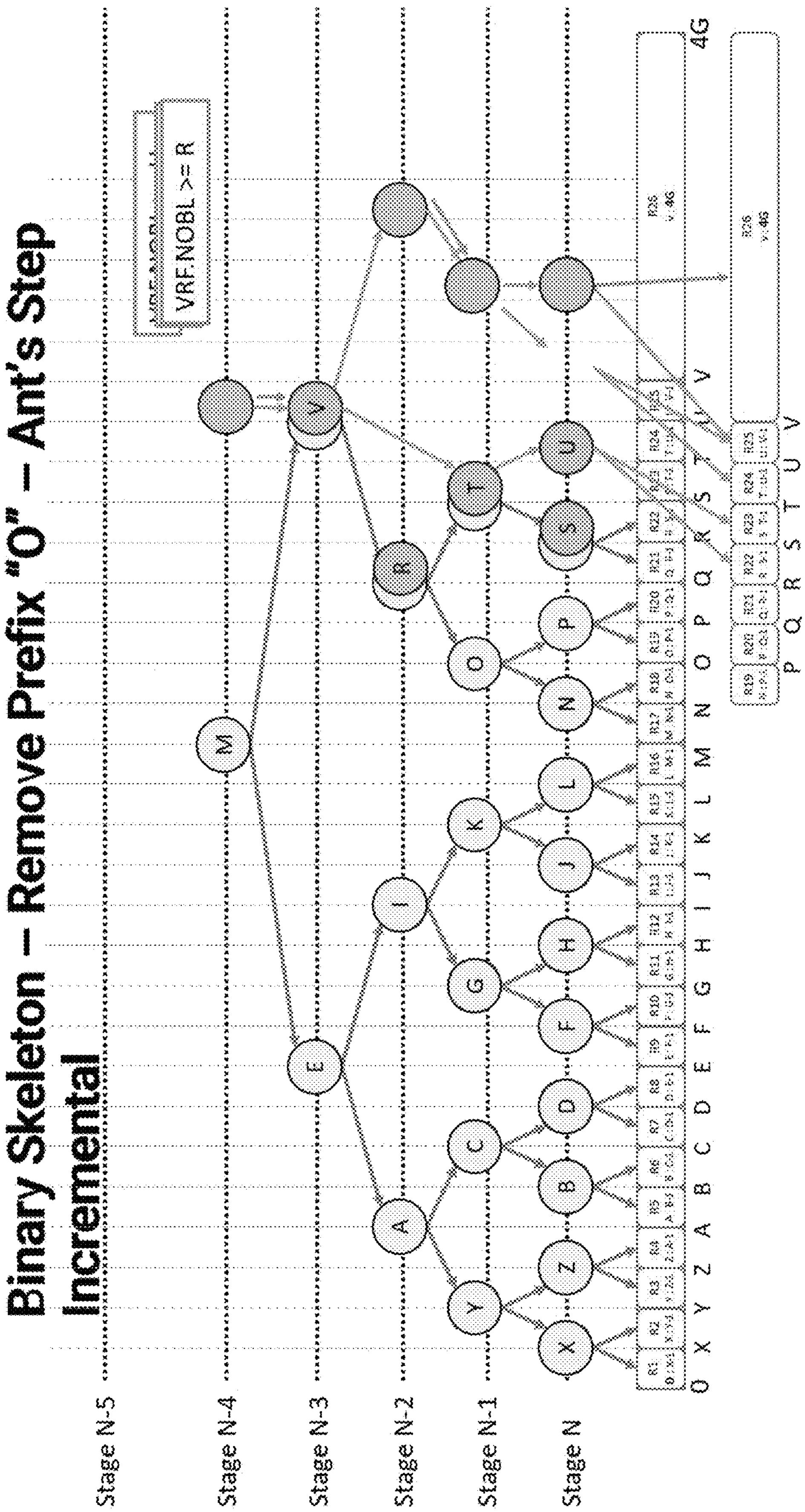
Figure 146:
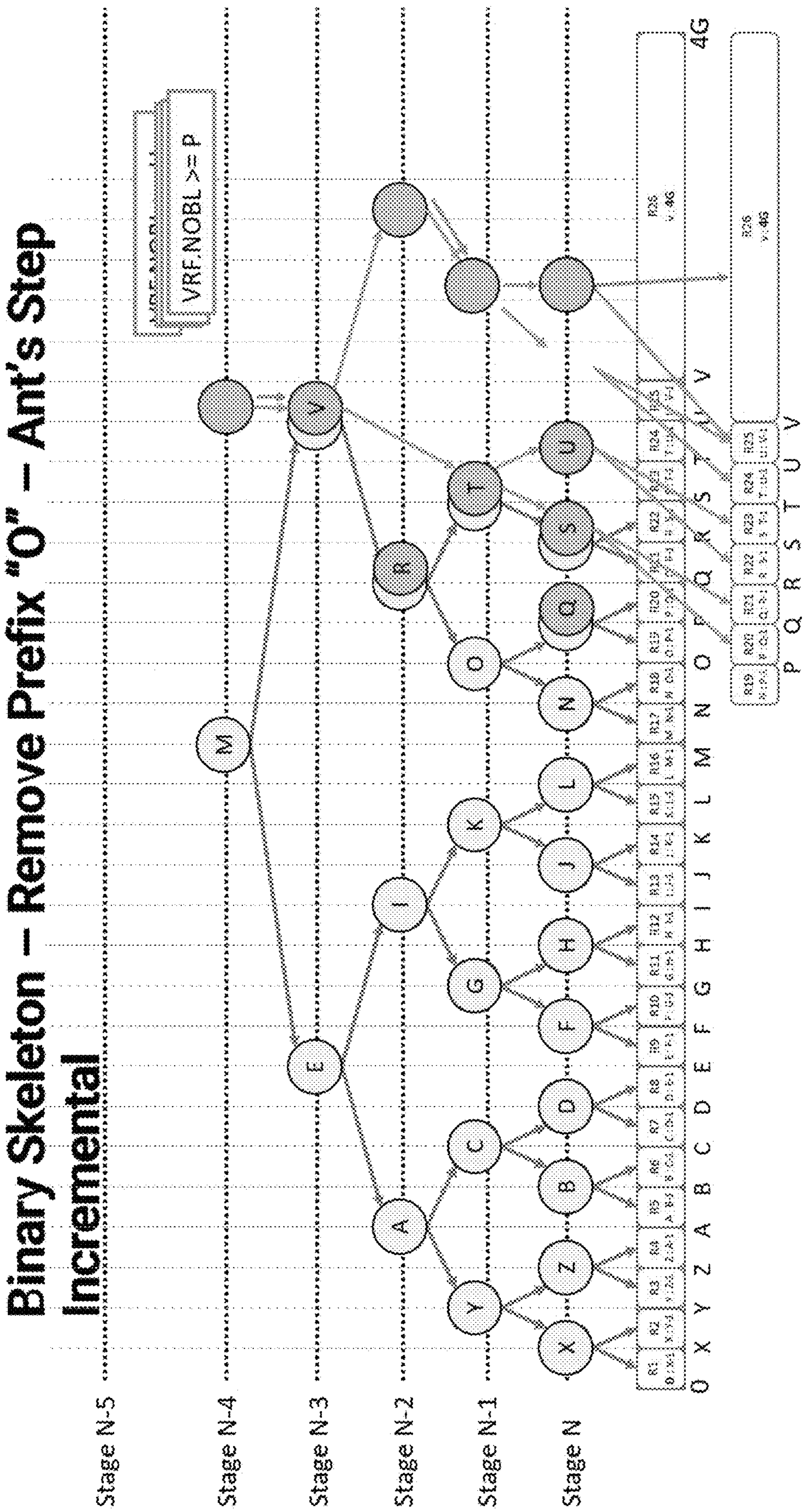
Figure 147:
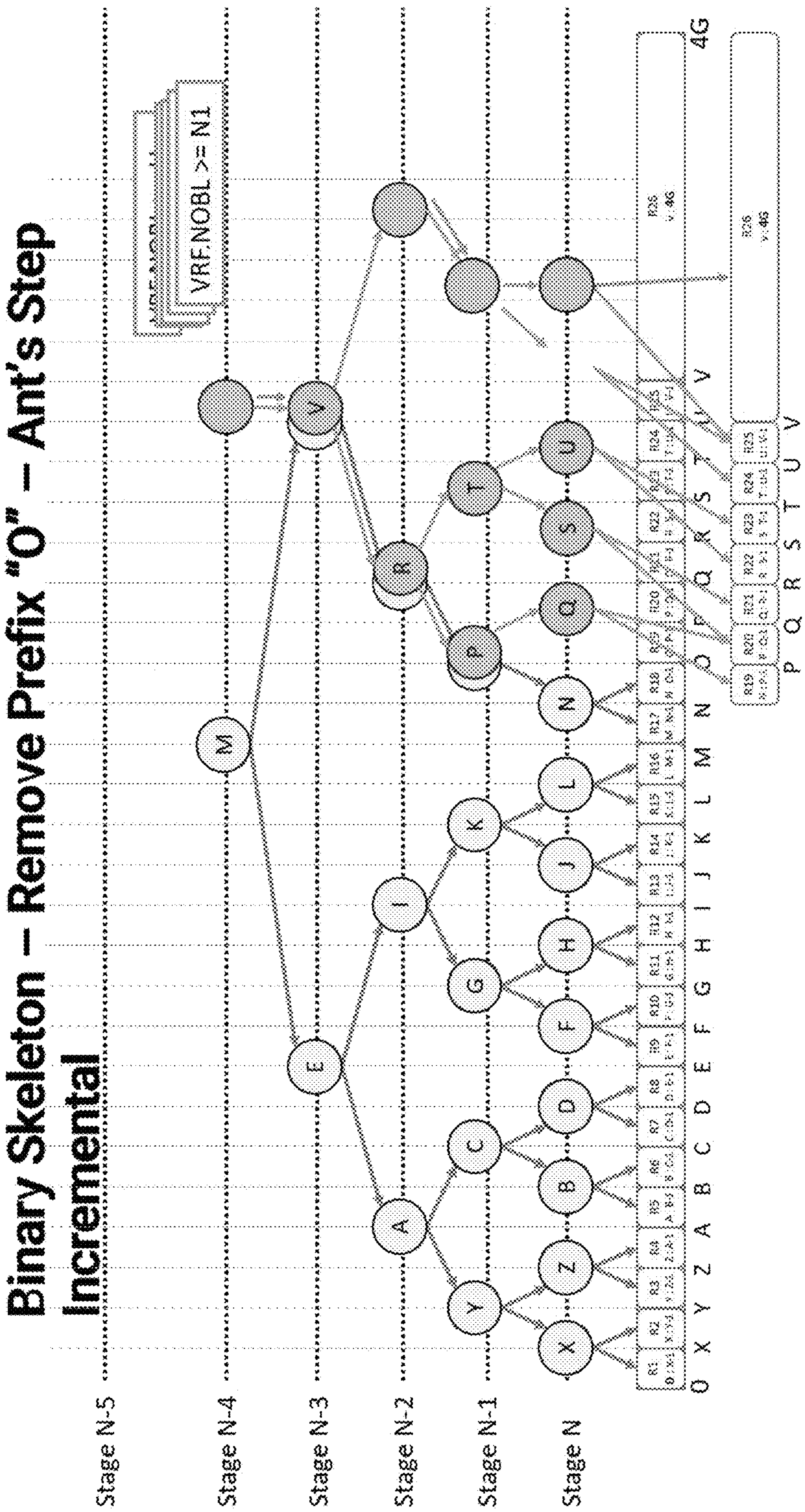
Figure 148:
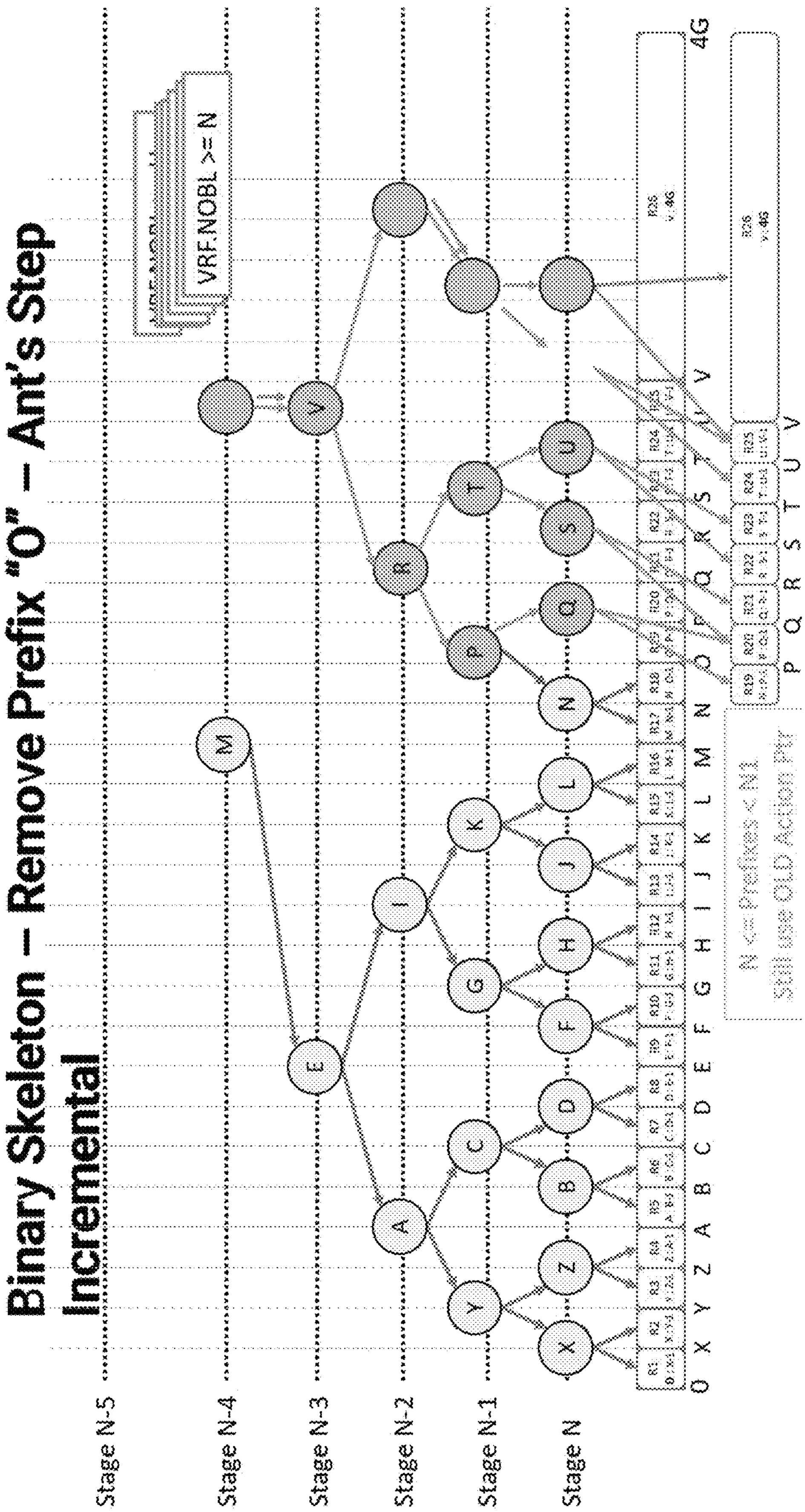
Figure 149:
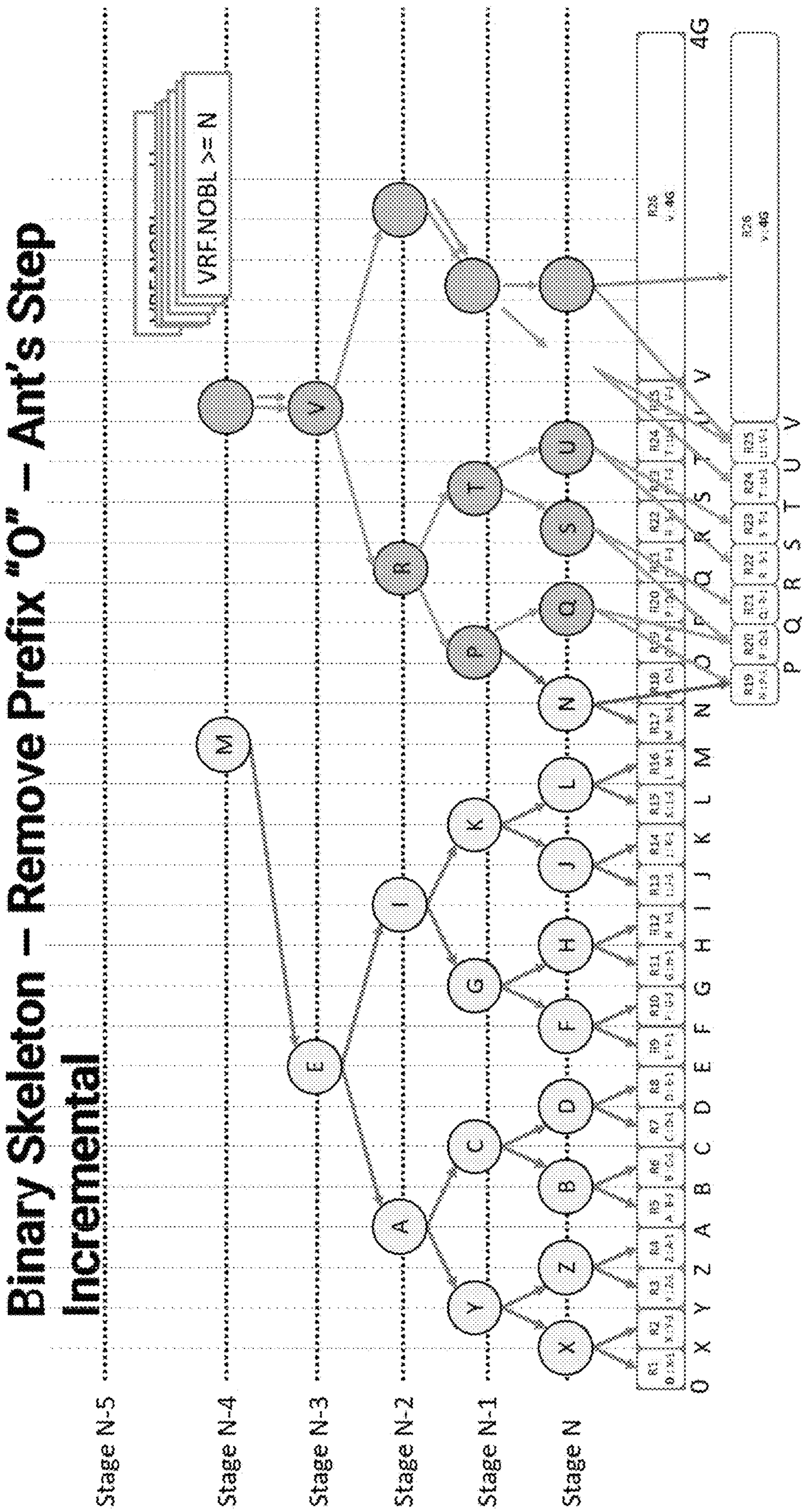
Figure 150:
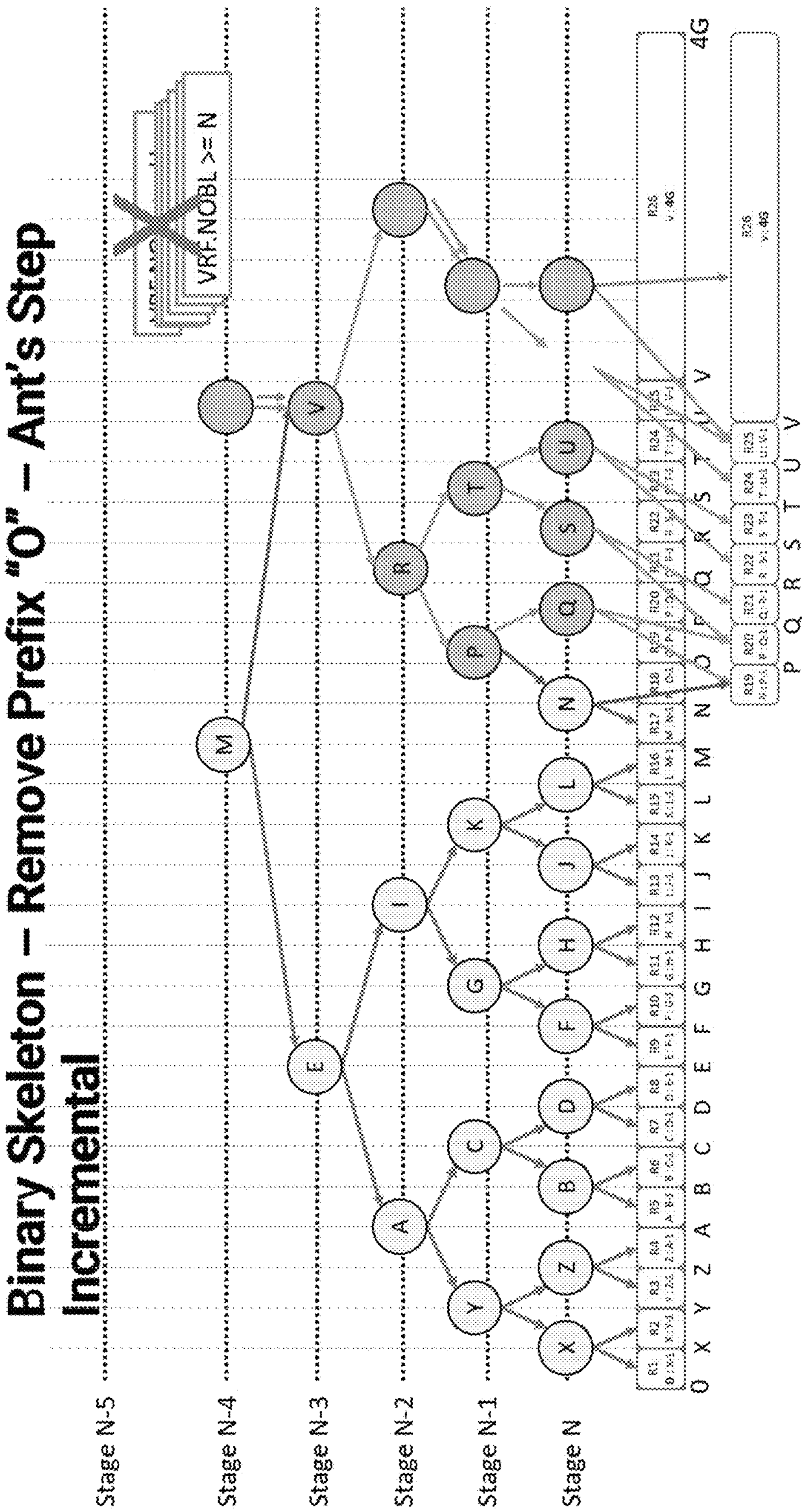

Method 100 may start by step 110 of obtaining a tree. Examples of the tree, examples of updating the tree, pseudo-codes and a hardware unit are illustrated in FIGS. 12-99.

Step 110 may include at least one of step 111 of receiving the tree and/or step 112 of generating the tree.

The tree includes multiple nodes. The multiple nodes may include leaf nodes and non-leaf (NL) nodes. A NL node may be a root node and/or an intermediate node of the tree that is not a leaf node.

The NL nodes may be associated with node boundary values that represent boundaries of destination address ranges. The association may include storing in the node (for example a memory entry allocated to the node) the node boundary value. In one implementation which is presented throughout this document each search iteration is based on comparing the value which is stored in each node (aka 'node boundary value') with the incoming packet's destination IP address. For the result of that comparison, we use the term 'smaller' and 'not smaller' ('not smaller' means bigger or equal). Accordingly, the maximum boundary value of a prefix is the last (biggest) address value which is included in that prefix PLUS 1. Consider the examples provided in paragraph [3]. The last highest supported address of 20.2.1.0/28 is 20.2.1.15, thus its maximum boundary value is: 20.2.1.16 (maximum address plus 1). Similarly, the last highest supported address of 20.2.1.0/24 is: 20.2.1.255, thus its maximum boundary value is 20.2.2.0 which is the next value of an IPv4 address after 20.2.1.255.

The destination address ranges may be spanned by destination addresses prefixes of a routing table. In a sense a tree implements a routing table or a part of a routing table.

Each NL node has NL children nodes. A parent NL node may have NL children nodes. The parent NL node is associated with links for accessing its NL children nodes. A NL child node may be a NL node or a leaf node. A NL node may have one or more NL child nodes that are NL nodes and/or one or more NL child nodes that are leaf nodes.

Each leaf node may be associated with a single destination address range.

The different destination address ranges may not cover the entire address range that can be spanned by the packet destination address. For example—a IPv4 address has 32 bits and can span an address range of 4G values. The different address ranges may cover only a part of the 4G address range. Thus—there may be a gap between at least two destination address ranges.

The tree may be a binary tree or may be an m-ary tree where m exceeds two. Any reference to a binary tree may be applied, mutatis mutandis, to a m-ray tree where m exceeds two.

The tree may include a bypass node, wherein a value of the bypass node may be an extremum value that results in selecting a same child node regardless of a value of the packet destination address.

Method 100 may also include step 120 of receiving a packet associated with a packet destination address. The association may include having the packet destination address including in the packet (for example in a header—or located elsewhere in the packet), or not included in the packet.

A tree may belong to a group trees, and step 120 may include obtaining a tree selection indicator that may be indicative of which tree of the group of trees to access. The different trees may be allocated to destination addresses of different lengths. The different trees may be allocated to different sets of users.

Step 120 may be followed by step 130 of scanning, using the packet destination address, the tree, to find a longest matching destination address prefix.

Step 130 may include step 131 of preforming multiple comparison iterations.

Figure 9:
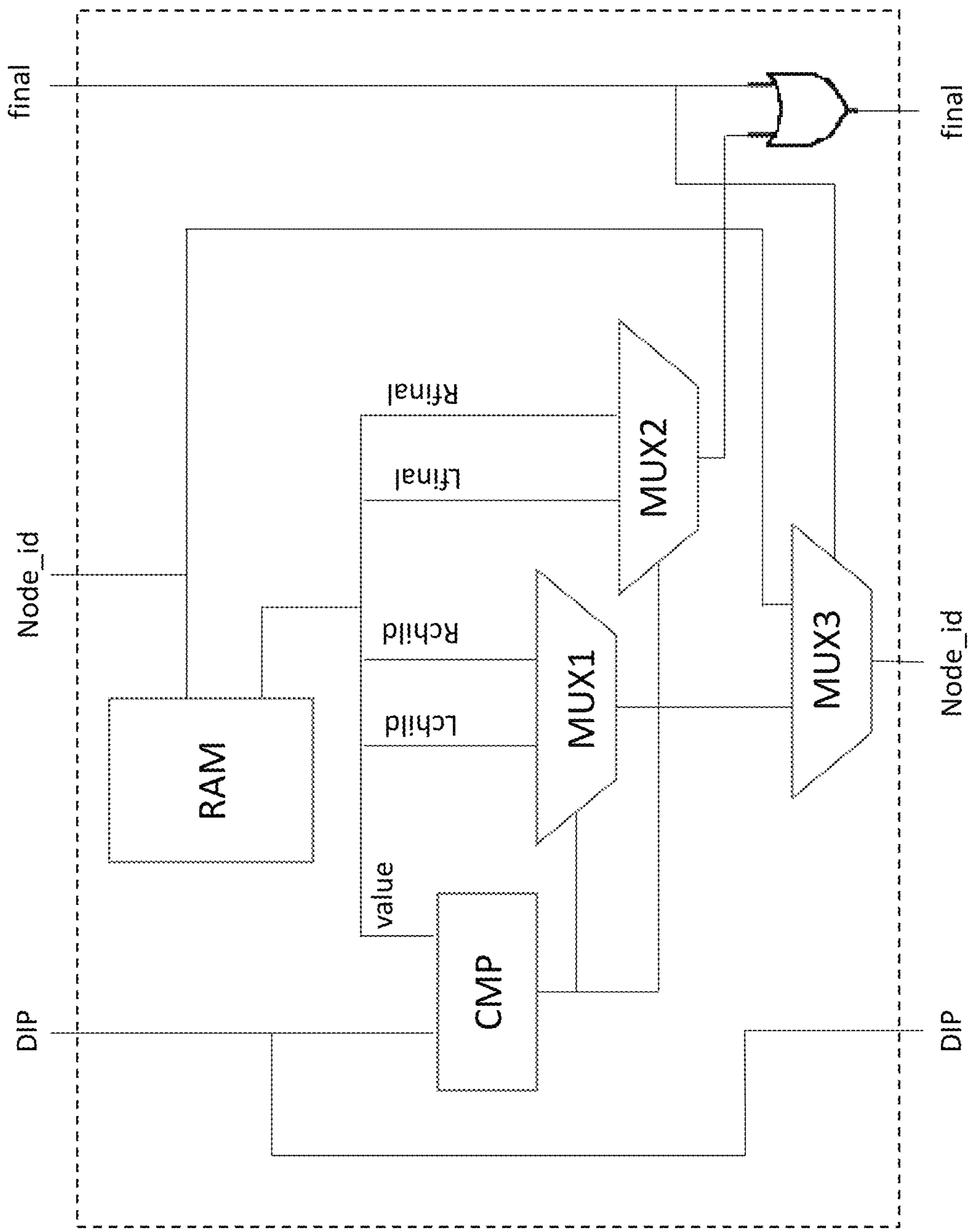
FIG. 9 illustrates an example of a hardware unit for scanning the tree.
Figure 10:
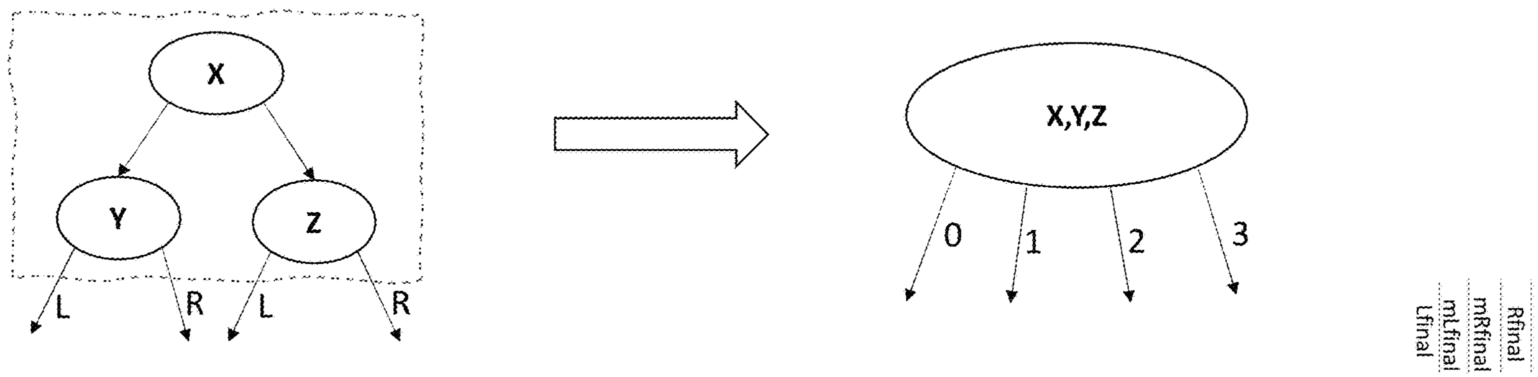
FIG. 10 illustrates an example of a conversion of binary nodes to m-ary nodes where m exceeds two.
Figure 11:
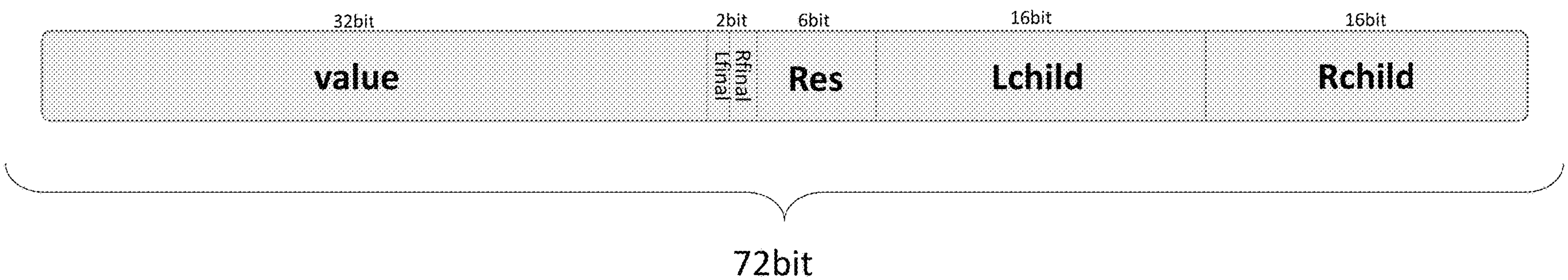
FIG. 11 illustrates an example of allocating different trees to address formats having different length.

A comparison iteration of the multiple iterations may include comparing the packet destination address (denoted DIP in FIG. 9) to a node boundary value of a node to provide a comparison iteration result.

a. The comparison result may be indicative of a next step of the scanning.
b. The comparison iteration result may select a next node of the tree to be compared to the packet destination address, when the next node is a NL node.
c. The comparison iteration results may select a destination address range of a leaf node, or a link to the destination address range when the next node is a leaf node.
d. Each NL node may be linked to NL children nodes and wherein the NL node may be also associated with the NL children node pointers that point to the NL children nodes. A comparison iteration result may select one of the NL children node as a next node to be evaluated during the next comparison iteration. For example—referring to FIG. 9—the address of the right NL child node is Rchild, the address of the left NL child node is Lchild—and the comparison result (output of comparator CMP) selects whether MUX1 will output Lchild or Rchild.
e. The comparison iteration result may indicate whether a selected NL child may be a leaf node. In FIG. 9—this is an output "final" from the OR gate. In this case that already reached a leaf node (previous iteration)—the final input signal will cause MUX 3 to output the node index ("node_id) from the previous iteration.

Step 130 may include step 132 of scanning the tree with a hardware unit that may include a comparator, a memory unit for storing values associated with the nodes, next node logic and leaf node logic. Another hardware unit may be used when reaching a leaf node. An example of the hardware unit is illustrated in FIG. 9.

Step 132 may include at least one of the following:

a. Performing a comparison iteration during a hardware unit cycle.
b. Receiving, during a comparison iteration and by the hardware unit, a packet destination address, a current node identifier, and an input leaf indication of whether the hardware unit already reached a leaf node.
c. Determining, by the leaf node logic, that the input leaf indication is indicative that the hardware unit reached the leaf node during a previous comparison iteration; and responding to the determining by (i) outputting by the next node logic the current node identifier and (ii) outputting, by the leaf node logic, an output leaf indication.
d. Retrieving from the memory unit links to candidate next nodes that may be linked to a current node identified by the current node identifier; and selecting by the next node logic, a next node of the candidate next nodes based on a comparison between the packet destination address and a node boundary value of the current node.
e. Retrieving from the memory unit leaf node indicators related to the candidate next nodes that are linked to the current node identified, and determining, by the leaf node logic whether the next node may be a leaf node.
f. The leaf node logic may include a leaf node indicator multiplexer (for example MUX 2 of FIG. 9) and a logic gate (for example the OR gate at the right left side of FIG. 9); and wherein the next node logic may include a next node multiplexer (denoted MUX1 in FIG. 9) and an output multiplexer (denoted MUX3 in FIG. 9).
g. At any given time the tree has a certain number of populated layers. The method may include determining that a leaf node was reached when the scanning reached the last populated layer. (The method may reach the leaf node before scanning all the layers of the tree). When reaching a leaf node the comparison iteration result indicates whether to select a destination address range that is to the right of the node boundary value of the leaf node or select a destination address range that is to the left of the node boundary value. A dedicated hardware unit may be used for this comparison—and may differ from the hardware unit used for scanning the tree till reaching the leaf node.

Step 130 may be followed by step 140 of applying at least one routing decision, based on the longest matching destination address prefix.

Method 100 may also include step 160 of updating the tree. Step 160 may be executed from time to time to reflect changed in a routing table.

Step 160 of updating the tree may include at least one of the following:

a. Introducing one or more changes in values of one or more of the boundaries of destination address ranges—while maintaining links to the multiple nodes unchanged. This greatly simplifies the management of the tree and the implementation of tree amendments—as the links maintain the same.
b. Maintaining (when comparing an pre-amendment state of the tree to an after-amendment state of the tree) at least a majority (for example 755, 80%, 85%, 90%, 95%, 99% and the like) of links between tree nodes unchanged while an overall number of the tree nodes maintains the same, despite changes in one or more destination addresses prefixes.
c. Replacing a node that is not a bypass node by a bypass node, while maintaining links of other nodes of the tree unchanged despite changes in one or more destination addresses prefixes.
d. Maintaining (when comparing an pre-amendment state of the tree to an after-amendment state of the tree) current links to NL nodes unchanged when changing a number of leaf nodes.
e. Changing values of node boundary values when changing the destination address ranges, wherein the changing may include repetitively selecting a set of nodes and rotating the node boundary values between the set of nodes.
f. Receiving by a software a new destination range; determining by the software a location of one or more new node boundary values; and updating the tree by a hardware unit.
g. Filling layers of different groups of layer, one group of layers after the other, starting from a lowest layer of the tree. The filling may also be executed during step 112.
h. Finding that a tree has no vacancy for a new destination address ranges, adding a new layer of NL nodes to the tree, and linking one or more NL nodes of the new layer to one or more nodes of current layers of the tree. This may include maintaining a majority of links of nodes of the current layers unchanged.
i. Replacing between bypass nodes and NL nodes during the updating.
j. Updating of the tree while keeping routing decisions supported by the tree unchanged. This feature allows to execute step 120 while executing step 113—and receiving the same routing decisions.
k. Executing step 120 on a shadow tree (replica of the tree before the last update) during step 113 while executing step 120 on the tree—and then replacing the roles of the shadow tree (not updated) with the tree.

Figure 152:
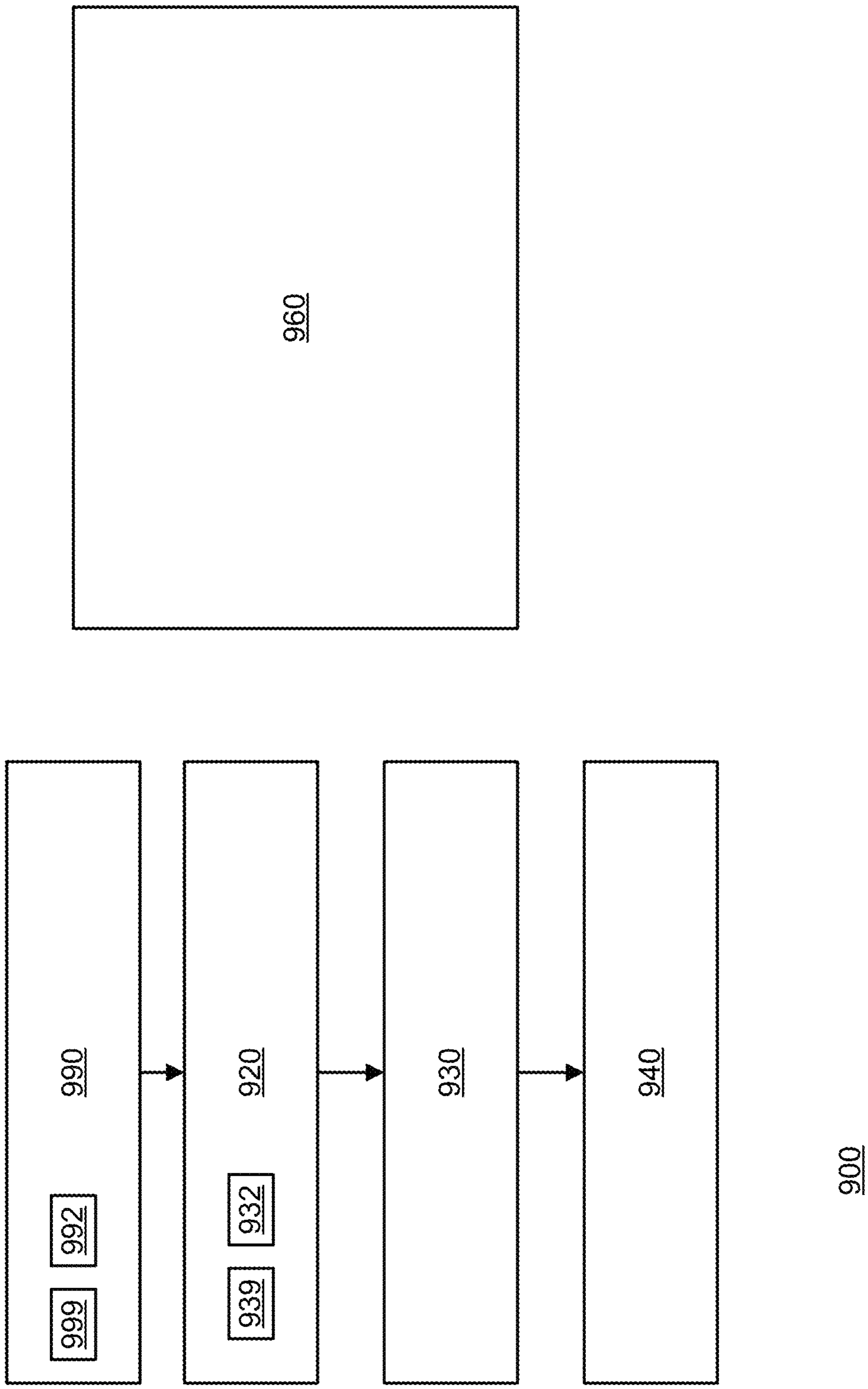
FIG. 152 illustrates an example of a method.

FIG. 152 illustrates a method 900 for routing using longest prefix matching.

Method 900 may include step 910 of obtaining a tree that is compressed.

Examples of the tree that is compresses, examples of updating the tree, pseudocodes and a hardware unit are illustrated in FIGS. 100-150.

Step 910 may include at least one of step 911 of receiving the tree and/or step 912 of generating the tree.

Step 112 may include at least one of:

a. Populating the tree by allocating ascending node boundary values to nodes having ascending node indexes.
b. The tree is binary and a populating of a certain node having a certain node index may include virtually inverting the certain node index to provide an inverted certain node index, determining a layer of the certain node by counting a number of reset most significant bits of the inverted certain node index, and determining an order of the certain node in the layer of the certain node based on any digit after a first set bit of the inverted certain node index. For example—assume node index of 110100—the inverter certain node index is 001011, the layer is the second layer (two zero valued MSBs), ignoring the first "1"—the order of the node is "011"—the third node of the second layer.

Receiving from a software a sorted list of the boundaries of destination address ranges, and building the tree by a Examples of the tree, examples of updating the tree, pseudo-codes and a hardware unit are illustrated in FIGS. 12-99.

a. The hardware unit does not need to know in advance the number of layers and is configured to populate the tree by assigning node boundary values.

The tree includes multiple nodes to find a longest matching destination address prefix. The tree includes multiple layers of nodes, the multiple layers of nodes may include a lowest layer of leaf nodes and non-leaf (NF) layers that may include NL nodes.

A NL node may have children of the same type-either

The NL nodes are associated with node boundary values that represent boundaries of destination address ranges.

The destination address ranges are determined based on destination addresses prefixes of a routing table.

The links between the NL nodes may be fixed.

The tree may be compressed in the sense that the tree does not store links to NL node children. A jumping to a child node (from a parent node) is executed by applying a function. The same function may be applied on all jumps.

The tree may include a bypass layer. Each layer may include a single bypass node.

A value of a bypass node is an extremum value that results in selecting a same child node regardless of a value of the packet destination address. This allows to maintain the fixed links between the nodes of the tree.

Method 900 may also include step 920 of receiving a packet associated with a packet destination address. The association may include having the packet destination address is included in the packet (for example in a header—or located elsewhere in the packet), or not included in the packet.

Step 920 may be followed by step 930 of scanning, using the packet destination address, the tree. Step 930 may differ from step 130 by calculating a next node address using a function—instead of using child node links. Step 930 may also differ from step 130 by not using a leaf node logic or a leaf node indicator in the manner used in method 100. The scanning may determine that it reached the leaf node when reaching the last populated layer of the tree. The number of populated layers of the tree at any given time is known—for example by having this value (or an indicator of this value) stored.

Step 930 may include step 931 of preforming multiple comparison iterations.

A comparison iteration of the multiple iterations may include comparing the packet destination address to a node boundary value of a node to provide a comparison iteration result.

a. The comparison result may be indicative of a next step of the scanning.
b. The comparison iteration result may select a next node of the tree to be compared to the packet destination address, when the next node is a NL node.
c. The comparison iteration results may select a destination address range of a leaf node, or a link to the destination address range when the next node is a leaf node.
d. Step 931 may include applying a function on the packet destination address and on the comparison result (not smaller or smaller) to provide the next node.
e. The comparison iteration result may select a next node of the tree to be compared to the packet destination address, when the next node is a NL node.
f. The comparison iteration results may select a destination address range of a leaf node, or a link to the destination address range when the next node is a leaf node.
g. A comparison iteration may include calculating a memory address of a NL child node by applying a function on (a) an address in memory of a parent NL node, and on (b) a comparison result between a packet destination address and a node boundary value of the parent NL node. The same function can be applied when calculating a memory address of each NL child node in the tree.
h. The tree may be a binary tree and the function may be (a) when the node boundary value of the parent NL node is not smaller than the packet destination address then a memory address of a NL child node equals a base address plus twice an offset of a memory address of the parent NL node plus one, and (b) when the node boundary value of the parent NL node is smaller than the packet destination address then the memory address of the NL child node equals the base address plus twice the offset of the memory address of the parent NL node.

Step 930 may include step 932 of scanning the tree with a hardware unit that may include a comparator, a memory unit for storing values associated with the nodes, and next node logic. Another hardware unit may be used when reaching a leaf node.

Step 930 may be followed by step 940 of applying at least one routing decision, based on the longest matching destination address prefix.

Method 900 may include step 960 of updating the tree. Step 960 may include at least one of the following:

a. Updating the tree by adding a new destination address range.
b. Updating of the tree keeps routing decisions supported by the tree unchanged.
c. Updating of the tree by an iterative process that may include multiple updating iterations.
d. Performing multiple update iterations, whereas an update iteration may include (a) selecting a tree node to provide a selected tree node, (b) changing a node boundary value of the selected tree node, (c) shifting one or more values of one or more leaf nodes while maintaining pointers to the leaf nodes.
e. Changing of the node boundary value may include duplicating the node boundary value.
f. Changing of the node boundary value may include selecting a set of nodes and rotating values of the nodes.
g. The tree has an update initial configuration at a beginning of the updating and has a update end configuration at an end of the updating. The update end configuration differs from the update initial configuration by (a) a change in an allocation of node boundary values to nodes of the tree, (b) a change in some leaf node values, and (c) an addition of a new node that points to one or two ends of a destination address range. The update initial configuration links may also appear, unchanged, in the update end configuration.
h. Changing of node boundary values by repetitively selecting a set of nodes and rotating the node boundary values between the set of nodes.
i. Updating the tree by removing a new destination address range.

There may be provided a non-transitory computer readable medium for routing using longest prefix matching, the non-transitory computer readable medium stores instructions for: receiving a packet associated with a packet destination address; scanning, using the packet destination address, a tree that comprises multiple nodes to find a longest matching destination address prefix; wherein the multiple nodes comprises leaf nodes and non-leaf (NL) nodes; wherein the NL nodes may be associated with node boundary values that represent boundaries of destination address ranges, the destination address ranges may be spanned by destination addresses prefixes of a routing table; and applying at least one routing decision, based on the longest matching destination address prefix.

The tree does not store links to NL node children.

The non-transitory computer readable medium may store instructions for calculating a memory address of a NL child node by applying a function on (a) an address in memory of a parent NL node, and on (b) a comparison result between a packet destination address and a node boundary value of the parent NL node.

The non-transitory computer readable medium may store instructions for applying the function when calculating a memory address of each NL child node in the tree.

The tree may be a binary tree and wherein the function may be (a) when the node boundary value of the parent NL node may be not smaller than the packet destination address then a memory address of a NL child node equals a base address plus twice an offset of a memory address of the parent NL node plus one, and (b) when the node boundary value of the parent NL node may be smaller than the packet destination address then the memory address of the NL child node equals the base address plus twice the offset of the memory address of the parent NL node.

The non-transitory computer readable medium may store instructions for populating the tree by allocating ascending node boundary values to nodes having ascending node indexes.

The tree may be binary and wherein the non-transitory computer readable medium may store instructions for populating a certain node having a certain node index may include virtually inverting the certain node index to provide an inverted certain node index, determining a layer of the certain node by counting a number of reset most significant bits of the inverted certain node index, and determining an order of the certain node in the layer of the certain node based on any digit after a first set bit of the inverted certain node index.

The non-transitory computer readable medium may store instructions for receiving from a software a sorted list of the boundaries of destination address ranges, and building the tree by a hardware unit.

The non-transitory computer readable medium may store instructions for updating the tree by adding a new destination address range.

The updating of the tree keeps routing decisions supported by the tree unchanged.

The updating of the tree may be an iterative process that may include multiple updating iterations, wherein an update iteration may include (a) selecting a tree node to provide a selected tree node, (b) changing a node boundary value of the selected tree node, (c) shifting one or more values of one or more leaf nodes while maintaining pointers to the leaf nodes.

The changing of the node boundary value may include duplicating the node boundary value.

The changing of the node boundary value may include selecting a set of nodes and rotating values of the nodes.

The tree has an update initial configuration at a beginning of the updating and has a update end configuration at an end of the updating.

The update end configuration differs from the update initial configuration by (a) a change in an allocation of node boundary values to nodes of the tree, (b) a change in some leaf node values, and (c) an addition of a new node that points to one or two ends of a destination address range.

The update initial configuration links also appear, unchanged, in the update end configuration.

The changing may include repetitively selecting a set of nodes and rotating the node boundary values between the set of nodes.

The non-transitory computer readable medium may store instructions for updating the tree by removing a new destination address range.

The tree belongs to a group trees, and wherein the non-transitory computer readable medium may store instructions for obtaining a tree selection indicator that may be indicative of which tree of the group of trees to access.

The different trees may be allocated to destination addresses of different lengths. The different trees may be allocated to different sets of users.

Each tree layer may include up to one single bypass node.

A value of a bypass node may be an extremum value that results in selecting a same child node regardless of a value of the packet destination address.

There may be provided a non-transitory computer readable medium for routing using longest prefix matching, the non-transitory computer readable medium stores instructions for: receiving a packet associated with a packet destination address; scanning, using the packet destination address, a tree that may include multiple nodes to find a longest matching destination address prefix; wherein the multiple nodes may include leaf nodes and non-leaf (NL) nodes; wherein the NL nodes may be associated with node boundary values that represent boundaries of destination address ranges, the destination address ranges may be spanned by destination addresses prefixes of a routing table; applying at least one routing decision, based on the longest matching destination address prefix; wherein each NL node has NL children nodes; wherein the NL node may be also associated with the NL children node pointers that point to the NL children nodes; and introducing one or more changes in values of one or more of the boundaries of destination address ranges, while maintaining links to the multiple nodes unchanged.

Each leaf node may be associated with a single destination address range.

There may be a gap between at least two destination address ranges.

A scanning of the tree may include preforming multiple comparison iterations.

A comparison iteration of the multiple iterations may include comparing the packet destination address to a node boundary value of a node to provide a comparison iteration result that may be indicative of a next step of the scanning.

The comparison iteration result selects a next node of the tree to be compared to the packet destination address, when the next node may be NL node.

The comparison iteration results selects a destination address range of a leaf node, when the next node may be a leaf node.

The comparison iteration results selects a link to a destination address range of a leaf node, when the next node may be a leaf node.

Each NL node may be linked to NL children nodes and wherein the NL node may be also associated with the NL children node pointers that point to the NL children nodes.

A comparison iteration result selects one of the NL children node as a next node to be evaluated during the next comparison iteration.

A comparison iteration result indicates whether a selected NL child may be a leaf node.

The non-transitory computer readable medium may store instructions for scanning the tree with a hardware unit that may include a comparator, a memory unit for storing values associated with the nodes, next node logic and leaf node logic.

The non-transitory computer readable medium may store instructions for performing a comparison iteration during a hardware unit cycle.

The non-transitory computer readable medium may store instructions for receiving, during a comparison iteration and by the hardware unit, a packet destination address, a current node identifier, and an input leaf indication of whether the hardware unit already reached a leaf node.

The non-transitory computer readable medium may store instructions for determining, by the leaf node logic, that the input leaf indication may be indicative that the hardware unit reached the leaf node during a previous comparison iteration; and responding to the determining by (i) outputting by the next node logic the current node identifier and (ii) outputting, by the leaf node logic, an output leaf indication.

The non-transitory computer readable medium may store instructions for retrieving from the memory unit links to candidate next nodes that may be linked to a current node identified by the current node identifier; and selecting by the next node logic, a next node of the candidate next nodes based on a comparison between the packet destination address and a node boundary value of the current node.

The non-transitory computer readable medium may store instructions for retrieving from the memory unit leaf node indicators related to the candidate next nodes that may be linked to the current node identified, and determining, by the leaf node logic whether the next node may be a leaf node.

The leaf node logic may include a leaf node indicator multiplexer and a logic gate; and wherein the next node logic may include a next node multiplexer and an output multiplexer.

The non-transitory computer readable medium may store instructions for maintaining at least a majority of links between tree nodes unchanged while an overall number of the tree nodes maintains the same, despite changes in one or more destination addresses prefixes.

The tree may include a bypass node, and wherein the non-transitory computer readable medium may store instructions for replacing a node that may be not a bypass node by a bypass node, while maintaining links of other nodes of the tree unchanged despite changes in one or more destination addresses prefixes.

The non-transitory computer readable medium may store instructions for maintaining links to non-leaf nodes when changing a number of leaf nodes.

The non-transitory computer readable medium may store instructions for changing values of node boundary values when changing the destination address ranges, wherein the changing may include repetitively selecting a set of nodes and rotating the node boundary values between the set of nodes.

The tree belongs to a group trees, and wherein the non-transitory computer readable medium may store instructions for obtaining a tree selection indicator that may be indicative of which tree of the group of trees to access.

The different trees may be allocated to destination addresses of different lengths.

The different trees may be allocated to different sets of users.

The non-transitory computer readable medium may store instructions for receiving by a software a new destination range; determining by the software a location of one or more new node boundary values; and updating the tree by a hardware unit.

The tree may be a binary tree.

The tree may be an m-ary tree where m exceeds two.

The non-transitory computer readable medium may store instructions for building the tree by filling layers of different groups of layer, one group of layers after the other, starting from a lowest layer of the tree.

The non-transitory computer readable medium may store instructions for finding that a tree has no vacancy for a new destination address ranges, adding a new layer of non-leaf nodes to the tree, and linking one or more non-leaf nodes of the new layer to one or more nodes of current layers of the tree.

The non-transitory computer readable medium maintaining a majority of links of nodes of the current layers unchanged.

The tree may include a bypass node, wherein a value of the bypass node may be an extremum value that results in selecting a same child node regardless of a value of the packet destination address.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM; Resistive-RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for routing using longest prefix matching, the method comprising:

receiving a packet associated with a packet destination address;

scanning, using the packet destination address, a tree that comprises multiple nodes to find a longest matching destination address prefix; wherein the multiple nodes comprises leaf nodes and non-leaf (NL) nodes; wherein the NL nodes are associated with node boundary values that represent boundaries of destination address ranges, the destination address ranges are spanned by destination addresses prefixes of a routing table; and applying at least one routing decision, based on the longest matching destination address prefix;

wherein the NL nodes comprise parent NL nodes, each parent NL node has NL children nodes; wherein each parent NL node is associated with links for accessing its NL children nodes and also associated with NL children node pointers that point to its NL children nodes; and introducing one or more changes in values of one or more of the boundaries of destination address ranges, wherein the tree implements a routing table, while maintaining links to the multiple nodes unchanged.

2. The method according to claim 1 wherein each leaf node is associated with a single destination address range.

3. The method according to claim 1 wherein there is a gap between at least two destination address ranges.

4. The method according to claim 1 wherein a scanning of the tree comprises preforming multiple comparison iterations.

5. The method according to claim 1, comprising maintaining at least a majority of links between tree nodes unchanged while an overall number of the tree nodes maintains the same, despite changes in one or more destination addresses prefixes.

6. The method according to claim 1, wherein the tree comprises a bypass node, and wherein the method comprises replacing a node that is not a bypass node by a bypass node, while maintaining links of other nodes of the tree unchanged despite changes in one or more destination addresses prefixes.

7. The method according to claim 1, comprising changing values of node boundary values when changing the destination address ranges, wherein the changing comprises repetitively selecting a set of nodes and rotating the node boundary values between the set of nodes.

8. The method according to claim 1, wherein the tree belongs to a group trees, and wherein the method comprises obtaining a tree selection indicator that is indicative of which tree of the group of trees to access.

9. The method according to claim 1, comprising receiving by a software a new destination range; determining by the software a location of one or more new node boundary values; and updating the tree by a hardware unit.

10. The method according to claim 1, comprising building the tree by filling layers of different groups of layer, one group of layers after the other, starting from a lowest layer of the tree.

11. The method according to claim 1, comprising finding that a tree has no vacancy for a new destination address ranges, adding a new layer of non-leaf nodes to the tree, and linking one or more non-leaf nodes of the new layer to one or more nodes of current layers of the tree.

12. The method according to claim 1, wherein the tree comprises a bypass node, wherein a value of the bypass node is an extremum value that results in selecting a same child node regardless of a value of the packet destination address.

13. The method according to claim 4 wherein a comparison iteration of the multiple iterations comprises comparing the packet destination address to a node boundary value of a node to provide a comparison iteration result that is indicative of a next step of the scanning.

14. The method according to claim 13 wherein the comparison iteration result selects a next node of the tree to be compared to the packet destination address, when the next node is NL node.

15. The method according to claim 13 wherein the comparison iteration results selects a destination address range of a leaf node, when the next node is a leaf node.

16. The method according to claim 13 wherein the comparison iteration results selects a link to a destination address range of a leaf node, when the next node is a leaf node.

17. The method according to claim 4, wherein a comparison iteration result indicates whether a selected NL child is a leaf node.

18. The method according to claim 4 comprising scanning the tree with a hardware unit that comprises a comparator, a memory unit for storing values associated with the nodes, next node logic and leaf node logic.

19. The method according to claim 18 comprising receiving, during a comparison iteration and by the hardware unit, a packet destination address, a current node identifier, and an input leaf indication of whether the hardware unit already reached a leaf node.

20. The method according to claim 19 comprising determining, by the leaf node logic, that the input leaf indication is indicative that the hardware unit reached the leaf node during a previous comparison iteration; and responding to the determining by (i) outputting by the next node logic the current node identifier and (ii) outputting, by the leaf node logic, an output leaf indication.

21. The method according to claim 19 comprising:

retrieving from the memory unit links to candidate next nodes that are linked to a current node identified by the current node identifier; and selecting by the next node logic, a next node of the candidate next nodes based on a comparison between the packet destination address and a node boundary value of the current node.

22. The method according to claim 18, wherein the leaf node logic comprises a leaf node indicator multiplexer and a logic gate; and wherein the next node logic comprises a next node multiplexer and an output multiplexer.

23. A non-transitory computer readable medium for routing using longest prefix matching, the non-transitory computer readable medium stores instructions for:

receiving a packet associated with a packet destination address;

scanning, using the packet destination address, a tree that comprises multiple nodes to find a longest matching destination address prefix; wherein the multiple nodes comprises leaf nodes and non-leaf (NL) nodes; wherein the NL nodes are associated with node boundary values that represent boundaries of destination address ranges, the destination address ranges are spanned by destination addresses prefixes of a routing table; and wherein the NL nodes comprise parent NL nodes, each parent NL node has NL children nodes; wherein each parent NL node is associated with links for accessing its NL children nodes and also associated with NL children node pointers that point to its NL children nodes; and introducing one or more changes in values of one or more of the boundaries of destination address ranges, wherein the tree implements a routing table, while maintaining links to the multiple nodes unchanged.

* * * * *